US012743194B2

(12) United States Patent
Gutierrez

(10) Patent No.: US 12,743,194 B2
(45) Date of Patent: Sep. 22, 2026

(54) SYSTEMS AND METHODS FOR SEMANTICALLY GOVERNED SPECIFICATION-DRIVEN INTEROPERABILITY IN DISTRIBUTED ENVIRONMENTS

(71) Applicant: Comake, Inc., Los Angeles, CA (US)

(72) Inventor: Andres Eduardo Gutierrez, Atlanta, GA (US)

(73) Assignee: Comake, Inc., Los Angeles, CA (US)

( * ) Notice: Subject to any disclaimer, the term of this patent is extended or adjusted under 35 U.S.C. 154(b) by 0 days.

(21) Appl. No.: 19/200,402

(22) Filed: May 6, 2025

(65) Prior Publication Data

US 2025/0328341 A1 Oct. 23, 2025

Related U.S. Application Data

(63) Continuation of application No. 19/187,797, filed on Apr. 23, 2025, which is a continuation-in-part of (Continued)

(51) Int. Cl.
*G06F 9/44* (2018.01)
*G06F 3/0484* (2022.01)
(Continued)

(52) U.S. Cl.
CPC .............. *G06F 3/0484* (2013.01); *G06F 8/10* (2013.01); *G06F 8/35* (2013.01); *G06F 8/71* (2013.01); *G06F 40/30* (2020.01); *G06Q 10/40* (2026.01)

(58) Field of Classification Search
None
See application file for complete search history.

(56) References Cited

U.S. PATENT DOCUMENTS 5,872,973 A * 2/1999 Mitchell ................. G06F 9/465 719/330
6,370,537 B1 4/2002 Gilbert et al.
(Continued)

FOREIGN PATENT DOCUMENTS

WO WO-2021/127550 A1 6/2021
WO WO-2023/122344 A1 6/2023
WO WO-2025/029343 A1 2/2025

OTHER PUBLICATIONS

Scott Rose et al., "Zero Trust Architecture", Aug. 2020 (Year: 2020).*

(Continued)

*Primary Examiner* — Lanny N Ung
(74) *Attorney, Agent, or Firm* — Foley & Lardner LLP

(57) ABSTRACT

Disclosed herein are systems and methods for enabling decentralized, schema-driven interoperability across distributed computing environments through the use of a Standard Knowledge Language (SKL). An Enterprise Mesh Platform (EMP) interprets and executes SKL specifications—such as capabilities, objects, mappings, policies, and workflows—as composable, machine-interpretable contracts that define data structures, logic, and governance protocols. The system supports dynamic versioning, validation, semantic linking, and recursive execution of SKL-defined components. A mesh-wide analytics server coordinates execution, issue detection, and resolution propagation. Capabilities can be orchestrated, remediated, and adapted in real-time based on SKL-defined relationships, while preserving compliance and traceability. The disclosed architecture facilitates federated development, adaptive system integration, and fine-grained policy enforcement across complex digital ecosystems.

20 Claims, 72 Drawing Sheets

Related U.S. Application Data application No. 18/814,305, filed on Aug. 23, 2024, which is a continuation-in-part of application No. 18/303,890, filed on Apr. 20, 2023, now Pat. No. 12,367,337, which is a continuation of application No. 18/088,485, filed on Dec. 23, 2022, now abandoned, said application No. 18/814,305 is a continuation-in-part of application No. 17/965,650, filed on Oct. 13, 2022, said application No. 18/088,485 is a continuation-in-part of application No. 17/707,888, filed on Mar. 29, 2022, said application No. 17/965, 650 is a continuation-in-part of application No. 17/707,888, filed on Mar. 29, 2022.

(60) Provisional application No. 63/637,381, filed on Apr. 23, 2024, provisional application No. 63/534,335, filed on Aug. 23, 2023, provisional application No. 63/354,563, filed on Jun. 22, 2022, provisional application No. 63/351,690, filed on Jun. 13, 2022, provisional application No. 63/308,305, filed on Feb. 9, 2022, provisional application No. 63/293,600, filed on Dec. 23, 2021, provisional application No. 63/255,401, filed on Oct. 13, 2021, provisional application No. 63/191,852, filed on May 21, 2021, provisional application No. 63/167,401, filed on Mar. 29, 2021.

(51) Int. Cl.

| | |
|---|---|
| ***G06F 8/10*** | (2018.01) |
| ***G06F 8/35*** | (2018.01) |
| ***G06F 8/71*** | (2018.01) |
| ***G06F 40/30*** | (2020.01) |
| ***G06Q 10/40*** | (2026.01) |

(56) References Cited

U.S. PATENT DOCUMENTS 7,099,885 B2 8/2006 Hellman et al.
7,162,427 B1 1/2007 Myrick et al.
7,340,726 B1* 3/2008 Chelf .................. G06F 11/3604 714/38.12
7,424,701 B2 9/2008 Kendall et al.
9,201,966 B2 12/2015 Lundberg
9,715,518 B2 7/2017 Ducott, III et al.
10,467,344 B1 11/2019 Jade et al.
10,762,060 B1 9/2020 Faulkner et al.
11,314,692 B1 4/2022 Gutierrez et al.
11,409,820 B1 8/2022 Gutierrez et al.
11,586,591 B1 2/2023 Gutierrez et al.
11,720,642 B1 8/2023 Gutierrez et al.
11,741,115 B2 8/2023 Gutiã%%rrez et al.
2003/0028370 A1 2/2003 Leffert
2003/0179228 A1 9/2003 Schreiber et al.
2003/0216919 A1 11/2003 Roushar
2008/0172440 A1 7/2008 Jagannathan
2008/0294426 A1* 11/2008 Evans ..................... G06F 40/30 704/9
2009/0138454 A1 5/2009 Rayner et al.
2010/0205529 A1 8/2010 Butin et al.
2012/0047149 A1 2/2012 Zhou et al.
2012/0210296 A1 8/2012 Boulter et al.
2013/0117219 A1 5/2013 Malka et al.
2014/0136531 A1 5/2014 Aflalo et al.
2016/0042058 A1 2/2016 Nguyen
2016/0308982 A1 10/2016 Greene
2016/0335314 A1* 11/2016 Grigoreva ............. G06F 16/951
2017/0177310 A1* 6/2017 Mathias .................... G06F 8/36
2018/0196812 A1 7/2018 Gupta et al.
2018/0232445 A1 8/2018 Gomadam et al.
2018/0341371 A1 11/2018 Callaghan
2019/0050378 A1 2/2019 Novak et al.
2019/0087691 A1 3/2019 Jelveh
2019/0361860 A1 11/2019 Rogynskyy et al.
2019/0361934 A1 11/2019 Rogynskyy et al.
2019/0370812 A1 12/2019 Kandasamy et al.
2020/0234155 A1 7/2020 Ares et al.
2020/0334313 A1 10/2020 Kussmaul et al.
2021/0248534 A1 8/2021 Ares
2021/0405959 A1 12/2021 Lovitt
2022/0050864 A1 2/2022 Osmon et al.
2022/0164683 A1* 5/2022 Hao ........................ G06N 3/044
2022/0269790 A1* 8/2022 Rajana .................. G06F 21/577
2022/0309037 A1 9/2022 Gutierrez et al.
2023/0143597 A1 5/2023 Gutierrez et al.
2023/0252233 A1 8/2023 Gutierrez et al.

OTHER PUBLICATIONS

"A new way to use computers" Published in Adept, Retrieved from https://www.adept.ai/, Retrieved on Mar. 21, 2023, 5 pages.
"Action", Published in Action Schema.org Type, Retrieved from https://schema.org/Action, Retrieved on Dec. 28, 2022, 3 pages.
"Automatically Categorized Bookmarks", Published in Speare, Inc on 2020, Retrieved on Mar. 26, 2021, Retrieved from https://stash.ai, 7 pages.
"Block Protocol", Published in from Block Protocol, Retrieved from https://blockprotocol.org, Retrieved on Dec. 28, 2022, 9 pages.
"Browser support for JavaScript APIs", Published in mdn web docs, Retrieved from https://developer.mozilla.org/en-US/docs/Mozilla/Add-ons/WebExtensions/Browser_support_for_JavaScript_APIs, Retrieved on Dec. 28, 2022, 69 pages.
"Build Multi-agent simulations in minutes", Published in HASH, Retrieved from https://web.archive.org/web/20220117015712/https:/hash.ai, Retrieved on Dec. 28, 2022, 4 pages.
"Centralize ALL your data in minutes" Published in Airbyte, Retrieved from https://airbyte.com, Retrieved on Mar. 21, 2023, 10 pages.
"Change the Way You Work with Data", Published in MarkLogic, Retrieved from https://www.marklogic.com, Retrieved on Mar. 22, 2023, 4 pages.
"Chrome Extensions Reference", Published in API reference-Chrome Developers, Retrieved from https://developer.chrome.com/docs/extensions/reference, Retrieved on Dec. 28, 2022, 10 pages.
"Comake SKL Demo for Delta", Published in Youtube, Retrieved from https://youtu.be/m_KsDWW84VU?t=177, Retrieved on Dec. 28, 2022, 2 pages.
"Data modeling for modern data warehouses", Published in Activity Schema, Retrieved from https://www.activityschema.com, Retrieved on Dec. 28, 2022, 6 pages.
"Data-Driven agility without compromise", Published in Virtuoso, Retrieved from https://virtuoso.openlinksw.com/, Retrieved on Mar. 21, 2023, 10 pages.
"Decision Intelligence through Knowledge Democratization" Published in Metaphacts, Retrieved from https://metaphacts.com/, Retrieved on Mar. 21, 2023, 10 pages.
"Design Tokens Format Module", Published in Draft Community Group Report, Published on Dec. 13, 2022, Retrieved from https://tr.designtokens.org/format, 48 pages.
"Dolt—It's Git for Data", Published in DoltHub, Retrieved on Mar. 25, 2021, Retrieved from https://github.com/dolthub/dolt, 10 pages.
"Events", Published in Nylas API v2.7—Nylas Docs, Retrieved from https://developer.nylas.com/docs/api/#tag--Events, Retrieved on Dec. 28, 2022, 1 page.
"Example Domain" Retrieved from http://example.com/idlab/function/getMIMEType, Retrieved on Dec. 28, 2022, 1 page.
"HoloLens 2 AR Headset: On Stage Live Demonstration", Published in UploadVR, Published on Feb. 24, 2019, Retrieved from https://youtu.be/uIHPPtPBgHk?t=106 , 3 pages.
"Mem: The self-organizing workspace", Published in MEM, Retrieved from https://get.mem.ai, Retrieved on Dec. 28, 2022, 14 pages.
"Merge SDKs", Published in Merge SDKs, Retrieved from https://docs.merge.dev/sdk, Retrieved on Dec. 28, 2022, 5 pages.

(56) References Cited

OTHER PUBLICATIONS

"Metriport", Published in Github, Retrieved from https://github.com/metriport/metriport/tree/master/api/app/src/mappings, Retrieved on Dec. 28, 2022.
"OpenAPI Generator", Retrieved from https://openapi-generator.tech, Retrieved on Dec. 28, 2022, 10 pages.
"Patient", Published in Flexpa, Retrieved from https://www.flexpa.com/docs/fhir-resources/patient, Retrieved on Dec. 28, 2022, 4 pages.
"Protege", Published in Protege, Retrieved from https://protege.stanford.edu, Retrieved on Dec. 28, 2022.
"Speech Recognition", Published in Web Accessibility Initiative (WAI), W3C, Retrieved on Oct. 27, 2021, Retrieved from URL: https://www.w3.org/WAI/perspective-videos/voice/, 6 pages,.
"Stop wasting time manually writing weekly updates", Published in Broadcast, Retrieved from https://www.withbroadcast.com/, Retrieved on Mar. 21, 2023, 8 pages.
"Storage API Docs", Published in The Unified API Platform—Kloudless, Retrieved from https://developers.kloudless.com/docs/latest/storage#files, Retrieved on Dec. 28, 2022, 26 pages.
"Superface", Retrieved from https://superface.ai, Retrieved on Dec. 28, 2022, 7 pages.
"Surfingkeys", Published in Chrome Web Store, Retrieved on Oct. 27, 2021, Retrieved from https://chrome.google.com/webstore/detail/surfingkeys/gfbliohnnapiefjpjlpjnehglfpaknnc?hl=en-US, 6 pages.
"Swagger Codegen", Published in Swagger Open Source, Retrieved from https://swagger.io/tools/swagger-codegen, Retrieved on Dec. 28, 2022, 4 pages.
"The Automated data movement platform", Published in Fivetran, Retrieved from https://www.fivetran.com, Retrieved on Mar. 21, 2023, 9 pages.
"The Developer Platform" Published in Apollo, Retrieved from https://www.apollographql.com/, Retrieved on Mar. 22, 2023, 4 pages.
"The Employee object" Retrieved from https://docs.merge.dev/hris/employees. Retrieved on Dec. 28, 2022, 253 pages.
"The fastest path from data to insight" Published in Starburst Data Inc, Retrieved from https://www.starburst.io/, Retrieved on Mar. 21, 2023, 5 pages.
"The Lead object", Published in Merge Documentation, Retrieved from https://docs.merge.dev/crm/leads/#leads-object, Retrieved on Dec. 28, 2022, 19 pages.
"Unabomber Manifesto", Published in Wikipedia, Published on Mar. 23, 2021, Retrieved from https://en.wikipedia.org/wiki/Unabomber_Manifesto, 7 pages.
"Universal API for Healthcare Data, Published in Metriport", Retrieved from https://metriport.com/, Retrieved on Dec. 28, 2022, 11 pages.
"Using the Web Speech API", Published in MDN Web Docs, Mozilla, Retrieved on Oct. 27, 2021, Retrieved from https://developer.mozilla.org/en-US/docs/Web/API/Web_Speech_API/Using_the_Web_Speech_API, 13 pages.
"Vimium", Published in Chrome Web Store, Retrieved on Oct. 27, 2021, Retrieved from https://chrome.google.com/webstore/detail/vimium/dbepggeogbaibhgnhhndojpepiihcmeb?hl=en, 6 pages.
"Wasting time and energy trying to stay organized? We can help", Published in Journal—Bring your projects to life, Retrieved on Mar. 26, 2021, Retrieved from https://usejournal.com, 6 pages.
"Welcome to DoItHub", Published in DoItHub Home | DoItHub, Retrieved on Mar. 26, 2021, Retrieved from https://www.doIthub.com, 1 page.
8.1.15 Resource Patient—Detailed Descriptions, Published in HL7FHIR—Local Build (markiantorno), Retrieved from https://build.fhir.org/patient-definitions.html, Retrieved on Dec. 28, 2022, 8 pages.
A Large-scale Investigation of Semantically Incompatible APIs behind Compatibility Issues in Android Apps—arXiv, accessed Apr. 9, 2025, https://arxiv.org/html/2406.17431v1.
A Model-Driven Method for automatic generation of Rule-based Web Applications—CEUR-WS.org, accessed Apr. 9, 2025, https://ceur-ws.org/Vol-486/kese2009-02.pdf.
A new paradigm for Continuous Alignment of Business and IT: Combining Enterprise Architecture Modeling and Enterprise Ontology, Repository.up.ac.za, accessed Apr. 9, 2025, https://repository.up.ac.za/bitstream/2263/50927/1/Hinkelmann_New_2016.pdf.
AA'01 Tutorial on Agent Communication Languages—UMBC CSEE, accessed Apr. 9, 2025, https://www.csee.umbc.edu/~finin/talks/691m.pdf.
Agent Certification Standards and Federated Meta-Orchestration: Building Reliable and Scalable AI Systems—Ve3 Global, Dec. 30, 2024, accessed Apr. 9, 2025, https://www.ve3.global/agent-certification-standards-and-federated-meta-orchestration-building-reliable-and-scalable-ai-systems/.
Agent Communications Language—Wikipedia, accessed Apr. 9, 2025, https://en.wikipedia.org/wiki/Agent_Communications_Language.
Agentic Workflows: Everything You Need to Know—Automation Anywhere, accessed Apr. 9, 2025, https://www.automationanywhere.com/rpa/agentic-workflows.
AI-Generated Infrastructure-as-Code: The Good, the Bad and the Ugly, Paul Foryt, published Feb. 2, 2023, accessed Apr. 9, 2025, https://www.styra.com/blog/ai-generated-infrastructure-as-code-the-good-the-bad-and-the-ugly/.
Alenezi, M., & Akour, M. (2025). AI-Driven Innovations in Software Engineering: A Review of Current Practices and Future Directions. Applied Sciences, 15(3), 1344., accessed Apr. 9, 2025, https://www.mdpi.com/2076-3417/15/3/1344.
Ali, A., Tufail, A., De Silva, L. C., & Abas, P. E. (2024). Innovating Patent Retrieval: A Comprehensive Review of Techniques, Trends, and Challenges in Prior Art Searches. Applied System Innovation, 7(5), 91., accessed Apr. 9, 2025, https://www.mdpi.com/2571-5577/Jul. 5, 91.
Alsaeh, Amal & Sezen, Arda. (2024). Semantic Interoperability and Reusability in IoT: a Systematic Mapping Study. 1-7. 10.1109/IDAP64064.2024. 10710911.
Automated Database Schema Evolution in Microservice, André, ceur-ws.org, accessed Apr. 9, 2025, https://ceur-ws.org/Vol-3452/paper10.pdf.
Baldwin, Donald & Perjons, Erik. (2015), A Domain Neutral Enterprise Architecture Framework for Enterprise Application Integration and Pervasive Platform Services., accessed Apr. 9, 2025, https://www.researchgate.net/publication/321596806_A_Domain_Neutral_Enterprise_Architecture_Framework_for_Enterprise_Application_Integration_and_Pervasive_Platform_Services.
Challenges and solutions for distributed data management—.NET | Microsoft Learn, accessed Apr. 9, 2025, https://learn.microsoft.com/en-us/dotnet/architecture/microservices/architect-microservice-container-applications/distributed-data-management.
Code Generation—How Agentic Workflows Transform Requirements into Code, K G Aravinda Kumar, Feb. 9, 2025, accessed Apr. 9, 2025, https://aravindakumar.medium.com/code-generation-how-agentic-workflows-transform-requirements-into-code-61aecd683cbb.
Common Information Model (CIM) Infrastructure—DMTF, accessed Apr. 9, 2025, https://www.dmtf.org/sites/default/files/standards/documents/DSP0004_2.5.pdf.
Comparing Agent Communication Languages and Protocols: Choosing the Right Framework for Multi-Agent Systems—SmythOS, accessed Apr. 9, 2025, https://smythos.com/ai-agents/ai-agent-development/agent-communication-languages-and-protocols-comparison/.
Copplestone et al., "Supabase Wrappers a Postgres FDW framework written in Rust" Retrieved from https://supabase.com/blog/postgres-foreign-data-wrappers-rust, Retrieved on Mar. 21, 2023, 17 pages.
Critical Schema Compatibility: The Key to Preventing Data Disasters, accessed Apr. 9, 2025, https://blog.devops.dev/critical-schema-compatibility-the-key-to-preventing-data-disasters-5ac8044d0643.
Cruz et al, Using a Layered Approach for Interoperability on the Semantic Web, Published in Proceedings of the Fourth International Conference on Web Information Systems Engineering Dec. 12-12, 2003 (WISE'03) 0-7695-1999-7/03, 11 Pages.
Data mesh—Wikipedia, accessed Apr. 9, 2025, https://en.wikipedia.org/wiki/Data_mesh.

(56) References Cited

OTHER PUBLICATIONS

Data Mesh Principles (Four Pillars) Guide for 2025—Atlan, accessed Apr. 9, 2025, https://atlan.com/data-mesh-principles/.
Data Mesh: Delivering Data-Driven Value at Scale: Dehghani, Zhamak—Amazon.com, accessed Apr. 9, 2025, https://www.amazon.com/Data-Mesh-Delivering-Data-Driven-Value/dp/1492092398.
Distributed Construction of Ontologies Using Hozo—CEUR-WS, accessed Apr. 9, 2025, https://ceur-ws.org/Vol-273/paper_19.pdf.
Djuric, Dragan & Gasevic, Dragan & Devedzic, Vladan. (2006). The Tao of Modeling Spaces. Journal of Object Technology. 5. 125-147. 10.5381/jot.2006.5.8.a4, accessed Apr. 9, 2025, https://www.researchgate.net/publication/220299599_The_Tao_of_Modeling_Spaces.
Elevate Data Mesh with Kyvos Semantic Layer, accessed Apr. 9, 2025, https://www.kyvosinsights.com/data-mesh/.
Enterprise Collaboration Architecture (ECA) Specification—Object Management Group, accessed Apr. 9, 2025, https://www.omg.org/spec/EDOC/1.0/PDF.
Extended European Search Report on EPO Application No. 22782019.8 dated Feb. 5, 2025 (10 pages).
Extensible and Dynamic Topic Types for DDS—Object Management Group, Feb. 2012, accessed Apr. 9, 2025, https://www.omg.org/spec/DDS-XTypes/1.0/Beta2/PDF.
Federal Enterprise Architecture Framework—Obama White House, accessed Apr. 9, 2025, https://obamawhitehouse.archives.gov/sites/default/files/omb/assets/egov_docs/fea_v2.pdf.
Gates B., "Why do we believe lies?" Bill Gates and Rashida Jones Ask Big Questions—Episode 3, Published on Nov. 30, 2020, Retrieved from https://www.gatesnotes.com/Podcast/Why-do-we-believe-lies, 1 page.
Hall S., "Dolt, a Relational Database with Git-Like Cloning Features", Published on Aug. 19, 2020, Published in The New Stack. Retrieved from https://thenewstack.io/dolt-a-relational-database-with-git-like-cloning-features/, 15 pages.
Health informatics—Interoperability and Integration Reference Architecture—Model and Framework—HL7—Confluence, accessed Apr. 9, 2025, https://confluence.hl7.org/download/attachments/86967864/ISO-DIS%2023903%20-%20Interoperability%20Reference%20Architecture_Final_without%20Figure%20E1.pdf?version=1&modificationDate=1591980934242&api=v2.
International Search Report and Written Opinion on International Application No. PCT/US 24/43652 dated Nov. 6, 2024 (13 Pages).
International Search Report and Written Opinion on PCT App. PCT/US2022/053994 dated Apr. 7, 2023 (14 pages).
International Search Report on International Application No. PCT/US 22/22341 dated Jul. 7, 2022 (2 pages).
Introducing Ontology Evolution Management—SEDICI, accessed Apr. 9, 2025, http://sedici.unlp.edu.ar/bitstream/handle/10915/21301/Documento_completo.pdf?sequence=1&isAllowed=y.
Ives et al. "Interactive Data Integration through Smart Copy & Paste", Published in National Electronics and Computer Technology Center CIDR 2009, 10 pages.
Lee, Juhyun & Park, Sangsung & Lee, Junseok. (2022). A Fast and Scalable Algorithm for Prior Art Search. IEEE Access. PP. 1-1. 10.1109/ACCESS.2022.3141494., accessed Apr. 9, 2025, https://www.researchgate.net/publication/357663630_A_Fast_and_Scalable_Algorithm_for_Prior_Art_Search.
Linkerd vs. Istio: 7 Key Differences—Solo.io, accessed Apr. 9, 2025, https://www.solo.io/topics/linkerd/linkerd-vs-istio.
Louhichi, Soumaya & Graiet, Mohamed & Kmimech, Mourad & Bhiri, Mohamed & Gaaloul, Walid & Cariou, Eric. (2011). ATL Transformation for the Generation of SCA Model. 164-167. 10.1109/SKG.2011.37., accessed Apr. 9, 2025, https://www.researchgate.net/publication/221510895_ATL_Transformation_for_the_Generation_of_S CA_Model.
M. Taylor, "Theneo wins PITCH contest at Web Summit 2022", Published on Nov. 4, 2022, Retrieved from https://websummit.com/blog/theneo-pitch-2022-siemens, 6 pages.
Marquardt et al. "Designing User-, Hand-, and Handpart-Aware Tabletop Interactions with Touch Id Toolkit", Published in Research Gate, Published on Nov. 2011, 11 pages.
Matchmaker: Self-Improving Large Language Model Programs for Schema Matching, University of Cambridge, published Oct. 31, 2024, https://arxiv.org/abs/2410.24105.
Matney L., "Facebook debuts Infinite Office, a virtual reality office space", Published in Tech Crunch, Published on Sep. 16, 2020, Retrieved from https://techcrunch.com/2020/09/16/facebook-debuts-infinite-office-a-virtual-reality-office-space/, 8 pages.
Meta Object Facility | Enterprise Architect User Guide—Sparx Systems, accessed Apr. 9, 2025, https://sparxsystems.com/enterprise_architect_user_guide/17.0/modeling_languages/mof.html.
Mining Android API Usage to Generate Unit Test Cases for Pinpointing Compatibility Issues—arXiv, accessed Apr. 9, 2025, https://arxiv.org/pdf/2208.13417.
Model-Driven Development of AI for Digital Games—bac-lac.gc.ca, accessed Apr. 9, 2025, https://dam-oclc.bac-lac.gc.ca/download?is_thesis=1&oclc_number=922582798&id=2c06f462-9b58-4c7a-91c4-4fac9e31fc2c&fileName=vh53wz77q.pdf.
Model-driven Software Development, accessed Apr. 9, 2025, https://profs.info.uaic.ro/adrian.iftene/Licenta/Documentatie/2_Model-driven%20software%20developm%20-%20Sami%20Beydeda%20&%20Matthias%20Book%20&_317.pdf.
MOF 2.0/XMI Mapping Specification, v2.1—Object Management Group, Sep. 2005, accessed Apr. 9, 2025, https://www.omg.org/spec/XMI/2.1/PDF.
NextGRID Architectural Concepts—SciSpace, accessed Apr. 9, 2025, https://scispace.com/pdf/nextgrid-architectural-concepts-143ws4ctcz.pdf.
OGC Testbed-14: Characterization of RDF Application Profiles for Simple Linked Data Application and Complex Analytic Application, published Feb. 4, 2019, accessed Apr. 9, 2025, https://docs.ogc.org/per/18-094r1.pdf.
OMG Meta Object Facility (MOF) Core Specification, Oct. 2019, accessed Apr. 9, 2025, https://www.omg.org/spec/MOF/2.5.1/PDF.
Ontology-based multi-agent system to support business users and management—arXiv, accessed Apr. 9, 2025, https://arxiv.org/pdf/1807.03646.
Ontology-Driven Generation of Guidelines for Content Creation Purposes—IGI Global, accessed Apr. 9, 2025, https://www.igi-global.com/chapter/ontology-driven-generation-of-guidelines-for-content-creation-purposes/113127.
Principles of data mesh | dbt Labs, Daniel Poppy, published Sep. 12, 2023, accessed Apr. 9, 2025, https://www.getdbt.com/blog/what-are-the-four-principles-of-data-mesh.
Representation of levels and instantiation in a metamodelling environment—Scientific Figure on ResearchGate. Available from: https://www.researchgate.net/figure/The-four-layer-metamodel-architecture_fig1_228569882 [accessed Apr. 22, 2025].
Requirements for enterprise-referencing architectures and methodologies BS ISO 15704:2019—BSI Standards Publication, accessed Apr. 9, 2025, https://webstore.ansi.org/preview-pages/BSI/preview_30360657.pdf.
S. D. J. McArthur; E. M. Davidson; V. M. Catterson; A. L. Dimeas; N. D. Hatziargyriou; F. Ponci; T. Funabashi, "Multi-Agent Systems for Power Engineering Applications—Part I: Concepts, Approaches, and Technical Challenges", IEEE Transactions on Power Systems, vol. 22, No. 4, Nov. 2007, accessed Apr. 9, 2025, https://site.ieee.org/pes-mas/agent-technology/standards-and-interoperability/.
Saraiva, João & Silva, Alberto. (2008). Evaluation of MDE Tools from a Metamodeling Perspective. Journal of Database Management. 19. 21-46. 10.4018/jdm.2008100102, accessed Apr. 9, 2025, https://www.researchgate.net/figure/An-example-of-OMGs-four-layer-metamodel-architecture_fig2_220373664.
Sascha Welten, Laurenz Neumann, Yeliz Ucer Yediel, Luiz Olavo Bonino da Silva Santos, Stefan Decker, Oya Beyan; DAMS: A Distributed Analytics Metadata Schema. Data Intelligence 2021; 3 (4): 528-547., accessed Apr. 9, 2025, https://direct.mit.edu/dint/article/3/4/528/101036/DAMS-A-Distributed-Analytics-Metadata-Schema.

(56) References Cited

OTHER PUBLICATIONS

Scanagatta et al. "A Survey on Bayesian network structure learning from data" Published on May 29, 2019, Retrieved from https://doi.org/10.1007/s13748-019-00194-y, 15 pages.
Security and Microservice Architecture on AWS: Architecting and Implementing a Secured, Scalable Solution [1 ed.] 1098101464, 9781098101466—DOKUMEN.PUB, accessed Apr. 9, 2025, https://dokumen.pub/security-and-microservice-architecture-on-aws-architecting-and-implementing-a-secured-scalable-solution-1nbsped-1098101464-9781098101466-i-4320235.html.
Semantic Data Mesh for Scalable Data Management | Timbr.ai, Tzvi Weitzner, accessed Apr. 9, 2025, https://timbr.ai/blog/semantic-data-mesh-for-scalable-data-management/.
Semantic Interoperability Methods for Smart Service Systems: A Survey—Uni Mannheim, accessed Apr. 9, 2025, https://www.uni-mannheim.de/media/Einrichtungen/ines/Preprints/tems-online.pdf.
Semantic service discovery in the service ecosystem | QUT ePrints, accessed Apr. 9, 2025, https://eprints.qut.edu.au/50872/.
Service Mesh in Kubernetes: A Comparison of Istio and Linkerd | by Yasinkartal | Medium, accessed Apr. 9, 2025, https://medium.com/@yasinkartal2009/service-mesh-in-kubernetes-istio-and-linkerd-f4865a9bcc86.
Service Meshes Decoded: Istio vs Linkerd vs Cilium | LiveWyer, Oleksandr, published May 8, 2024, accessed Apr. 9, 2025, https://livewyer.io/blog/service-meshes-decoded-istio-vs-linkerd-vs-cilium/.
Service Meshes: Istio and Linkerd for Advanced Traffic Management | by Platform Engineers, accessed Apr. 9, 2025, https://medium.com/@platform.engineers/service-meshes-istio-and-linkerd-for-advanced-traffic-management-8f6150e575d8.
Slides: How a Semantic Layer Makes Data Mesh Work at Scale—DATAVERSITY, accessed Apr. 9, 2025, https://www.dataversity.net/slides-how-a-semantic-layer-makes-data-mesh-work-at-scale/.
Source code generation using deep learning: revolutionizing software development, accessed Apr. 9, 2025, https://www.byteplus.com/en/topic/419556.
Stojanovic, Ljiljana & Maedche, Alexander & Motik, Boris & Stojanovic, Nenad. (2002). User-Driven Ontology Evolution Management. Proc of the 13th Intl Conf on Knowledge Engineering and Knowledge Management. 10.1007/3-540-45810-7_27., accessed Apr. 9, 2025, https://www.researchgate.net/publication/200827810_User-Driven_Ontology_Evolution_Management.
Sun, et al., "Mining Android API Usage to Generate Unit Test Cases for Pinpointing Compatibility Issues," accessed Apr. 23, 2025, https://arxiv.org/pdf/2208.13417, 13 pages (2022).
Thacker N., "Microsoft Mesh—A Technical Overview", Published in Microsoft Mesh, Published on Mar. 2, 2021, Retrieved from https://techcommunity.microsoft.com/t5/mixed-reality-blog/microsoft-mesh-a-tecnical-overview/ba-p/2176004, 8 pages.
The Essence of Multilevel Metamodeling—School of Engineering and Computer Science Wiki, accessed Apr. 9, 2025, https://homepages.ecs.vuw.ac.nz/~tk/publications/papers/essence.pdf.
The Principles of Data Mesh and the Semantic Layer—AtScale, Elif Tutuk, accessed Apr. 9, 2025, https://www.atscale.com/resource/data-mesh-principles-semantic-layer/.
Tools for Developing Applications in the Semantic Web of Things: A Systematic Literature Review | Revista Facultad de Ingenieria, accessed Apr. 9, 2025, https://revistas.uptc.edu.co/index.php/ingenieria/article/view/17959/14943.
Types of Agent Communication Languages—SmythOS, accessed Apr. 9, 2025, https://smythos.com/ai-agents/ai-agent-development/types-of-agent-communication-languages/.
UBL NDR Version 1pt0—OASIS Open, accessed Apr. 9, 2025, https://docs.oasis-open.org/ubl/prd-UBL-NDR-2.0.htm.
Understanding Data Mesh Principles—DATAVERSITY, accessed Apr. 9, 2025, https://www.dataversity.net/understanding-data-mesh-principles/.
Wang, Hongwei & Wang, Guoxin & Jinzhi, Lu & Ma, Changfeng. (2019). Ontology Supporting Model-Based Systems Engineering Based on a GOPPRR Approach. 10.1007/978-3-030-16181-1_40, accessed Apr. 9, 2025, https://www.researchgate.net/publication/332025938_Ontology_Supporting_Model-Based_Systems_Engineering_Based_on_a_GOPPRR_Approach.
What are Agentic Workflows? | IBM, Cole Stryker and Anna Gutowska, Mar. 7, 2025, accessed Apr. 9, 2025, https://www.ibm.com/think/topics/agentic-workflows.
What Are Agentic Workflows?, Mansi Shah, Feb. 27, 2025, accessed Apr. 9, 2025, https://arya.ai/blog/agentic-workflows.
What is a Semantic Layer? (Components and Enterprise Applications), Lulit Tesfaye, Feb. 1, 2024, accessed Apr. 9, 2025, https://enterprise-knowledge.com/what-is-a-semantic-layer-components-and-enterprise-applications/.
What Is Service Mesh in Kubernetes & 4 Tools to Get Started, accessed Apr. 9, 2025, https://www.tigera.io/learn/guides/service-mesh/service-mesh-kubernetes/.
PCT International Search Report and Written Opinion for Application No. PCT/US2025/025922 mailing date Jul. 10, 2025, 13 pages.
A Framework for Cooperative Ontology Construction Based on Dependency Management of Modules—CiteSeerX, accessed Apr. 9, 2025, https://citeseerx.ist.psu.edu/document?repid=rep1&type=pdf&doi=6a313da7cf5ec8d4d900e953bd291979a7394e84.
Categories of Ontologies' Applications in the Realm of Enterprise Modeling, Monika Kaczmarek, 2015 IEEE 17th Conference on Business Informatics, published Jul. 13, 2015, https://ieeexplore.ieee.org/abstract/document/7264721.
Mining Android API Usage to Generate Unit Test Cases for Pinpointing Compatibility Issues—Yanjie Zhao, accessed Apr. 9, 2025, https://yanjiezhao96.github.io/files/sun2022mining.pdf.
Palma et al., "Ontology Evolution," Ontology Engineering in a Networked World, Chapter 11, Jan. 2011, pp. 235-255.
Salatge et al., "Fault Tolerance Connectors for Unreliable Web Services," 37th Annual IEEE/IFIP International Conference on Dependable Systems and Networks (DSN'07), Jun. 2007, 10 pages.
Thiagarajan et al., "Semantic Service Discovery by Consistency-Based Matchmaking," Lecture Notes in Computer Science (LNCS) 5446, pp. 492-505, 2009.
Weaving the Extensible Bills of Materials (xBOM) Fabric, Erica Dretzka, Brent Smith, Nathaniel Fuller, MODSIM World 2023, published May 22, 2023, http://modsimworld.org/about/publications/2023.
Final Office Action on U.S. Appl. No. 18/814,305 dated Jun. 22, 2026, 32 pages.
Noura, et al., "Automatic Knowledge Extraction to Build Semantic Web of Things Applications," IEEE Internet of Things Journal 6(5), pp. 8447-8454 (2019).

* cited by examiner

1500 skl:Spec a owl:Class, sh:NodeShape

Basic Identity
@id
@type
rdfs:label
dc:decription
skl:disambiguatingDescription

Purpose & Justification
skl:purpose (goal or job this Spec Solves)
skl:Motivation (background on the problem/use case)
skl:rationale (reasoning behind design decisions, trade-offs)

Usage & Discovery
skl:usageGuidelines (instructions/best practices)
skl:applicability (domain/contextual constraints)
skl:classification (link to security classification or data classification sets)
skl:bagOfWords (analyses of data and incoming relationships can generate this)
skl:keyword Extended Docs
skl:extendedDocumentation
skl:example
skl:analysis Activity
complied from skl:IsAuditable Lifecycle
complied from skl:IsVersionable Management
complied from skl:IsManageable Observability
complied from skl:IsObservable Evolution
complied from skl:IsEvaluatable Incoming Relationships (not defined in Spec)
Issues
Comments
Requirements
AccessControlAssignments
Policies
etc.

FIG. 15 skl:IsIntegratedData 1702

INSTANCE OF: 1704
skl:Spec

SUBCLASS OF: 1706
skl:MixIn

DESCRIPTION: 1708
MixIn for entities that maintain synchronized data from external sources or systems

PURPOSE, USAGE GUIDELINES, ETC.

PROPERTIES: 1712
source : IntegratedProduct
idInSource : String
dateCreatedInSource : DateTime
dateModifiedInSource : DateTime

...

1714 nc:Issue a skl:Object

Basic Identity
@id # e.g., http://release.niem.gov/niem/niem-core/5.0/Issue
@type # e.g., skl:Object, skl:Spec, owl:Class, sh:NodeShape
rdfs:label # e.g., Issue ...
Purpose & Justification
...
Usage and Discovery
...
Extended Docs
...

Properties
rdfs:subClassOf IsIntegratedData
nc:IssueDescriptionText # e.g., Fix Field on cdao:Person
nc:IssueDate
nc:IssueCategoryText
nc:IssueSeverityText
nc:IssueStatusText IsIntegratedData
skl:source # e.g., https://mymesh.com/some-team/Cameo
skl:idInSource # e.g., 12948490388
skl:dateCreationInSource # e.g., 2024-07-12T05:23:55Z
skl:dateModifiedInSource # e.g., 2025-02-05T23:41:47Z

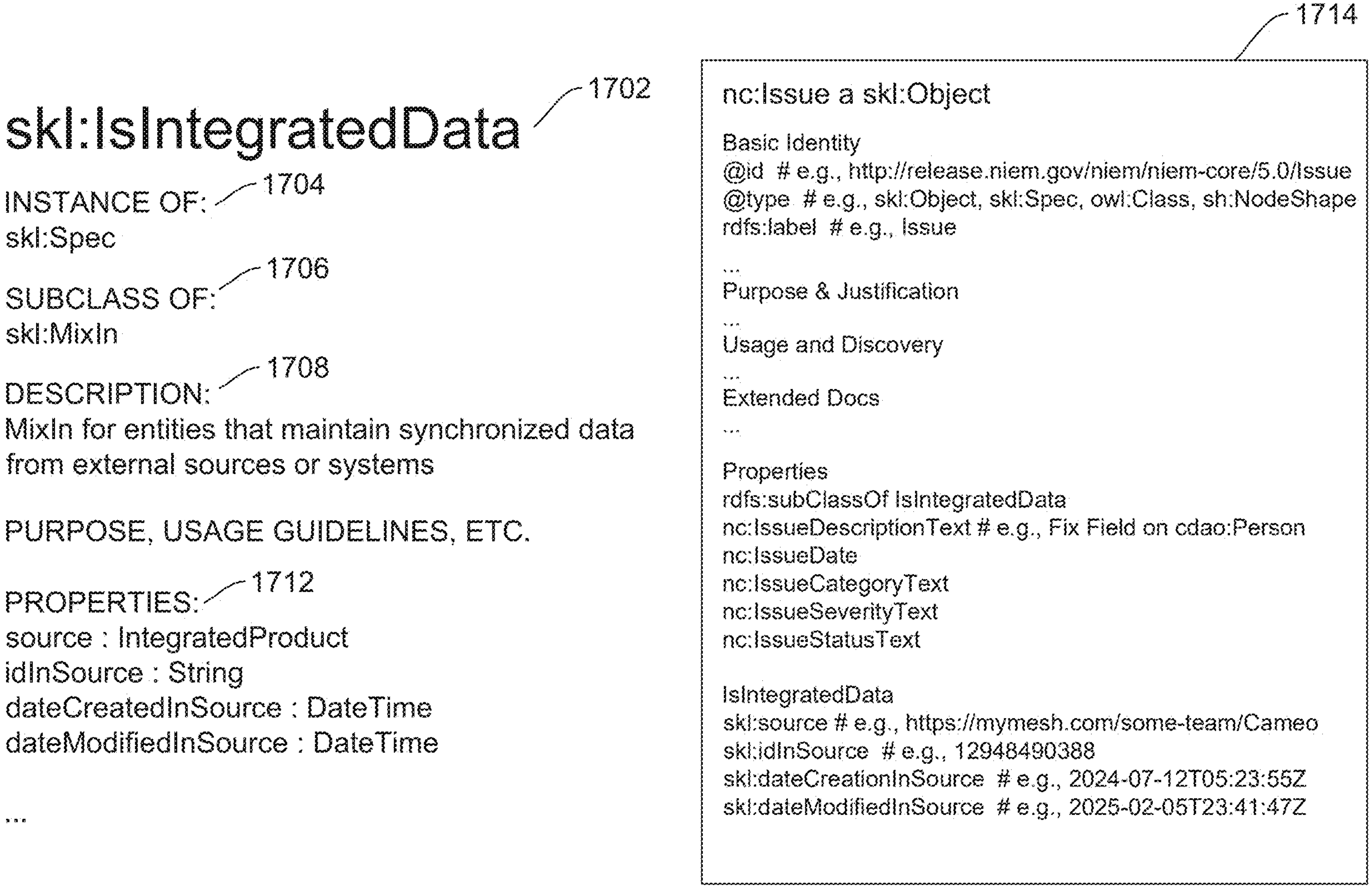

FIG. 17 skl:IsIntegratedData —1802

INSTACE OF: —1804
skl:Spec

SUBCLASS OF: —1806
skl:MixIn

DESCRIPTION: —1808
MixIn for entities that maintain synchronized data from external sources or systems.

PURPOSE, USAGE GUIDELINES, ETC. —1810

PROPERTIES: —1812
source : IntegratedProduct
idInSource : String
dateCreatedInSource : DateTime
dateModifiedInSource : DateTime
...

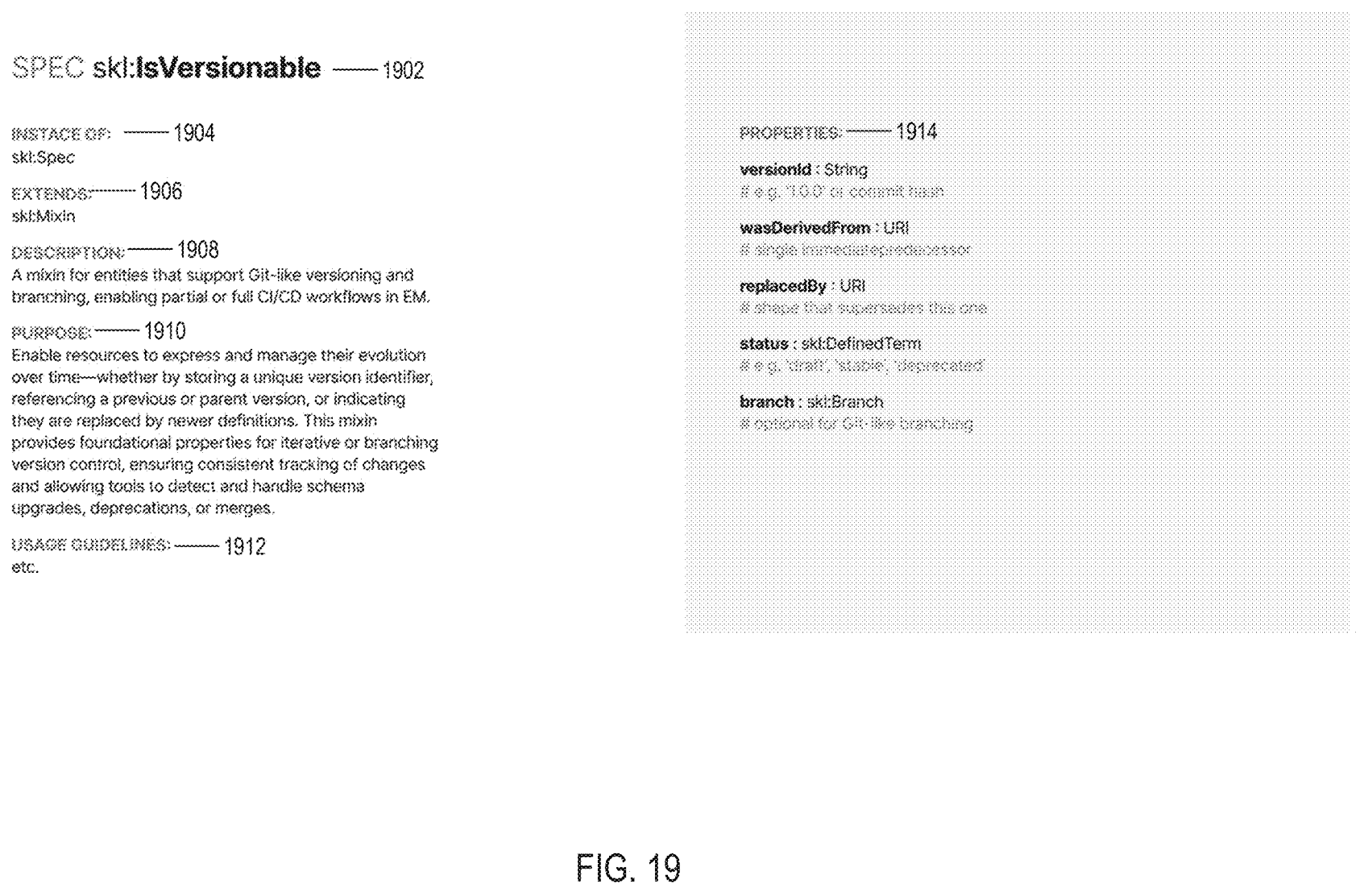

SPEC skl:IsVersionable —— 1902

INSTACE OF: —— 1904
skl:Spec

EXTENDS: —— 1906
skl:Mixin

DESCRIPTION: —— 1908
A mixin for entities that support Git-like versioning and branching, enabling partial or full CI/CD workflows in EM.

PURPOSE: —— 1910
Enable resources to express and manage their evolution over time—whether by storing a unique version identifier, referencing a previous or parent version, or indicating they are replaced by newer definitions. This mixin provides foundational properties for iterative or branching version control, ensuring consistent tracking of changes and allowing tools to detect and handle schema upgrades, deprecations, or merges.

USAGE GUIDELINES: —— 1912
etc.

PROPERTIES: —— 1914 versionId : String
e.g. '1.0.0' or commit hash wasDerivedFrom : URI
single immediatepredecessor replacedBy : URI
shape that supersedes this one status : skl:DefinedTerm
e.g. 'draft', 'stable', 'deprecated' branch : skl:Branch
optional for Git-like branching

FIG. 19

SPEC skl:Product 2002

INSTANCE OF: 2004
skl:Spec

EXTENDS: 2006
skl:IsVersionable, skl:IsManageable, skl:IsIndexable

DESCRIPTION: 2008
Represents a product or service that can be integrated into the enterprise mesh, gathering relevant schemas, interfaces, and governance in one place.

PURPOSE: 2010
Provided a self-contained or reference-based package of definitions and policies for discoverable, maintainable products.

USAGE GUIDELINES: 2012
Use when bundling data (Objects), Capabilities, Interfaces, and governance for a standalone or third-party offering.

2014

```
#Optional marketplace-like metadata
inProductSuite: ProductSuite
provider: Organization | Person | Account
audience: Audience
brand: Brand | Organization
hasCertification: Array of Certification
keyword: Array of Defined Term
logo: ImageObject | URL
offers: Array of Offer
review: Array of Review
etc.

#Core Specs / Schemas
object: Array of skl:Object
capability: Array of skl:Capability
property: Array of skl:Property
mapping: Array of skl:Mapping
interface: Array of skl:IntegrationInterface
integration: Array of skl:IntegratedProduct
etc.

#Governance & Reporting
accessControl: Array of skl:AccessControlAssignment
policy: Array of skl:Policy
evaluationCriteria: Array of skl:EvaluationCriteria
etc.
```

FIG. 20 skl:AccessControlAssignment — 2102

INSTACE OF: — 2104
skl:Spec

SUBCLASS OF: — 2106
skl:MixIn

DESCRIPTION: — 2108
Links a principal (Account or Group) to a permission (or role) on a target resource, optionally under a ControlRule or Policy.

PURPOSE, USAGE GUIDELINES, ETC. — 2110

PROPERTIES: — 2112
resource : The target resource being referenced
principal : Account or Account Group
permission : Permission or Role
policy : ControlRule or Policy
...

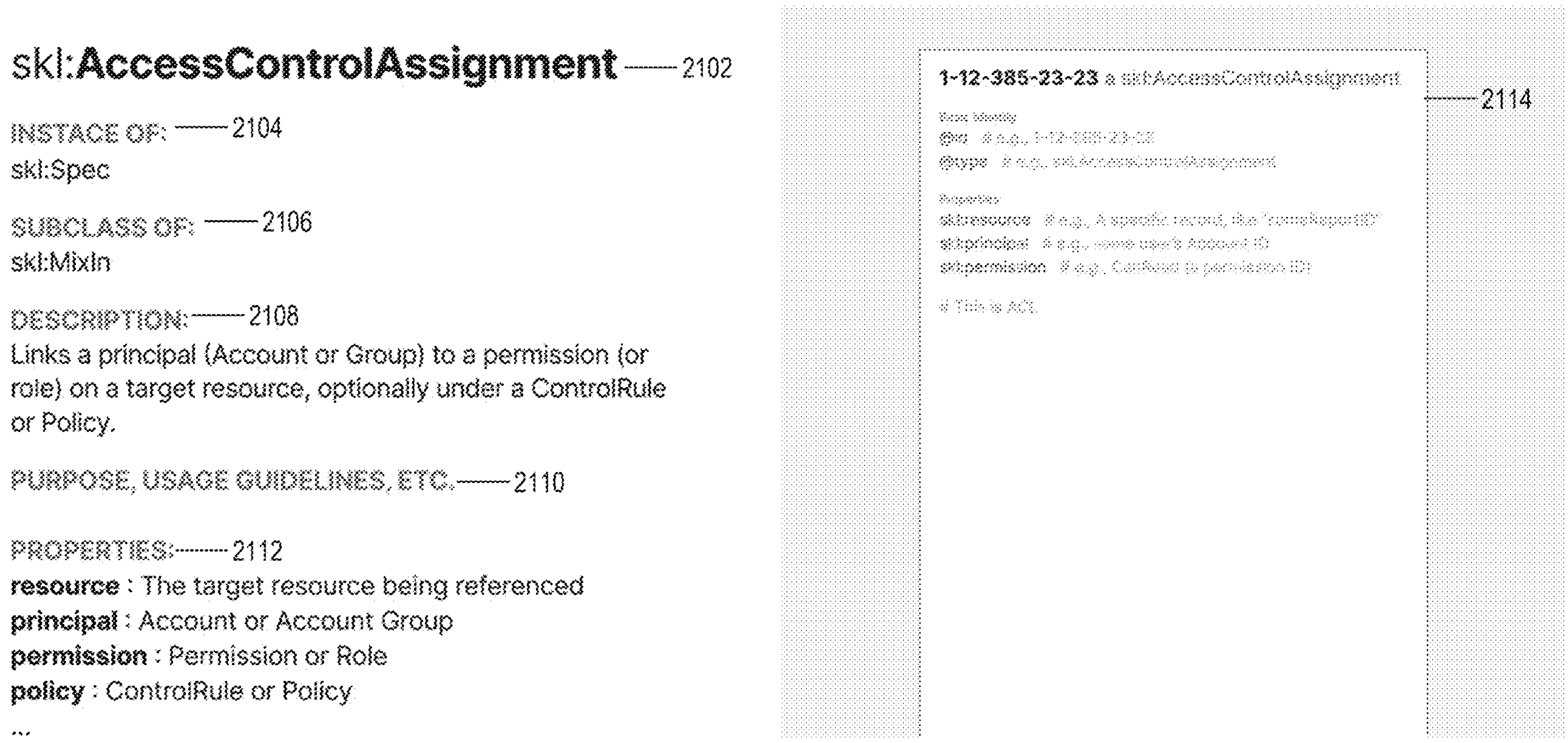

FIG. 21 skl:AccessControlAssignment 2202

FIG. 22
1-12-385-23-23 a skl:AccessControlAssignment
@type
skl:resource
skl:principal
skl:permission
2214

INSTACE OF: 2204
skl:Spec

SUBCLASS OF: 2206
skl:MixIn

DESCRIPTION: 2208
Links a principal (Account or Group) to a permission (or role) on a target resource, optionally under a ControlRule or Policy.

PURPOSE, USAGE GUIDELINES, ETC. 2210

PROPERTIES: 2212
resource : The target resource being referenced
principal : Account or Account Group
permission : Permission or Role
policy : ControlRule or Policy
...

FIG. 22 skl:AccessControlAssignment 2302

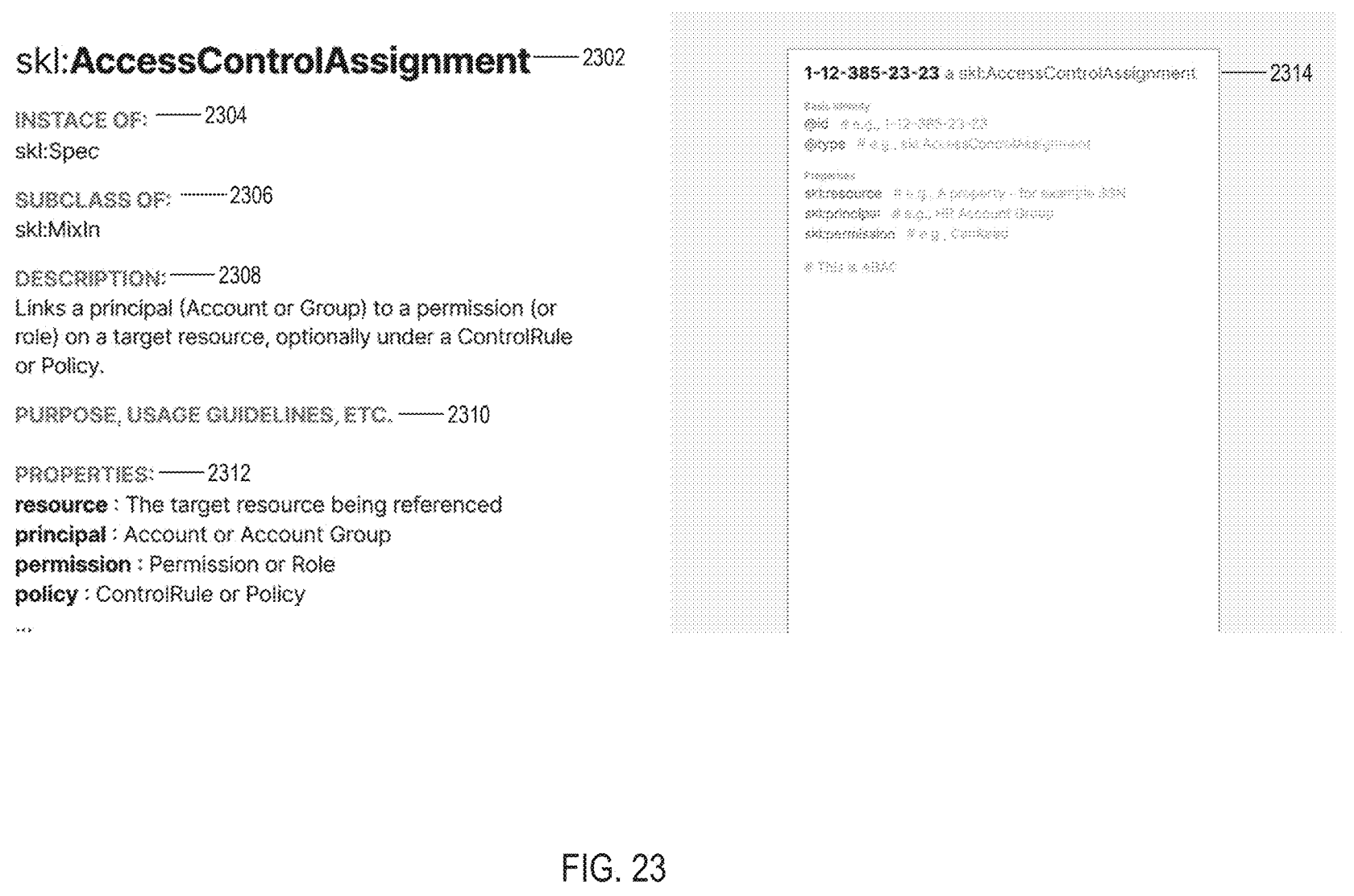

INSTACE OF: 2304
skl:Spec

SUBCLASS OF: 2306
skl:MixIn

DESCRIPTION: 2308
Links a principal (Account or Group) to a permission (or role) on a target resource, optionally under a ControlRule or Policy.

PURPOSE, USAGE GUIDELINES, ETC. 2310

PROPERTIES: 2312
resource : The target resource being referenced
principal : Account or Account Group
permission : Permission or Role
policy : ControlRule or Policy
...

FIG. 23

Enterprise Mesh ▸ main
Specs Terms Data Objects Search
Workspace Core Definitions Governance Settings Copilot Context Commit Log Developer Tools Home
Inbox
Issues
Copilot
New TYPES OF SPECS
Primitives
Objects
Capabilities
Properties
User Interfaces
Interoperable Products
Agents & Workflows SAVED VIEWS
Core Shapes
All Mappings
FHIR
NIEM Core
Prompts
Vocabularies
Issue Types 3004 Patient
Share
3006 3008 3010
Overview Structure Implementations Issues Permissions Lifecycle
3012 3014

Basic Identity
3016 UID https://mesh.mil/capability/getPatient
3020 Description Provides a unified interface for retrieving a patient records across multiple healthcare systems, EHRs, and data sources. This Capability normalizes patient data into a FHIR Patient's schema, ensuring seamless integration and interoperability within your mesh.
3018 Defining Context FHIR - Release 7.1.4
Related Terms Some Term, Another Term, Other Term, Some Other Term Overview
3022 Usage 2.6 million runs of this capability in the last year
3024 Security 4 Applications and 12 users can access this capability
3026 History Last change 6 days ago, 92 changes in last 3 years Contributors +3 contributors Relationships Graph 3028
Key
UI: Card
Athenahealth
Diagnosis
Person
evaluateRisk
getPatients
approveInsuracneClaim
EPIC
UI: Profile
scheduleAppt

PURPOSE, JUSTIFICATION, GUIDELINES

Purpose Goal or job this Spec solves
Motivation Background on the problem or use case
Rationale Reasoning behind design decisions
Usage Guidelines Instructions/best practices
Applicability Domain / Contextual Constraints
Classification Reference security/data/privacy classifications
Evaluation Criteria Structured object or description of how to determine whether instances of this object are good/bad/etc.

Examples Expand Table
All Example 1 Example 2 Example 3 Example 4 Example 5 +2 More Examples

| Property | Type | Value | |
|---|---|---|---|
| Example 1 | | | |
| Value | Type | Value | |

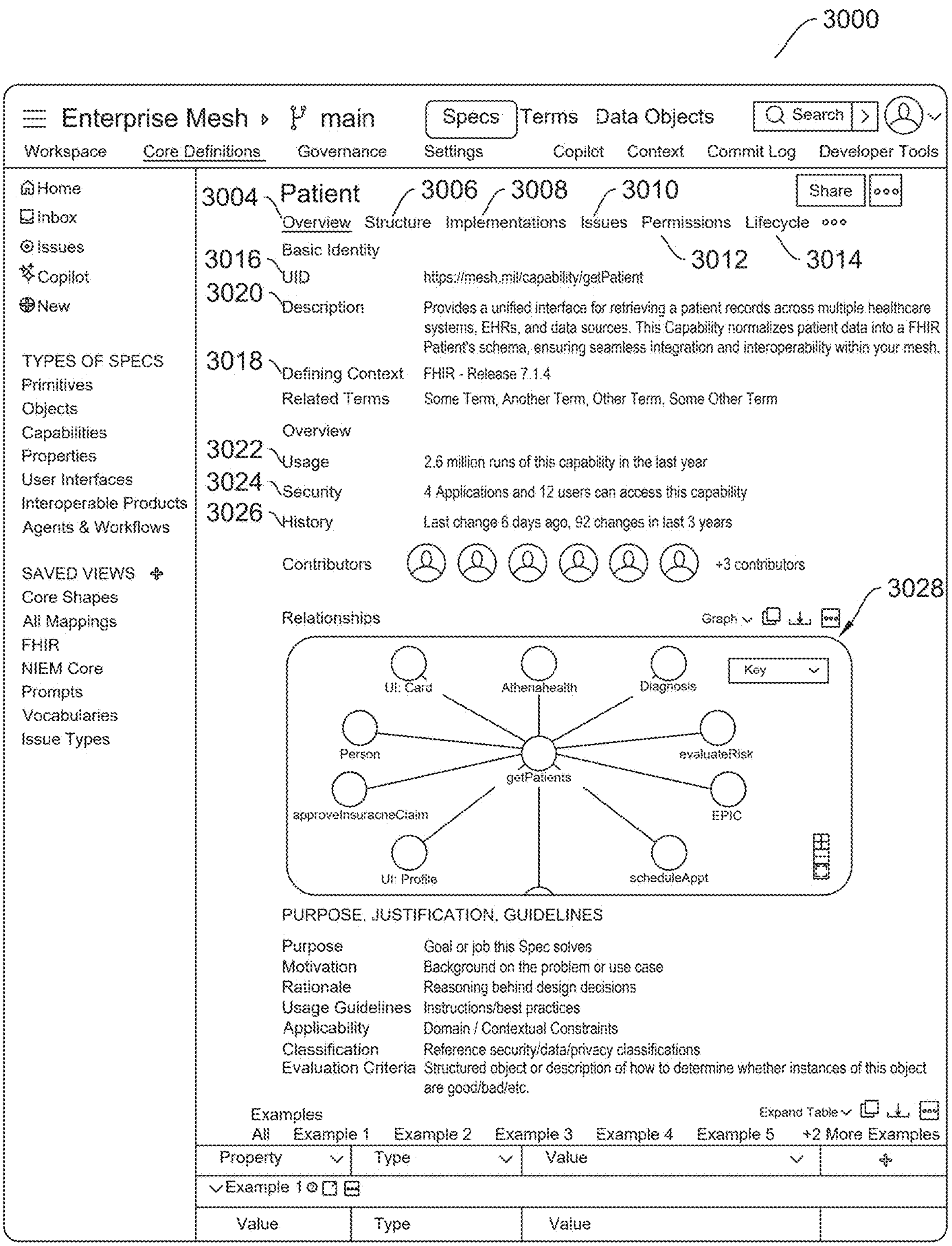

SYSTEMS AND METHODS FOR SEMANTICALLY GOVERNED SPECIFICATION-DRIVEN INTEROPERABILITY IN DISTRIBUTED ENVIRONMENTS

CROSS-REFERENCE TO RELATED APPLICATIONS

This application claims priority under 35 U.S.C. § 120 as a continuation of U.S. patent application Ser. No. 19/187,797, filed on Apr. 23, 2025, which claims priority to U.S. Provisional Patent Application No. 63/637,381, filed Apr. 23, 2024. U.S. patent application Ser. No. 19/187,797 also claims priority as a continuation-in-part of U.S. patent application Ser. No. 18/814,305, filed Aug. 23, 2024, which claims priority as a continuation-in-part of U.S. patent application Ser. No. 17/965,650, filed Oct. 13, 2022, which claims priority as a continuation-in-part of U.S. patent application Ser. No. 17/707,888, filed Mar. 29, 2022, which claims priority to U.S. Provisional Patent Application Nos. 63/191,852, filed May 21, 2021, and 63/167,401, filed Mar. 29, 2021. U.S. patent application Ser. No. 17/965,650 also claims priority to U.S. Provisional Patent Application Nos. 63/255,401, filed Oct. 13, 2021, and 63/191,852, filed May 21, 2021. U.S. patent application Ser. No. 18/814,305 also claims priority as a continuation-in-part of U.S. patent application Ser. No. 18/303,890, filed Apr. 20, 2023, which claims priority as a continuation of U.S. patent application Ser. No. 18/088,485, filed Dec. 23, 2022, which claims priority to U.S. Provisional Patent Application Nos. 63/308,305, filed Feb. 9, 2022, 63/293,600, filed Dec. 23, 2021, 63/351,690, filed Jun. 13, 2022, and 63/354,563, filed Jun. 22, 2022. U.S. patent application Ser. No. 18/814,305 also claims priority to U.S. Provisional Patent Application No. 63/534,335, filed Aug. 23, 2023. U.S. patent application Ser. No. 18/088,485 also claims priority as a continuation-in-part of U.S. patent application Ser. No. 17/707,888, filed Mar. 29, 2022, which claims priority to U.S. Provisional Patent Application Nos. 63/191,852, filed May 21, 2021, and 63/167,401, filed Mar. 29, 2021. The entireties of these applications are incorporated by reference herein for all purposes.

TECHNICAL FIELD

This application relates generally to electronic data management and communication.

BACKGROUND

Modem enterprises operate across increasingly fragmented digital environments composed of numerous independently managed systems, data sources, services, and teams. These components are often developed using different technologies, standards, and governance models, yet are expected to interoperate securely, reliably, and efficiently. Traditional integration methods rely heavily on static, hard-coded connections, rigid data schemas, and centralized orchestration engines. These methods create structural fragility, impede scalability, and introduce significant coordination overhead as systems evolve.

Historically, integration has depended on bespoke middleware and point-to-point APIs, resulting in brittle coupling between systems. Even minor changes in data structures, interfaces, or workflows can cascade into broad architectural disruptions. Governance across such environments tends to be fragmented and reactive, with limited ability to detect or prevent behavioral inconsistencies, policy violations, or semantic misalignments.

While service-oriented architectures and API-first design have enabled more modularity, they often remain constrained by a lack of shared semantics. Systems may expose well-documented endpoints but still rely on informal or human-mediated interpretations of their meaning and purpose. This results in ambiguity, duplication of effort, and incompatibility in collaborative or cross-domain environments.

Current architectures lack a unified, formal mechanism to define, manage, and validate the intended meaning and relationships between components at the application level. Without such mechanisms, organizations are left with inconsistent behavior between software components and data, broken links during versioning of components, and fragile integrations that require constant manual intervention. These limitations are particularly acute in dynamic or regulated environments where systems must evolve safely over time without compromising traceability, compatibility, or policy compliance.

Moreover, modern enterprises face significant challenges in implementing effective security models across distributed environments. Traditional perimeter-based security approaches are increasingly inadequate as workforces become remote, applications move to the cloud, and threat surfaces expand. Zero Trust Architecture (ZTA) has emerged as a response, requiring continuous verification of every access request regardless of source or resource location. However, implementing ZTA across heterogeneous systems traditionally requires brittle, hard-coded integration logic that is difficult to maintain, scale, or adapt to evolving threat landscapes.

SUMMARY

For the aforementioned reasons, there is also a desire for an efficient system and method for enabling decentralized, semantically governed interoperability across distributed computing environments. In contrast to traditional integration architectures that rely on brittle APIs, hardcoded workflows, or centrally managed schemas, the disclosed system leverages a dynamic, graph-based framework of executable semantic specifications—referred to as SKL Specifications or schemas—to define and manage the structure, behavior, and policies of enterprise software components.

Each SKL Specification acts as a machine-interpretable blueprint describing objects, capabilities, mappings, and governance rules in a formal language interpretable by both human users and autonomous systems. These specifications are linked through declared semantic relationships and stored in a continuously evolving nodal data structure or knowledge graph (also referred to herein as an Enterprise Mesh (EM)) managed by an Enterprise Mesh Platform (EMP). At runtime, the Enterprise Mesh Platform interprets these specifications to resolve dependencies, enforce policies, generate orchestration plans, and/or execute cross-domain workflows-without requiring custom code or manual integration.

By shifting architectural control from static code to declarative and semantic specifications, limitations of traditional systems, including integration fragility, semantic ambiguity, and governance fragmentation are mitigated. The methods and systems herein describe a modular, adaptive, and policy-aware ecosystem in which capabilities, data structures, and policies can evolve independently while maintaining semantic consistency and interoperability across domains.

The SKL Specifications described herein collectively function as a form of digital DNA for software architecture. Similar to how biological DNA encodes inheritable traits and governs the behavior of living systems, the SKL Specifications define the semantic structure, operational behavior, lifecycle traits, and policy constraints of software components in a format that is both human-readable and machine-executable. These specifications may also be composable, recursively linkable, and versionable, enabling individual systems, capabilities, and data products to evolve over time without undermining architectural integrity of the EM.

This "digital DNA" framework enables software systems to be self-describing and semantically interoperable across domains, allowing distributed teams and autonomous agents to reason about components, simulate changes, detect semantic breaks, and orchestrate workflows based entirely on SKL-defined meaning and behavior. In contrast to brittle integration techniques that require manual rewiring or deep coupling, this "digital DNA" approach promotes a living architecture that can adapt, scale, and evolve continuously within a decentralized and policy-governed environment.

In some aspects, the techniques described herein relate to a computer-implemented method for decentralized interoperability across a distributed computing environment, including: generating, by one or more processors, an enterprise mesh based at least in part on a standard knowledge language (SKL) defining a plurality of SKL specifications executable by the one or more processors, wherein the plurality of SKL specifications are machine-interpretable, semantically descriptive, and define a plurality of composable components within the enterprise mesh; linking, by the one or more processors, a first SKL specification of the plurality of SKL specifications to a second SKL specification of the plurality of SKL specifications based at least in part on a semantically declarative relationship between the first SKL specification and the second SKL specification, wherein the semantically declarative relationship is defined by the first SKL specification; receiving, by the one or more processors, a versioning request to adjust the first SKL specification from a first version to second version; versioning, by the one or more processors, the first SKL specification from the first version to the second version based at least in part on the versioning request; traversing, by the one or more processors, the enterprise mesh to identify semantically linked SKL specifications that are linked to the first SKL specification; and upon versioning the first SKL specification to the second version and identifying the second SKL specification as being linked to the first SKL specification, validating, by the one or more processors, the second SKL specification.

In some aspects, the techniques described herein relate to a computer-implemented method, further including: receiving, by the one or more processors, and indication of a broken link between the first SKL specification and the second SKL specification based in part on versioning of the first SKL specification; and generating, by the one or more processors, an alert indicating the broken link and a cause of the broken link.

In some aspects, the techniques described herein relate to a computer-implemented method, further including: remediating, by the one or more processors, the broken link by performing one or more of (1) generating a provisional revision of the second SKL specification, (2) selecting a compatible alternative version of the first SKL specification, (3) applying a fallback mapping to maintain compatibility between the first SKL specification and the second SKL specification, or (4) creating a structured issue identifying the broken link and associated remediation metadata.

In some aspects, the techniques described herein relate to a computer-implemented method, wherein the enterprise mesh includes at least one SKL product, wherein the at least one SKL product is a sub-enterprise mesh that includes a second plurality of SKL specifications with bi-directional inherencies with the plurality of SKL specifications of the enterprise mesh.

In some aspects, the techniques described herein relate to a computer-implemented method, further including: in response at least in part to validating the second SKL specification, generating, by the one or more processors, execution code for executing the second SKL specification based at least in part on the second version of the first SKL specification.

In some aspects, the techniques described herein relate to a computer-implemented method, wherein the first SKL specification is one of an object, a capability, a mapping, a policy, a workflow, and a product.

In some aspects, the techniques described herein relate to a computer-implemented method, wherein the first SKL specification is set as a draft version prior to validating the second SKL specification; wherein the first SKL specification is set to a live version upon validating the second SKL specification.

In some aspects, the techniques described herein relate to a computer-implemented method, wherein the enterprise mesh further includes a knowledge graph of instances of objects adhering to SKL.

In some aspects, the techniques described herein relate to a system including: one or more processors; and a computer-readable non-transitory storage medium containing instructions that when executed by the one or more processors, cause the one or more processors to perform a method including: generating an enterprise mesh based at least in part on a SKL defining a plurality of SKL specifications executable by the one or more processors, wherein the plurality of SKL specifications are machine-interpretable, semantically descriptive, and define a plurality of composable components within the enterprise mesh; linking a first SKL specification of the plurality of SKL specifications to a second SKL specification of the plurality of SKL specifications based at least in part on a semantically declarative relationship between the first SKL specification and the second SKL specification, wherein the semantically declarative relationship is defined by the first SKL specification; receiving a versioning request to adjust the first SKL specification from a first version to second version; versioning the first SKL specification from the first version to the second version based at least in part on the versioning request; traversing the enterprise mesh to identify semantically linked SKL specifications that are linked to the first SKL specification; and upon versioning the first SKL specification to the second version and identifying the second SKL specification as being linked to the first SKL specification, validating the second SKL specification.

In some aspects, the techniques described herein relate to a system, the method further including: receiving and indication of a broken link between the first SKL specification and the second SKL specification based in part on versioning of the first SKL specification; and generating an alert indicating the broken link and a cause of the broken link.

In some aspects, the techniques described herein relate to a system, the method further including: remediating the broken link by performing one or more of (1) generating a provisional revision of the second SKL specification, (2) selecting a compatible alternative version of the first SKL specification, (3) applying a fallback mapping to maintain compatibility between the first SKL specification and the second SKL specification, or (4) creating a structured issue identifying the broken link and associated remediation metadata.

In some aspects, the techniques described herein relate to a system, wherein the enterprise mesh includes at least one SKL product, wherein the at least one SKL product is a sub-enterprise mesh that includes a second plurality of SKL specifications with bi-directional inherencies with the plurality of SKL specifications of the enterprise mesh.

In some aspects, the techniques described herein relate to a system, the method further including: in response at least in part to validating the second SKL specification, generating execution code for executing the second SKL specification based at least in part on the second version of the first SKL specification.

In some aspects, the techniques described herein relate to a system, wherein the first SKL specification is one of an object, a capability, a mapping, a policy, a workflow, and a product.

In some aspects, the techniques described herein relate to a system, wherein the first SKL specification is set as a draft version prior to validating the second SKL specification; wherein the first SKL specification is set to a live version upon validating the second SKL specification.

In some aspects, the techniques described herein relate to a system, wherein the enterprise mesh further includes a knowledge graph of instances of objects adhering to SKL.

In some aspects, the techniques described herein relate to a computer-readable non-transitory storage medium containing instructions that, when executed by one or more processors, cause the one or more processors to perform a method including: generating an enterprise mesh based at least in part on a SKL defining a plurality of SKL specifications executable by the one or more processors, wherein the plurality of SKL specifications are machine-interpretable, semantically descriptive, and define a plurality of composable components within the enterprise mesh; linking a first SKL specification of the plurality of SKL specifications to a second SKL specification of the plurality of SKL specifications based at least in part on a semantically declarative relationship between the first SKL specification and the second SKL specification, wherein the semantically declarative relationship is defined by the first SKL specification; receiving a versioning request to adjust the first SKL specification from a first version to second version; versioning the first SKL specification from the first version to the second version based at least in part on the versioning request; traversing the enterprise mesh to identify semantically linked SKL specifications that are linked to the first SKL specification; and upon versioning the first SKL specification to the second version and identifying the second SKL specification as being linked to the first SKL specification, validating the second SKL specification.

In some aspects, the techniques described herein relate to a computer-readable non-transitory storage medium, the method further including: receiving and indication of a broken link between the first SKL specification and the second SKL specification based in part on versioning of the first SKL specification; and generating an alert indicating the broken link and a cause of the broken link.

In some aspects, the techniques described herein relate to a computer-readable non-transitory storage medium, the method further including: remediating the broken link by performing one or more of (1) generating a provisional revision of the second SKL specification, (2) selecting a compatible alternative version of the first SKL specification, (3) applying a fallback mapping to maintain compatibility between the first SKL specification and the second SKL specification, or (4) creating a structured issue identifying the broken link and associated remediation metadata.

In some aspects, the techniques described herein relate to a computer-readable non-transitory storage medium, wherein the enterprise mesh includes at least one SKL product, wherein the at least one SKL product is a sub-enterprise mesh that includes a second plurality of SKL specifications with bi-directional inherencies with the plurality of SKL specifications of the enterprise mesh.

In some aspects, the systems and methods described herein are particularly well-suited for implementing dynamic, context-aware security models such as Zero Trust Architecture. By expressing security policies, access controls, and verification requirements as semantically-defined SKL specifications, the Enterprise Mesh enables organizations to implement consistent, adaptive security governance across distributed systems without brittle point-to-point integrations or hard-coded rules. This specification-driven approach allows security policies to evolve independently from implementation logic while maintaining semantic consistency and interoperability across security domains.

BRIEF DESCRIPTION OF THE FIGURES

Non-limiting embodiments of the present disclosure are described by way of example with reference to the accompanying figures, which are Schematic and are not intended to be drawn to scale. Unless indicated as representing the background art, the figures represent aspects of the disclosure.

FIGS. 13-15 illustrate modeling patterns for specification inheritance, including the use of semantic mixins and versioning traits, in accordance with an embodiment.

FIGS. 16-23 illustrate example embodiments of use cases for semantic capability invocation, instance-level policy enforcement, and dynamic interoperability across systems, in accordance with an embodiment.

FIGS. 30 and 31 depict example object schemas and their relationships, in accordance with an embodiment.

DETAILED DESCRIPTION OF FIGURES

Figure 1:
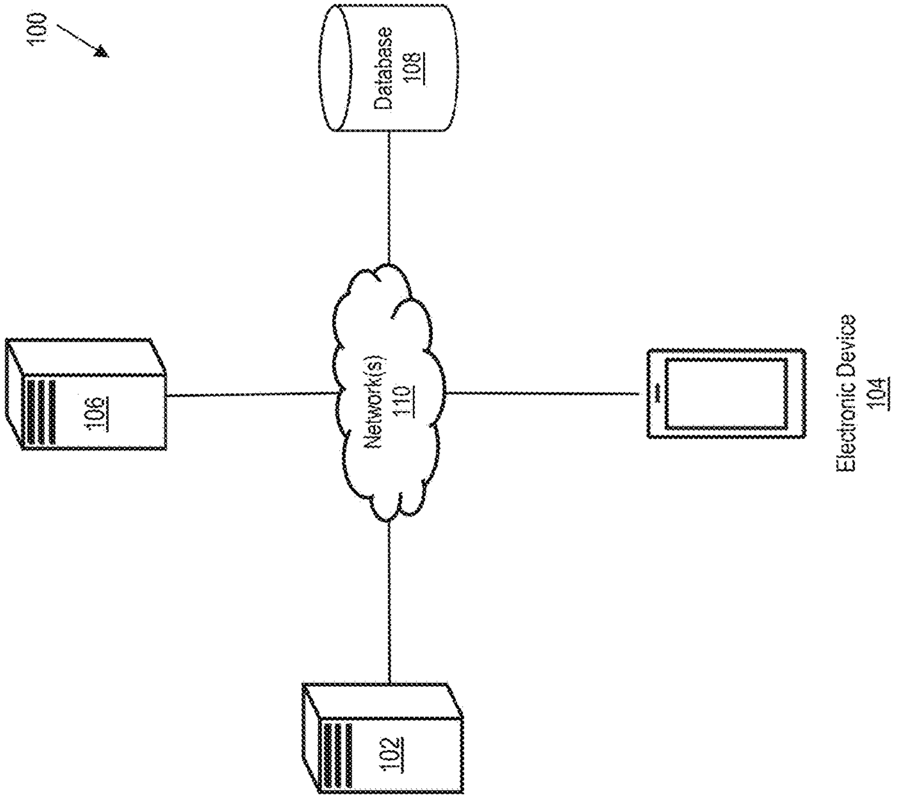
FIG. 1 illustrates an example system architecture for enabling decentralized semantic interoperability, including an analytics server, a user device, a third-party server, and a database interconnected via one or more networks, in accordance with an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The method, systems, and illustrated architectures are non-limiting to the concepts discussed herein.

As described in further detail herein, an Enterprise Mesh (also referred to herein as EM) is a schema-centric architectural paradigm that enables modular, semantically governed interoperability across complex, distributed enterprise environments. The Enterprise Mesh is composed of SKL specifications-machine-interpretable declarations written in a Standard Knowledge Language (SKL). These specifications define and organize core digital constructs such as objects, capabilities, mappings, policies, and interfaces. Each SKL specification describes both the structure and semantics of a component within the mesh, enabling dynamic resolution, composition, and governance of functionality across disparate systems. For example, an SKL capability specification may define a reusable action such as "submitRequest" or "generateReport," while an SKL object may represent structured data like a "Person," "Invoice," or "Document." These specifications serve as the source of truth for how components behave, interrelate, and evolve across the mesh.

In various embodiments, SKL Specifications ("skl:Specs") exhibit a novel multi-modal functionality, enabling a single specification to simultaneously serve multiple distinct technical purposes across the software development lifecycle. This multi-modal nature represents an advancement over conventional approaches that typically require separate artifacts for documentation, interface definitions, code implementation, and runtime execution. The multimodal capabilities of skl:Specs include, but are not limited to:

1. As structured semantic documentation (descriptive mode): SKL Specifications function as machine-readable, semantically explicit documentation that describes components, including capabilities, relationships, and governance policies. Unlike traditional documentation formats that exist separately from implementation and frequently become outdated, these specifications serve as the authoritative semantic source of truth. The descriptive metadata embedded within skl:Specs—such as purpose, motivation, usage guidelines, examples, and cross-references—is accessible to both human readers (e.g., product managers, developers, etc.) and machine systems (e.g., integrated systems, AI Agents, etc.), enabling consistent interpretation across various technical and non-technical stakeholders. For example, a skl:Capability specification for "evaluateRiskScore" may contain not just its structural definition but also its business justification, governance context, and relationship to regulatory frameworks, all as first-class, query-able properties. In some embodiments, automatic processing of software code, meeting transcripts, contracting documents, and/or other materials may be used to automatically generate specs as documentation.
2. As semantic interface contract (boundary mode): SKL Specifications define precise interoperability boundaries between "products" representing different domains, systems, etc. These boundaries explicitly describe encapsulated capabilities, API endpoints, or the like. The boundary mode enables runtime validation of interactions, ensuring that data exchanged between "products" adheres to the declared semantic contracts. For instance, when a financial system invokes a "submitClaim" capability from an insurance system, the Enterprise Mesh Platform validates that the submitted data conforms to the semantically defined input schema, that access policies permit the interaction, and that all required contextual metadata is present—all without requiring hardcoded validation logic in either system.
3. As model-driven code generator (translation mode): SKL Specifications can be systematically transformed into executable code, database schemas, user interfaces, or other implementation artifacts through various transformation techniques such as model-to-code transformations, Protocol Buffer compilation, OpenAPI code generation, or other processors. The translation mode may leverage the semantic richness of skl:Specs to generate not just structural code (e.g., classes, types, fields) but also behavioral logic, validation rules, and integration adapters. This reduces or eliminates manual coding while preserving the semantic intent of the specifications. For example, an skl:Object specification for "Patient" might generate corresponding class definitions in multiple programming languages, database table schemas, API payload definitions, and client-side form validation rules—all derived from a single authoritative specification and automatically updated when that specification evolves.

4. As directly executable semantic definition (runtime mode): In some embodiments, SKL Specifications are interpreted and executed directly by a given solution (e.g., the Enterprise Mesh Platform, a "product" in the mesh, etc.) without translation to intermediate code. This runtime execution mode enables declarative systems where some or all of the behavior, validation, transformation, and policy enforcement are determined entirely by specifications rather than hardcoded implementations. For instance, an skl:Mapping specification might define how data from a legacy system is transformed, validated, and routed to a cloud service—with the Enterprise Mesh Platform (or an SKL Engine in a given product) directly executing this transformation at runtime based on the declarative mapping definition, without requiring a separate implementation of the transformation logic.

These multi-modal capabilities are not isolated functions but concurrent aspects of the same specification artifacts, allowing the Enterprise Mesh to maintain semantic consistency across documentation, interface contracts, generated code, and runtime execution. This integration addresses a fundamental challenge in software engineering: the frequent divergence between documentation, interface definitions, implementation code, and runtime behavior.

In one embodiment, when a skl:Spec is modified, the Enterprise Mesh Platform propagates those changes across all its modes—updating documentation, notifying systems that rely on its interface contract, regenerating any derived code, and adjusting runtime behavior—all while maintaining semantic integrity and verifying compatibility with linked specifications. This capability enables continuous evolution of distributed systems while preserving interoperability and governance at scale.

The multi-modal nature of skl:Specs further enables diverse stakeholders to interact with the system according to their expertise and requirements. Business analysts may focus on the descriptive documentation mode, architects on the interface contracts, developers on the generated code, and operations teams on the runtime execution—all working with consistent, semantically aligned specifications rather than disconnected artifacts.

In some embodiments, SKL Specifications enable federated semantic interaction through their inherently self-describing, addressable, and composable nature. Unlike traditional integration approaches that rely on centralized platforms or hardcoded connectors, federation in the Enterprise Mesh emerges naturally from the SKL architecture, where each specification has a unique identifier and can independently reference other specifications across domain boundaries. This distributed, semantically-linked approach allows a request—such as invoking a capability or querying a complex data object—to be fulfilled through resolution of semantic references across domains without requiring centralized coordination. Each SKL Specification maintains its own semantic relationships, governance rules, and resolution mechanisms, enabling true decentralized interoperability where entities can evolve independently while maintaining semantic coherence across the distributed mesh. In these embodiments, an analytics server somewhere in the mesh, rather than "enabling" federation, simply interprets these specifications and follows their defined semantic pathways to resolve references and execute capabilities across domain boundaries.

The Enterprise Mesh Platform (also referred to herein as EMP) functions as the intelligent execution layer that interprets and operationalizes the SKL specifications in real time. Rather than relying on fixed APIs or rigid workflows, the EMP dynamically mediates behavior, applies governance, and executes capabilities based entirely on SKL-defined contracts. It traverses the mesh to locate SKL capabilities and their input/output schemas, resolves mappings between incompatible data types, and enforces executable SKL policies during runtime. Additionally, the EMP supports features such as version management, bi-directional inheritance, and semantic introspection of linked specifications, enabling recursive composition and cross-domain reasoning.

In some embodiments, the Enterprise Mesh Platform may be executed/generated by an analytics server to provide auxiliary computation, inference, or observability services across the mesh. For example, the analytics server may evaluate historical mesh activity to detect trends in capability invocation, validate usage against SKL policy constraints, or infer missing links between specifications to improve semantic alignment. It may also execute asynchronous dataflows, perform usage summarization, or produce evolution recommendations—e.g., flagging out-of-date capability compositions or proposing schema refactoring based on telemetry. In this way, the analytics server acts as a mesh-aware observer and computational agent, enabling higher-order functions such as predictive governance, compliance auditing, and dynamic mesh optimization. It is understood that the analytics server may execute some or all of the methods described herein.

FIG. 1 illustrates a system 100 for implementing an Enterprise Mesh Platform (EMP) within a distributed computing environment. The system 100 may include an analytics server 102, an electronic device 104, a server 106, and a database 108, each communicatively coupled via one or more networks 110. These components collectively support the creation, execution, and governance of semantically-defined operations across the enterprise mesh. The system architecture enables decentralized interoperability, version-controlled specification execution, and cross-system collaboration using a plurality of SKL specifications.

The analytics server 102 may serve as the core execution engine and semantic reasoning system for the Enterprise Mesh Platform. In this capacity, the analytics server 102 may generate and manage an enterprise mesh based on a SKL, wherein a plurality of machine-interpretable SKL specifications (e.g., skl:Object, skl:Capability, skl:Policy, skl:Workflow, skl:Product) define composable components within the mesh. The analytics server 102 may be configured to perform runtime resolution of SKL capabilities, enforce governance policies through executable constraints, track and validate specification inheritance, and coordinate multi-domain orchestration across distributed services. In some implementations, the analytics server 102 may additionally interpret declarative SKL specifications to perform schema-driven transformation, version validation, usage telemetry analysis, and graph-wide impact assessment.

The analytics server 102 may also expose endpoints or interfaces (e.g., APIs, semantic gateways, user interface layers) enabling electronic devices such as the electronic device 104 to interact with the mesh. These interactions may include initiating capability invocations, submitting specification drafts, monitoring execution telemetry, or viewing semantic compositions defined as skl:Products. In some embodiments, the analytics server 102 may also automatically trigger reconciliation tasks, semantic upgrades, or specification propagation workflows based on feedback signals or mesh evolution policies.

The server 106 may represent any third-party system, integration point, or external application that is operatively connected to the enterprise mesh managed by the analytics server 102. Examples of such a server include a third-party document repository, cloud service, identity provider, or domain-specific service endpoint. Interoperability with server 106 may be achieved through one or more SKL IntegrationInterface specifications (e.g., skl:RESTfulApi, skl:GraphQLInterface, skl:IntentInterface) that define how external resources may participate in semantic resolution or capability execution within the mesh. For example, the analytics server 102 may invoke a skl:Capability that, based on a mapping specification, delegates execution to an external endpoint hosted by the server 106.

The database 108 may serve as a persistent store for SKL specifications and associated metadata (e.g., version histories, composition structures, authorship records, compliance annotations), as well as runtime data instances that conform to one or more skl:Object specifications (e.g., issue logs, governance assignments, audit trails). In some embodiments, the database 108 may include graph-oriented data structures or triple stores to enable high-performance semantic traversal and query resolution.

The one or more networks 110 may include any suitable combination of private or public LAN, WLAN, WAN, or Internet communication infrastructure, using secure transmission protocols (e.g., HTTPS, TLS) and semantic web standards (e.g., JSON-LD, RDF) to facilitate interaction among components.

Collectively, the system 100 shown in FIG. 1 enables the dynamic generation and execution of the Enterprise Mesh that supports semantic composability, federated governance, and distributed capability invocation. Through the role of the analytics server 102, the system 100 unifies SKL specification logic, runtime instance tracking, and integration control—allowing for intelligent, policy-aware automation across enterprise systems.

Figure 2:
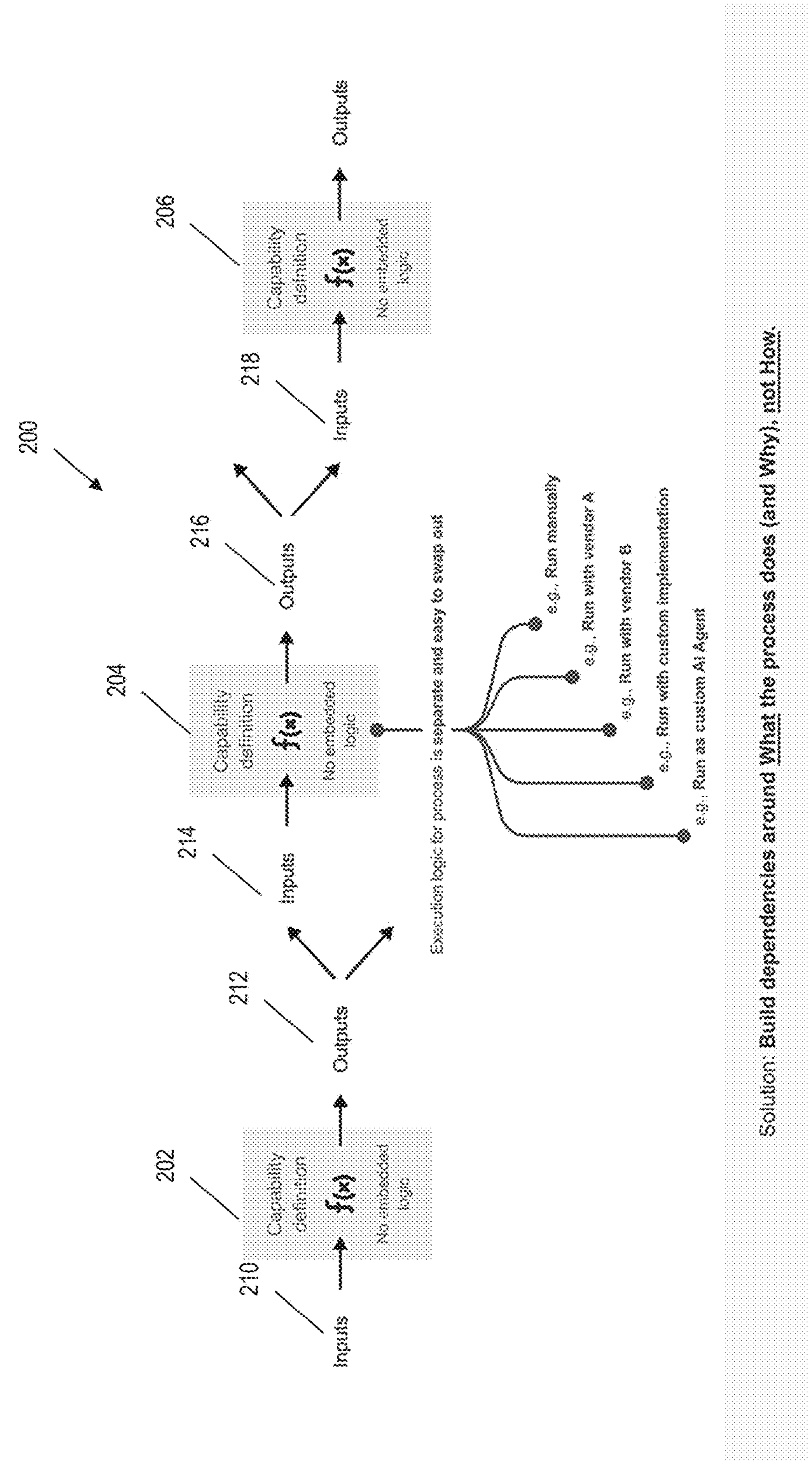
FIG. 2 depicts a layered schematic representation of how a semantic graph may be initialized or updated, showing various processing modules and data flows between components, in accordance with an embodiment.

FIG. 2 illustrates an example SKL capability (e.g., an SKL specification 202) which may form a part of the Enterprise Mesh generated by the analytics server 102 of FIG. 1. The SKL capability is a form of SKL specification or schema, and is a composable component within an Enterprise Mesh system. The SKL specification 202 is a representation of modular, declarative capability definitions within a specification-driven execution model, in accordance with one or more embodiments of the systems and methods described herein. The system 200 includes a series of discrete SKL schemas, shown as SKL specification 202, 204, and 206, each of which represents an abstracted SKL-defined functional unit that describes what a process does (semantically), without embedding the executable logic responsible for carrying out that process.

Figure 3:
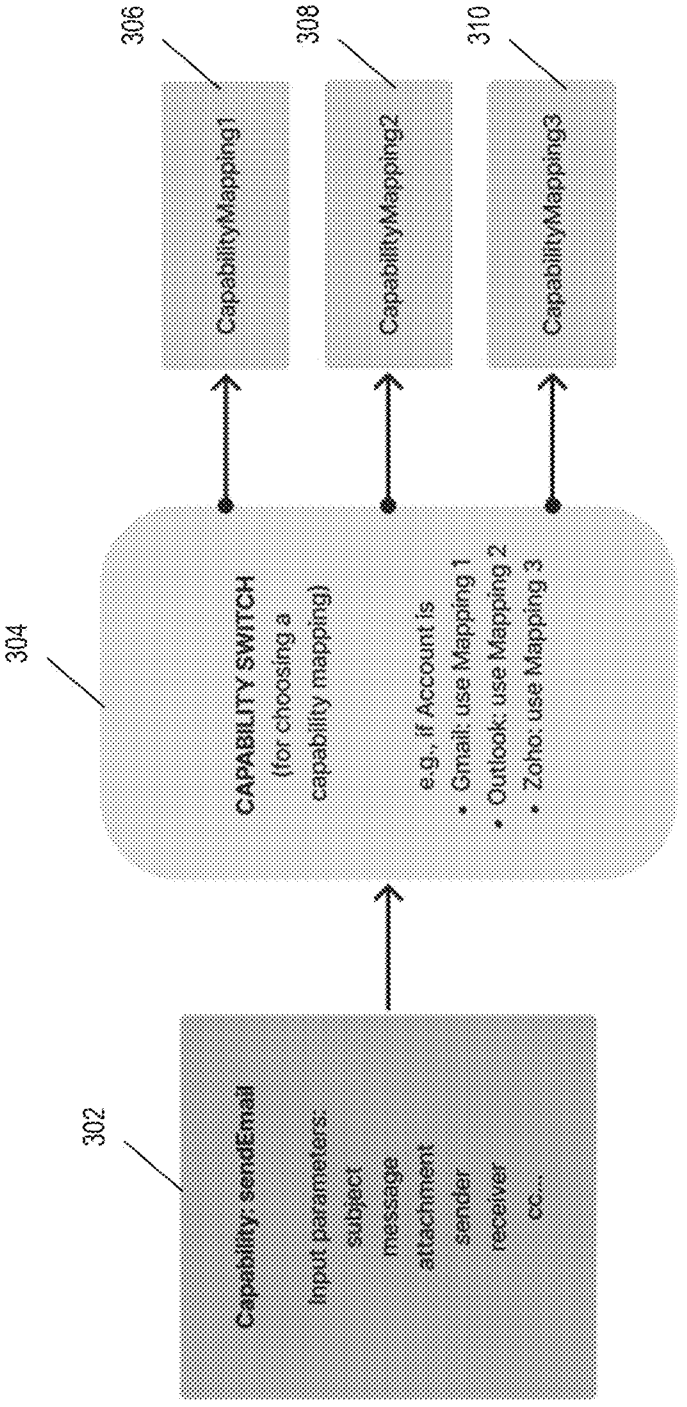
FIG. 3 shows an example flow diagram of operations performed during semantic resolution or capability invocation, in accordance with an embodiment.

As shown, each capability (e.g., SKL specification 202) receives one or more Inputs 210 and yields one or more Outputs 212, as represented by directional arrows. The functional behavior f(x) of each capability is conceptually declared at the specification layer—e.g., as a skl:Capability—but is not bound to any specific procedural code within the capability definition itself. Rather, the execution logic for each process is externalized and may be dynamically resolved and invoked by an orchestration engine or runtime switch, as shown in FIG. 3.

This abstraction enables downstream capabilities, such as SKL specification 204 and 206, to receive prior outputs (e.g., one or more Outputs 212 and output 216) as their own respective inputs (e.g., input 214 and 218), thereby supporting a chained or composable execution graph within the Enterprise Mesh while maintaining strict decoupling between specification and implementation. As each capability produces outputs semantically consistent with the SKL-defined structure (as described herein), the analytics server can reason through downstream components over those outputs and execute based on declarative contracts rather than implementation-specific coding.

This system of non-embedded logic within the each SKL schema (e.g., the SKL specification 204) allows for execution flexibility. Specifically, for a given capability, the execution logic can be selected from among multiple interchangeable implementation options, including but not limited to: manual execution by a human user; integration with third-party vendor platforms (e.g., Vendor A or Vendor B); invocation of a custom implementation; or runtime execution via an autonomous AI agent.

This decision may be governed by contextual parameters, runtime environment metadata, or dynamic orchestration policies defined elsewhere in the Enterprise Mesh or Enterprise Mesh Platform. This design pattern supports capability switching by the analytics server—the ability to bind a semantic capability to one of multiple underlying implementations at runtime—based on declarative mappings and without altering upstream or downstream dependencies within the EM.

By isolating execution logic from capability specification, the system provides consistent substitution, governance, and experimentation without architectural disruption within the Enterprise Mesh. Changes to the implementation of a process at one SKL specification do not propagate semantic inconsistencies because dependent systems are bound to the declarative interface, not the underlying code. In other words, this model allows systems to build dependencies around what the process does (and why), not how.

Continuing from the description of FIG. 2, FIG. 3 illustrates a non-limiting embodiment of a capability switch mechanism used within the Enterprise Mesh to resolve and invoke the appropriate execution pathway for a given SKL-defined capability based on runtime conditions.

As shown, the diagram represents an SKL specification (e.g., Capability 302) labeled "sendEmail," which includes a number of declared input parameters such as subject, message, attachment, sender, receiver, and cc. These parameters are defined as part of the SKL specification for the capability and serve as semantic input fields that may or must (depending on the SKL Specification) be satisfied for execution of the capability, regardless of implementation.

Instead of binding the sendEmail capability to a fixed execution routine, the analytics server executes a Capability Switch 304 that determines which implementation to use based on one or more context-aware criteria. The capability switch may be represented by a skl:CapabilitySwitch specification, for example, and is configured to evaluate runtime metadata or request attributes—such as user account type, input parameters, geographic region, policy status, or system health.

In the illustrated embodiment, the capability switch supports conditional routing logic such that: (1) if the email account is managed by Gmail®, the system invokes CapabilityMapping 306; (2) if the account is managed by Outlook®, it selects CapabilityMapping 308; and (3) if the account is hosted on Zoho®, it applies CapabilityMapping 310.

Each CapabilityMapping (e.g., CapabilityMapping 306, 308, 310) is its own a declarative SKL specification that defines how to execute the abstract capability using a specific integration, transformation routine, or protocol. These mappings may encapsulate REST API calls, message bus interactions, low-code workflows, or custom logic functions, depending on the target implementation environment. As such, the SKL specification (e.g., the capability 302) remains agnostic to these underlying mappings, which may be swapped, versioned, or extended without altering the interface contract exposed to upstream systems. This allows for the decoupling of the capability 302 from execution logic, mediated by the dynamically configurable switching layer (e.g., the Capability Switch 304), which further supports contextual execution, federated interoperability, and safe evolution of system behavior. It allows systems employing the EM to adapt or diversify implementations without breaking integration contracts, thereby enabling semantically governed orchestration of actions and data management across heterogeneous platforms and runtime conditions.

Figure 4:
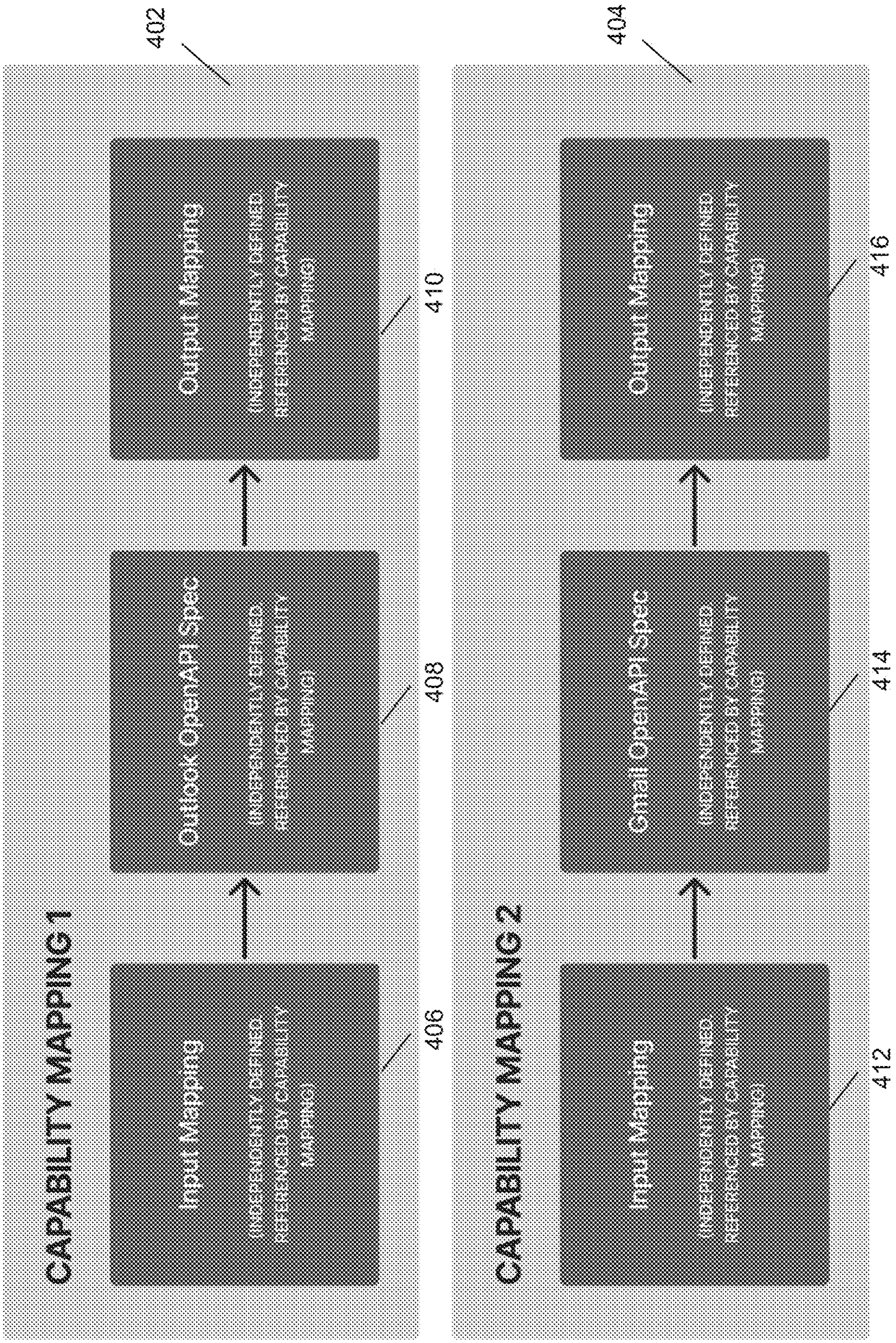
FIG. 4 presents a schema composition or capability mapping process, illustrating interactions among inputs, processing logic, and output generation, in accordance with an embodiment.

Continuing from the description of FIG. 3, FIG. 4 illustrates an embodiment of capability mappings used to execute an abstract capability—such as sendEmail from FIG. 3—via multiple interchangeable service integrations. Each capability mapping is a structured SKL specification that references one or more input mappings, integration definitions, and output mappings, all of which are independently defined and composable.

FIG. 4 illustrates two mappings Capability Mapping 402 and Capability Mapping 404 each representing a distinct execution pathway for the same abstract capability. These mappings are selected by the analytics server based on the capability switch mechanism (described in FIG. 3) based on runtime context or configuration.

In Capability Mapping 402, an Input Mapping 406 is used to transform or align the abstract input parameters (e.g., subject, sender, receiver) to match the expected structure for the corresponding integration. The transformed input is then passed to an integration component (e.g., Operation Mapping 408) defined by an OpenAPI specification for Outlook. This specification may declare the endpoint, authentication method, payload structure, and invocation rules necessary for interacting with Outlook's email service. The result returned from Outlook is then passed through an Output Mapping 410, which translates the response data into the expected semantic structure required by the SKL-defined capability or the calling application.

Output Mapping 410 acts as the semantic bridge between the abstract, system-agnostic capability definition and its concrete implementation. The Output Mapping 410 includes references to the corresponding input and output mappings, along with contextual metadata such as supported SKL object types, transformation logic, and constraints for execution. In some embodiments, the Output Mapping 410 may also include conditional logic or rules for selecting between multiple integration targets based on runtime conditions or policy evaluations. By modeling this transformation layer explicitly as an SKL specification, the Enterprise Mesh Platform can dynamically interpret and execute the mapping without requiring embedded procedural logic. The Output Mapping 410 thus enables runtime semantic mediation between declaratively defined enterprise behaviors and the APIs or services that operationalize them.

Capability Mapping 404 follows a similar pattern but substitutes the Outlook integration with a Gmail OpenAPI Spec at the Operation Mappings 414. As before, the Input Mapping 412 and Output Mapping 416 are each referenced as independent components, allowing reuse across other capability mappings or integration pathways.

FIG. 4 illustrates that execution logic is declaratively assembled, not hardcoded into the SKL specification framework. Mappings are modular, interoperable, and composable, enabling developers or orchestration engines to define and invoke integrations using semantic instructions rather than imperative code. The structure also allows the same capability to be routed through multiple providers or implementations with minimal disruption, supporting governed evolution, vendor abstraction, and/or policy-driven integration.

In managing each mapping component as a separately versioned SKL Spec—rather than a fixed block of code—the EM provides governance control, traceability, and/or dynamic reconfiguration of integration workflows between the disparate computing environments/servers without reengineering the broader architecture.

In some embodiments, the internal structure of capability mappings may vary. For instance, Input Mappings 406 and 412, Operation Mappings 408 and 414, as well as Output Mappings 410 and 416 may be incorporated directly within the capability mapping rather than by "reference". In other embodiments, capability mappings may include other components such as a preprocessing mapping. In yet other embodiments, capability mappings can be considered "black boxes" that simply handle the execution logic for a given capability, in essence accepting the capability's inputs, then performing an operation, and then returning the capability's outputs. In this example, capability mappings could be described and executed using alternate expression or logic language and execution environments.

Figure 5:
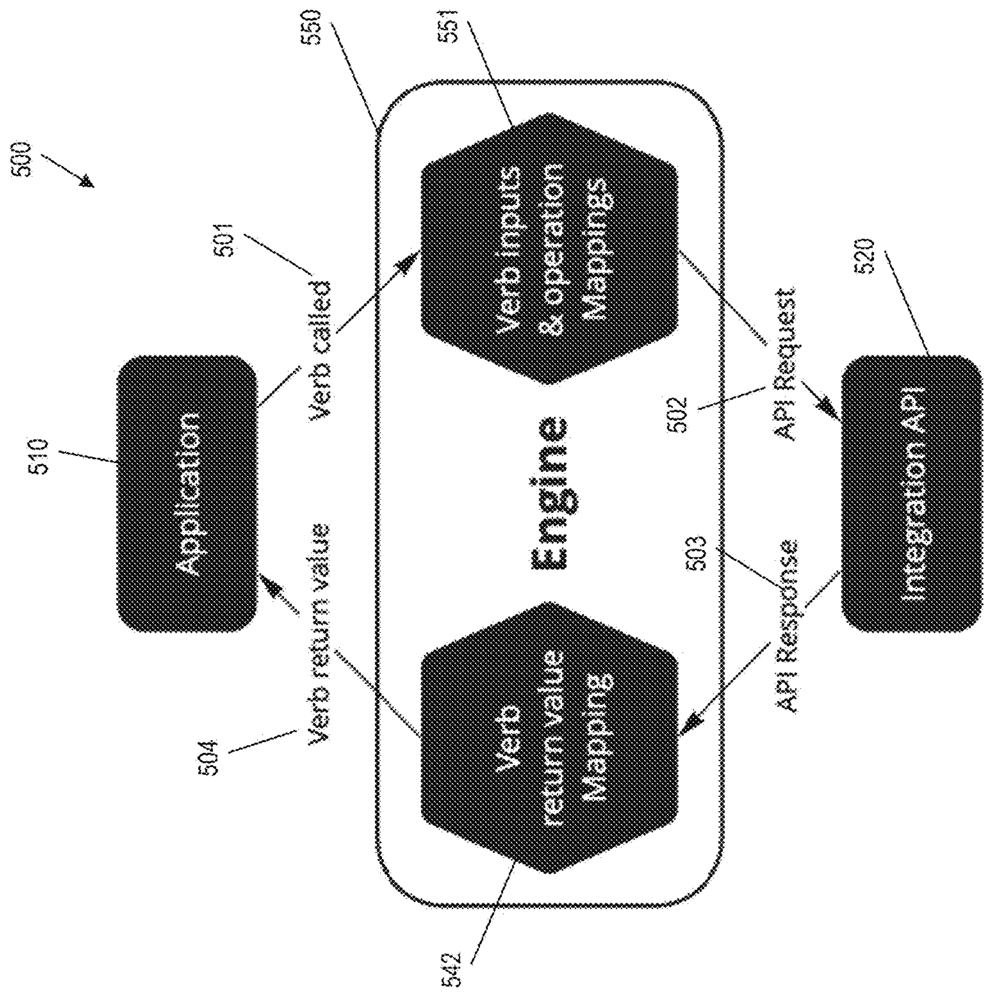
FIG. 5 illustrates a semantic capability execution pipeline in which an application invokes a capability that is resolved and executed by an engine via mappings and external APIs, in accordance with an embodiment.

FIG. 5 illustrates an exemplary execution flow for invoking a capability within an EM using semantic mappings, in accordance with one or more embodiments of the disclosed system. The system 500 includes an Application 510 that initiates a semantic request corresponding to a verb (e.g., capability) call. A call 501, annotated as "Verb called," is transmitted to an Engine 550 (e.g., the analytics server) that interprets the semantic specification associated with the requested capability. The Engine 550 acts as an intelligent intermediary between application-initiated semantic requests and the corresponding executable logic and integration workflows defined across the mesh. Rather than relying on static code paths, the Engine 550 dynamically interprets SKL Capability specifications to resolve input mappings, operational logic, and response formatting, enabling flexible orchestration of services and capabilities in accordance with declarative specifications. As such, it supports runtime mediation, semantic routing, and interoperable invocation of mesh-defined operations without requiring hardcoded application logic-making it a foundational component for modular and extensible execution within the Enterprise Mesh.

Within the Engine 550, a first component labeled Verb inputs & Operation Mappings 551 is configured to receive the incoming verb call and resolve the appropriate input mappings, transformation logic, and operational execution steps. Based on this mapping, the Engine 550 generates an API Request 502 directed toward an Integration API 520. The Integration API 520 facilitates communication with an external or downstream system or service, returning an API Response 503 to the Engine 550.

Upon receiving the response, the Engine 550 passes the result through a second mapping layer labeled Verb return Value Mapping 542, which translates or transforms the response into a format consistent with the semantic structure expected by the calling application. The transformed output is then delivered back to the Application 510 as a Verb return value 504.

The two internal mapping layers within the Engine 550—namely, the Verb inputs & Operation Mappings 551 and the Verb return Value Mapping 542—operate on the basis of declarative SKL Specifications, which define the structure and semantics of both the incoming call and the expected return value. As such, the Engine 550 performs routing, transformation, and semantic mediation without embedding fixed code implementations, relying instead on SKL-defined mapping specifications and execution metadata.

Verbs, as illustrated in FIG. 5, may be conceptually and operationally compared to SKL Capabilities within the Enterprise Mesh framework. In this context, a "verb" represents an abstracted invocation of an action or operation initiated by an application, such as "submitRequest," "evaluateRisk," or "generateDocument." This aligns with the SKL model, in which skl:Capability specifications define the semantic contract for a given action—namely, what the action does, what it requires as input, what it produces as output, and how it may be governed or composed.

Accordingly, each verb initiated by the Application 510 corresponds to a SKL Capability that is defined as a machine-interpretable specification within the EM. The Engine 550 serves as the intermediary that interprets the invoked verb by resolving the associated SKL Capability and retrieving the relevant SKL Mappings for inputs, outputs, and execution logic. The Verb inputs and Operation Mappings 551 may correspond to a combination of skl:Capability and skl:Mapping specifications that determine how input data should be transformed or routed for execution. Similarly, the Verb return Value Mapping 542 operates in accordance with SKL-defined schemas and mapping logic, ensuring that the response adheres to the output structure defined by the SKL Capability's semantic contract. This allows plug-and-play interoperability, version control, and policy enforcement.

Figure 6:
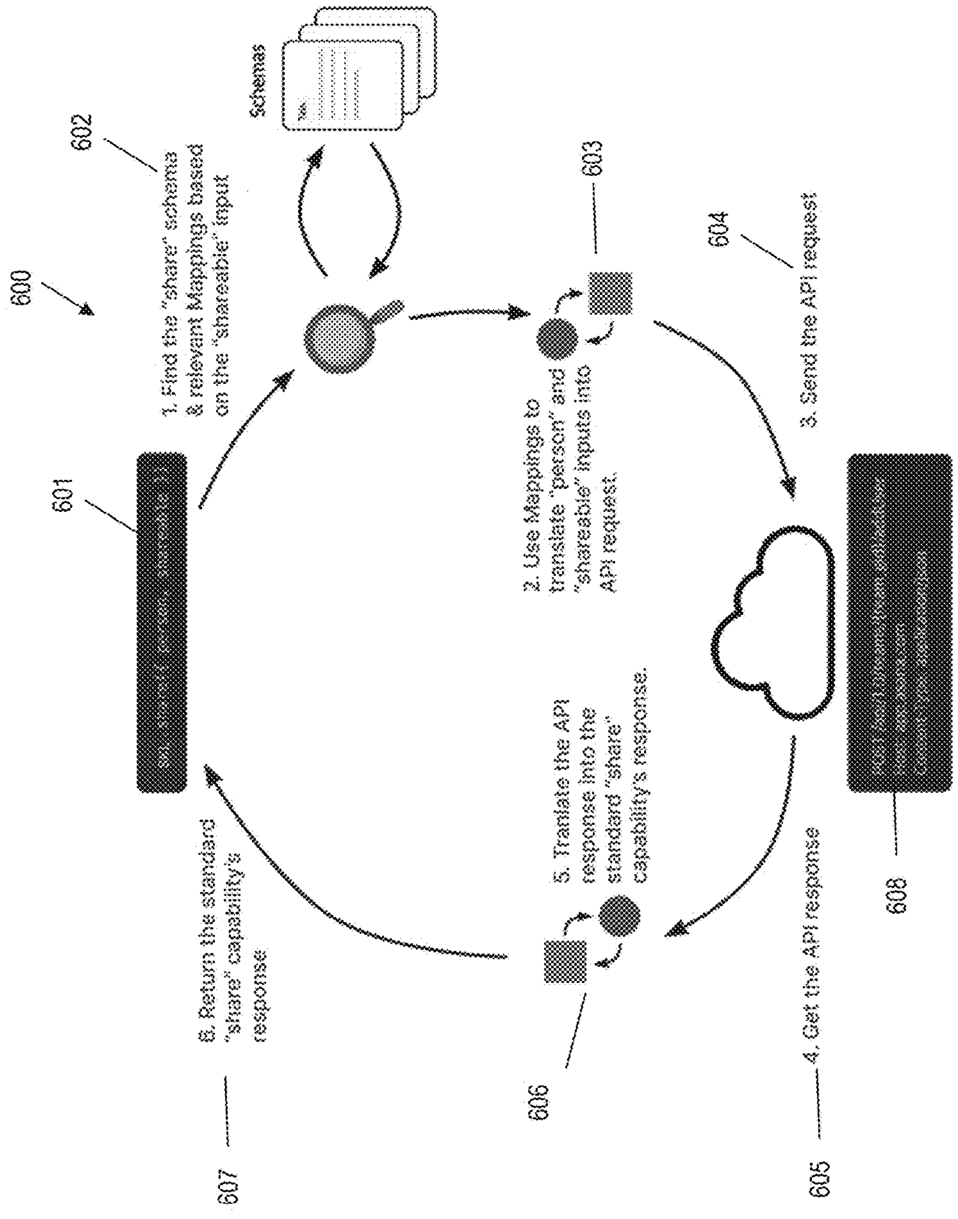
FIGS. 6-11 depict various schema authoring and editing interfaces, including no-code and code-based representations, capability and object schema specifications, and interface views for human or AI-assisted authoring, in accordance with an embodiment.

FIG. 6 illustrates a flow diagram of a representation of a Shared Knowledge Language (SKL) process 600, in accordance with an embodiment. At step 601, an application initiates a call to the SHARE verb using a Standard SDK, passing in a shareable entity (e.g., a task or file) and a person entity (e.g., a user or account). The SHARE verb corresponds to a declaratively defined SKL capability.

At step 602, the Standard SDK identifies the SKL schemas and relevant mappings associated with the person and shareable entities, as well as the integration service that corresponds to the operation. These specifications may be retrieved from a local codebase, a federated SKL library, or a runtime-accessible knowledge graph maintained by the Enterprise Mesh Platform.

At step 603, the SDK uses the identified schemas and mapping specifications to translate the person and shareable arguments into an API-ready format. This translation process includes resolving parameter shape, data transformation, and routing metadata based on the SKL-defined input mappings.

At step 604, the SDK dispatches the transformed request to the target Integration API 608, for example using a standard internal method such as EXECUTEOPENAPIOPERATION( ), and structured according to the target API's interface definition (e.g., OpenAPI spec).

At step 605, the Integration API responds with a result, which may reflect the successful execution of the share operation (e.g., an HTTP response confirming user assignment to a task or shared access granted).

At step 606, the SDK uses the corresponding Output Mapping to transform the API response back into the format expected by the SKL-defined SHARE capability. This ensures that the semantics of the response align with the standardized outputs defined by the SKL Specification for the verb.

Finally, at step 607, the Standard SDK returns the normalized response to the application, completing the semantic invocation cycle. Throughout this process, the SDK operates on the basis of declarative SKL specifications, enabling integration behavior to be controlled, governed, and evolved through specification data rather than embedded logic.

Figure 7:
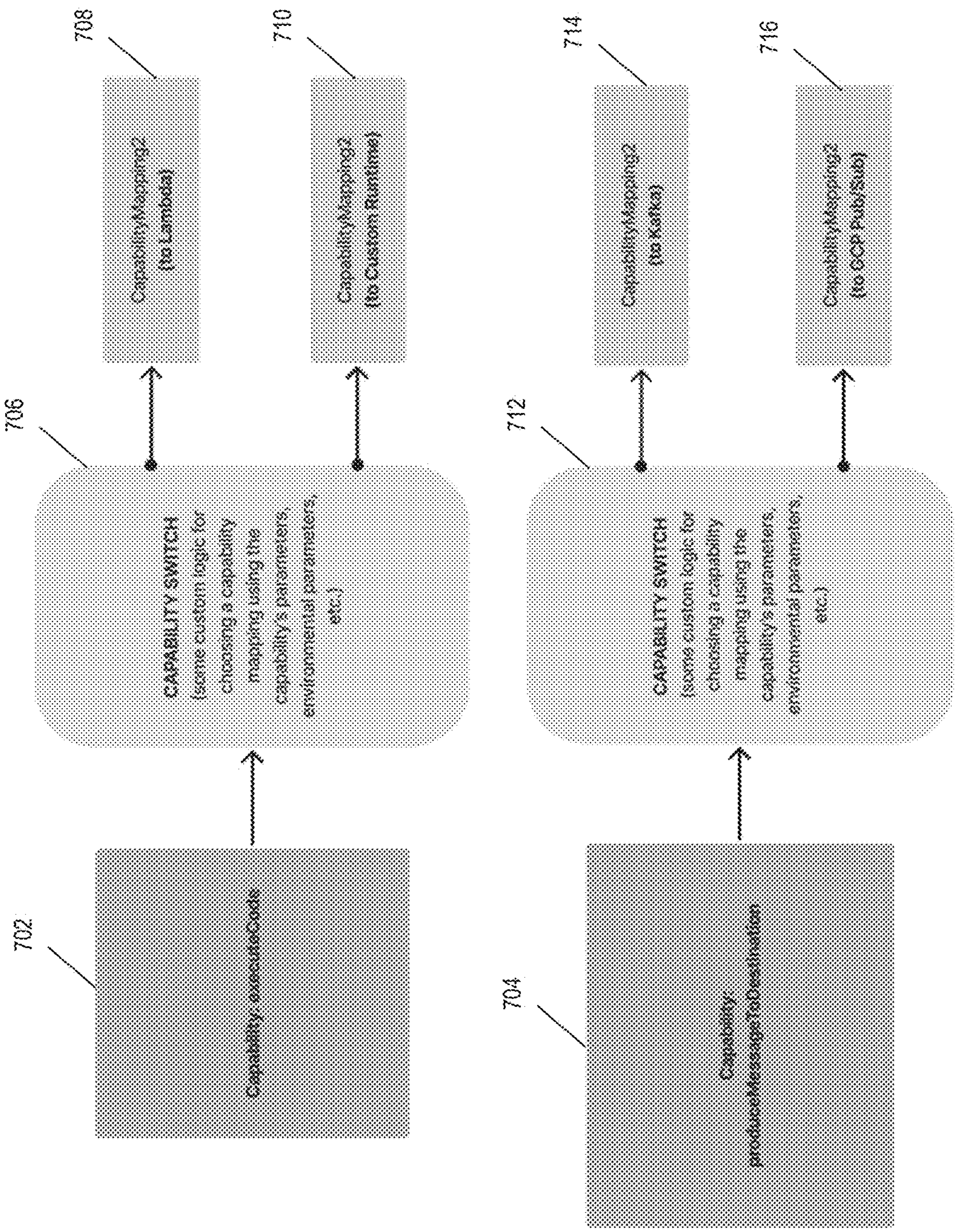

FIG. 7 illustrates additional examples of capability switching logic used to dynamically select among multiple execution pathways based on environmental context, runtime parameters, or integration preferences, in accordance with various embodiments of the disclosed system.

As shown, the diagram includes two declaratively defined SKL capabilities such as capability 702 (Capability: executeCode) and capability 704 (e.g., Capability: produceMessageToDestination). Each capability is defined independently from its execution logic and instead relies on a Capability Switch mechanism (e.g., Capability Switch 706, 712) to determine the appropriate mapping at runtime.

For the capability 702 (e.g., executeCode), the Capability Switch 706 corresponding thereto applies context-specific logic to select from multiple capability mappings: (1) CapabilityMapping2 708 defines an execution pathway using AWS Lambda, (2) CapabilityMapping2 710 defines an alternate pathway that may route the operation to an internal or user-defined execution environment.

Similarly, for the capability 704 (e.g., produceMessageToDestination), the Capability Switch 712 is configured to analyze the capability's declared inputs, invocation context, or external environmental parameters to select between two different message-publishing services: (1) CapabilityMapping2 (to Kafka) 714 and (2) CapabilityMapping2 (to Google Cloud Pub/Sub) 716.

As shown in FIG. 7, rather than embedding conditional logic into applications or workflows, routing and execution behavior is declaratively defined and governed through SKL specifications. Capability switches enable dynamic binding to the most appropriate implementation based on real-time variables such as: (1) source system metadata, (2) user identity or account configuration, (3) deployment environment, (4) runtime performance metrics, or (5) governing policies.

In so doing, the EM supports federated control, vendor-neutral integration, and extensibility, allowing enterprise systems across disparate environments to adapt, evolve, and scale by shifting execution strategy without altering the interface contract of the underlying capability. As with FIGS. 3-6, the capability switches operate on formal SKL constructs, enabling transparent orchestration and lifecycle governance throughout the system.

Figure 8:
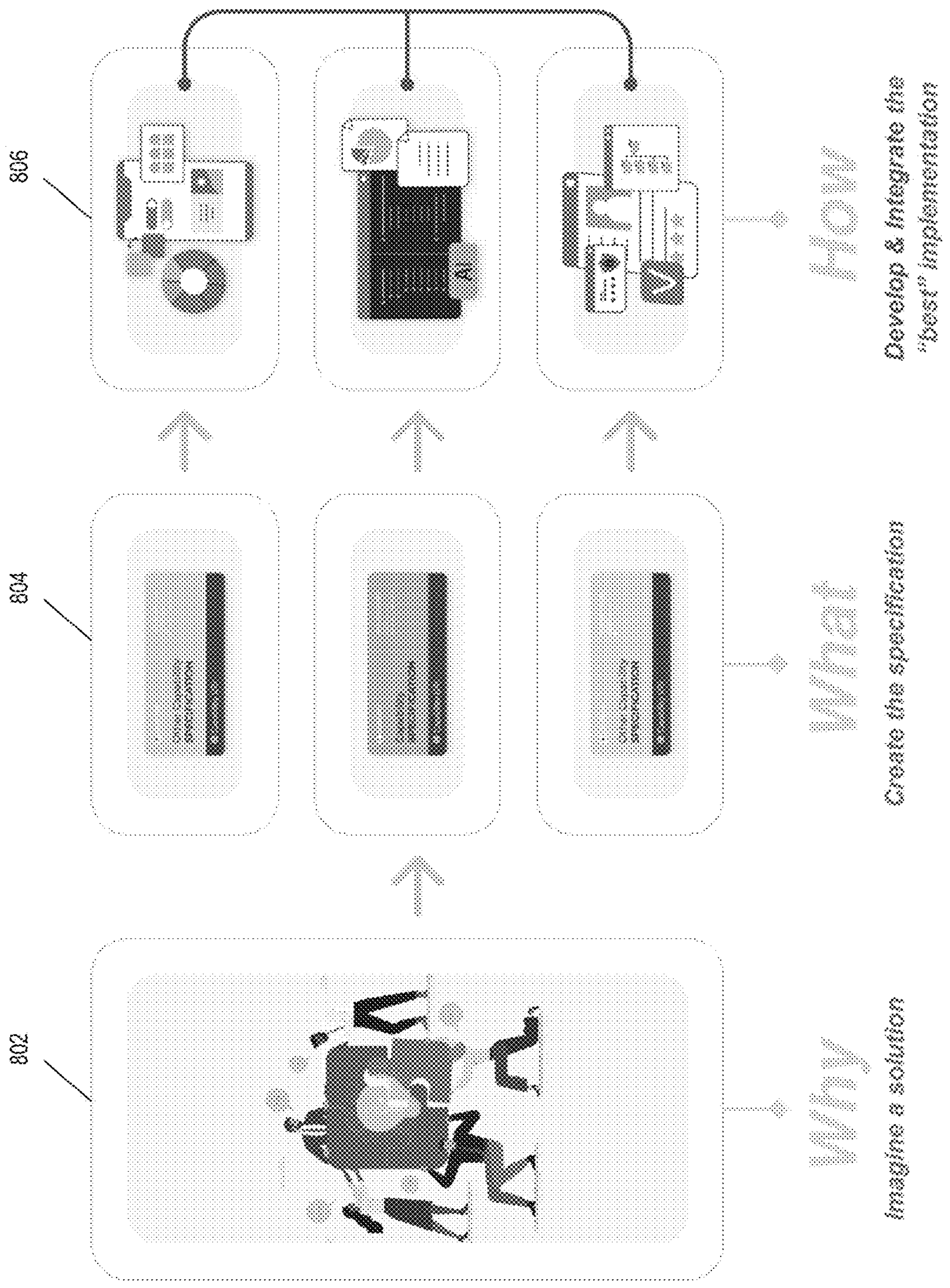

FIG. 8 illustrates a software development pattern in which dependencies are built around fixed implementations. This approach can lead to tight coupling between a system's behavior and its underlying execution logic, resulting in significant constraints on flexibility and reuse.

The diagram is divided into three conceptual stages: stage 802, stage 804, and stage 806. In stage 802, stakeholders imagine a solution to a particular business or technical challenge. This phase is typically driven by user needs, domain knowledge, or operational objectives. In stage 804, teams define one or more capability specifications that describe what the system should do. In conventional models, these specifications are often not formally structured and may exist only as part of documentation or embedded directly into code. In stage 806, development efforts proceed directly toward building or integrating the selected implementation. This implementation becomes tightly coupled to the specification, meaning future changes—whether to requirements, technologies, or vendors—require extensive rework. Dependencies are locked in around a specific solution, logic path, or API, limiting modularity and adaptability, leading to the inability to evolve or swap implementations without disrupting upstream or downstream dependencies.

Figure 9:
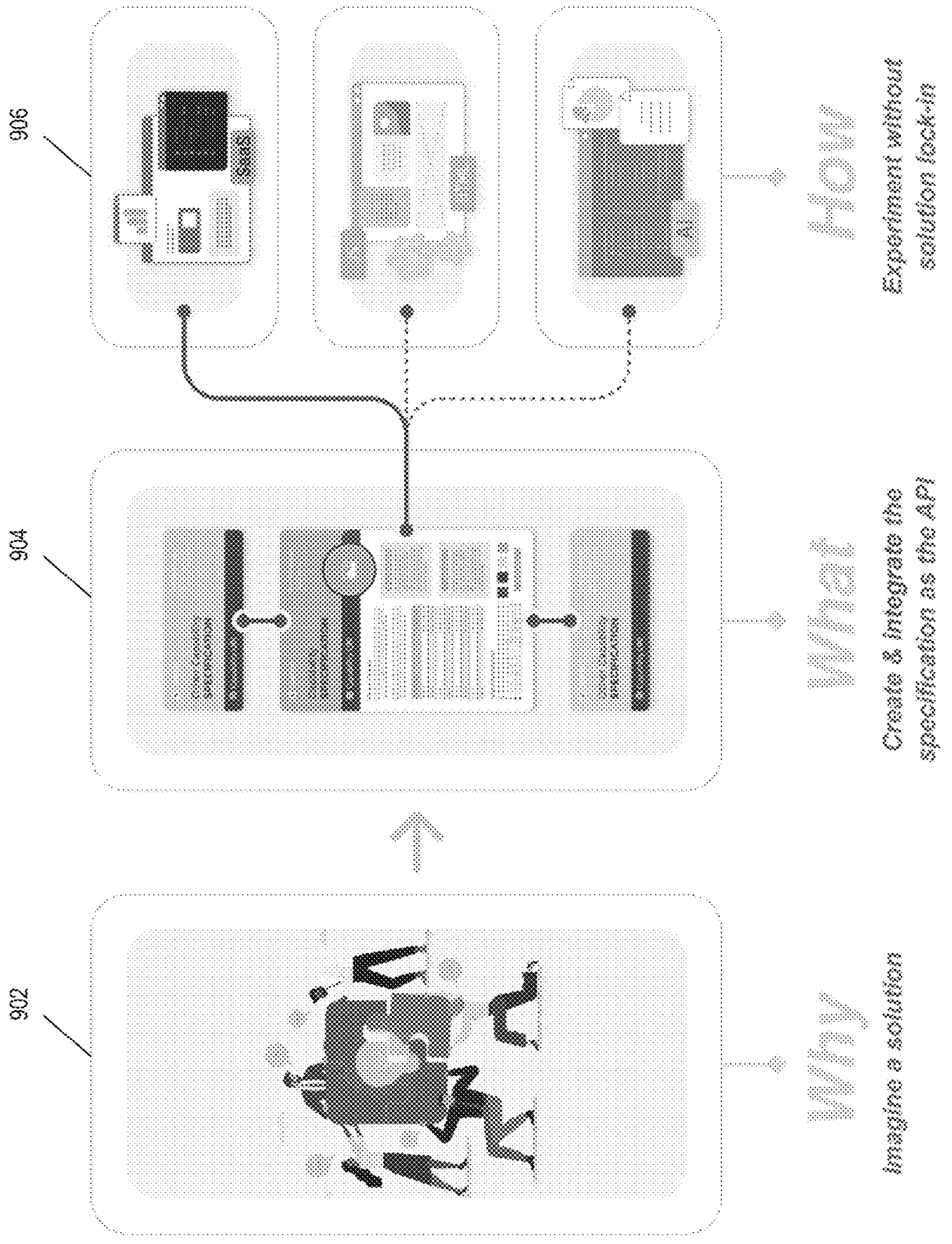

FIG. 9 illustrates an architecture and development approach in which capability definitions—and other system components—are treated as formal specifications that serve as the authoritative semantic contract for execution and integration. This model supports a clean separation between what a system does and how it is implemented, enabling modularity, experimentation, and composability without introducing architectural fragility or vendor lock-in.

The diagram is structured into three stages: stage 902, stage 904, and stage 906. In stage 902, a team imagines a solution to a problem or identifies a desired outcome. This intention-setting phase anchors the development process in human insight or organizational objectives. In stage 904, the team defines the capability using a formal SKL specification. This specification operates as the semantic interface or contract of the capability, and includes structural definitions (e.g., input/output schemas), declared behaviors, policies, and references to mappings. The specification is written in a machine-readable form that allows it to serve as a stable integration surface, even as downstream implementations evolve. This specification is not just documentation—it is the executable layer that governs behavior, policy enforcement, and lifecycle control across the system. In stage 906, multiple implementations may be developed and integrated in accordance with the specification. Because the system interacts with the capability via its SKL-defined interface, these implementations can vary by runtime environment, vendor, programming language, or policy constraints—without altering the interface itself. Implementations may be routed dynamically using capability switches, allowing for runtime selection based on context, environment, or optimization logic.

This approach enables systems to evolve without architectural disruption. Teams can safely test new versions, integrate across domains, or substitute technologies, all while preserving semantic consistency and policy alignment. FIG. 9 thus represents a shift from rigid, implementation-first integration (as shown in FIG. 8) toward a specification-as-interface model where components are governed, orchestrated, and composed through reusable, declarative contracts.

Figure 10:
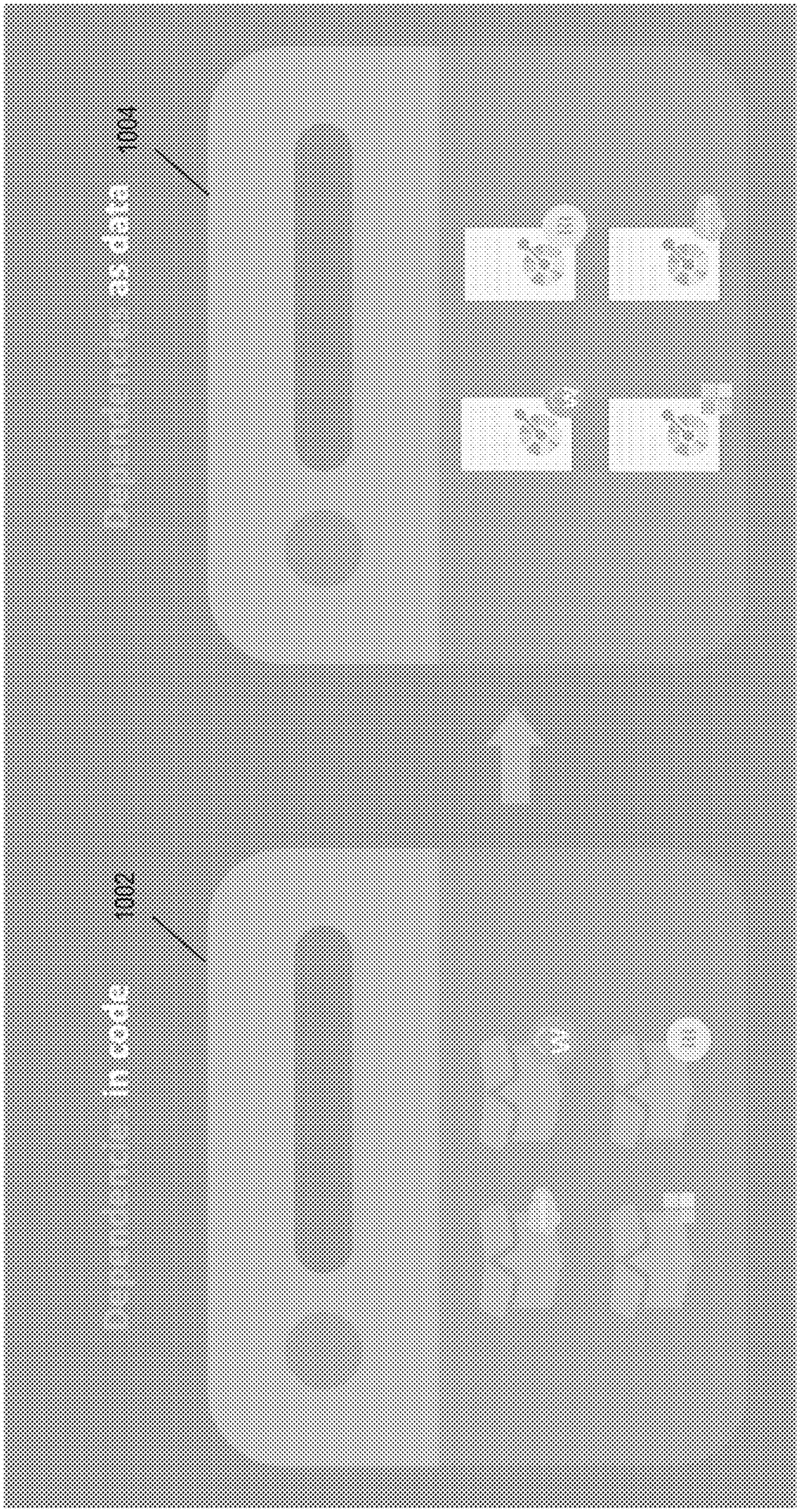

Continuing from the specification-first architecture illustrated in FIG. 9, FIG. 10 depicts a conceptual shift in how systems manage and express their dependencies. Whereas traditional systems embed architectural definitions and integration logic directly into application code, the EM architecture transitions these dependencies into modular, machine-readable specifications that exist independently of implementation.

A system 1002 illustrates dependencies in code in which systems are shown as tightly coupled to specific technologies or vendors—such as cloud services, APIs, or platform components-through direct, hardcoded references. These embedded dependencies/architectural definitions constrain flexibility, making it difficult to substitute, extend, or version components without modifying and redeploying the surrounding system logic. As a result, experimentation and adaptation are expensive and error-prone.

A system 1004 illustrates dependencies as data in which dependencies/architectural definitions are externalized and expressed declaratively as specifications. These specifications encode the structure, semantics, and behavior of components such as capabilities, mappings, objects, and policies in a format that can be reasoned over, composed, and evolved by the system itself. Rather than embedding logic, the system dynamically interprets these specifications at runtime-selecting implementations, enforcing policies, and resolving orchestration paths as needed.

By moving dependencies into data—e.g., into structured SKL specs the system gains the ability to adapt without architectural disruption. This shift enables a new layer of agility where systems interact through stable semantic contracts rather than rigid code paths. It empowers modularity, version control, and governed experimentation across federated teams and distributed environments.

Figure 11:
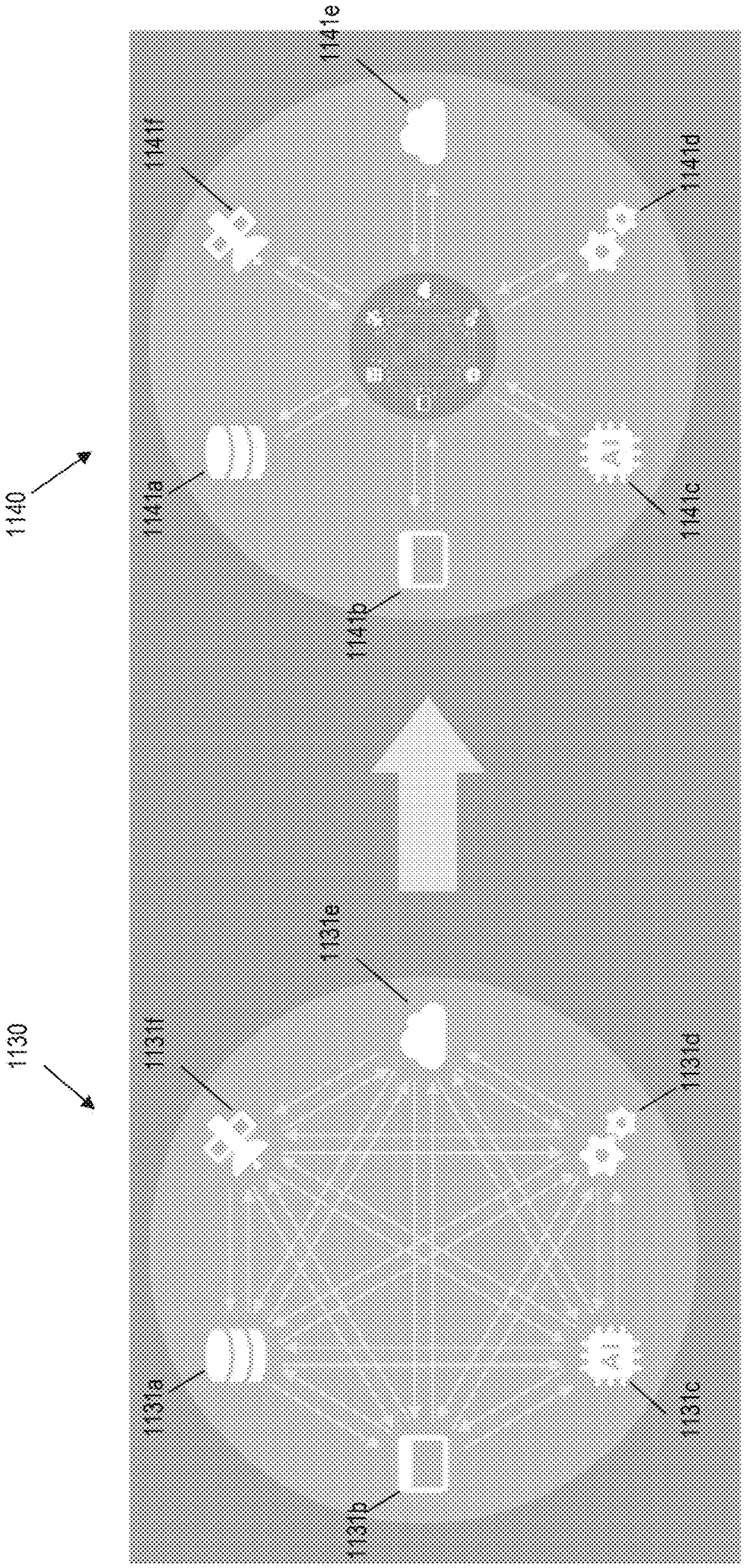

FIG. 11 shows two conceptual alternative embodiments for how a set of databases 1131*a*, software applications 1131*b*, AI models 1131*c*, processes 1131*d* (e.g., analog or digital business processes), cloud services 1131*e*, and other systems 1131*f* (e.g., sensors, satellites, mainframes, etc.) (collectively, applications 1131) and applications and systems 1141*a-f* (collectively, applications 1141) may be integrated. Applications 1131 and 1141 are to be considered the same set of applications and systems, only represented as part of two different integration architectures.

The network of integrations 1130 illustrates a conventional, point-to-point integration model in which each application 1131 is directly integrated with every other application. In this embodiment, different developers are typically responsible for implementing, maintaining, or customizing their own integrations between their application 1131*a-f* and other relevant components. These integration patterns often involve bespoke APIs, ad hoc transformation logic, and incompatible data schemas—each defined and maintained independently using various technologies, SDKs, and frameworks. The resulting ecosystem is highly fragmented, with inconsistent translations and unpredictable behaviors across systems. These types of integration networks are difficult to scale, govern, debug, or optimize, and they present a persistent barrier to cohesive enterprise interoperability.

By contrast, the integration mesh 1140 represents an embodiment of the Enterprise Mesh Platform applied to applications 1141. In this configuration, each application 1141*a-f* is semantically integrated through shared, SKL-defined specifications that govern structure, behavior, and policy. Rather than point-to-point custom connections, each application 1141 interoperates through a mesh of machine-readable contracts—such as SKL objects, capabilities, mappings, and policies-interpreted and orchestrated by the Enterprise Mesh Platform. This allows the underlying systems to participate in a cohesive, schema-driven environment in which integrations are consistent, reusable, and context-aware. The integration mesh 1140 enables unified governance, flexible adaptation, and intelligent orchestration across previously siloed components, replacing fragile custom logic with robust, specification-based interoperability.

Figure 12:
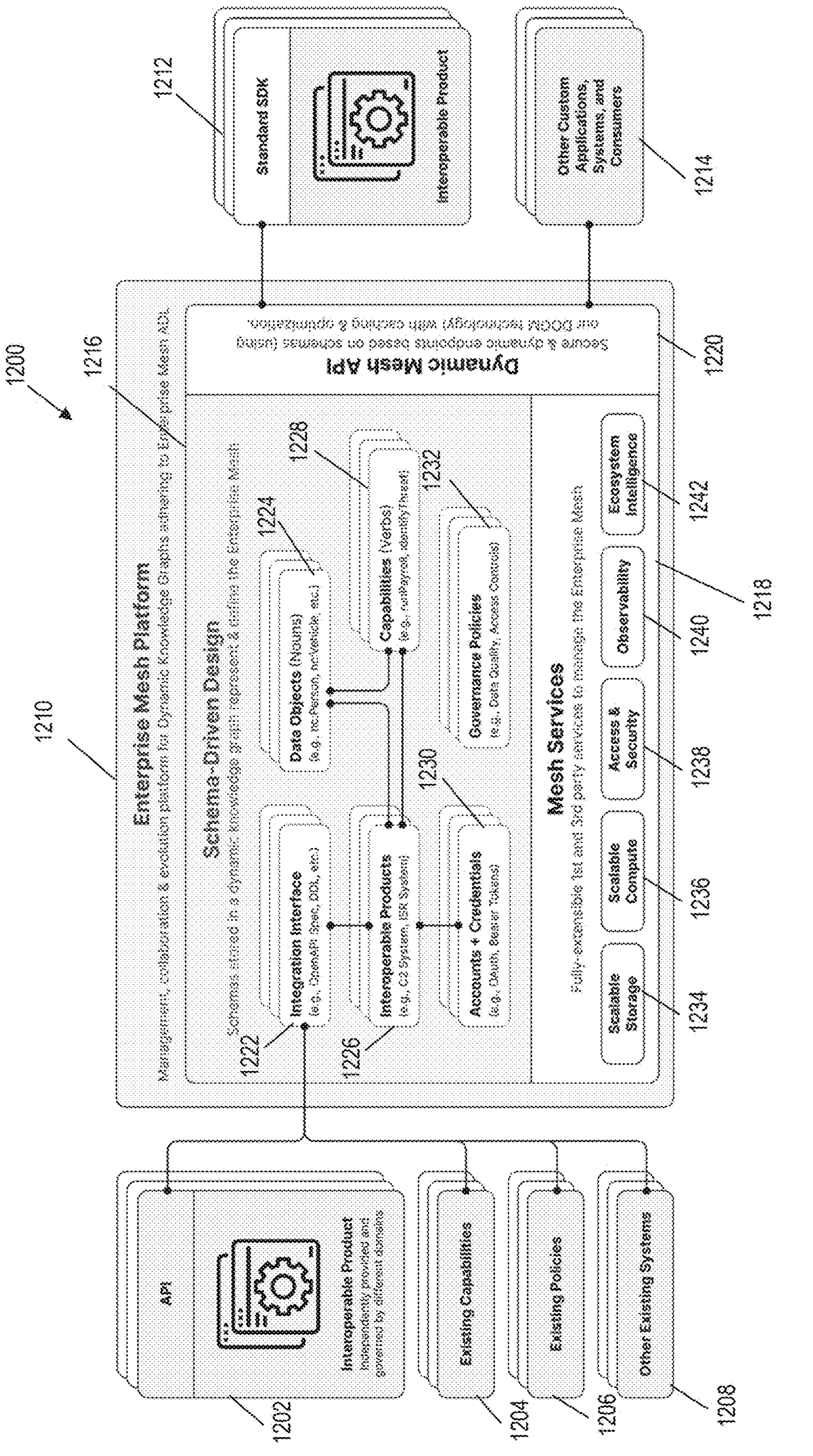
FIG. 12 shows an overview of an Enterprise Mesh Platform and its associated components, including mesh services, specification types, governance tools, and external system interfaces, in accordance with an embodiment.

FIG. 12 illustrates a system 1200, including an Enterprise Mesh Platform 1210 (e.g., EMP), is a schema-driven orchestration and governance environment designed to unify disparate systems through a shared, executable semantic layer. The system 1200 enables distributed software components—whether legacy systems, APIs, cloud services, or AI agents—to interoperate by abstracting their capabilities, data models, and policies into a common, machine-readable specification format known as SKL Specs.

Rather than relying on tightly coupled integration logic or static interface contracts, the system 1200 builds a dynamic knowledge graph (e.g., an Enterprise Mesh) of semantic specifications that define the behavior, structure, and access rules for each component. This knowledge graph becomes the basis for all runtime execution, enabling the platform to resolve, validate, and orchestrate system behavior based on formal semantics rather than code-level bindings.

The platform supports full lifecycle management of SKL-defined elements, including capabilities, data objects, transformation mappings, access credentials, and governance policies. These specifications are versioned, composable, and independently managed, allowing teams to experiment, evolve, and collaborate across organizational and technical boundaries. Through the use of mesh services—including scalable compute, observability, and ecosystem intelligence—the platform continuously monitors and adapts the system's operation, ensuring semantic consistency, policy compliance, and runtime efficiency.

The system 1200 may include the Enterprise Mesh Platform 1210. The Enterprise Mesh Platform 1210 serves as the central control plane and semantic runtime environment for managing the execution, evolution, and interoperability of distributed systems defined by SKL specifications. It is configured to ingest, validate, version, and orchestrate semantic representations of software architecture—referred to as SKL Specs—across a diverse ecosystem of applications, APIs, and legacy infrastructure. The Enterprise Mesh Platform 1210 enables these components to interact not through static code or precompiled interfaces, but through dynamically interpreted specifications that define their behavior, structure, and governance.

The Enterprise Mesh Platform 1210 maintains and operates upon a continuously evolving EM, composed of interconnected SKL Specs representing various elements such as capabilities, data objects, transformation mappings, credential requirements, and policy constraints. This graph serves as both a source of truth and an execution context: it allows the platform to resolve runtime interactions, enforce constraints, detect semantic drift, and coordinate the lifecycle of modular components. The platform supports both user-authored and system-generated specifications, enabling contributions from federated teams or AI-assisted agents.

The Enterprise Mesh Platform 1210 is further configured to support decentralized authorship and governance, enabling multiple teams or domains to independently define, reuse, or version components without introducing architectural conflict. It integrates with both mesh-aware and mesh-unaware systems by wrapping external services in SKL-defined abstraction layers (e.g., SKL wrappers), facilitating semantic interoperability without requiring direct modification to existing codebases.

In operation, the Enterprise Mesh Platform 1210 interprets semantic requests—such as a request to execute a capability or retrieve a typed data object—and resolves the appropriate SKL Specs, mappings, and policies required to fulfill the request. The Enterprise Mesh Platform 1210 can dynamically route execution across multiple implementations based on real-time context, policy evaluation, or system health metrics, allowing for context-sensitive behavior and runtime optimization.

The Enterprise Mesh Platform 1210 may include a schema-driven architecture referred to as the Enterprise Mesh 1216. The Enterprise Mesh 1216 maintains a continuously evolving, graph-based representation of all components modeled using SKL specifications. These specifications define semantic constructs such as capabilities, data objects, transformation mappings, access rules, and governance policies. Each specification is stored, versioned, and interpreted as executable metadata. Within this graph, each node represents an SKL-defined element, while the edges represent declared semantic relationships such as dependency, version lineage, mapping, or policy constraint. This structure enables the mesh to resolve behavior, trace dependencies, and orchestrate functionality at runtime.

The Enterprise Mesh 1216 includes an integration interface 1222 configured to ingest SKL specifications from a variety of external sources. These may include codebases, documentation libraries, public or private spec repositories, or automated tools capable of deriving specifications from observed system behavior. Through the integration interface 1222, the platform can continuously register new components—such as REST endpoints defined in an OpenAPI document—and generate corresponding SKL Capability, Mapping, and Object specifications. This allows external systems, including legacy services, to be onboarded into the mesh without modifying their underlying code or exposing internal logic.

In addition, the Enterprise Mesh 1216 includes support for managing interoperable products 1226. An interoperable product is a semantically bundled set of SKL specifications that together represent a modular capability set—such as an onboarding workflow, approval process, or procurement tool. These product bundles may include multiple capabilities (e.g., createAccount, assignTask, generateReport), associated data objects (e.g., User, Task, Document), and one or more policy specifications that define usage constraints or lifecycle governance. These bundles are reusable across domains, and because they are specification-defined rather than code-bound, they may be implemented differently in different environments without changing the exposed interface or behavioral contract.

Interoperable products 1226 are composable and versioned. For example, a team may publish an onboarding product with defined inputs and outputs, and another team may subscribe to that product, adapting it to local execution through their own capability mappings such as routing one capability to a third-party API and another to an internal ML service. This abstraction ensures that product-level dependencies are governed semantically, not structurally, allowing for safe substitution, reuse, and collaborative development.

Together, the integration interface 1222 and interoperable products 1226 enable the Enterprise Mesh 1216 to function as a dynamic semantic coordination layer for distributed software ecosystems. By capturing and interpreting all architectural elements as structured specifications, the mesh enables modular reuse, real-time orchestration, and policy-aware interoperability without requiring brittle code integration.

Within the Enterprise Mesh 1216, data object 1224 and capability 1228 are both represented as formal SKL specifications—also referred to as skl:Specs. These specifications serve as machine-readable, semantically rich declarations that describe the structure and behavior of system components in a way that is both interpretable at runtime and version-controlled for lifecycle governance.

Data objects 1224 represent structured, reusable entities—also referred to as “nouns”—that define the shape, semantics, and constraints of data elements exchanged between capabilities or systems. Examples of data objects include entities such as User, Task, Invoice, or SensorReading. Each data object 1224 is defined using an SKL specification that may include field definitions, data types, cardinality, required status, enumerations, inheritance from other objects, and version history. These specifications serve as the formal schema for input and output structures across the mesh. Because the data objects are stored and managed as specifications, they can be independently versioned, extended, or composed with other object specs through declared semantic relationships—such as skl:extends, skl:uses, or skl:conformsTo.

Data object 1224 are used across the mesh. They provide the input and output contract for capabilities, serve as the basis for validation and type checking at runtime, and enable traceability of data dependencies between interoperable products. For example, a Task object may be referenced by a createTask capability, linked to a Project object through an association field, and governed by a policy that applies only when the task status is Approved. By modeling these relationships in the SKL graph, the mesh enables systems to reason over data contextually and semantically, not just structurally. Further, instances of a data object may be generated and stored within the Enterprise Mesh 1216.

Capability 1228, also referred to as “verb,” defines executable units of behavior within the Enterprise Mesh 1216. Each capability is expressed as an SKL specification that declares what a system does rather than how it does it. For example, capabilities may include operations like createInvoice, submitReview, sendNotification, or evaluateRiskScore. Each capability 1228 includes declared inputs (typically one or more data object specs), outputs (also defined as data object specs), and may be linked to one or more mappings, policies, workflows, or triggers.

The capability 1228 is not hardwired to a specific implementation. Instead, the SKL Specification defines the capability’s semantic intent-its role, constraints, and required interfaces. Implementations are separately defined using CapabilityMapping specs, which may be resolved dynamically at runtime through a capability switch. For example, the sendNotification capability may have one mapping that uses Twilio, another that sends Slack messages, and a third that invokes a local webhook. The calling system remains bound to the semantic contract, while the mesh selects the appropriate implementation path based on context, policy, or preference.

Data object 1224 and capability 1228 are building blocks in the Enterprise Mesh 1216. By abstracting structure (in the case of data objects) and behavior (in the case of capabilities) into machine-executable specifications, the mesh allows distributed teams to interoperate and govern at a higher level of abstraction without fragile code dependencies.

User Accounts and Authentication Credentials 1230 represent specialized classes of SKL specifications within the Enterprise Mesh 1216 that define the identity, access permissions, and authentication context associated with an actor—such as a user, application, system, service, or AI agent. These specifications are used to establish who or what is making a request within the mesh, and under what conditions that request may be executed. In some embodiments, a User Account may have multiple Authentication Credentials associated with it. In other embodiments, User Accounts and Authentication Credentials may be modeled as one class/spec.

According to a non-limiting embodiment, each Authentication Credential of the User Accounts and Authentication Credentials 1230 may include attributes such as an account identifier, authentication method (e.g., OAuth token, API key, SSO provider), associated roles or access scopes, linked organizational domain, and policy references. In some embodiments, an Account and/or Authentication Credential may also encapsulate metadata such as creation time, credential source, expiration rules, and usage restrictions. The credential spec may be linked to one or more skl:Policy specs that govern its usage—for instance, specifying that certain capabilities can only be executed during business hours, from specific IP ranges, or by accounts with elevated trust scores.

User Accounts and Authentication Credentials 1230 are used by the Enterprise Mesh Platform 1210 at runtime to enforce access control, policy evaluation, and/or personalized routing. When a semantic request—such as an invocation of a capability—is received through a Dynamic Mesh API, the associated User Account and/or Authentication Credential is used to validate whether the actor has permission to perform the requested operation. This validation may involve traversing the SKL knowledge graph to evaluate policy constraints, inspect mappings, or identify semantic conflicts based on account-level entitlements.

In distributed or federated deployments, User Accounts and Authentication Credentials 1230 may be used to represent cross-domain or multi-tenant identities. For example, a developer operating within one organization may be granted restricted access to invoke capabilities defined in another organization’s mesh, provided that their Account and/or Authentication Credential includes the appropriate trust attributes and conforms to the destination domain’s governance policies. In such cases, identity mapping or credential normalization may also be supported via SKL-defined translation layers.

User Accounts and Authentication Credentials 1230 classes are modeled as SKL specifications, as such, they may be subject to the same versioning, validation, and governance controls as other elements of the mesh. This enables fine-grained auditing, real-time policy updates, and integration with external identity providers, all while maintaining a consistent, machine-readable representation of identity and authorization across the ecosystem.

As such, User Accounts and Authentication Credentials 1230 allow the Enterprise Mesh 1216 to securely and semantically evaluate who is executing a request, what they are allowed to do, and how those permissions are governed.

In Zero Trust implementations, the skl:UserAccount, and/or skl:AuthenticationCredential specifications can express not only identity and authentication context, but also incorporate or reference additional security context evaluators. These may include device attestation requirements, geolocation constraints, behavioral risk scores, or trust levels. At runtime, the Enterprise Mesh Platform can evaluate these context-aware credential specifications against a request’s security context-either provided directly with the request or retrieved from external systems such as identity providers (IDPs), mobile device management (MDM) systems, security information and event management (SIEM) tools, or threat intelligence platforms. This dynamic, context-aware credential evaluation enables the flexible implementation of Zero Trust principles while maintaining semantic coherence across the mesh.

Governance policies 1232 are SKL specifications within the Enterprise Mesh 1216 that define and enforce rules, constraints, and behavioral conditions governing how capabilities, data objects, accounts, and other mesh components may be used, accessed, or evolved. These policies are modeled as skl:Policy specs, according to some embodiments, and serve as machine-executable contracts that guide runtime decision-making and lifecycle management across the mesh, ensuring semantic integrity, compliance, and operational safety.

Each of the governance policies 1232 is authored as a structured SKL spec, typically orchestrating a series of controls and/or conditions, along with evaluation logic. In some embodiments and potentially referencing other SKL elements—such as skl:Capability, skl:Object, or skl:Property—to define the scope and conditions of enforcement. Policies may include input parameters, expressions of preconditions (e.g., required data fields, trust levels), execution constraints (e.g., frequency limits, regional availability), or conformance requirements (e.g., version compatibility, approval status). The policies may also specify failure modes, escalation paths, or downstream effects when violations occur. According to several embodiments, Policies may be used to define service level agreements, contracts, security requirements, performance or quality measurement baselines, required lifecycle patterns or processes, and more.

In some embodiments, skl:Policy specifications express conditions using declarative semantic expressions that can be evaluated against runtime context. These expressions may be represented as structured logic blocks, referenced evaluation workflows, or semantic rule sets encoded in standards such as XACML, OPA (Open Policy Agent), or custom constraint languages. By expressing policies as semantic, machine-interpretable specifications rather than procedural code, the Enterprise Mesh enables consistent evaluation across heterogeneous enforcement points while maintaining clear separation between policy definition and enforcement logic. That being said, in other embodiments, procedural code may be used within nodes in a skl:Policy or skl:Workflow so long as there is support via underlying infrastructure and a runtime supports the execution of arbitrary code blocks.

According to one or more embodiments, governance policies 1232 are invoked at runtime during the execution of semantic requests routed through the Enterprise Mesh Platform 1210. For example, when an account (e.g., human, system, or AI agent) requests to execute a capability or access a data object, the platform identifies relevant policies (e.g., via skl:AccessControlAssignment) and evaluates the applicable policies to determine whether the request should be permitted, conditionally allowed, or blocked. This may involve checking whether a requesting User Account has sufficient clearance, whether the capability's inputs satisfy required data quality thresholds, or whether the request adheres to organizational compliance rules.

For example, a skl:AccessControlAssignment instance may state that the generateInvoice capability can only be invoked if the conditions of a given skl:Policy are met (e.g., require associated customer object to be verified, and a supervisor approval token if the invoice amount is above a specified threshold). In another example, a policy might require that any interaction personally identifiable information (PII) must log an audit trail and notify a compliance endpoint, and in this example, such policy might be assigned to the Defined Term "Personally Identifiable Information". These rules are not embedded in application logic; instead, they are defined in the sematic spec layer and are enforced by the mesh runtime based on the assignment and relation between various specs and skl:Policy instances (which may be themselves considered specs in some embodiments, while in other embodiments they may be considered lower level instances that are not specs).

Governance policies 1232 may also be used in spec validation and promotion workflows. Before a new version of a capability or data object spec is deployed, the mesh may evaluate policies to ensure that semantic compatibility is preserved, required mappings are defined, and consumers of the spec have been notified of pending changes. This enables safe evolution of architectural elements across federated teams, even in environments with high interdependence.

Because governance policies are authored and stored as SKL Specs, according to some embodiments, they are version-controlled, discoverable, and traceable. They can be composed, extended, or reused across multiple domains, allowing organizations to encode enterprise-level governance strategies alongside team- or product-level rules—all within a unified semantic framework. Additionally, policies can be generated or refined using AI tooling within the mesh, allowing intelligent recommendations or automated enforcement to evolve as usage patterns change.

In some embodiments, skl:Policy specifications contain executable decision logic expressed using declarative semantic expressions that can be dynamically evaluated against runtime context. These expressions may be represented as structured logic blocks, referenced evaluation workflows, or semantic rule sets encoded in standards such as XACML, OPA (Open Policy Agent), or custom constraint languages. By expressing policies as semantic, machine-interpretable specifications with executable logic rather than procedural code, the Enterprise Mesh enables consistent evaluation across heterogeneous enforcement points while maintaining clear separation between policy definition and enforcement implementation.

In summary, governance policies 1232 provide the semantic guardrails of the Enterprise Mesh 1216. They ensure that all interactions, updates, and executions are safe, compliant, and context-aware, without relying on brittle procedural logic or manual oversight. They enable adaptive governance across distributed teams and systems by embedding enforceable rules directly into the semantic fabric of the mesh.

According to some embodiments, the Enterprise Mesh supports distributed policy enforcement through semantically coordinated enforcement points that may be deployed across the mesh environment. These enforcement points—which may be for example implemented as SKL capabilities, API gateways, service meshes, sidecars, or embedded within skl:Product implementations-interpret and apply policies consistently by referencing the same underlying SKL specifications.

When a User Account requests access to a protected resource, the enforcement point intercepts the request and initiates a semantic resolution process that may include one or more of the following steps:

1. An enforcement point identifies the resource being accessed and retrieves associated SKL specifications (e.g., skl:Object, skl:Capability, or skl:Property specs). Such enforcement points may, for example, be determined by the defining context of the requesting server, the specs being interacted with's defining context, location-based criteria, among other options.

In some Zero Trust embodiments, this retrieval process specifically identifies all relevant skl:AccessControlAssignment specifications that declaratively link the requesting principal's attributes, the targeted resource, and associated policy specifications containing executable decision logic. These assignment specifications serve as the semantic cornerstone of access control, explicitly declaring which policies should be evaluated for which resource-principal combinations without requiring hard-coded lookup tables or rule engines.

2. A server traverses semantic definitions to identify applicable policies, which may for example be attached directly to the requested resource, assigned or related via other specs, inherited via relationships with skl:DefinedTerms or other specifications. Before evaluating policy conditions, the enforcement point may enrich the request context by retrieving additional contextual information not present in the original request. This context enrichment may involve invoking specialized skl:Capability instances designed as "context providers" that interface with external systems such as threat intelligence platforms, user behavior analytics engines, or environmental risk services. The enriched context enables more sophisticated policy decisions without requiring the requesting application to gather and provide all potentially relevant security information.
3. For one or more applicable policies, the enforcement point evaluates the request context against the policy's semantic conditions, which may for example include verification of credentials, checking environmental factors, or evaluating risk scores.

The environmental context evaluated during policy enforcement may include numerous factors beyond the principal's identity, such as request time, network location, device security posture, prior access patterns, threat intelligence signals, and organizational risk levels. Because these context factors are referenced semantically within policy specifications, enforcement points can dynamically retrieve relevant context from appropriate providers without requiring policy authors to understand the underlying implementation details of context acquisition.

4. Based on this evaluation, the enforcement point makes an authorization decision and either allows the request to proceed, blocks it with an appropriate error, or initiates additional verification workflows such as step-up authentication.

The authorization decision may not be limited to binary allow/deny outcomes. In some embodiments, skl:Policy specifications can define graduated or adaptive responses based on the degree of verification confidence or contextual risk factors. These responses may include enforcing read-only access, applying data redaction to sensitive fields, limiting result pagination, requiring step-up authentication, imposing additional monitoring, or executing remediation workflows. This approach aligns with Zero Trust principles by enabling least-privilege access that dynamically adapts to the security context of each request.

This distributed but semantically unified enforcement approach ensures consistent security governance across heterogeneous environments without requiring centralized policy servers or hard-coded integration points. Policy updates propagate automatically through the mesh as specifications evolve, enabling organizations to adapt security postures without architectural disruption.

In distributed environments with frequent access patterns, enforcement points may maintain a contextual decision cache that temporarily stores verification results for similar request contexts. These cached decisions remain valid for configurable time periods or until invalidation events occur, such as policy updates or security posture changes. The caching parameters themselves may be defined semantically within governance policies, enabling consistent caching behavior across distributed enforcement points while maintaining security integrity.

Throughout the enforcement process, enforcement points may generate standardized audit records that conform to skl:AuditEvent specifications. These audit events capture critical details including the requesting principal, accessed resource, policy evaluation results, contextual factors that influenced the decision, and timestamps. Because these audit records are themselves instances of SKL-defined types, they can be consistently collected, analyzed, and governed across the mesh regardless of which enforcement point generated them. This enables unified security monitoring, compliance verification, and anomaly detection across otherwise disparate systems and domains.

Figure 49:
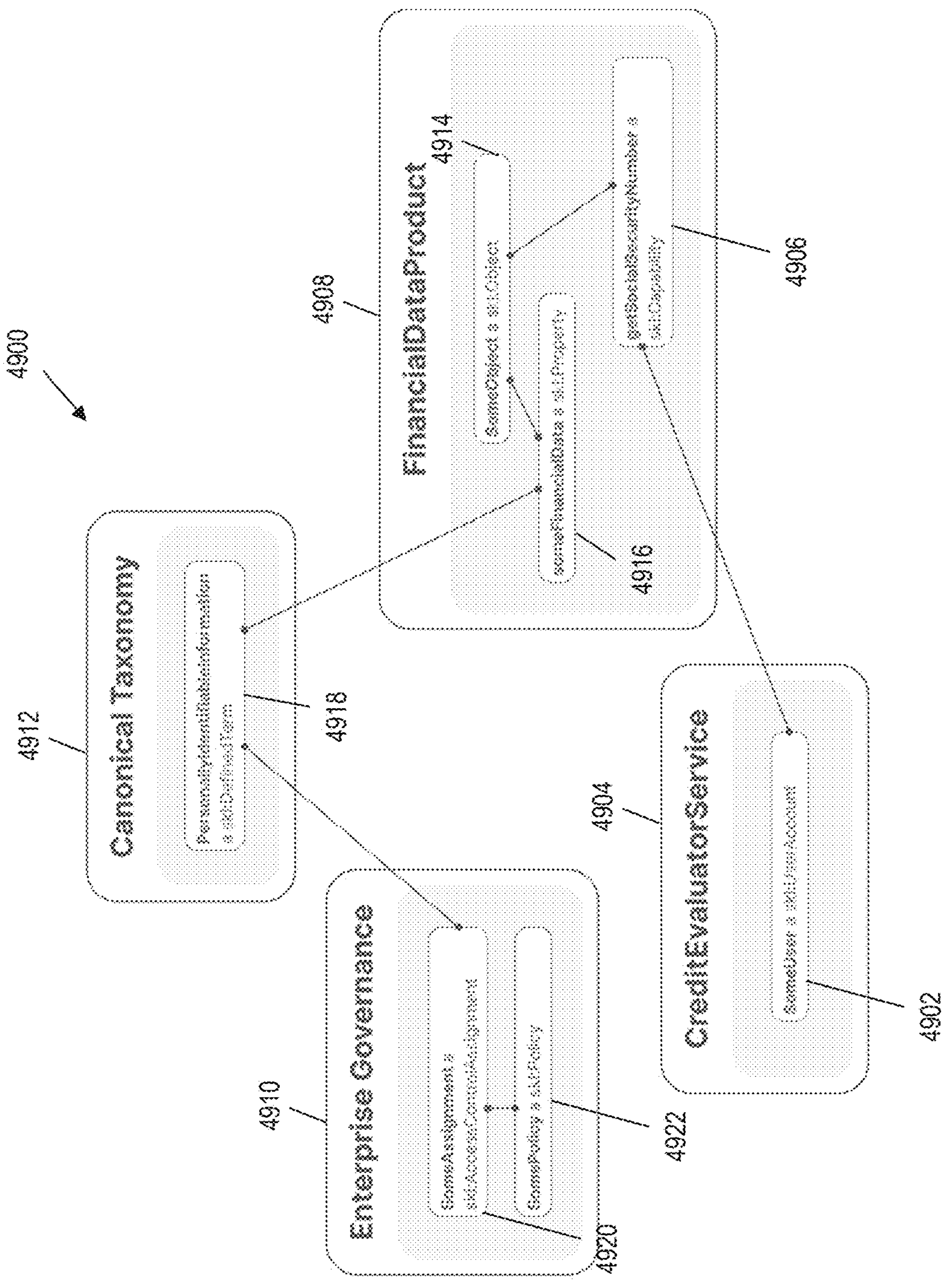
FIG. 49 illustrates a system for semantic Zero Trust within an Enterprise Mesh, in accordance with an embodiment.

FIG. 49 illustrates a system 4900 for semantic Zero Trust implementation within an Enterprise Mesh. A User Account "SomeUser" 4902 in the CreditEvaluatorService 4904 needs to access sensitive financial data via the "getSocialSecurityNumber" capability 4906 provided by the FinancialDataProduct 4908

The FinancialDataProduct 4908 defines "SomeObject" 4914 with a property "someFinancialData" 4916 that references the "PersonallyIdentifiableInformation" DefinedTerm 4918 from the Canonical Taxonomy 4912 This DefinedTerm is linked to "SomeAssignment" (e.g., an skl:AccessControlAssignment 4920) in the Enterprise Governance 4910 domain, which in turn references "SomePolicy" 4922 (e.g., a skl:Policy).

When "SomeUser" 4902 attempts to invoke the "getSocialSecurityNumber" capability, an enforcement point intercepts this request and performs one or more of the following steps:

1. It identifies that the capability operates on data that ultimately connects to the "PersonallyIdentifiableInformation" DefinedTerm 4918
2. It discovers that this DefinedTerm 4918 is governed by "SomePolicy" 4922 through the "SomeAssignment" AccessControlAssignment 4920
3. The enforcement point evaluates "SomePolicy" 4922 against the request context provided by "SomeUser" 4902 which may include authentication status, device information, and request purpose.
4. Based on this evaluation, access is either granted, denied, or additional verification is requested according to the conditions specified in "SomePolicy" 4922

This non-limiting embodiment of cross-domain semantic resolution demonstrates Zero Trust verification without requiring each product to implement its own security logic. The security requirements are defined in the shared Canonical Taxonomy and Enterprise Governance domains, while the enforcement occurs dynamically at runtime when the CreditEvaluatorService 4904 interacts with the FinancialDataProduct 4908

Returning to FIG. 12, API 1202, existing capabilities 1204, existing policies 1206, and other existing systems 1208 represent upstream sources of functionality, data, and governance logic that originate outside the Enterprise Mesh Platform 1210 but are made interoperable with the platform through the integration interface 1222.

The API 1202 refers to one or more externally hosted application programming interfaces, such as RESTful endpoints, GraphQL schemas, or gRPC services, that expose operational functionality from third-party platforms, legacy systems, or internal microservices. These APIs typically operate independently of the mesh and are not originally authored using SKL. Through the integration interface 1222, the Enterprise Mesh Platform 1210 can be configured to ingest structural and behavioral definitions of these APIs-either by directly interacting with OpenAPI, Graph QL SDL, or other declarative specifications, or potentially even building specs by scraping metadata and/or using introspection tools. According to some embodiments, these Integration Interface specs which represent APIs may be related to skl:Capability specs through skl:Mapping specifications as described elsewhere herein. In some embodiments, APIs endpoints may be represented as Capability specs, thereby treating the Capability as a sort of integration interface. For example, an external API endpoint for creating support tickets might be modeled in the mesh as a skl:createSupportTicket capability with inputs and outputs formally described in SKL. In some cases, integration interface specs may be semantically addressed, governed, and composed like any native mesh component.

Existing capabilities 1204 include predefined business functions or service behaviors that are already implemented and deployed in upstream systems. These may be exposed through SDKs, scripts, stored procedures, or service interfaces, but are not yet modeled in a machine-interpretable, semantic form. The integration interface 1222 enables the Enterprise Mesh Platform 1210 to register these capabilities as skl:Capability specs and link them to implementation pathways using one or more CapabilityMapping specifications. These mappings abstract how the capability is invoked—whether through a CLI command, HTTP request, cloud function, or custom workflow—so that downstream mesh consumers only need to interact with the semantic intent of the capability, not the specific execution logic.

Existing policies 1206 represent regulatory, procedural, or system-level rules that govern behavior in upstream systems. These may include rate limits, access controls, workflow approvals, or compliance constraints enforced in databases, IAM systems, or external policy engines. The integration interface 1222 is configured to extract or mirror these rules into mesh-readable skl:Policy specifications. For example, if an upstream system restricts access to sensitive data based on user clearance level, that logic can be represented as a semantic policy spec within the mesh. This allows the mesh to enforce the same policy declaratively during orchestration, and to reason over how policy constraints apply across different capabilities and data flows.

Other existing systems 1208 refers to legacy platforms, on-premise systems, monolithic applications, or third-party SaaS environments that are not natively integrated with modern orchestration layers. These systems may lack formal APIs or consistent interface definitions. However, through the integration interface 1222, the mesh may connect to these systems using connectors, middleware adapters, reverse proxies, or human-in-the-loop workflows. Once linked, the behaviors and data flows of these systems can be modeled in the mesh using SKL Specs, enabling semantic interoperability even for traditionally siloed or opaque technologies.

The integration interface 1222 acts as the conduit through which external functionality and constraints may be ingested, normalized, and modeled within the mesh. It may include automated tooling to convert OpenAPI specs into SKL Capabilities, mapping editors to define transformation logic, and schema registries to standardize object structures. Ingested elements—whether APIs, capabilities, policies, or entire systems—are represented in a modular, composable, and governable form that can participate in mesh-based orchestration. Once integrated, these upstream sources become first-class participants in the schema-driven execution graph maintained by the Enterprise Mesh 1216.

The mesh services 1218 constitute the operational and runtime infrastructure that supports the execution, governance, and continuous evolution of the semantic architecture maintained by the Enterprise Mesh Platform 1210. These services enable the system to function not just as a registry of specifications, but as an intelligent, policy-aware execution environment that can scale, secure, and adapt software behavior across distributed domains. Mesh services 1218 may include five components: scalable storage 1234, scalable compute 1236, access and security 1238, observability 1240, and ecosystem intelligence 1242.

Scalable storage 1234 provides the persistent, versioned data layer for all SKL specifications and their associated artifacts. This includes not only raw SKL specs for capabilities, objects, and policies, but also their historical versions, dependency relationships, lifecycle metadata, validation outcomes, and promotion history. The storage layer is designed to support large-scale, federated environments where specifications may be authored and maintained by many teams across organizational boundaries. By treating specs as persistent semantic assets, the mesh ensures traceability, impact analysis, and reproducibility of all orchestrated interactions.

Scalable compute 1236 delivers the runtime execution layer for resolving, validating, and invoking specifications within the mesh. This includes executing orchestration plans based on capability mappings, performing data transformations as specified in skl:Mapping specs, evaluating constraints and preconditions from skl:Policy specs, and triggering workflows or downstream system interactions. The compute layer is designed to handle both synchronous and asynchronous tasks, support dynamic routing and execution switching, and integrate with distributed environments, serverless runtimes, or cloud-native event buses.

Access and security 1238 governs authentication, authorization, and enforcement of security policies across all mesh interactions. It validates identity through User Accounts and Authentication Credentials (e.g., SKL-defined actors or external identity providers), enforces access constraints based on declared scopes and policies, and ensures that only permitted entities can invoke specific capabilities or access sensitive data objects. This component may include integrations with external IAM systems, token services, or API gateways, and ensures that the mesh complies with enterprise security and compliance requirements without duplicating procedural logic in application code.

Observability 1240 provides runtime introspection into the behavior and performance of mesh operations. This includes structured logs, execution traces, dependency graphs, usage analytics, and error telemetry tied directly to the underlying SKL specs. Observability tools enable developers and administrators to monitor how specifications are being executed, detect anomalies or failed orchestrations, identify long-running workflows, and trace the semantic lineage of data across federated domains. Because observability is integrated at the specification level, users can ask questions such as: "Which version of this capability was active when this output was generated?" or "Which data object specs have experienced schema drift over the past 30 days?"

Ecosystem intelligence 1242 is a layer of adaptive analytics and AI-assisted insight that supports the continuous refinement and optimization of the semantic graph. It analyzes how SKL specs are authored, composed, and executed; detects semantic drift, unused mappings, or orphaned policies; and may suggest reusable components, validation rules, or versioning strategies. It also supports automation scenarios such as auto-generating specs from observed behavior, recommending candidate capability mappings based on past executions, or proposing governance policies aligned with enterprise patterns. This intelligence layer enables the mesh to evolve as a learning system-helping teams converge toward best practices and reduce redundant effort across the organization.

Together, these mesh services 1218 allow the Enterprise Mesh Platform 1210 to operate as a resilient, governable, and evolvable architecture. They support the system's ability to reason over specifications at scale, to enforce operational constraints dynamically, and to adapt in real time as business needs, system boundaries, and/or compliance rules are updated.

In at least one example, the system 1200 may be used in a cross-functional joint task force. The cross-functional joint task force composed of multiple service branches and civilian contractors must collaborate on a time-sensitive operational plan, requiring access to systems, data feeds, workflows, and decision support tools that span different technical stacks, domains, and security enclaves.

In the traditional architecture, this task force would face major integration challenges: systems would be independently designed, data models would conflict, and business logic would be duplicated or embedded in rigid application code. Policy constraints—such as clearance levels, mission authority, and data handling rules-would be inconsistently enforced, often manually. Using the Enterprise Mesh Platform 1210, all components of the solution may be semantically described, governed, and orchestrated as part of a shared mesh.

First, core services—such as mission planning, geospatial intelligence feeds, personnel readiness tools, and tasking systems—are each registered into the mesh via the integration interface 1222. The APIs 1202 and existing capabilities 1204 are wrapped in SKL Capability specifications, while existing policies 1206 (such as security classification rules) are mapped into SKL Policy specifications. Legacy systems and the other existing system 1208 that cannot be re-engineered are integrated using proxy agents or secure gateway adapters, allowing them to expose mesh-compatible behaviors without modifying underlying code.

Using the Enterprise Mesh 1216, mission planners define interoperable products 1226—such as "Target Development" or "Logistics Coordination"—each of which is composed of semantically defined capabilities (e.g., requestAsset, assignUnit, generateMissionPackage) and data objects (e.g., Asset, CommanderIntent, TargetPacket). These products are portable and can be reused by different commands, components, or contractors while preserving a consistent interface and governance model.

When a user—such as an operations officer—issues a request through a mission dashboard built on the mesh services 1218 (e.g., a standard SDK), that request is routed through the Dynamic Mesh API 1212. The platform uses User Accounts and Authentication Credentials 1230 to validate identity and authority, and evaluates applicable governance policies 1232—such as restricting access to certain capabilities based on clearance level or mission phase. The mesh resolves the request using the knowledge graph of SKL specs, selects the correct CapabilityMapping, applies input and output transformations as needed, and executes the desired behavior using scalable compute 1236 that is, in some embodiments, mesh managed.

Throughout the execution, observability 1240 tracks semantic trace data, generating mission logs that reflect not just what happened, but why—e.g., which SKL specs were involved, which policies were triggered, and how data flowed across systems. Ecosystem intelligence 1242 analyzes spec usage and may suggest improved mappings or reusable capability patterns for future mission templates. All SKL specs are stored in scalable storage 1234, allowing version control, rollback, and traceable lineage of mission-critical components.

In FIG. 12, element 1214 corresponds to the User Interaction Layer, which serves as the interface between human actors and the Enterprise Mesh Platform 1210. This layer may include graphical user interfaces (GUIs), dashboards, developer portals, command-line tools, or embedded application surfaces through which users can define, invoke, and manage SKL specifications. Through element 1214, users may initiate requests, view schema metadata, modify capability definitions, or participate in governance workflows. The user interaction layer is semantically aware and schema-driven, meaning its controls and views are dynamically generated from the underlying SKL specs—allowing for adaptive rendering based on role, context, or domain.

Element 1220 represents the Mesh SDKs and API Client Libraries. These components enable external systems and applications to programmatically interface with the Enterprise Mesh Platform 1210. For example, developers integrating third-party applications or building mission dashboards may use SDKs to retrieve capabilities, submit input payloads, inspect access policies, or resolve output schemas. These SDKs may be provided in a range of languages (e.g., JavaScript, Python, Go) and are backed by client libraries that abstract away mesh internals while preserving semantic fidelity. The SDKs allow external applications to operate as full participants in the mesh's schema-bound execution framework, benefiting from its dynamic governance, versioning, and interoperability features.

Figure 13:
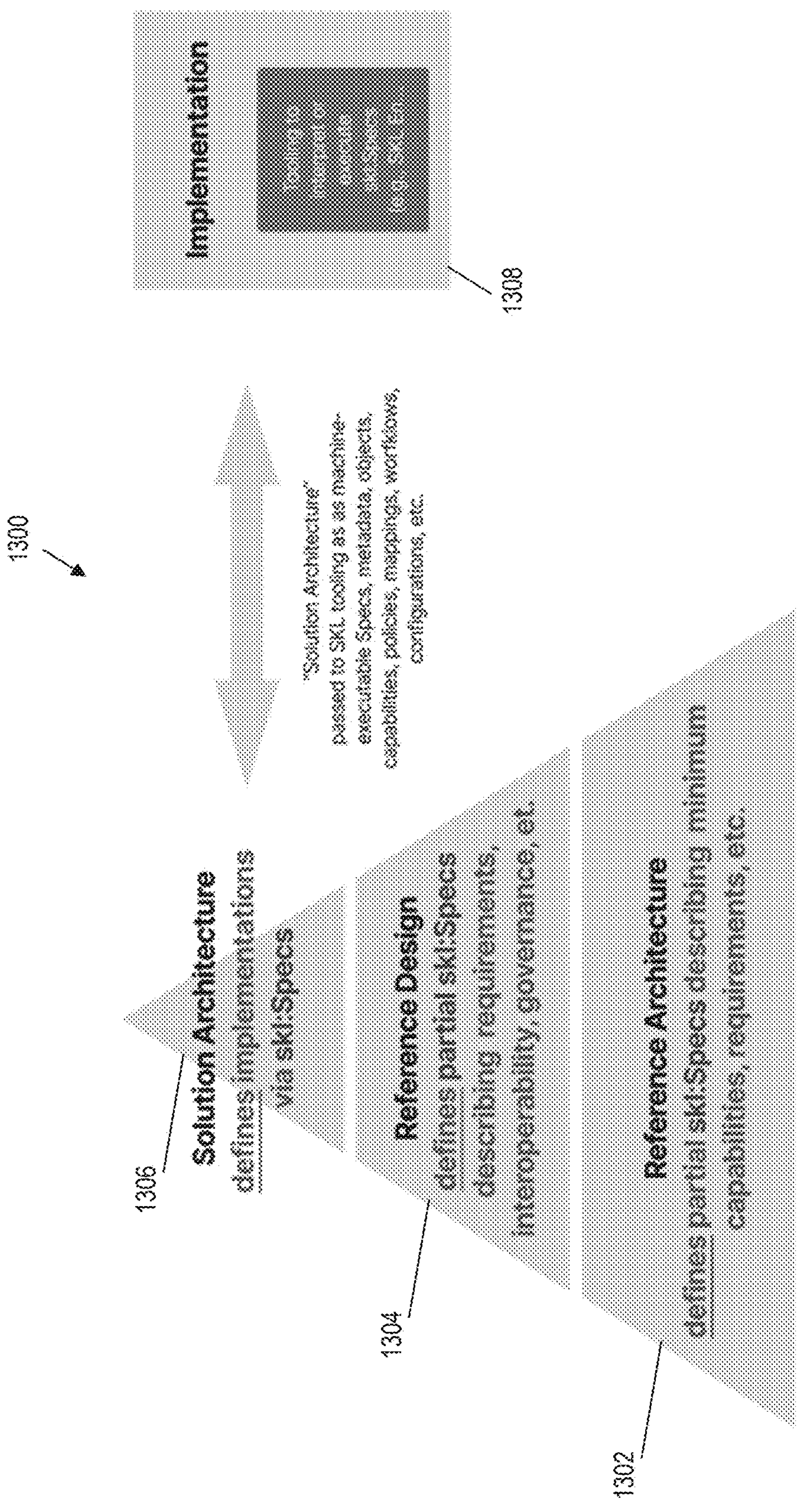

FIG. 13 illustrates a system 1300 of a layered progression of SKL-based semantic modeling—from high-level architectural intent to executable system behavior-demonstrating how an implementation can evolve from abstract design concepts to concrete runtime behavior using skl:Specs. In this embodiment, the SKL specifications are not static artifacts but iteratively refinable semantic constructs, which can be used to define capabilities, requirements, mappings, and governance rules at multiple levels of abstraction, as described herein.

At the base of the diagram is the Reference Architecture 1302. This layer describes foundational semantic definitions using partial SKL specifications that define the minimum set of capabilities, constraints, and structural expectations for a given domain or operational environment. For example, a reference architecture for a secure messaging system might define that all messages must have sender and receiver objects, must support encryption, and must comply with a skl:ConfidentialityPolicy, but would not specify particular endpoints or vendors. These reference-level specs act as semantic scaffolding, providing a reusable blueprint across systems or teams.

The next layer is the Reference Design 1304, introducing more detailed skl:Specs including requirements, interoperability strategies, and governance policies. Reference design specs describe the relationships between capabilities, how they should conform to domain-specific patterns, and how policies such as identity assurance, data retention, or regional data routing should be enforced. For instance, a shareDocument capability defined in the reference architecture may be augmented in the reference design with policies enforcing digital signature validation or multi-region content routing.

Building on this is the Solution Architecture 1306, which defines a complete set of machine-executable SKL specifications that describe the actual implementation plan. These include fully elaborated capabilities, input/output data object schemas, policy attachments, mappings to runtime systems, and any relevant workflow orchestration metadata. At this stage, the SKL specifications are sufficiently complete to be consumed by semantic tooling such as the SKL Engine or the Standard SDK. The solution architecture may include multiple CapabilityMapping specs, switch conditions for routing logic, runtime parameterizations, and even context-driven execution strategies for selecting between providers or fallback options.

The system 1300 includes Implementation 1308, which represents actual system behavior produced by executing the SKL specs defined in the solution architecture layer. This execution may be performed by an SKL Engine, a semantic orchestration runtime, or an SKL-aware SDK embedded in a client application. The engine interprets the specifications and triggers the corresponding capability execution, applying policies, performing input/output transformations, and coordinating service invocations according to the mesh's knowledge graph.

In alternate embodiments, the SKL specs defined in the Solution Architecture 1306 may be used specifically as descriptive elements (e.g., structured semantic docs), rather than directly executable semantic definitions. In yet other embodiments, the Solution Architecture 1306 may be used as a semantic interface for integration of external components, regardless of how those components may be internally built. And in yet other embodiments, the Solution Architecture 1306 may be used as a model-driven code generator.

In one exemplary embodiment, the layered progression illustrated in FIG. 13 enables organizations to unify technical specifications with legal and financial contracts through a shared semantic foundation. At the Reference Architecture 1302 layer, an organization may establish foundational SKL specifications for a desired custom software solution. These specifications define core capabilities, interfaces, security requirements, and performance expectations as machine-interpretable semantic contracts, effectively creating a "digital DNA" that simultaneously functions as technical requirements and legally binding agreements.

As the organization refines its requirements, it may author the Reference Designs 1304 (or multiple) against this architecture, potentially in different branches or environments or through using different teams of authors. Each Reference Design elaborates on the Reference Architecture with more concrete, opinionated specifications while maintaining the semantically declarative relationships established in the parent layer. For example, a Reference Design for a data analytics platform might specify particular API patterns, data formats, and authorization models as SKL-defined contracts that vendors must satisfy. If progress via a given Reference Design identifies a gap or issue with the parent Reference Architecture, it can be semantically remediated and recommended as a new version at the parent level. In this way, specs and documents can be structured, interlinked, and evaluated against each other.

When progressing to Solution Architecture 1306, vendors or implementation teams may create detailed specifications conforming to the chosen Reference Design. The specifications these teams are conforming against may serve the dual purpose of technical implementation guidance and contractual fulfillment evidence. Because all specifications maintain semantically declarative relationships throughout the hierarchy, the Enterprise Mesh Platform can automatically validate whether a proposed solution satisfies all requirements defined in the Reference Architecture and Design.

The same specification hierarchy that governs technical implementation may also drive legal and financial transactions. When a solution is integrated into the enterprise mesh, the system can automatically validate its runtime behavior against the contract requirements specified in the Reference Architecture. Upon successful validation, the enterprise mesh can trigger downstream financial transactions such as payment releases or milestone completions without manual intervention.

This capability extends to comparative evaluation through the capability switching mechanism described elsewhere herein. For instance, an organization could implement A/B testing of different vendor solutions against the same Reference Design, with each solution mapped through capability switches that dynamically route execution based on evaluation criteria. The enterprise mesh would automatically collect validation metrics, compliance measurements, and performance indicators, creating an auditable, objective basis for selecting among competing implementations.

When regulations or requirements change, necessitating a version update to the Reference Architecture or Design, the processors traverse the enterprise mesh to identify all affected components, including both technical implementations and contractual agreements. If a version change breaks existing relationships, the system can execute a remediation processes, ensuring that both technical and legal/financial aspects remain aligned despite evolving requirements This integrated approach transforms the relationship between technical specifications and procurement contracts from separate artifacts into linked, interoperable, executable data within one or more knowledge graph (e.g., nodal data structure) that make up the enterprise mesh. Organizations gain unprecedented traceability between requirements, implementations, and payments, while vendors receive clear, unambiguous validation criteria that automatically trigger compensation when satisfied. The enterprise mesh thus becomes not merely an integration platform for software components, but a foundation for trusted transactions that bridge technical, legal, and financial domains within a single semantic framework.

Figure 14:
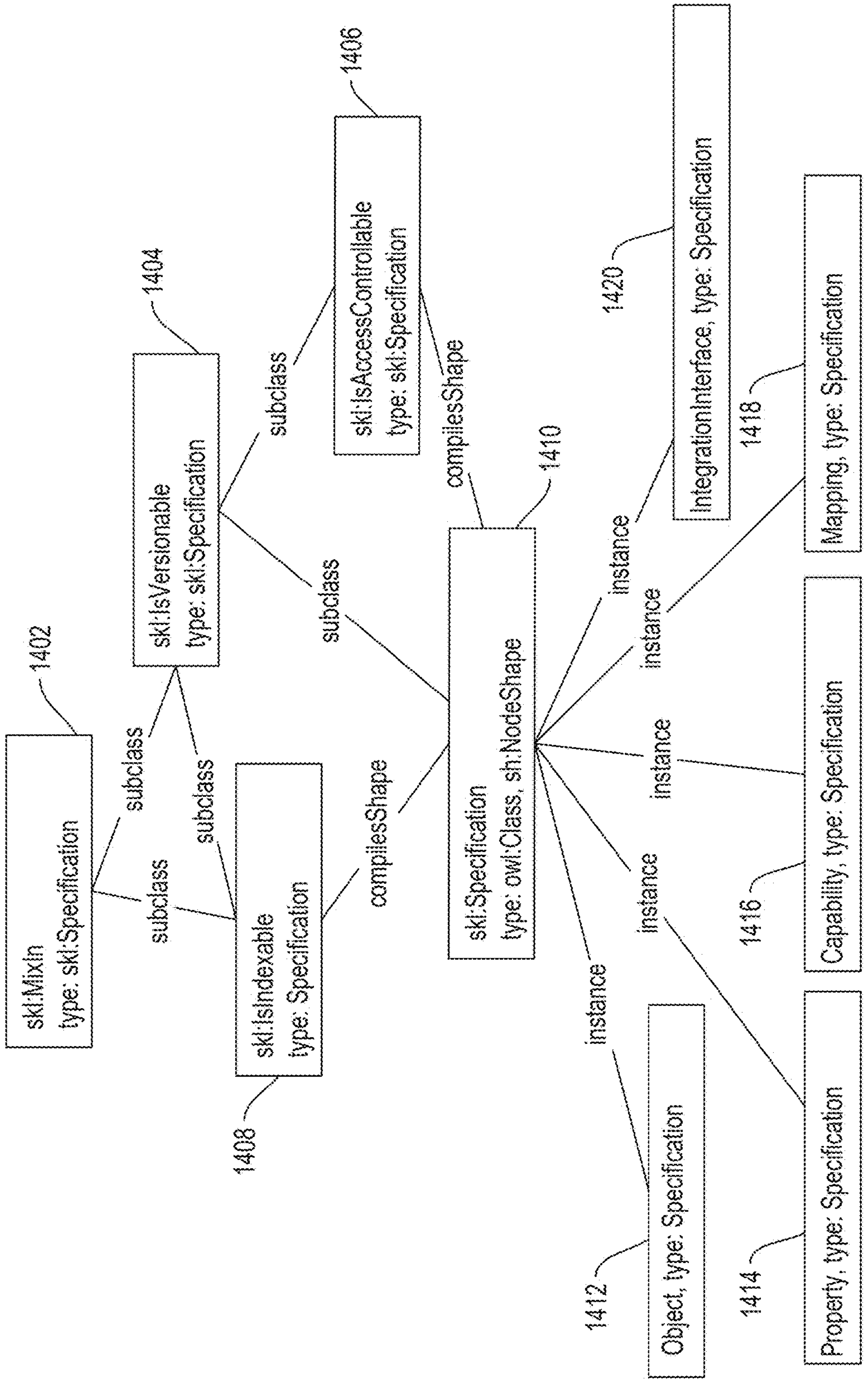
Figure 14:
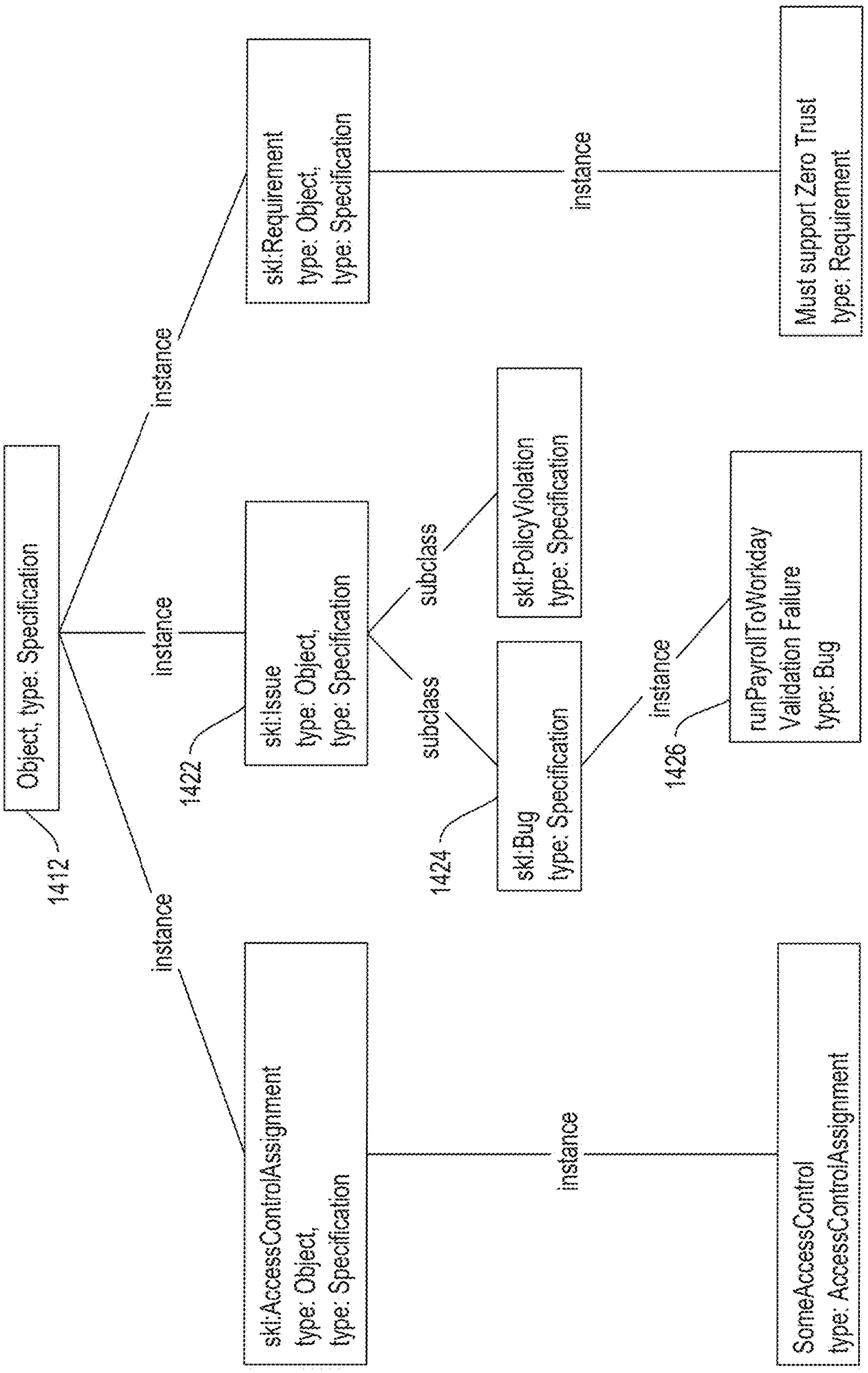
Figure 14:
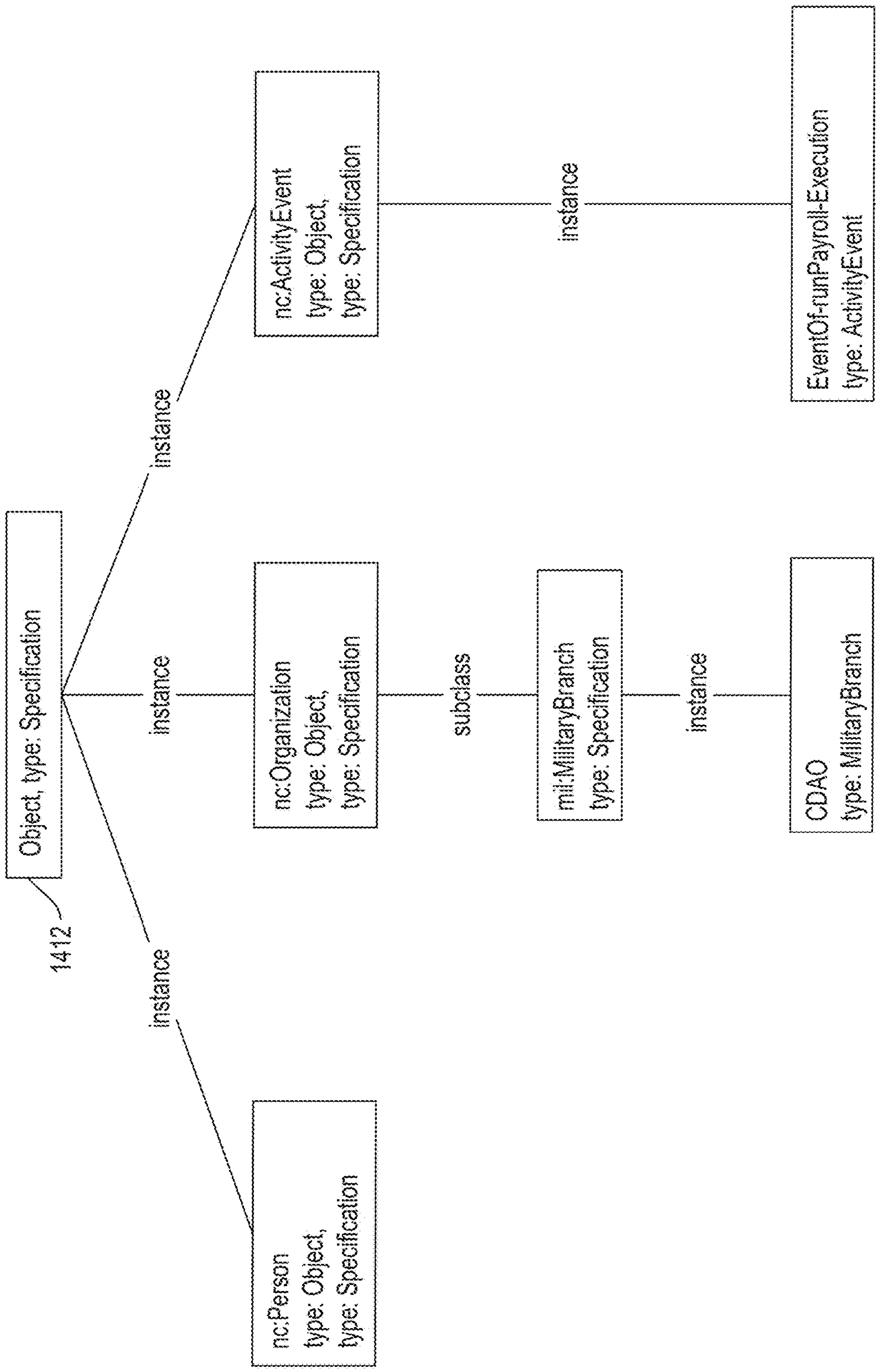
Figure 14:
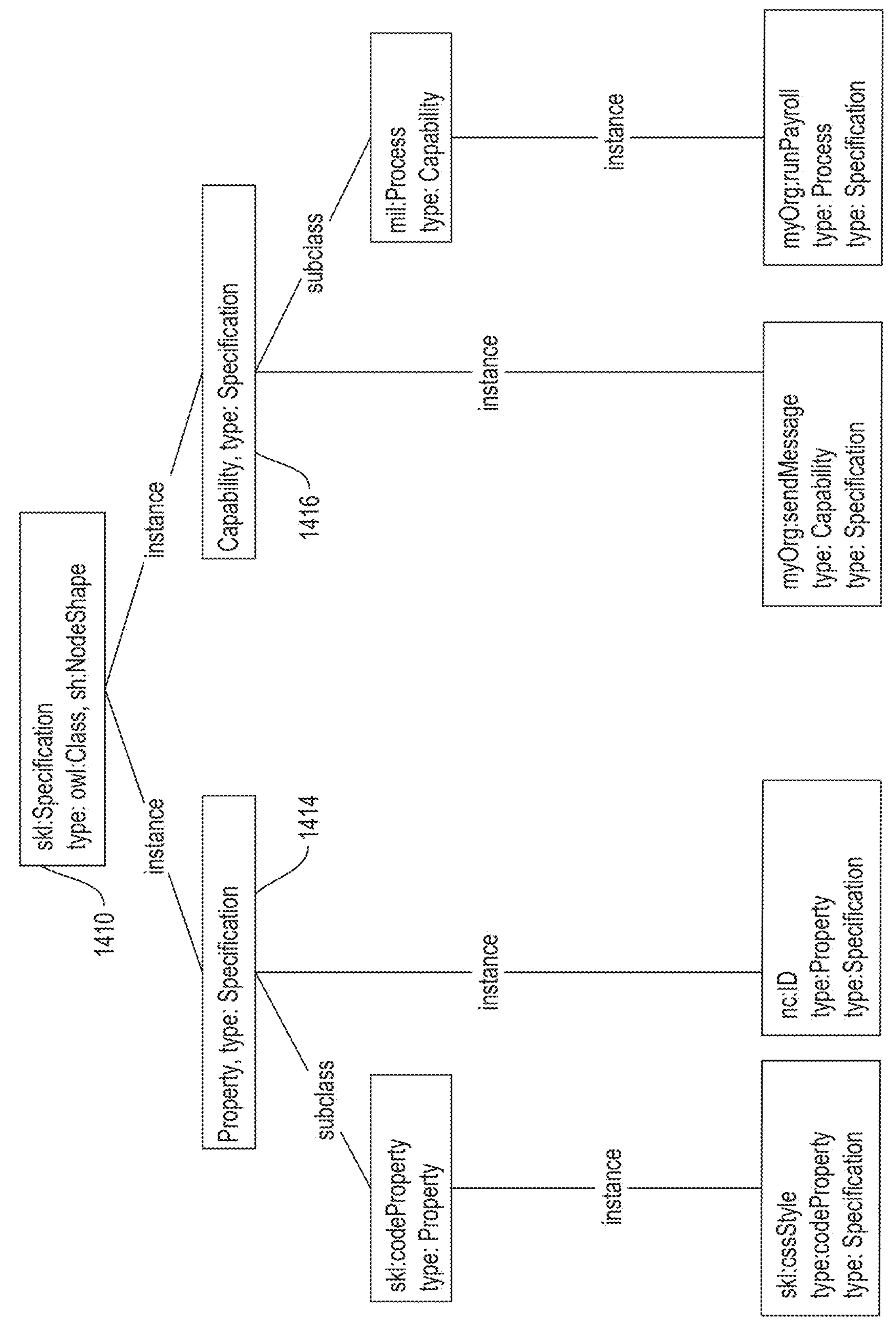
Figure 14:
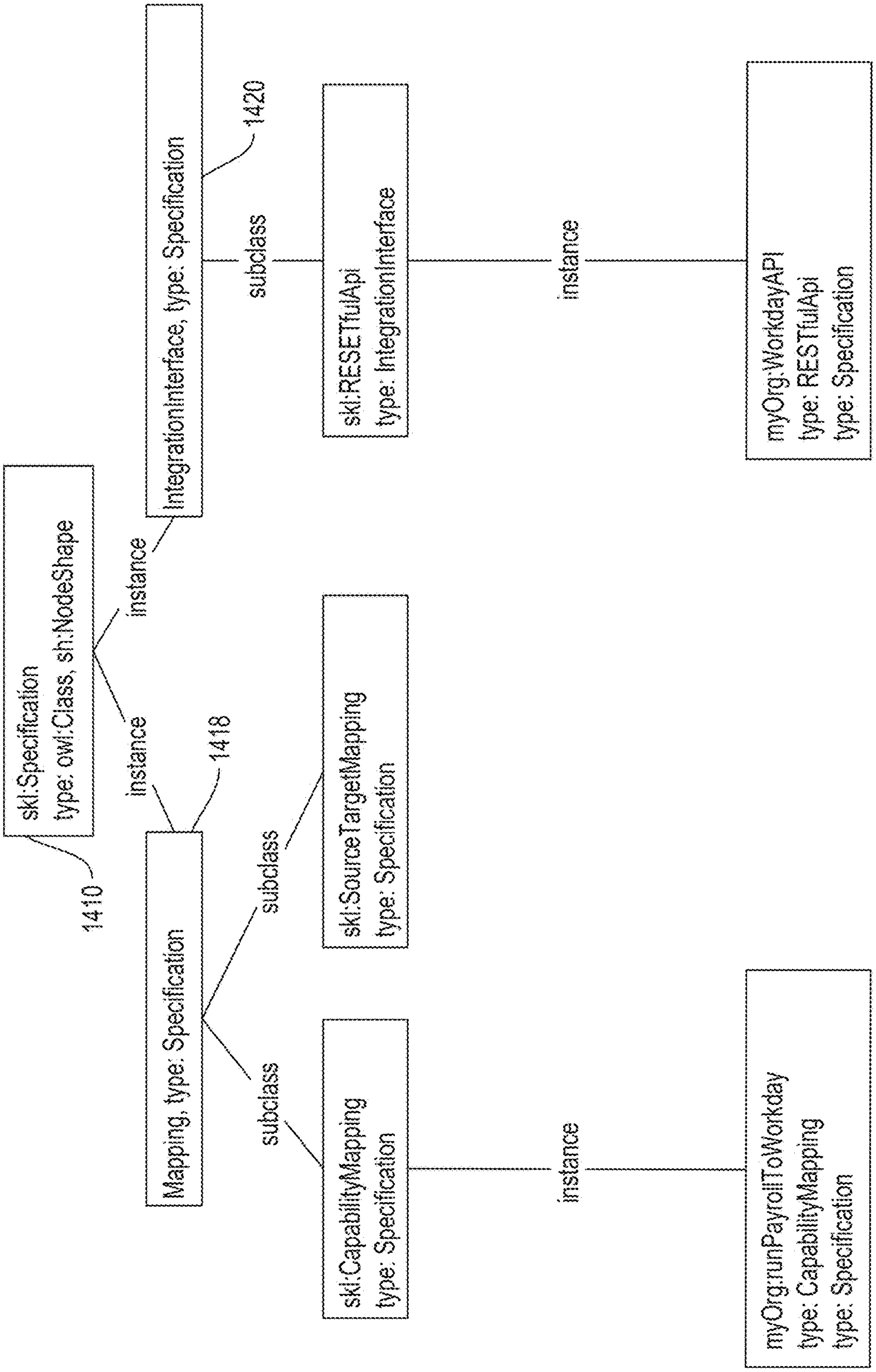

FIG. 14 illustrates a multi-tiered semantic modeling architecture for the SKL, in which all concept types, including those that define structure, logic, behavior, and integration, are formalized as instances of a root specification class (e.g., specification 1410 such as skl:Specification). The architecture shown in the figure enables semantic reasoning by organizing specifications, their subtypes, and runtime instances into clearly defined layers.

At the top of the figure, a set of reusable schema patterns referred to as SKL mixins are depicted, including skl:Mixin 1402, skl:IsVersionable 1404, skl:AccessControllable 1406, and skl:Indexable 1408. Each of these is itself an instance of skl:Specification 1410 and serves as a reusable, composable logic pattern that can be applied to other SKL specs to introduce semantic behaviors such as versioning, access control, or indexing. These mixins may be subclassed or composed into other schema definitions using declarative inheritance paths labeled "subclass" or "compliesShape."

Beneath the mixin layer, the figure displays a set of core specification types that are all direct instances of skl:Specification 1410. These include:

Object 1412—for defining object schemas such as domain entities or record types;

Property 1414—for defining structured attributes or fields;

Capability 1416—for defining executable functions, services, or behaviors;

Mapping 1418—for defining transformation logic;

IntegrationInterface 1420—for defining external system interfaces or adapters.

Each of these types serves as a category of SKL Specification that may in turn have its own instances. For example, under Object 1412, domain-specific specs such as skl:AccessControlAssignment, skl:Issue, skl:Requirement, nc:Person, and skl:ActivityEvent are shown. These object specs reside in the "Object Specs" section of the SKL model and are further identified in the figure by 1422. Some of these specs, like skl:Issue, serve as parents for additional subclasses such as skl:Bug, which is likewise an instance of skl:Specification.

The base-level of the figure shows a runtime data layer labeled "Object Instances" 1424. These include example data records such as SomeAccessControl, runPayrollTo-Workday Validation Failure, and EventOf-runPayroll-Execution, which are typed according to the object specs from the layer above. The instance-level relationships are marked with downward arrows annotated "instance," and link runtime entities back to their originating specifications. For example, the object Must support Zero Trust 1426 is an instance of the skl:Requirement specification above it.

FIG. 14 further illustrates how SKL classes function not only as semantic types but also as structural annotations that inform and guide processing behavior within the Enterprise Mesh. In this context, each SKL specification type—whether an Object 1412, Capability 1416, Mapping 1418, or other category—is understood by mesh-aware tools, applications, and agents as a declarative signal describing how the underlying data or logic should be handled. These SKL classes act analogously to semantic tags in markup languages such as HTML. Just as an <h1> or <p> tag provides contextual information to browsers and rendering engines (e.g., "this is a headline" or "this is a paragraph"), an SKL Specification type such as skl:Capability or skl:AccessControlAssignment tells mesh or SKL tooling what kind of function or object it is interpreting, what metadata to expect, and how it may be composed or executed.

This structured labeling allows mesh-based processors to behave in intelligent, context-sensitive ways. For example, SKL-aware user interfaces may render an skl:Requirement differently than a skl:ActivityEvent, while policy engines may know to scan instances of skl:AccessControlAssignment 1422 for authorization rules. Inference engines can use these class distinctions to traverse relationships, derive new knowledge, or validate conformance. Moreover, SKL classes can be composed and inherited—e.g., by using mixins such as skl:IsVersionable 1404 or skl:AccessControllable 1406—to convey behavioral traits in a modular, reusable fashion.

FIG. 15 illustrates a system 1500 with a generalized structure of an skl:Spec, which in some embodiments form the foundational building block for defining semantic contracts within the EMP. An skl:Spec represents a machine-readable and executable specification that encodes both formal semantics and human-readable documentation necessary for effective design, governance, and execution across distributed systems.

In this embodiment, each skl:Spec is modeled as a hybrid of an OWL class and a SHACL node shape. For example, it may combine the ontological expressiveness of RDF/OWL with SHACL's validation and constraint-checking features. This hybrid approach allows each spec to define not only what it represents (e.g., a capability, a data object, or a policy), but also the rules and structure that must be enforced during creation, evolution, and execution.

The figure is divided into several sections, each corresponding to different metadata fields or behaviors associated with the specification. Under the Basic Identity section, the spec includes properties like @id, @type, rdfs:label, dc:description, and skl:disambiguatingDescription, which together define the spec's unique identity, label, and short-form human-readable explanations. In some embodiments specs may have two IDs: one that is stable across versions (e.g., skl:stableId) and one that is unique to each version (e.g., @id).

The Purpose & Justification section contains fields such as skl:purpose, skl:motivation, and skl:rationale, which capture the semantic intent of the spec, the problem it addresses, and the reasoning behind its design. This documentation allows the specification to serve not just as a functional unit but also as a reusable architectural asset with traceable design logic.

In the Usage & Discovery section, the spec may declare fields like skl:usageGuidelines, skl:applicability, skl:classification, skl:bagOfWords, and skl:keyword, which help other users, systems, or AI agents to search, filter, and understand the applicability of the specification in specific contexts. This supports automated spec discovery and cross-domain reuse.

The Extended Documentation section may include links to skl:extendedDocumentation, skl:example, and skl:analysis, enabling richer contextualization and integration with developer tools, documentation portals, or lifecycle analytics.

Beneath this, the spec includes inherited or composed traits, such as skl:IsAuditable, skl:IsVersionable, skl:IsManageable, skl:IsObservable, and skl:IsEvaluatable. These indicate which runtime or governance behaviors the spec supports. For instance, skl:IsAuditable implies that all usage of the spec should be logged and traced, while skl:IsVersionable enforces a versioning lifecycle. These traits can be inherited from architectural mixins or higher-level patterns, enabling scalable architectural governance.

At the bottom of the diagram, incoming relationships such as Issues, Comments, Requirements, AccessControlAssignments, and Policies are listed. These refer to other specs or runtime elements that may be linked to the current spec in the SKL knowledge graph, even if they are not formally declared within the spec itself. This supports contextual enrichment and multi-dimensional lifecycle governance.

Below is a non-limiting embodiment of a serialization for the conceptual example described through FIG. 15. This is an illustrative example and any serialization (JSON, XML, Protobuf, etc.) may be equally used to formally describe the conceptual example illustrated through FIG. 15.

```
{
  "@id": "https://skl.so/Spec",
  "@type": ["http://www.w3.org/2002/07/owl#Class",
"http://www.w3.org/ns/shacl#NodeShape"],
  "http://purl.org/dc/terms/created": "2025-03-10T16:35:10Z",
```

-continued

```
    "http://purl.org/dc/terms/modified": "2025-03-10T16:35:10Z",
    "https://skl.so/label": "Spec",
    "http://www.w3.org/ns/shacl#closed": false,
    "http://www.w3.org/ns/shacl#property": {
      "http://www.w3.org/ns/shacl#path": "https://skl.so/label",
      "http://www.w3.org/ns/shacl#datatype":
      "http://www.w3.org/2001/XMLSchema#string",
      "http://www.w3.org/ns/shacl#minCount": 1
    },
    ...
}
```

Figure 16:
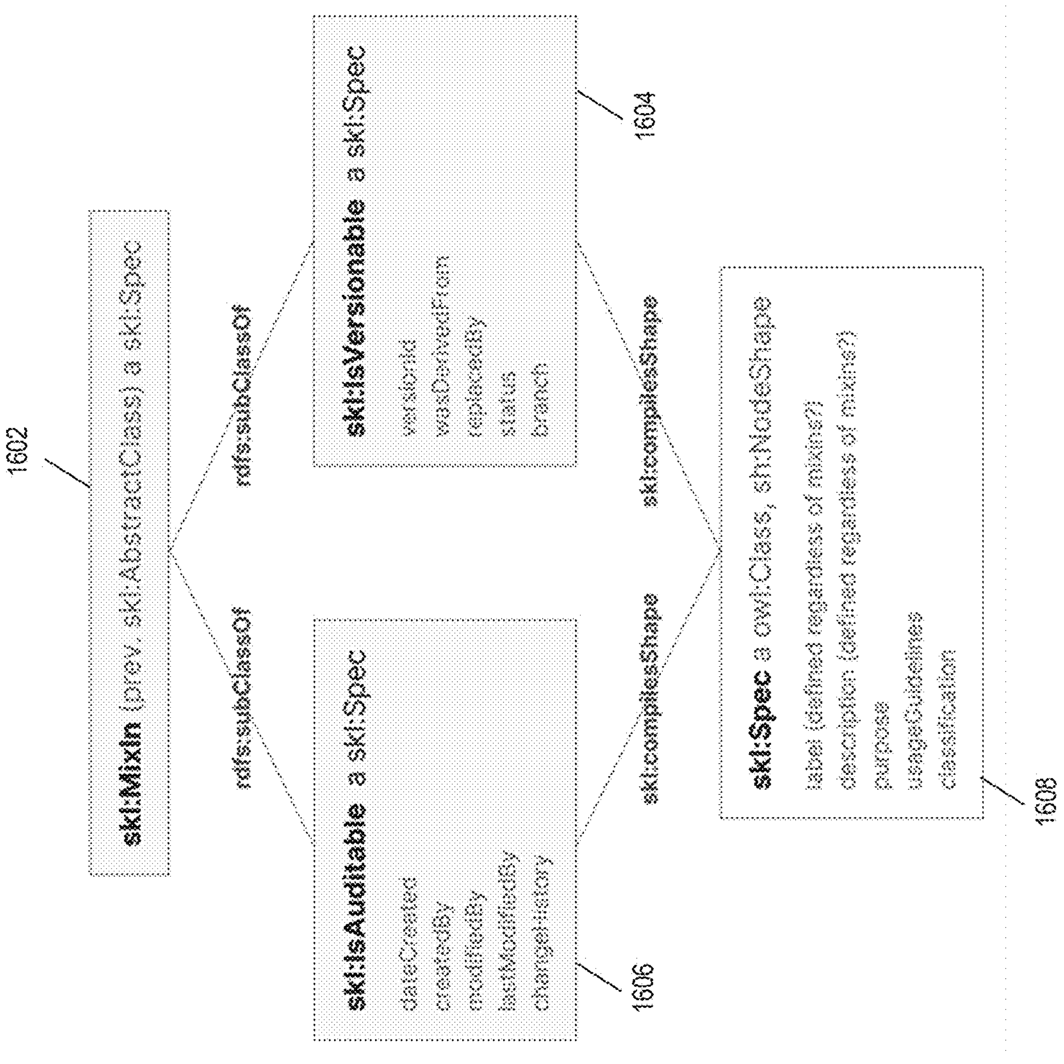

FIG. 16 illustrates the conceptual mechanism by which reusable patterns—called skl:MixIns—are incorporated into the semantic specification model without creating problematic circular inheritance, while preserving the versionability, traceability, and composability of each SKL specification, according to an embodiment. FIG. 16 illustrates how MixIns themselves are treated as first-class skl:Spec objects, and how they are "compiled into" other SKL specifications through the property skl:compilesShape.

At the top of the diagram is skl:Mixin 1602, a generalized class representing reusable specification fragments. These may be analogous to abstract classes or traits in object-oriented systems, and can be used to define architectural behaviors or common fields across multiple spec types. Unlike traditional mixins or inheritance models, a skl:Mixin is also a skl:Spec-meaning it can be versioned, governed, and referenced like any other component in the Enterprise Mesh.

The figure shows two example MixIns: (1) skl:isAuditable 1606 and (2) skl:isVersionable 1604. The skl:isAuditable 1606 MixInincludes properties such as dateCreated, createdBy, modifiedBy, lastModifiedBy, and changeHistory, which define metadata required to track and audit the lifecycle of a specification. Similarly, the skl:isVersionable 1604 MixIn defines semantic fields such as versionId, wasDerivedFrom, replacedBy, status, and branch, supporting version management and evolution control within the SKL knowledge graph.

Rather than relying on classical inheritance, both of these MixIns contribute their structure to the base skl:Spec 1608 through a concept called skl:compilesShape. This avoids the circularity that would otherwise arise if every skl:Spec were to directly inherit from every MixIn it uses. Instead, the skl:compilesShape mechanism instructs the SKL tooling to "flatten" or compile the properties of the MixIns into the a new version of the skl:Spec (e.g., a new file or database record with a new version number), creating a semantically coherent and validation-ready node shape that includes all inherited behavior.

For example, when a skl:isAuditable and skl:isVersionable are changed, a new version of each may be created and trigger an automatic compilation of the skl:Spec class including all relevant properties from both MixIns, even though the skl:Spec itself does not technically subclass them. This allows the Enteprise Mesh Platform, SKL Engine, or authoring tools to detect changes in MixIn definitions (such as a new required field in skl:isAuditable), recommend updates to dependent specs, and create new compiled versions accordingly—ensuring both architectural consistency and semantic traceability.

FIG. 17 presents an example embodiment demonstrating how a skl:Mixin, specifically skl:IsIntegratedData 1702, can be used to extend the semantic schema of an object class—in this case, the nc:Issue object 1714—by enriching it with additional standardized metadata relevant to data integration from external systems. This non-limiting example illustrates the practical application of MixIns in the EM to modularly compose reusable patterns across different specification types, without enforcing brittle inheritance hierarchies.

The mixin skl:IsIntegratedData 1702 is itself defined as a SKL specification meaning it is both an instance of skl:Spec 1704 and a subclass of skl:Mixin 1706. This allows it to be versioned, governed, and semantically linked like any other component in the Enterprise Mesh, while still serving a modular role as a reusable design pattern. The description 1708 for the mixin explains that it is used to annotate entities that maintain synchronized data originating from external systems or sources. This may be beneficial in distributed and federated environments where data lineage, source attribution, and synchronization status must be explicitly modeled.

The skl:IsIntegratedData mixin contains its own set of declared properties 1712, including: skl:source (typically referencing the external system or integration that supplied the data); skl:idInSource (the unique identifier used in the source system); skl:dateCreatedInSource; and skl:dateModifiedInSource (timestamps that represent when the data was created or last updated in its origin system).

These fields are relevant across many object types and provide traceable metadata to support auditing, synchronization, and provenance tracking.

The object nc:Issue 1714 is shown as a semantic entity defined as an skl:Object, and also an skl:Spec, owl:Class, and sh:NodeShape. The object has its own identity properties (@id, @type, rdfs:label), as well as a set of domain-specific fields such as nc:IssueDescriptionText, nc:IssueDate, nc:IssueCategoryText, and nc:IssueStatusText, which pertain to the native structure of an issue (e.g., alert) record.

The nc:Issue object also declares a rdfs:subClassOf skl:IsIntegratedData, which means that it inherits or compiles into its definition the additional properties and behaviors defined by the mixin. As a result, the final specification for nc:Issue includes both the issue-specific fields and the integration metadata fields—such as skl:source, skl:idInSource, skl:dateCreatedInSource, and skl:dateModifiedInSource—without requiring explicit duplication or hardcoded inheritance.

Figure 18:
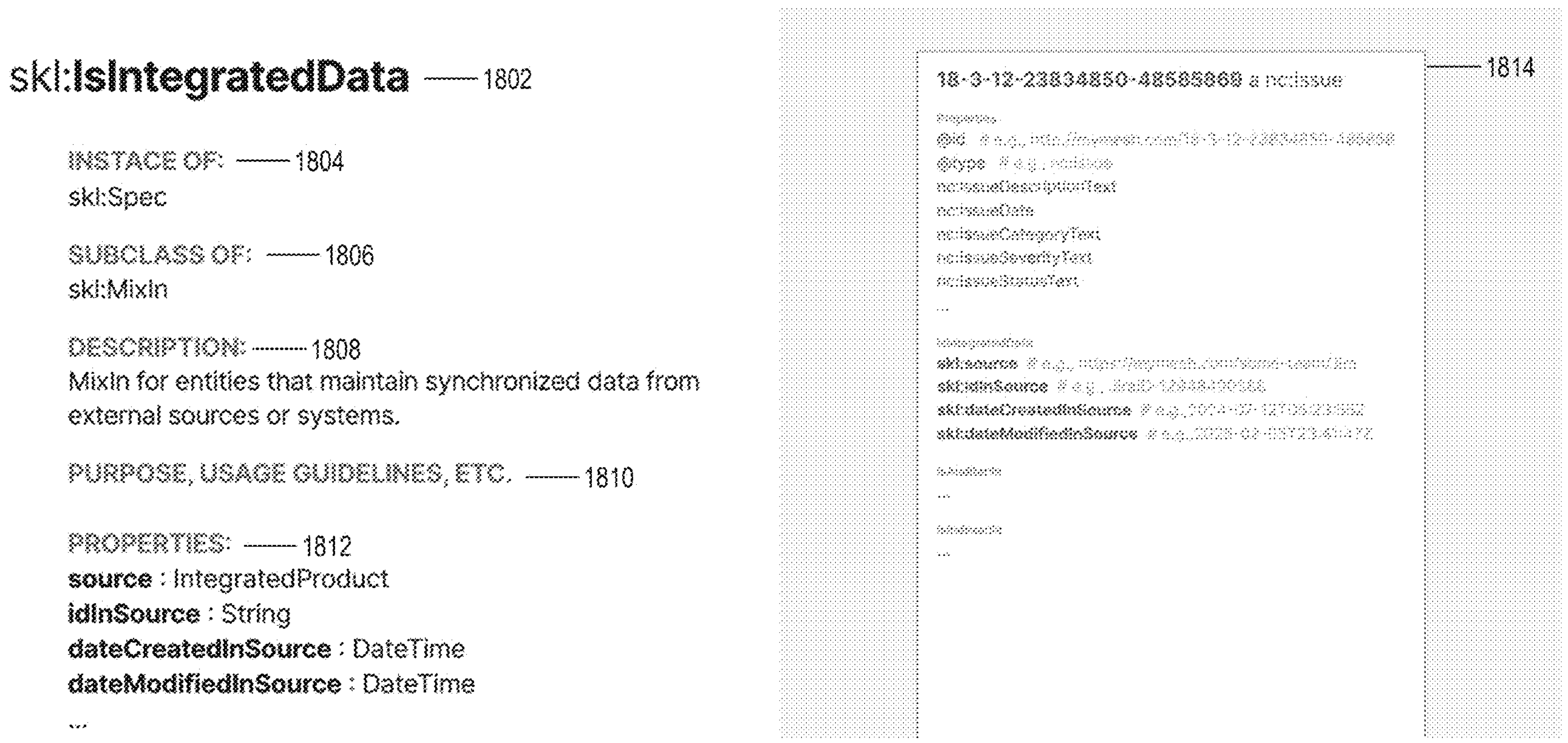

FIG. 18 builds upon the architectural principles introduced in FIG. 17 and provides an example of a conforming data instance—a node within the EM that has been instantiated using both the native structure of an object class and additional properties defined by a skl:Mixin. Specifically, it demonstrates how the mixin skl:IsIntegratedData 1802 is used to augment an instance of an nc:Issue object 1814 with metadata necessary to track synchronization with external systems. The instance of nc:Issue does not get the various metadata properties of the nc:Issue spec (e.g., label, description, motivation, purpose, etc.)

The skl:IsIntegratedData mixin in this non-limiting embodiment is an instance of skl:Spec 1804 and a subclass of skl:Mixin 1806. This design pattern ensures that the mixin can be governed, versioned, and reused like any other semantic element in the mesh. The mixin is accompanied by a description 1808 indicating that it is used to annotate entities that maintain synchronized data from external systems or sources. The specification includes structured documentation such as purpose and usage guidelines 1810, which help inform both human designers and machine agents of its intended application domain.

The mixin defines a standard set of properties 1812 that are required for integration-aware semantics, including: (1) skl:source: identifies the external system of origin (e.g., Jira, Salesforce, ServiceNow); (2) skl:idInSource: a string value that represents the native ID used in the external system; and (3) skl:dateCreatedInSource and skl:dateModifiedInSource: timestamps used to maintain lineage, freshness, and potential synchronization reconciliation logic.

The issue object 1814, is an instance of nc:Issue object identified here by a unique identifier 18-3-12-23834850-48585869. This node conforms to the SKL specification for nc:Issue, and it integrates properties from both the base Issue class and the IsIntegratedData mixin. Native properties such as nc:IssueDescriptionText, nc:IssueDate, nc:IssueCategoryText, nc:IssueSeverityText, and nc:IssueStatusText reflect domain-specific metadata for issue (e.g., alert) tracking.

The IsIntegratedData section of the node shows how the instance also includes: (1) skl:source: a URI pointing to an external Jira workspace; (2) skl:idInSource: the external ID from Jira (e.g., JiraID-12984890388); and (3) skl:dateCreatedInSource and skl:dateModifiedInSource: ISO 8601-formatted timestamps representing when the issue/alert was created and last updated in the source system.

As a result, the node in FIG. 18 benefits from both the semantic integrity of the nc:Issue spec and the architectural consistency of skl:IsIntegratedData. This enables tooling within the Enterprise Mesh Platform to perform traceability analysis, monitor synchronization health, enforce governance policies, and/or trigger workflows (e.g., re-polling source systems) without embedding fragile hard-coded business logic for individual systems.

FIG. 19 presents a non-limiting embodiment of the skl:IsVersionable mixin 1902, which is used within the Enterprise Mesh Platform to imbue SKL specifications (and/or other types of data/instances conforming to specs) with version management semantics that resemble Git-style source control workflows. This embodiment illustrates how semantic elements such as capabilities, objects, or policies can be given explicit version lineage, status labeling, and optional branching metadata, enabling controlled evolution and robust lifecycle governance across distributed teams.

The specification is introduced as an instance of skl:Spec 1904, and it extends skl:Mixin 1906, making it reusable as a composable trait across various spec types. This mixin may be compiled into any skl:Spec using the skl:compilesShape mechanism described in previous figures, allowing it to contribute a set of standard properties and behaviors relevant to version control.

The description 1908 of the mixin explains that it supports Git-like versioning and branching, facilitating partial or full CI/CD workflows within the Enterprise Mesh (EM). The purpose section 1910 further elaborates that this mixin is intended to allow semantic resources—such as capability definitions or data object specs—to express and manage their evolution over time. This may include declaring a new version identifier (versionId), referencing a parent or predecessor spec (wasDerivedFrom), or indicating that a spec has been deprecated or replaced (replacedBy).

A createInvoice capability spec may initially be defined in version 1.0.0, and a later version 2.0.0 might introduce new required fields. The skl:IsVersionable mixin ensures that these changes are explicitly modeled, traceable, and/or governable across the mesh.

The usage guidelines 1912 would typically include instructions or conventions on how version transitions should be managed, how to interpret branching metadata, and how to apply status labels (e.g., draft, approved, deprecated) for lifecycle enforcement and tooling integration.

The properties 1914 provided by this mixin are shown: (1) versionId: a unique string identifier for the current version of the spec (e.g., "1.0.0" or a commit-style hash); (2) wasDerivedFrom: a URI pointing to the immediate predecessor spec; (3) replacedBy: a URI identifying the spec that supersedes this one, used for deprecation and migration support; (4) status: a term from skl:DefinedTerm, which may take values such as "draft", "stable", "deprecated", etc., signaling the current phase of the spec in its lifecycle; and/or (4) branch: an optional reference to a skl:Branch, which supports parallel development paths-useful in complex deployment environments or experimental feature rollouts. In some embodiments, the same versioned spec may exist in multiple branches, and therefore the "status" property may be modeled as a relationship that relates a given spec version with its status in a given branch. In other embodiments, the skl:IsVersionable MixIn may define a property (e.g., skl:versionGroupId) that facilitates stable referencing across versions (e.g., if an id policy exists where every edit of a spec that is created creates a new version—similar to Git—then referencing may break across the mesh, unless there is a stable way to reference entities across versions—potentially through another id property like "versionGroupId" or "stableVersionId").

As illustrated in FIG. 20, a non-limiting embodiment of an skl:Product specification 2002 is shown as a specialized type of SKL Specification that establishes a governance boundary around a logically cohesive set of capabilities, objects, interfaces, and policies. More than merely a collection of components, an skl:Product usually represents an explicitly governed unit of accountability, ownership, and lifecycle management within the Enterprise Mesh.

In this example, an skl:Product specification 2002 is identified as an instance of skl:Spec 2004, that inherits governance patterns (shown at element 2006) defined by MixIns like skl:IsVersionable, skl:IsManageable, and skl:IsIndexable that enable systematic governance throughout its lifecycle. The descriptive attributes of the skl:Product outlined in element 2008, 2010, and 2012 define it as a container or reference-node for schemas, governance policies, and integration logic that together form a discrete, maintainable unit of functionality within the enterprise mesh. The product's purpose (e.g., shown at element 2010) enables discovery and authorized use of enterprise data and capabilities, while element 2012 suggests using skl:Product specs to bundle core semantic artifacts for packaging as standalone offerings or interoperable services.

Element 2014 illustrates how a skl:Product may be used to define structured metadata for discoverability, governance, and composability. This includes marketplace-style fields such as provider, brand, review, and certification, alongside core schema components like arrays of skl:Capability, skl:Object, skl:Mapping, and skl:IntegrationInterface. Governance-related metadata including skl:AccessControlAssignment, skl:Policy, and skl:EvaluationCriteria may also be explicitly referenced in some embodiments. These properties collectively allow a product to carry with it all the semantic contracts needed for discovery, understanding, and trusted and context-aware interaction.

FIG. 20 illustrates a conceptual overview of the skl:Product specification 2002, in accordance with a non-limiting embodiment. The figure provides both a structured definition and a metadata-driven representation of a product as an SKL-defined specification. The skl:Product specification 2002 is identified as an instance of skl:Spec 2004, and extends other core traits such as skl:IsVersionable, skl:IsManageable, and skl:IsIndexable, as shown at element 2006.

The descriptive attributes of the skl:Product are outlined in elements 2008 through element 2012. In particular, the element 2008 defines the skl:Product as central reference node for schemas, governance policies, and integration logic that together define a discrete, maintainable unit of functionality—e.g., an application, service, or third-party connector—within the enterprise mesh. The purpose (e.g., shown at the element 2010) of such a product is to enable discoverable and reusable configurations of enterprise logic. The element 2012 suggest that skl:Product should be applied when bundling core semantic artifacts (such as skl:Objects, skl:Capabilities, and skl:Interfaces) for packaging as standalone offerings or interoperable services.

Element 2014 expands the notion of skl:Product by illustrating how such a product may be enhanced with structured metadata for discoverability, governance, and composability. This includes optional marketplace-style fields such as inProductSuite, provider, brand, review, and certification, along with required schema components like arrays of skl:Capability, skl:Object, skl:Mapping, and skl:IntegrationInterface. Governance-related metadata such as skl:AccessControlAssignment, skl:Policy, and skl:EvaluationCriteria are also referenced, indicating that a product may carry with it all the semantic contracts needed for trusted and context-aware execution within the Enterprise Mesh Platform.

FIG. 21 provides a non-limiting embodiment of the skl:AccessControlAssignment specification 2102, which functions as a semantic access control list (ACL) entry within the EM. This embodiment illustrates how fine-grained permissions can be declaratively assigned to users or groups with respect to specific resources, all within the schema-driven, machine-executable framework of SKL specifications.

The specification is identified as an instance of skl:Spec 2104 and a subclass of skl:Mixin 2106, enabling it to be reused and compiled into other specifications or instantiated as a standalone control artifact. The description 2108 explains that the skl:AccessControlAssignment links a principal (e.g., an Account or AccountGroup) to a specific permission or role applied to a resource, such as a capability, a data object, or a report. Optionally, this assignment can be governed by a broader ControlRule or Policy, enabling conditional enforcement or contextual access logic.

The purpose and usage guidelines 2110 emphasize that this specification is used for declaring access entitlements, allowing mesh-aware systems to interpret and enforce access rights dynamically based on SKL-defined logic rather than hardcoded ACLs or role definitions. Because the spec is versioned and semantically composable, it supports auditable, policy-aware security patterns that can be aligned with governance policies, attribute-based access control (ABAC), or policy-as-code frameworks.

The properties 2112 defined in this mixin include: (1) skl:resource: the URI or identifier of the semantic resource being secured (e.g., a document, API endpoint, data field, or product spec); (2) skl:principal: the user or group to whom the permission applies; (3) skl:permission: the operation being granted, such as CanRead, CanUpdate, or a custom semantic role; and/or (4) skl:policy: an optional reference to a ControlRule or skl:Policy that constrains or contextualizes the permission (e.g., time-limited access, geographic restrictions, or audit traceability).

An instance 2114 of an skl:AccessControlAssignment is shown. This instance is identified by a unique ID (1-12-385-23-23) and includes concrete values for each of the core properties. The skl:resource may be "someReportID." The skl:principal may correspond to an account ID such as user123@agency.gov. The skl:permission may be set a semantic term like "CanRead".

This instantiation acts as a runtime-enforceable rule that can be evaluated by any policy engine, analytics server, SDK, or mesh-aware execution component to determine whether a particular user has the right to invoke or view a specific resource. Unlike traditional ACLs buried in application logic, these assignments are transparent, queryable, and governable through the mesh's versioned, semantic graph.

FIG. 22 presents a second, non-limiting embodiment of the skl:AccessControlAssignment specification 2202, building on the same core specification illustrated in FIG. 21, but showcasing an additional or alternative application pattern. While FIG. 21 demonstrated how an AccessControlAssignment could be used to assign a specific permission to an individual user or account (e.g., an access control list or ACL model), FIG. 22 illustrates how the same SKL construct supports role-based access control (RBAC) by assigning a permission to a group of users or accounts—referred to as a principal group.

Structurally, the spec is identical in many ways: it is an instance of skl:Spec 2204, a subclass of skl:Mixin 2206, and includes the same description 2208, usage guidelines 2210, and properties 2212. These properties define the key components of the assignment: (1) skl:resource: the resource being protected (e.g., a report, API, or service); (2) skl:principal: the entity receiving access, which may be a single account or a group; (3) skl:permission: the semantic operation granted (e.g., CanRead, CanApprove, CanExecute); and/or (4) skl:policy: an optional policy or control rule under which the access is granted.

An example difference lies in the example instance 2214. Rather than assigning the permission to an individual account, this embodiment assigns it to a role or group, such as an "HR Team AccountGroup." This models the behavior of a role-based security pattern, where access is granted based on membership in a predefined role or group, rather than to each user individually.

For example, while FIG. 21 might include: skl:principal="user123@agency.gov," FIG. 22 uses: skl:principal="HR team AccountGroup."

This seemingly small shift in the principal property enables the system to manage permissions at a higher abstraction level, simplifying administration and enabling more scalable security policies. When a user is added to or removed from the group, their access rights are updated automatically without modifying individual AccessControlAssignment specs.

FIG. 21 represents ACL-style, user-specific permissioning, whereas FIG. 22 represents RBAC-style, role-based permissioning. Both are modeled through the same semantic structure (skl:AccessControlAssignment), demonstrating the flexibility of SKL in supporting multiple access control paradigms within a unified, declarative framework.

FIG. 23 illustrates a third non-limiting embodiment of the skl:AccessControlAssignment specification 2302, and while it retains the same core semantic structure as shown in FIGS. 21 and 22, this embodiment introduces an attribute-based access control (ABAC) model-differing not by the identity of the principal or permission granted, but by the nature of the resource being controlled.

As in the previous embodiments, the spec is shown as an instance of skl:Spec 2304 and a subclass of skl:Mixin 2306, with a description 2308 explaining that it links a principal (e.g., user or group) to a permission or role on a target resource, possibly under a governing policy or control rule.

Its purpose and usage 2310 and its properties 2312—resource, principal, permission, and policy—remain the same in formal definition.

However, one difference lies in how the resource is defined and interpreted in the example instance 2314.

In FIG. 21, the resource was an individual user's specific record-like a document or object instance-used to assign user-specific permissions (ACL-style). In FIG. 22, the resource was a logical module or asset assigned to a user group or team, supporting role-based control (RBAC). In FIG. 23, the resource is a property specification, such as a sensitive field or attribute e.g., a Social Security Number or medicalConditionText-meaning this access control is applied at the attribute level, not the entity level.

For instance, FIG. 21 models a case where the HR Team (skl:principal) is granted permission (skl:permission=CanRead) not to a whole record, but to a specific field within a schema such as ssn or employeeSalary. The skl:resource in this case is not a document or object node, but a skl:Property spec that defines the semantic meaning and usage of that attribute across the mesh.

This design enables fine-grained access control at the data property level—a hallmark of ABAC models—and allows for context-aware enforcement. For example, systems could enforce policies where some roles can read birth dates but not home addresses, or where certain attributes are redacted unless certain policies (e.g., security clearance or consent flag) are met.

In FIG. 23, the properties 2312 define four exemplary properties of the skl:AccessControlAssignment specification 2302: resource, principal, permission, and policy. Each of these properties is semantically linked to their respective roles in governing access within the enterprise mesh. The resource refers to the asset being controlled (in this case, an individual property-level schema), the principal refers to the actor or agent (e.g., HR Team) being granted or denied access, the permission denotes the action permitted (e.g., CanRead), and the policy refers to any governing rules or conditions that constrain or inform the assignment. The schema for properties 2312 ensures these elements are consistently represented across different forms of access control logic, including ABAC, RBAC, and ACL configurations. This consistent structuring allows policy engines and mesh governance services to interpret and enforce assignments in a standardized, machine-readable way across heterogeneous systems.

The Enterprise Mesh Platform enables an implementation of Zero Trust Architecture (ZTA) through semantically decoupled policy definitions and distributed runtime evaluations. Unlike traditional approaches that require brittle, hard-coded security logic, the SKL framework allows security policies to be defined declaratively as specifications (e.g., using a skl:Policy spec) that reference semantic conditions (e.g., using skl:DefinedTerms, skl:Properties) and can be expressed through dynamic evaluation methods, according to some non-limiting embodiments.

At runtime, distributed enforcement points—which may be for example implemented as SKL capabilities, API gateways, service meshes, sidecars, or embedded within skl:Product implementations—dynamically interpret these semantic conditions. For example, when a service requests access to sensitive data protected by a skl:Policy, the enforcement point can retrieve relevant specifications and skl:AccessControlAssignment instances to determine applicable policies. The platform can then evaluate these policies against contextual metadata provided with the request, such as identity assertions, device health attestations, behavioral risk scores, or environmental conditions.

This semantic approach ensures precise, adaptive ZTA enforcement that can scale across distributed environments while remaining coherent and governable. By decoupling policy definition (in SKL specifications) from enforcement logic (in runtime components), the Enterprise Mesh enables security architecture to evolve independently from application logic without compromising interoperability or governance.

In some embodiments, skl:Policies are defined as skl:Workflow specs (see FIGS. 25 and 26), which facilitate the modeling of structured evaluation logic using expressions written in one or more languages (e.g., XACML, Python, RML, etc.).

Figure 24:
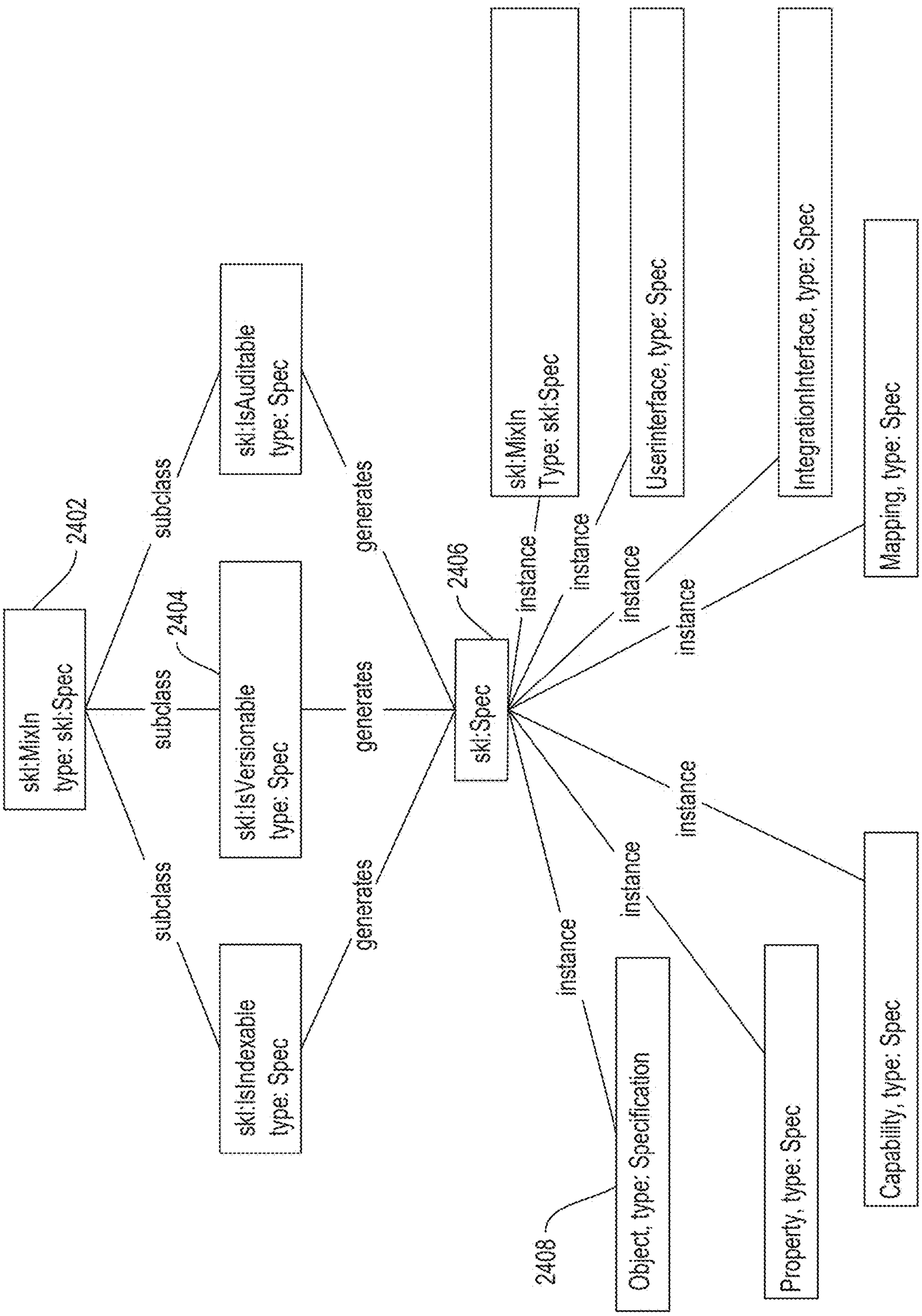
FIG. 24 illustrates a versioning inheritance model where certain SKL specifications inherit behavioral traits like versionability, while downstream instances do not unless explicitly configured, in accordance with an embodiment.
Figure 24:
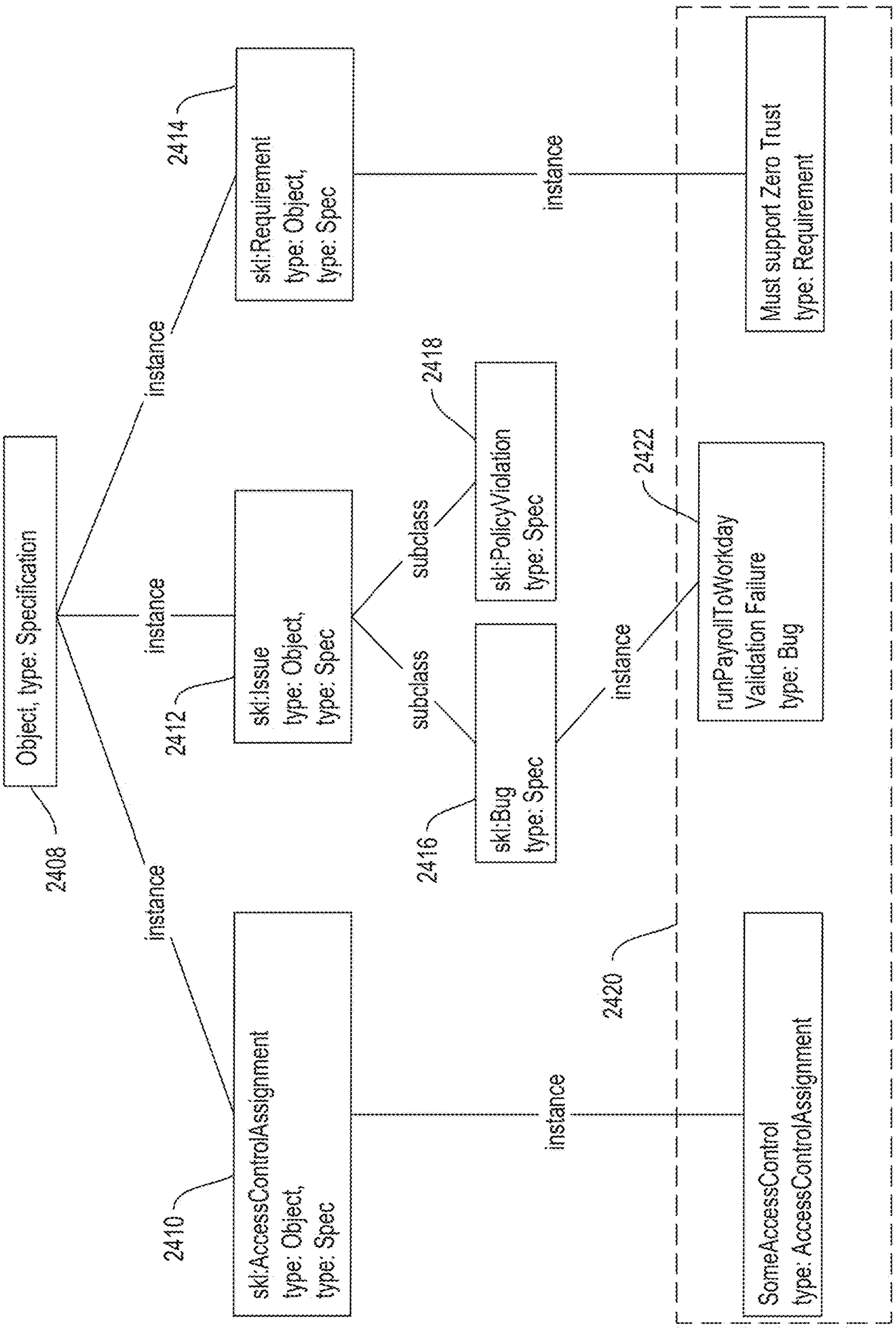
Figure 24:
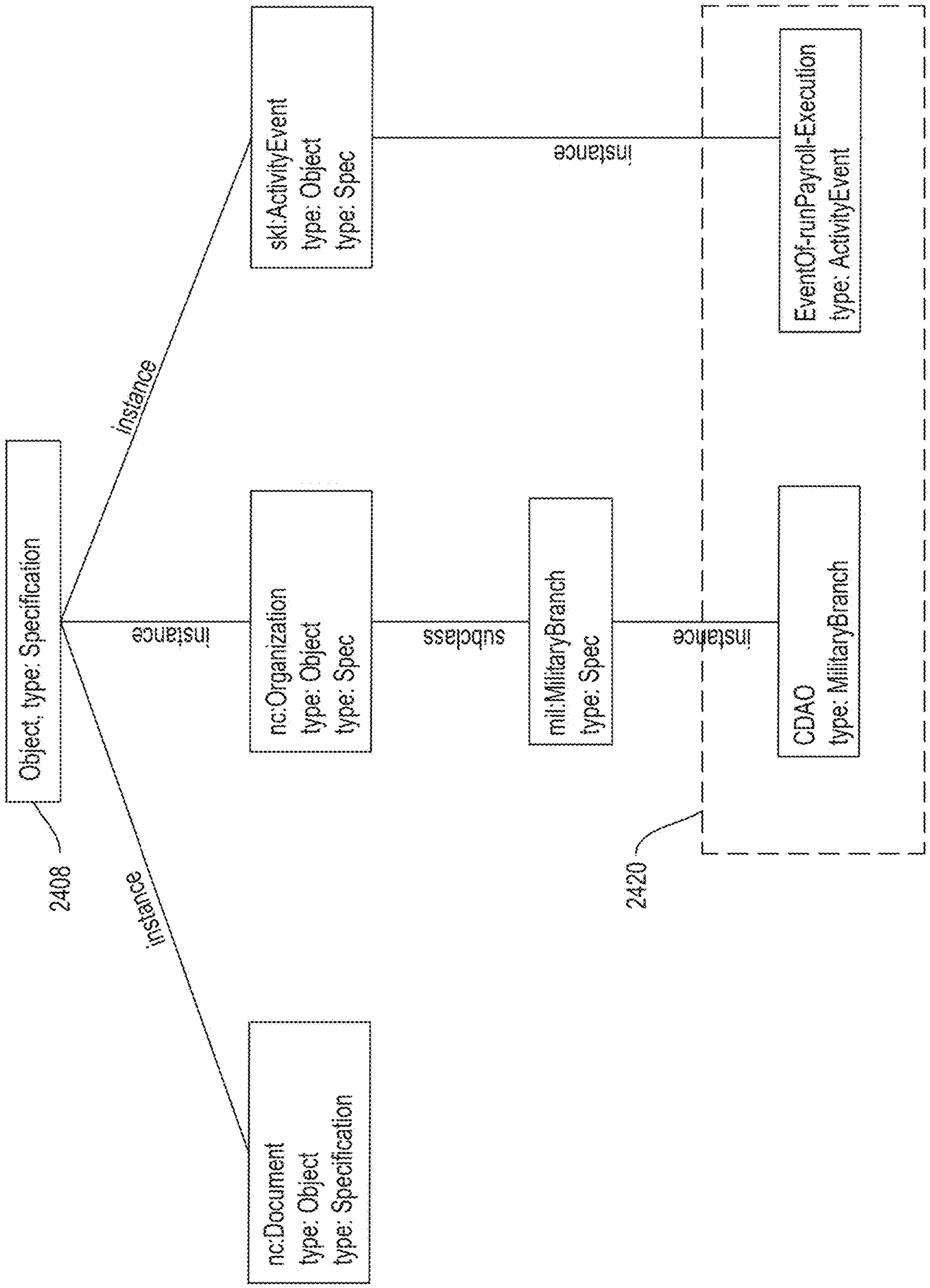
Figure 24:
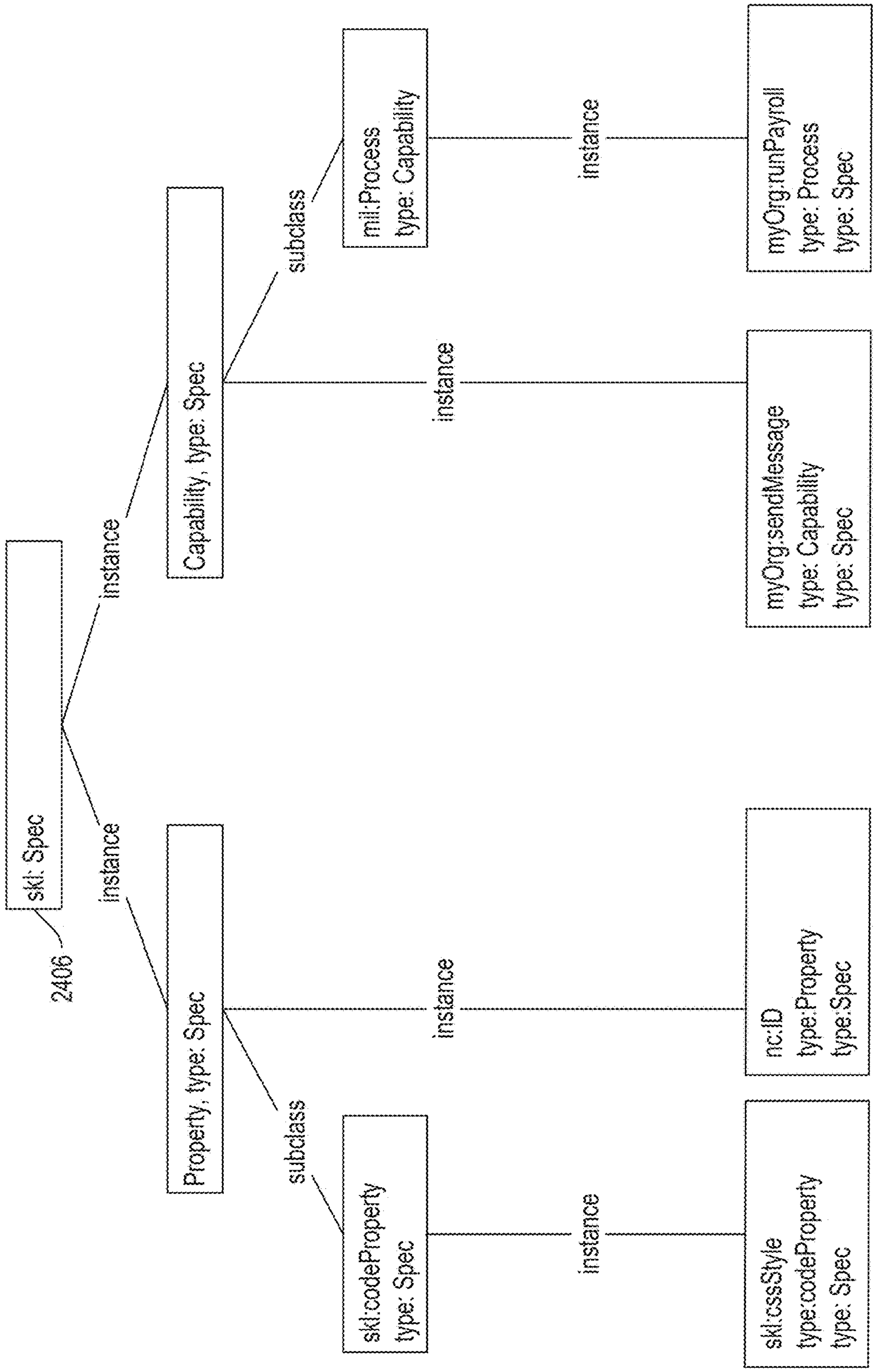
Figure 24:
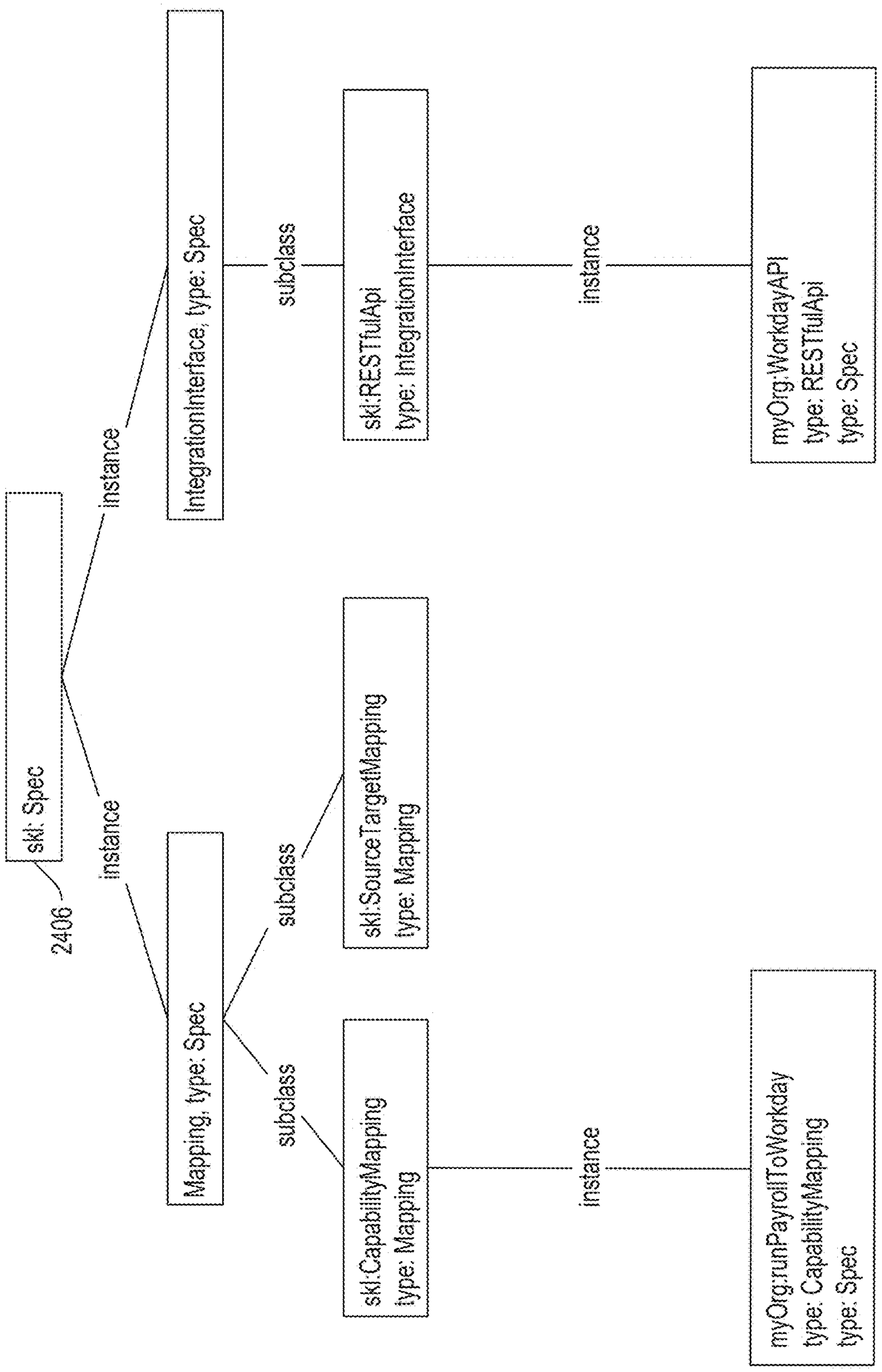
Figure 24:
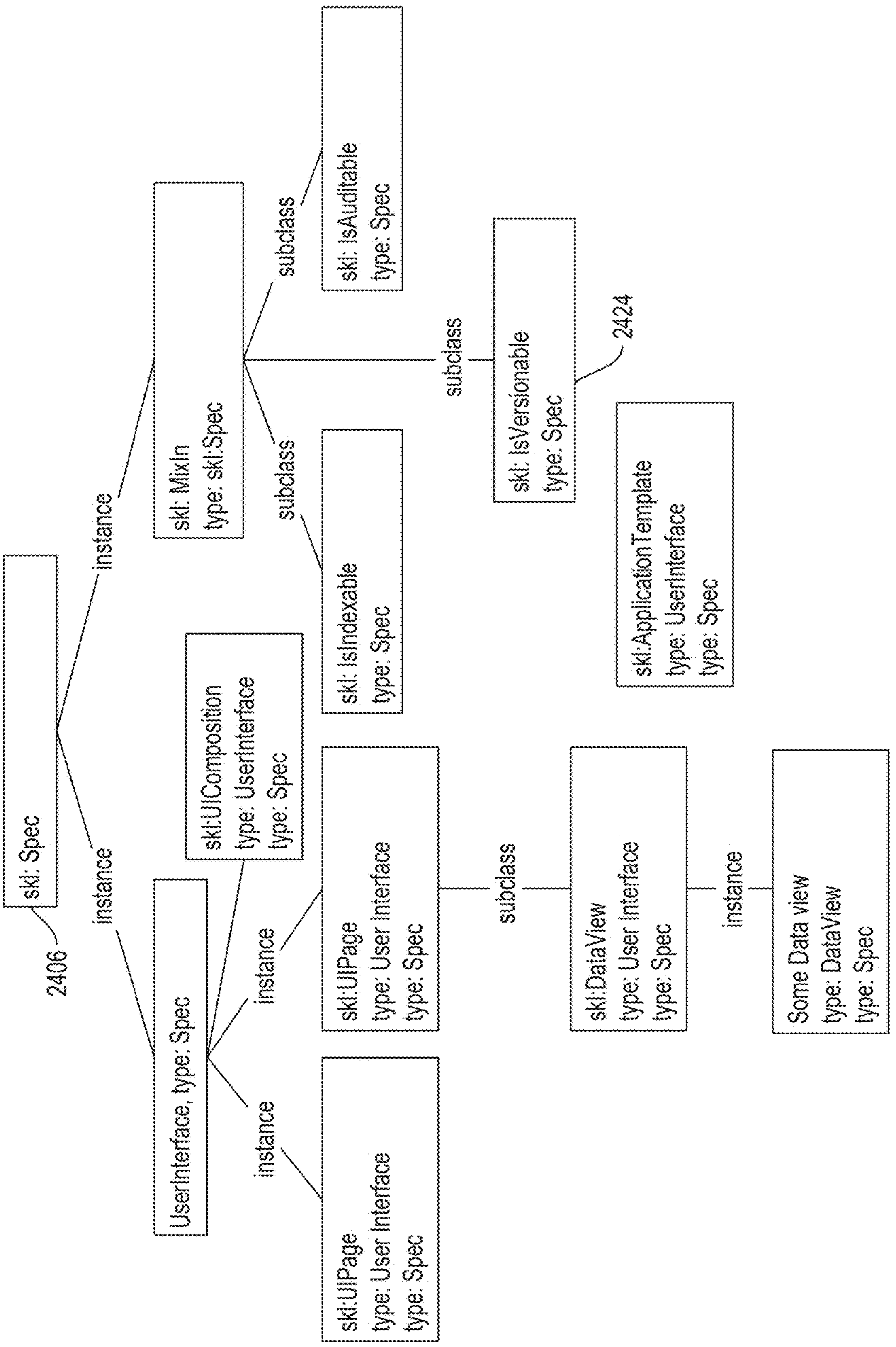

FIG. 24 illustrates how versionability is inherited within a multi-level semantic architecture based on the SKL, according to an embodiment. More specifically, FIG. 24 shows how the skl:IsVersionable mixin is applied to skl:Spec 2406, allowing all subclasses or instances of skl:Spec—including those within the SKL:Specification region—to inherit versioning behavior. These versionable specifications are visually identified by the bounding boxes drawn around them.

The diagram includes skl:Mixin 2402 and shows skl:IsVersionable 2404 as a subclass of skl:Mixin, meaning it can be used compositionally to extend the behavior of other SKL specifications. The skl:IsVersionable 2404 specification is also declared as an instance of skl:Spec 2406. Once skl:IsVersionable 2404 is linked to skl:Spec 2406 (e.g., via a "skl:compilesShape" or "skl:generates" relationship), the versioning trait becomes available to any spec instance that is derived from (e.g., subclass of) or typed as a skl:Spec 2406. That includes Object 2408, but may also include other specifications such as Capability, Mapping, IntegrationInterface, UserInterface, and related types. These are the structures that receive the versioning behavior.

Extending from Object 2408, various object specs are shown, including Object 2410, Issue 2412, and Requirement 2414. Object specs, as with other types of specs, may have at least one subclass, such as Bug 2416 and PolicyViolation 2418.

An area 2420 illustrates a distinction between specification-level inheritance and instance-level application. The area 2420 shows normal data records (e.g., "Must support Zero Trust," "SomeAccessControl," "runPayrollToWorkday Validation Failure" 2422) that are instances of object specifications. Although the object specifications (e.g., skl:Issue 2412, skl:Requirement 2414, skl:AccessControlAssignment) inherit skl:IsVersionable 2404 properties via their classification as skl:Specs, their corresponding runtime instances do not automatically receive these versioning behaviors.

This inheritance boundary occurs because, in this embodiment, property inheritance follows explicitly declared subclass relationships (e.g., "rdfs:subClassOf") and therefore does not automatically propagate to instances of instances. For example, skl:Bug 2416 (as a subclass of skl:Issue 2412) may inherit versioning behavior from skl:Issue 2412, but "runPayrollToWorkday Validation Failure" 2422 (as an instance of skl:Bug 2416) does not receive these properties by default.

However, if an object specification is explicitly designated to propagate inheritance patterns to its instances (e.g., if skl:Bug 2416 rdfs:subclassof skl:IsVersionable 2404), then its runtime instances would receive those properties (e.g., the properties of skl:IsVersionable 2404). This configurable inheritance enables governance patterns (e.g., spec labeling and metaproperties vs. runtime instance properties) to be applied precisely where needed within the multi-layer specification hierarchy, rather than automatically propagating to all runtime data. In the example shown, only one versioning mixin (skl:IsVersionable 2424) is applied, but the architecture allows for multiple versioning mixins with potentially different inheritance logic and runtime implications.

However, in this embodiment, specifications that are not directly instances of the skl:Spec (e.g., skl:Issue 2412) and that do not have inheritance paths that support the automatic inheritance of skl:Specs must be classified as instances of skl:Spec themselves (e.g., the type of skl:Issue 2412 is skl:Object and skl:Spec). This classification of Specs with the right types can be automatically managed by an Enterprise Mesh Platform or other authoring tools.

Figure 25:
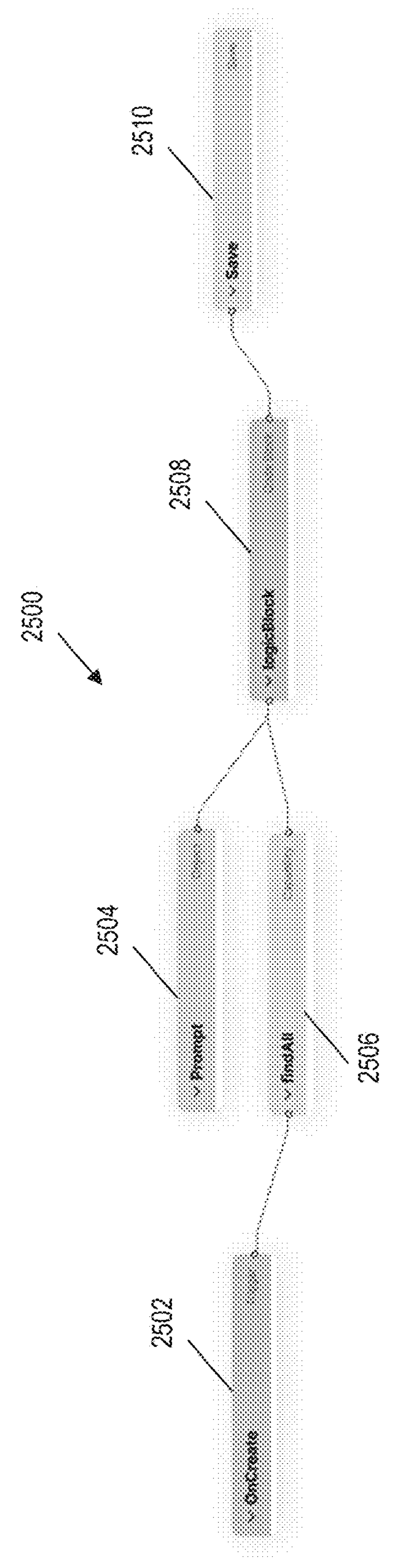
FIGS. 25 and 26 show examples of interaction flows and the dynamic resolution of linked semantic components, in accordance with an embodiment.
Figure 26:
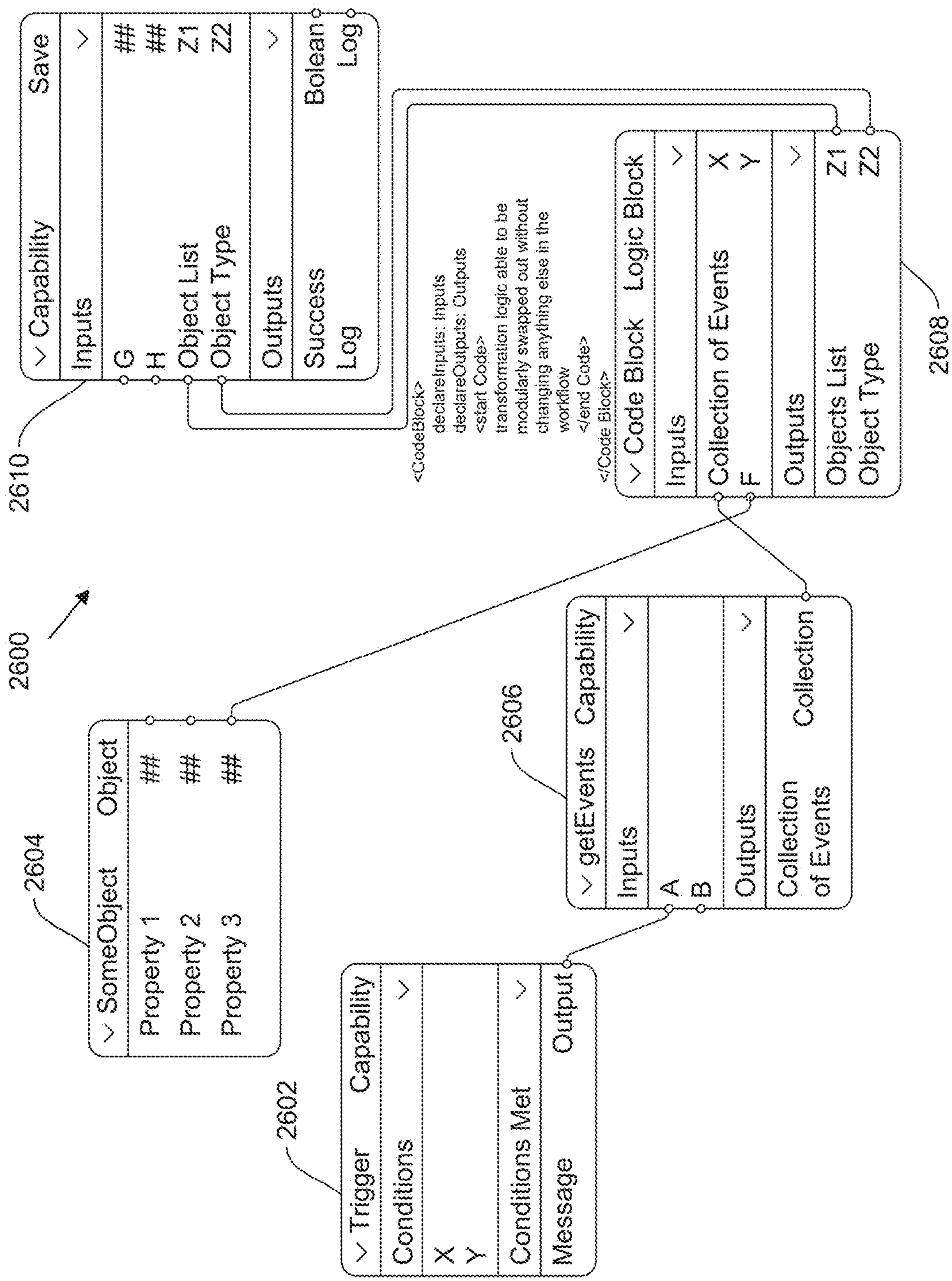

FIGS. 25 and 26 illustrate example workflows within an EM environment, emphasizing how declaratively defined workflows can orchestrate complex, dynamic processes by leveraging SKL-defined components such as Triggers, Capabilities, Objects, and Logic Blocks (e.g., an instance of CodeBlock object or LogicalExpression object that is executed by an "executeLogicBlock" capability which can use a capability switch to route the execution of the logic block to different runtimes based on how the logic is expressed).

In FIG. 25, a simplified workflow 2500 begins with an OnCreate node 2502, which serves as a trigger-executed when a particular event or condition initiates the workflow. Upon triggering, two parallel actions are launched: the Prompt block 2504, representing an Object spec (e.g., user-generated input or metadata), and the findAll block 2506, which represents a Capability that queries or retrieves relevant data. The results from both the Object and the Capability blocks are funneled into a logicBlock 2508, a node that performs programmable logic or data transformation. The output of this logic is passed to a final Save block 2510, likely another Capability, which persists the results or updates the system state. This workflow highlights the Enterprise Mesh's ability to declaratively define sequences of steps that are executable, interpretable, and maintainable by both human users and AI agents.

FIG. 26 presents a more detailed embodiment of a workflow 2600, composed of semantically distinct nodes and edges, each grounded in executable SKL Specs. The flow starts with a Trigger node 2602, which may include conditional logic (e.g., conditions X and Y) evaluated to determine when the workflow should activate. Once triggered, the flow branches to a SomeObject node 2604—an instance of an SKL Object—containing structured data fields. These data values are passed to the getEvents block 2606, a Capability node that likely queries or filters events based on the object properties.

The result is then sent to a Logic Block 2608, which allows for transformation logic written in code (e.g., Python, Rust, or domain-specific expressions). This node demonstrates the modularity of logic blocks within the mesh architecture—they can be dynamically swapped without disrupting other elements. The output of the logic block is passed to a downstream Capability node 2610, which is configured to accept the transformed data and execute a final action (e.g., persist the result, issue a notification, or trigger an additional process). Inputs to this capability may include the filtered or transformed object list (Z1) and an object type (Z2), with outputs such as a success Boolean and an execution log.

Figure 27:
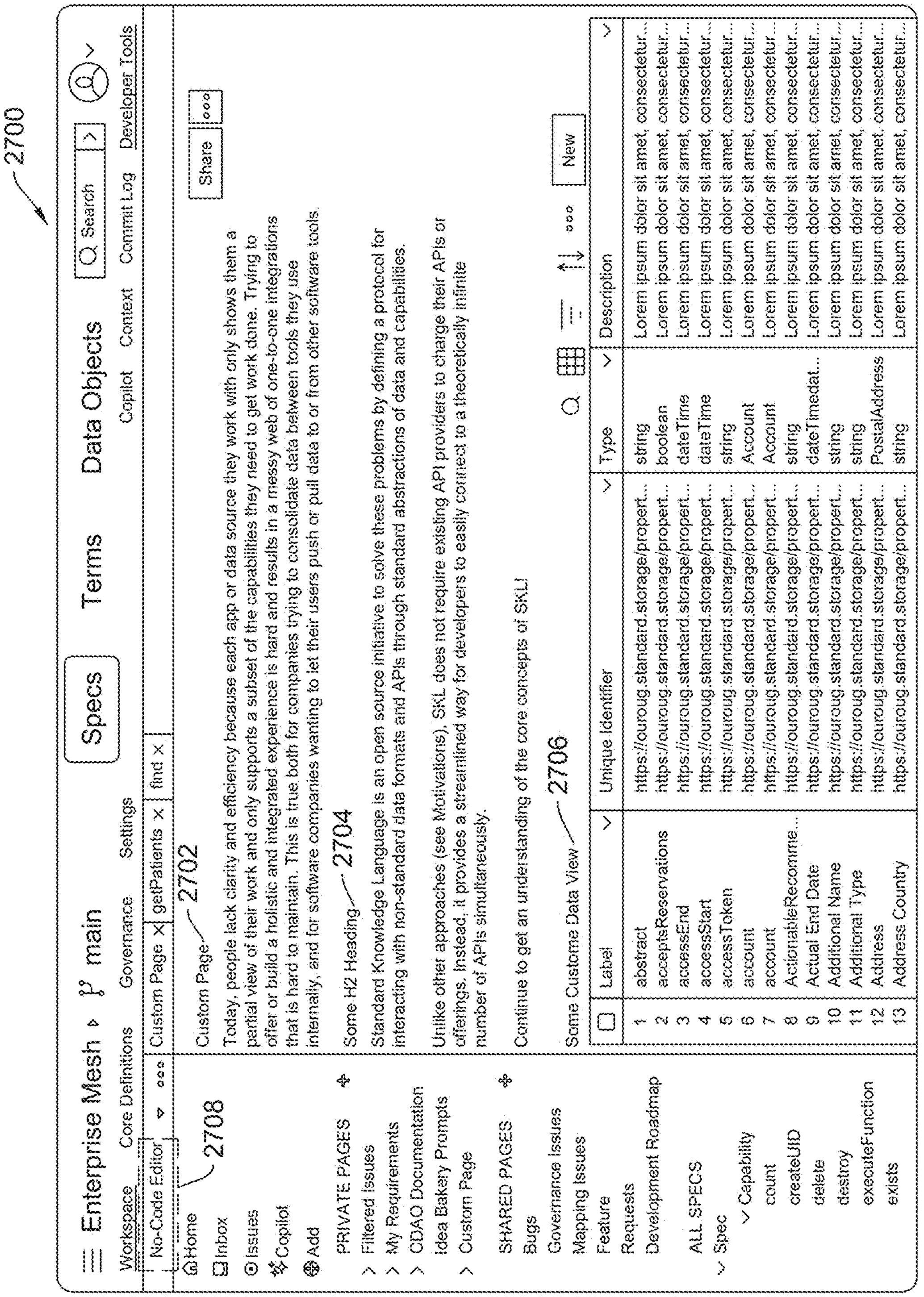
FIGS. 27-29 illustrate various user interface tools and editors for interacting with the mesh or creating SKL specifications, in accordance with an embodiment.

FIG. 27 illustrates an example user interface of the Enterprise Mesh Platform 2700, a schema-driven digital environment designed to create, manage, and evolve semantic specifications—referred to as SKL Specs—across distributed systems. FIG. 27 shows a visual instance of a "Page" Spec, rendered within a no-code editing environment that empowers users, including both technical and non-technical stakeholders, to collaboratively define and curate specifications in a flexible, editable format.

The interface comprises several key regions. A navigation sidebar 2708 allows users to move between sections such as Home, Issues, Copilot, and a curated list of Private and Shared Pages, including project-specific entries like "MyOrg Documentation" or "Governance Issues." This structure reflects how the platform can organize SKL-based entities into modular domains or views tailored to user needs.

At the center of the page is a title 2702, titled "Custom Page," where users may describe or define semantic content, guidance, or contextual documentation. Below the main heading is a subheading, header 2704, followed by supporting text—indicating how SKL and the Enterprise Mesh ecosystem can unify fragmented data views across tools and APIs.

Embedded within the page is a structured data table 2706, labeled "Some Custom Data View." This table shows an instance of SKL Specs rendered as rows and columns, where each entry includes a label, unique identifier, type, and description. For example, the entry "accessToken" links to its URI and indicates a string type, showcasing how specifications are stored as structured, linked data—interpretable by both humans and systems.

This editable page illustrates how the Enterprise Mesh Platform 2700 supports collaborative authoring of SKL Specs by abstracting away complexity. The visual document behaves both as a human-readable knowledge artifact and as a machine-readable semantic object. In doing so, it allows federated teams to document, evolve, and govern specifications (including Objects, Capabilities, Policies, Interfaces, and Mappings) with version control, reuse, and auditability built in. This environment bridges the gap between traditional static documentation and dynamic, runtime-executable architectural logic.

Figure 28A:
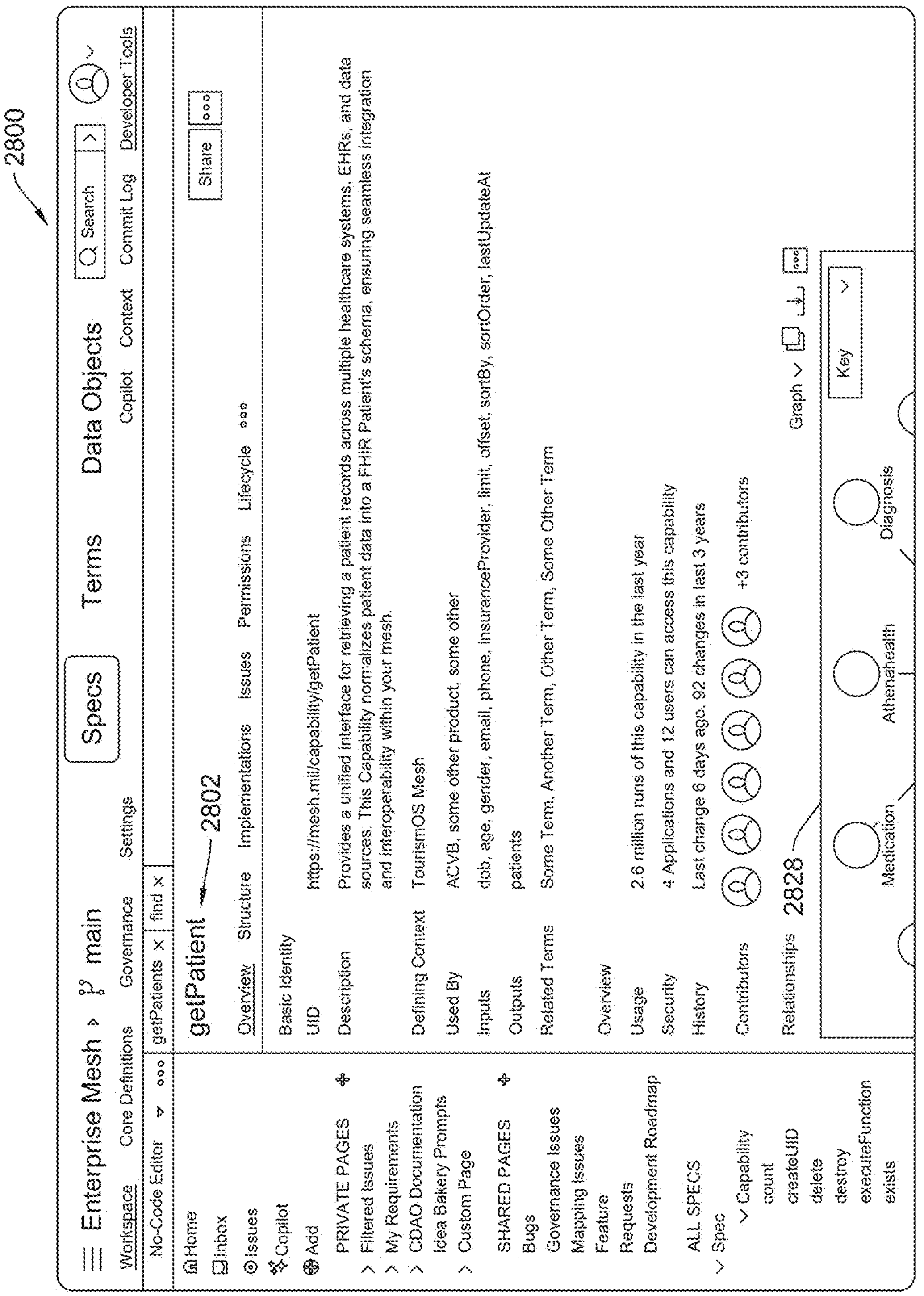

FIG. 28A illustrates a non-limiting example user interface of an Enterprise Mesh Platform 2800 (e.g., the Enterprise Mesh Platform 2700 of FIG. 27) where a user is viewing and managing a specific Capability Spec—in this case, the SKL-defined entity labeled getPatients 2802. This graphical user interface provides an interactive environment for examining the structure, lifecycle, usage, and semantic relationships of the selected object within the larger mesh.

In this embodiment, the getPatients capability is rendered by the analytics server with an emphasis on linked semantics and declarative governance metadata. As shown on the GUI of the Enterprise Mesh Platform 2800, the platform surfaces structured semantic documentation, including purpose, motivation, rationale, usage guidelines, applicability, evaluation criteria, and other justifying metadata consistent with the SKL Specification format. These fields support validation, discovery, and/or contextual integration across the Enterprise Mesh.

A Relationships graph 2828 visually maps the connections between the current object and other related entities within the mesh, such as "Diagnosis," "Medication," and "Encounter." These links represent semantic associations between SKL Specs and enable downstream systems to interpret, traverse, and act upon the graph dynamically.

Figure 28B:
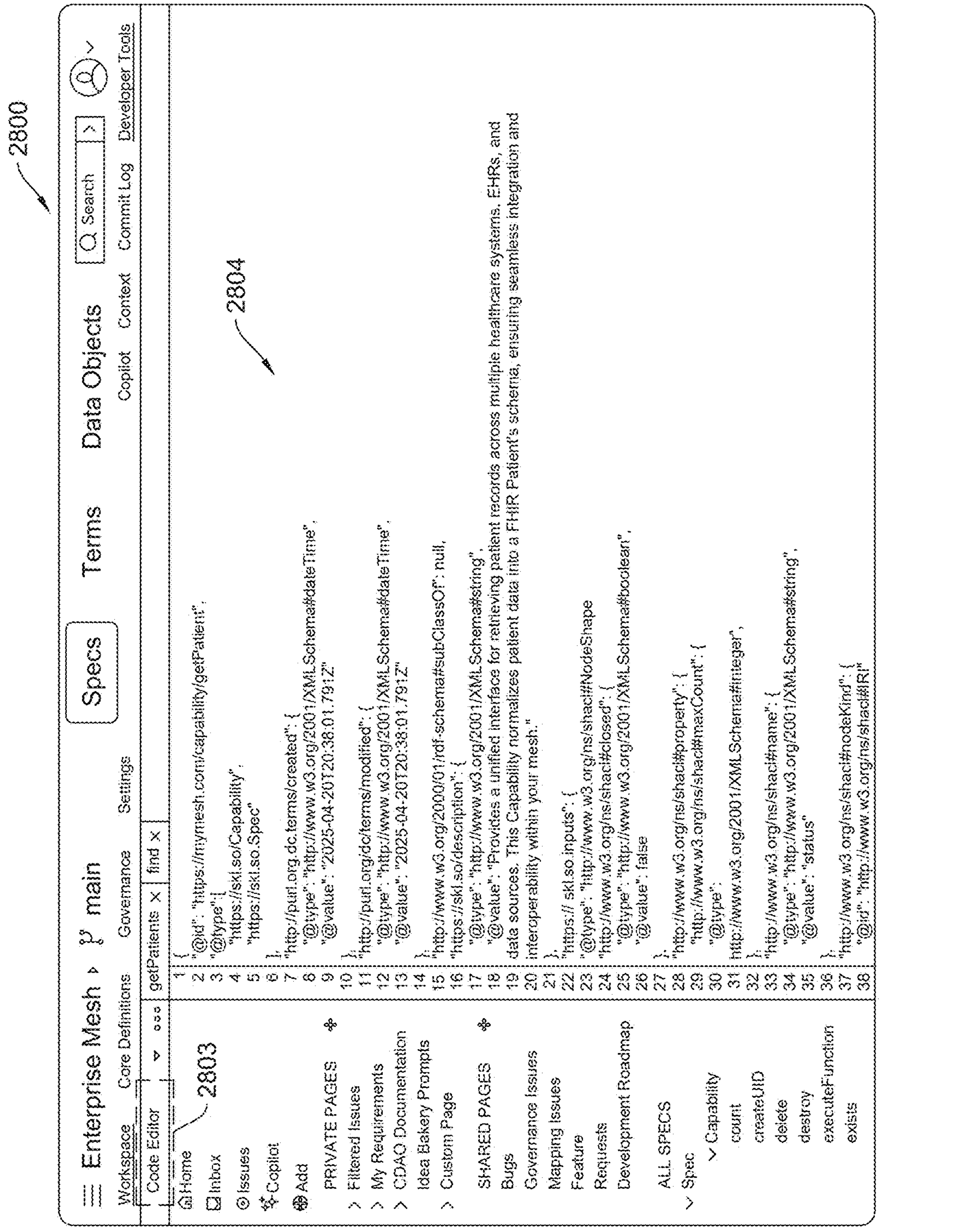

FIG. 28A and FIG. 28B both show the same schema, and also demonstrate how the Enterprise Mesh Platform itself is a platform that helps manage SKL Specifications. The Enterprise Mesh Platform is itself configured using the same SKL specification primitives that it manages (e.g., it is modeled as a skl:Product with objects, capabilities, workflows, policies, etc.). This illustrates the recursive architecture of the Enterprise Mesh Platform 2800 and its capability to self-represent and self-adapt at varying levels of the architecture using the same semantically-governed infrastructure it provides to users. The user interface seen here is declaratively defined and rendered using SKL specs and can be reconfigured at runtime without requiring changes to underlying code. This allows organizations to dynamically tailor the Enterprise Mesh Platform 2800 interface for specific stakeholder roles, such as schema designers, product managers, integration engineers, or data stewards—each of whom may prefer different representations, editing modes, and/or linked toolchains.

FIG. 28A and FIG. 28B demonstrate how the Enterprise Mesh Platform 2800 supports multiple views of the same specification, thereby accommodating users with varying technical proficiency. In the illustrated embodiment, the user has selected the "Code Editor" mode via a dropdown 2803 in a workspace navigation pane, causing the system to render the Spec—here labeled "getPatients"—as structured code in the SKL format. The editable body 2804 displays a machine-readable schema composed of RDF/OWL class declarations, URI references, and SHACL shapes, which collectively define the entity's identity, structure, and relationships.

The dual-view capability—visualized across FIG. 28A and FIG. 28B—illustrates the ability of the Enterprise Mesh Platform 2800 to toggle between human-friendly documentation and the machine-executable specifications that makeup the define actual system definitions. This approach enables business stakeholders to engage with specifications in a no-code interface, while simultaneously allowing architects, developers, or AI agents to engage directly with the code-level SKL Specs for advanced logic, automation, or integration workflows.

Altogether, FIG. 28A and FIG. 28B demonstrate how the Enterprise Mesh Platform 2800 provides not just a registry of specifications, but an operational environment-one that enables governance, interoperability, analytics, and execution logic to evolve from linked semantic artifacts in a knowledge graph, according to an embodiment. The getPatients example illustrates how domain-specific healthcare data models can be represented as modular SKL Specs and composed into workflows, APIs, or governance policies without requiring code rewrites or rigid schemas.

Figure 29:
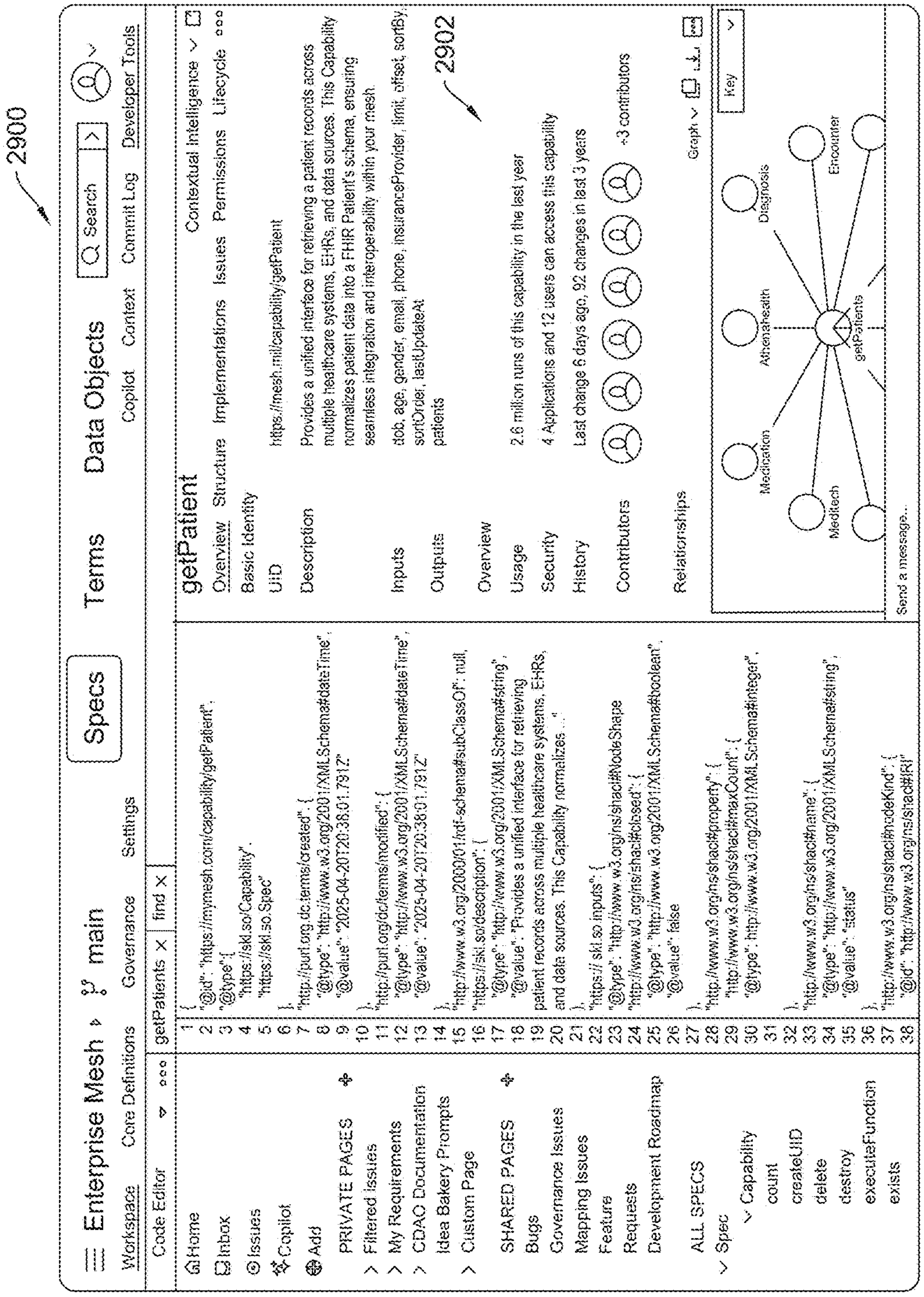

FIG. 29 illustrates another embodiment of the getPatient Spec editing interface within an Enterprise Mesh Platform 2900, illustrating the code-based representation of a semantic specification with a contextual panel 2902 that can facilitate coding workflows over a spec while being able to access relevant information from other specs (e.g., related specs, specific implementations, access controls, other versions, activity events, etc.). In this way, FIG. 29 illustrates a continuation of the interface shown in FIG. 28B, further illustrating the contextual responsiveness of an Enterprise Mesh Platform 2900, which may be similar to the Enterprise Mesh Platform 2800 of FIG. 28A.

Whereas FIG. 28B focused on demonstrating the code editor view of a semantic specification, FIG. 29 introduces an additional dimension of interactivity: a contextual panel 2902 that dynamically surfaces information and tools relevant to the current Spec or user interaction. FIG. 29 reveals a non-limiting embodiment of how contextual intelligence can used by a user to access contextually relevant information around a given piece of electronic content.

In this embodiment, the system is still displaying the SKL code definition for the "getPatients" capability, as shown in the Enterprise Mesh Platform 2900, but now also renders a contextual pane on the right. This pane is tailored to the active specification and workspace activity, enabling the user to visualize structured metadata, schema documentation, live relationship graphs, recent changes, usage history, contributors, and more—all in real time.

The contextual panel 2902 offers rich semantic overlays and tooling extensions that adapt based on the user's current focus, providing quick access to auxiliary functions such as commit/change logs, comment threads, AI copilot recommendations, dependency analysis, or domain-specific developer tools. For instance, in the current view, the right-hand panel surfaces a well-structured overview of the capability's UID, description, inputs, outputs, security policies, usage metrics, and contributor history, as well as a relationship graph linking the capability to other associated Specs such as "Medication," "Diagnosis," or "Encounter."

This feature improves situational awareness during specification editing or review, allowing users to reason about a given spec not only in isolation but also in the broader semantic, technical, and collaborative context of the Enterprise Mesh.

Figure 31:
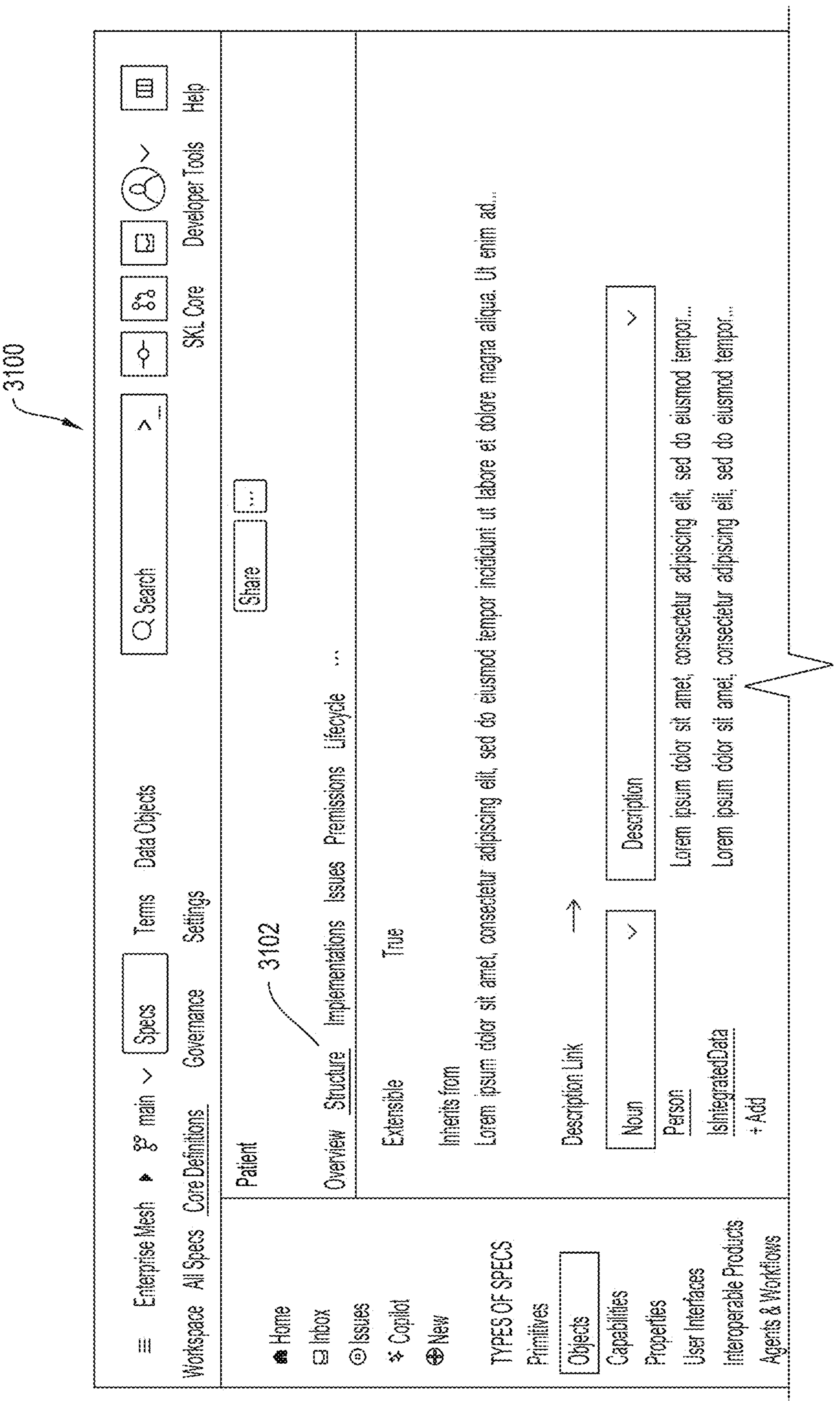
Figure 31:
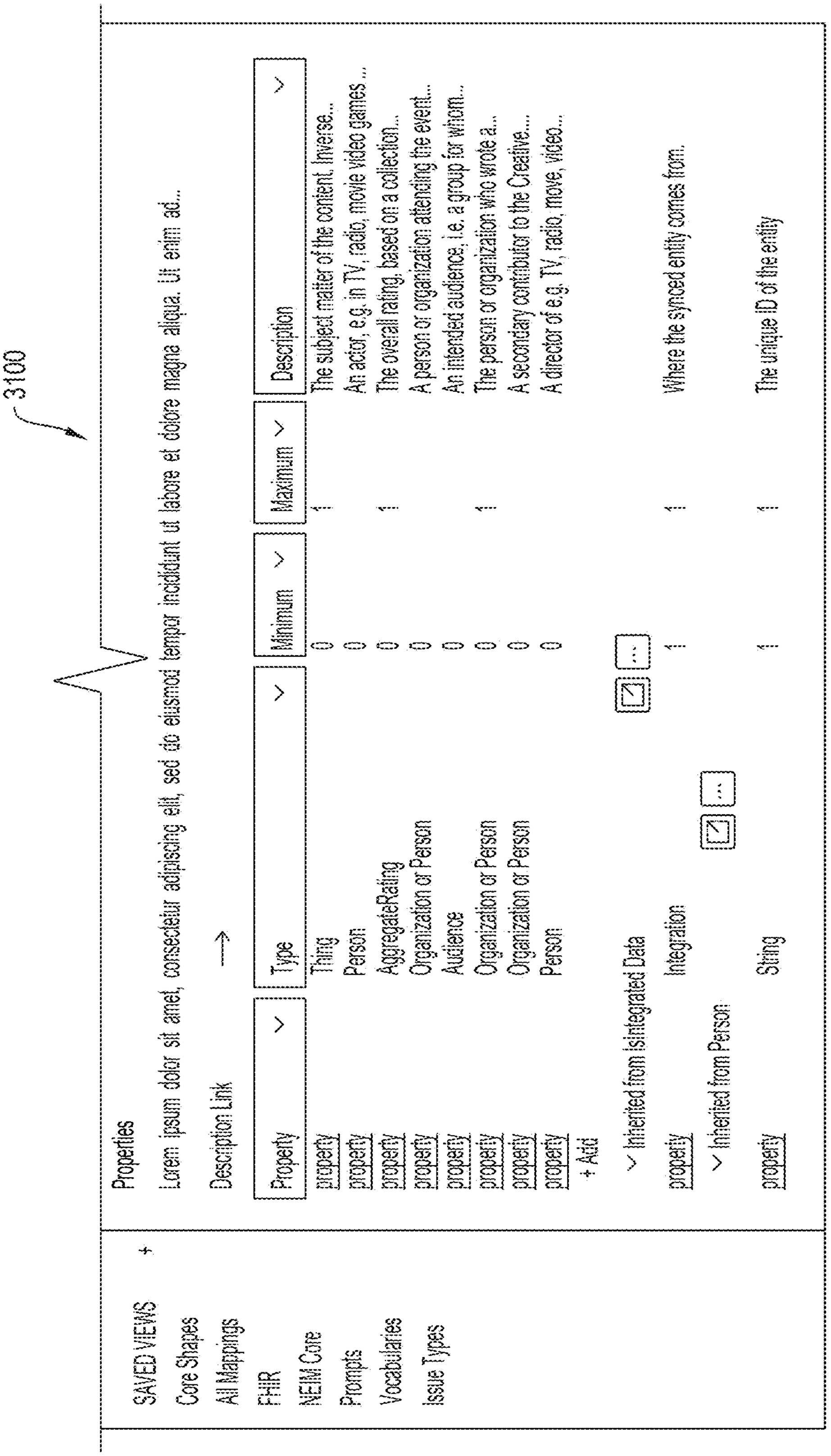

FIG. 30 illustrates an example view of an object specification—specifically, a Patient object—within an Enterprise Mesh Platform 3000, which may be substantially similar to the Enterprise Mesh Platform 2900. FIG. 31 demonstrates how the same semantic entity can be represented in an alternate user interface that may be tailored for a different user persona, organizational role, or workflow context. While the core identity, relationships, and semantic structure of the spec remain constant, the layout and available tools adapt dynamically based on user permissions, workstream, or configuration. In this example, the analytics server is presenting a "Core Definitions" tab (e.g., rather than a Governance, or Settings, or general Workspace tab) to manage specific entities in the mesh.

A navigation bar provides access to various information categories associated with the selected Spec, including Overview 3004, Structure 3006, Implementations 3008, Issues 3010, Permissions 3012, and Lifecycle 3014. Each tab leads to a different semantic facet of the object.

Below the title, the Basic Identity section shows the unique identifier (e.g., a UID 3016) for the fhir:Patient Spec, alongside a contextual reference (e.g., a Context 3018) and a Description 3020 of its function. For example, the text explains that this Spec acts as a unified interface for retrieving normalized patient records from distributed systems and aligns them with the FHIR (Fast Healthcare Interoperability Resources) schema, ensuring seamless integration across electronic health records (EHRs) and data sources.

An Overview section shows dynamic system-level telemetry, such as Usage 3022 (e.g., number of instances in use), Security 3024 (e.g., number of users and applications with access), and History 3026 (e.g., when it was last changed and how frequently). A Contributors section lists users who have edited or authored the Spec, highlighting collaborative authorship and traceability—two hallmarks of SKL's versioned, auditable model.

A navigation bar provides access to various information categories associated with the selected Spec, including Overview 3004, Structure 3006, Implementations 3008, Issues 3010, Permissions 3012, and Lifecycle 3014. Each tab leads to a different semantic facet of the object.

Below the title, the Basic Identity section shows the unique identifier (e.g., a UID 3016) for the fhir:Patient Spec, alongside a contextual reference (e.g., a Context 3018) and a Description 3020 of its function. For example, the text explains that this Spec acts as a unified interface for retrieving normalized patient records from distributed systems and aligns them with the FHIR (Fast Healthcare Interoperability Resources) schema, ensuring seamless integration across electronic health records (EHRs) and data sources.

An Overview section shows dynamic system-level telemetry, such as Usage 3022 (e.g., number of instances in use), Security 3024 (e.g., number of users and applications with access), and History 3026 (e.g., when it was last changed and how frequently). A Contributors section lists users who have edited or authored the Spec, highlighting collaborative authorship and traceability-two features of SKL's versioned, auditable model.

The graphical user interface of the Enterprise Mesh Platform 3000 includes an interactive visualization 3028 of related specifications—such as approveInsuranceClaim, evaluateRisk, and scheduleAppt—providing an Enterprise Mesh (e.g., knowledge graph) perspective on the patient entity's position within the broader mesh.

FIG. 31 presents a view of the Patient object specification within an Enterprise Mesh Platform 3100 (which may be substantially similar to the Enterprise Mesh Platform 3000), this time with the "Structure" tab 3102 selected. Unlike FIG. 30 which emphasized collaborative metadata and semantic relationships, this view surfaces the underlying schema definition—the actual structural model that governs how conforming instances of the Patient class are represented and validated within the mesh.

In this embodiment, the platform renders the formal structure of the object, including the types of data elements (referred to here as "properties"), their expected types or shapes, and cardinality constraints such as minimum and maximum occurrences. These properties may include primitive fields, references to other objects, or compositional patterns such as inherited traits. For example, the Patient class inherits structural attributes from both the Person and IsIntegratedData specifications, reflecting modular reuse and polymorphism via semantic mixins. These mixins may encode reusable structural or behavioral templates and are compiled into the target object to produce a flattened, enriched shape at runtime.

Each property row is defined with explicit constraints and accompanying documentation fields, to allow instances to be validated consistently and then semantically interpreted downstream. This structural definition may be consumed by the analytics server, validation engines, data ingestion pipelines, SDK generators, or runtime transformation engines within the mesh.

Together with FIG. 30, FIG. 31 illustrates the dual nature of SKL specs: they are simultaneously collaborative knowledge artifacts for coordination across teams (as shown in FIG. 30), and machine-readable definitions that enforce conformance, enable code generation, and drive system behavior. This separation of concerns—between the schema as a social object and the schema as a formal structure—is a foundational element of the Enterprise Mesh Platform's approach to semantic specification and distributed governance.

Figure 32:
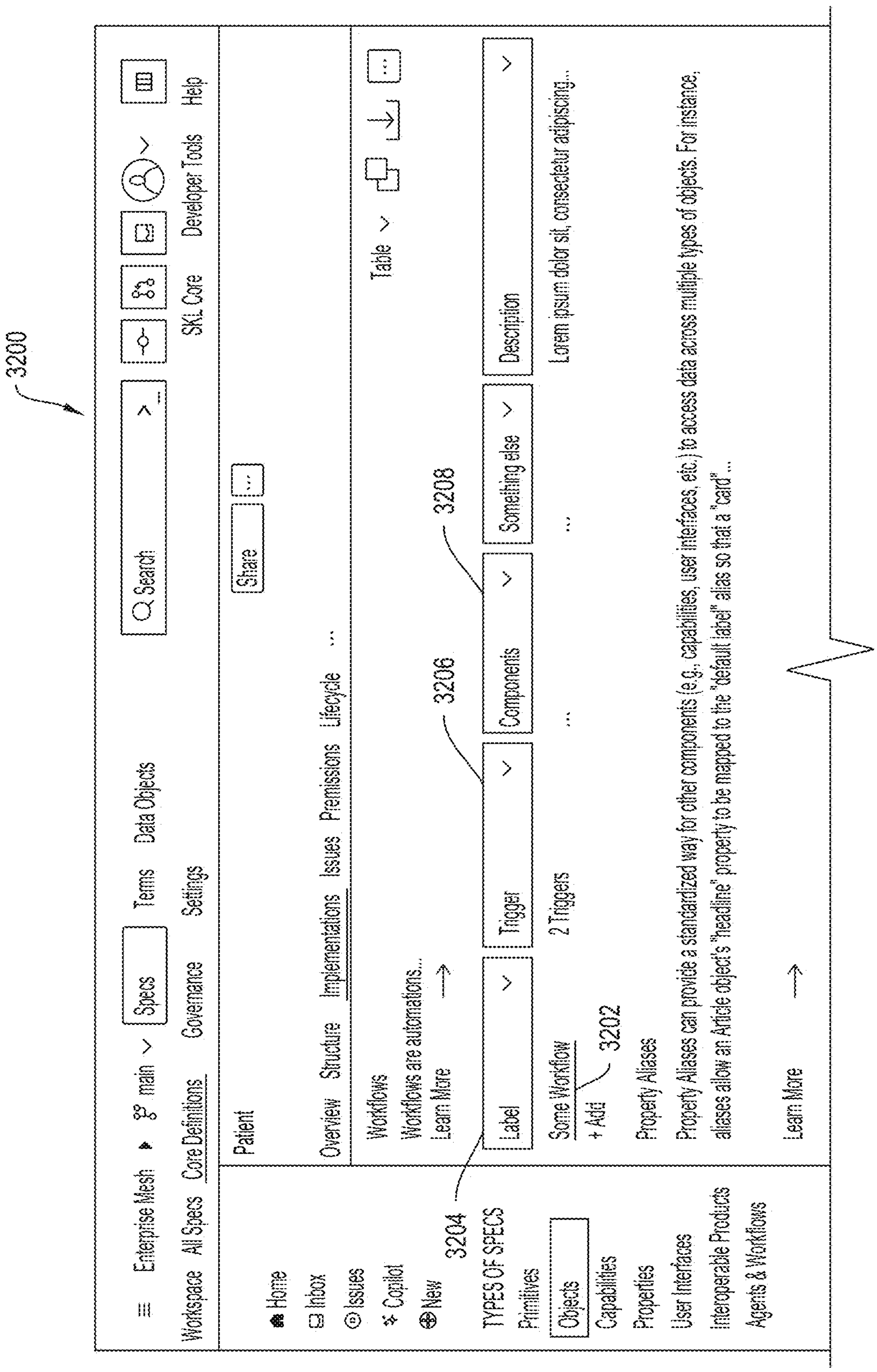
FIGS. 32-37 show graphical representations of capability configurations, mappings, and workflow declarations, in accordance with an embodiment.
Figure 32:
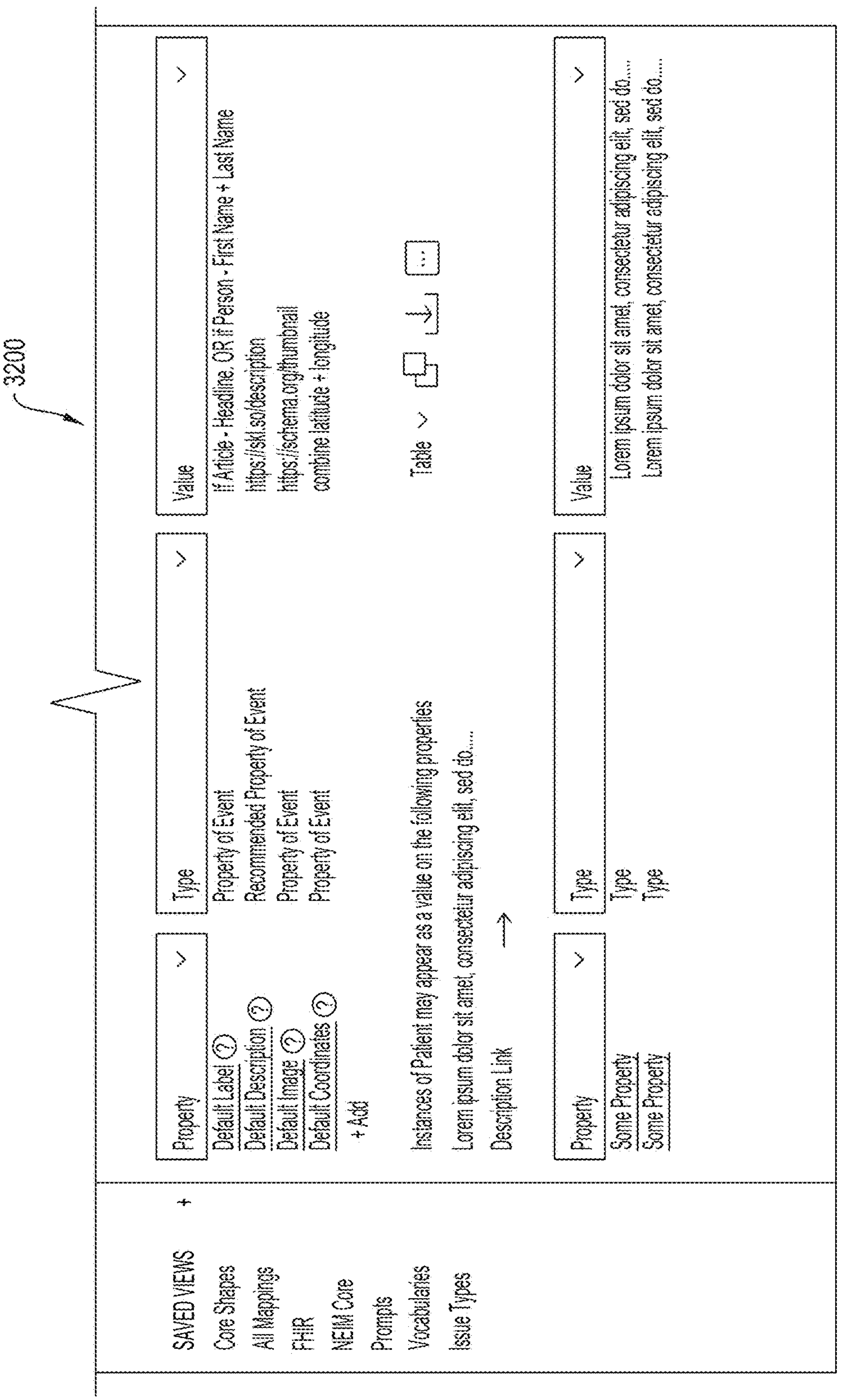

FIG. 32 continues the description of the Patient object specification within an Enterprise Mesh Platform 3200, which may be substantially similar to the Enterprise Mesh Platform 3100 of FIG. 31, now highlighting the "Implementations" tab. This view reveals how the Patient object is operationalized—specifically, how it is referenced, consumed, and interacted with by other specifications or executable processes across the mesh.

The Enterprise Mesh Platform 3200 may include a section labeled "Workflows" that lists automation logic (e.g., Some Workflow 3202) that is relevant to the Patient spec (e.g., any workflow with nodes that creates, updates, references, etc. instances of Patient). Such workflows may be programmatically triggered when a given condition is met, such as when Patient entity is created, updated, or used in a defined process. Each workflow entry includes metadata such as a label 3204 of the workflow, a number of triggers 3206, linked components 3208, and/or a description of the workflow. These workflows are instances of skl:Workflow specifications and act as orchestrated runtime behaviors that integrate semantic elements like capabilities, objects, and logic blocks.

The Enterprise Mesh Platform 3200 may include a section titled "Property Aliases" that illustrate a pattern for standardizing the surface presentation of Patient fields across various specs. Aliases allow downstream consumers (such as graphical user interfaces or capabilities) to refer to a property in a normalized or context-sensitive way. For instance, a Default Label alias may resolve to a concatenation of First Name and Last Name if the patient is a person, or to a headline field if applied to a news article schema. This aliasing enables polymorphic reuse of generic components while maintaining domain specificity.

The final section enumerates properties across other specs in which a Patient instance may appear as a value. This shows dependency relationships—where other specs embed or refer to Patient entities as part of their own definition. For example, a Clinical Encounter object or a Diagnostic Report capability might include Patient as a required or optional field. Each entry in this section defines the relationship type, source spec, and description, allowing users to understand and audit how the schema propagates across the mesh.

Figure 33:
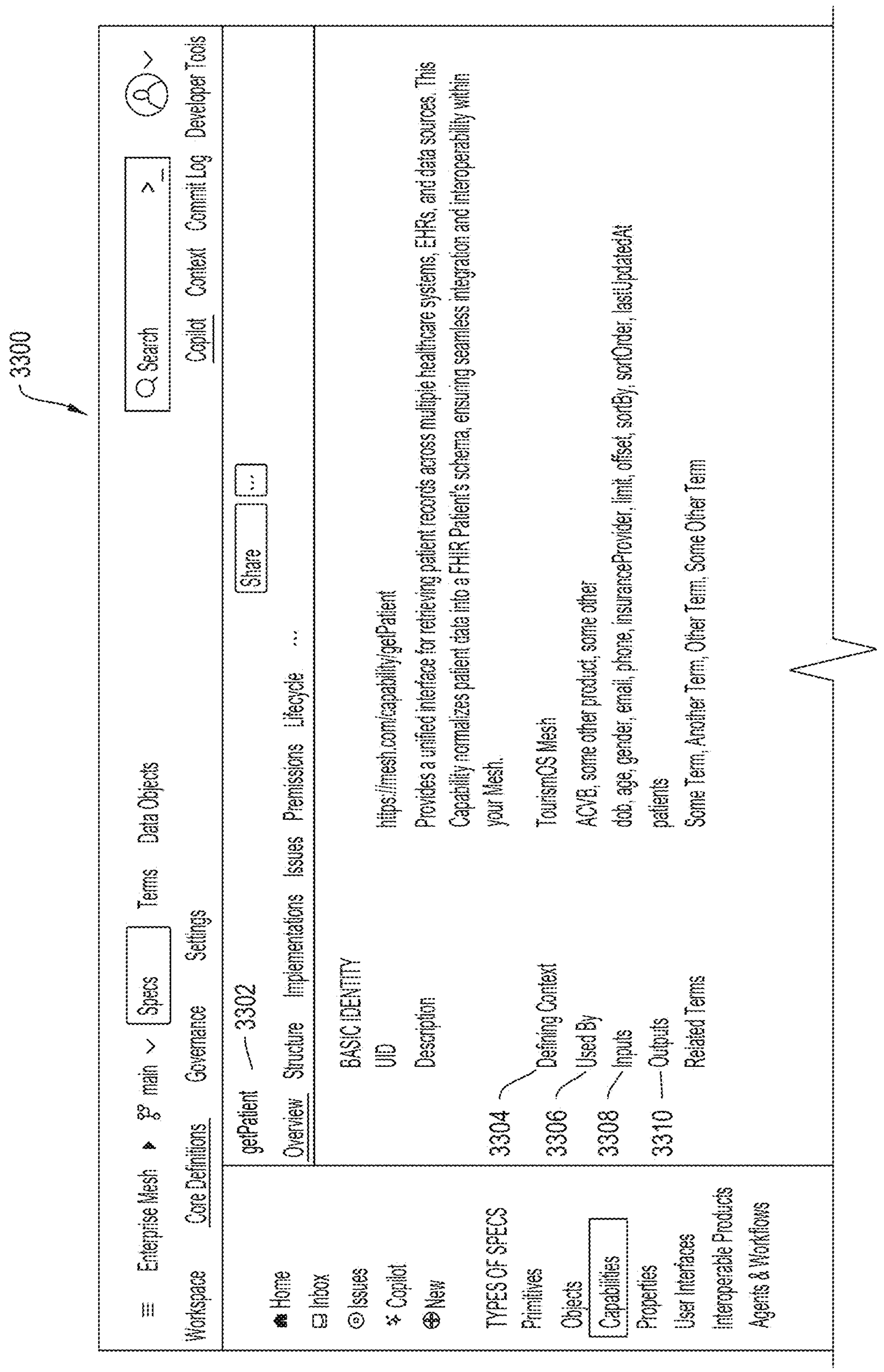
Figure 33:
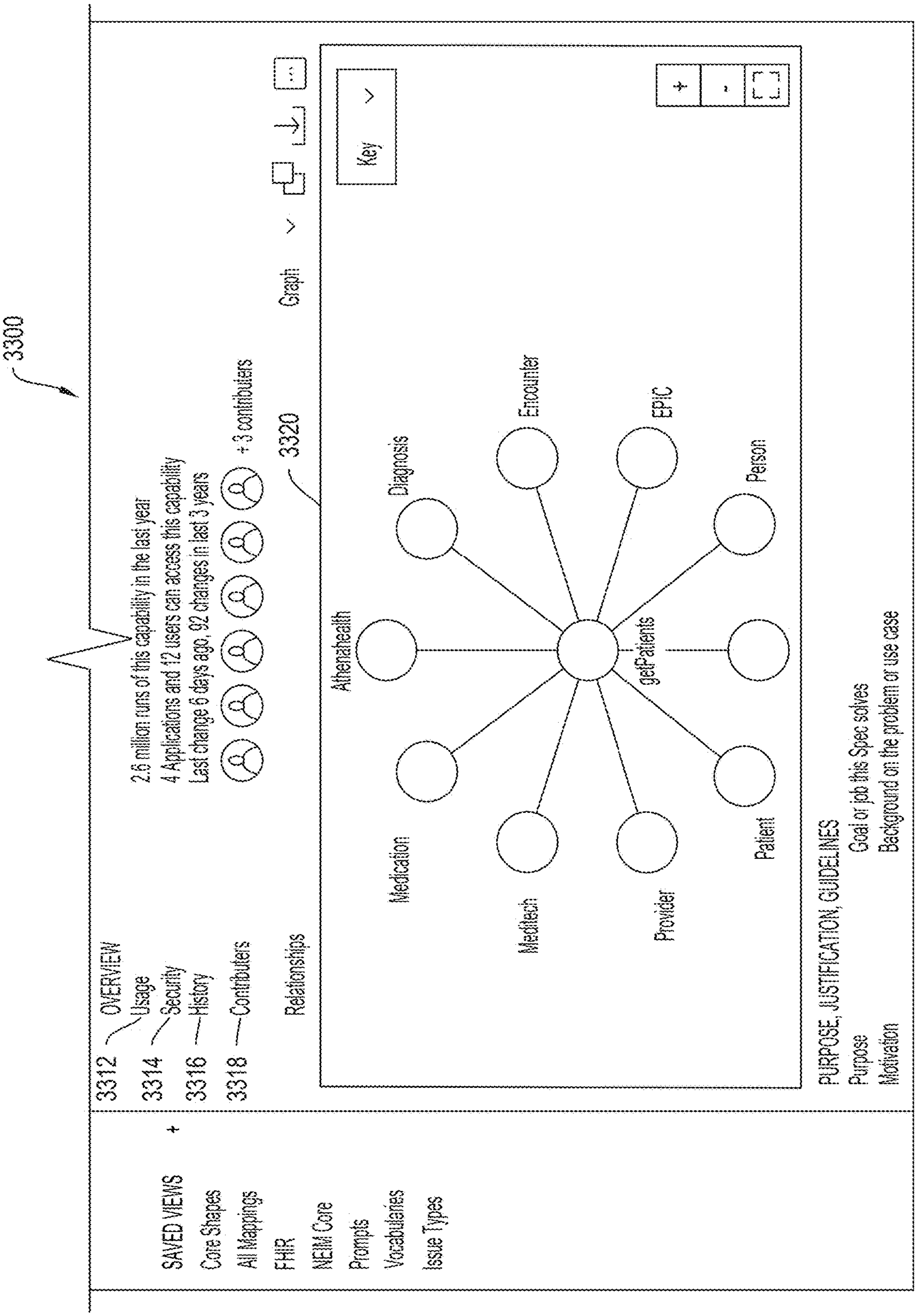

FIG. 33 illustrates a representative example of a capability specification rendered within an Enterprise Mesh Platform 3300. In this embodiment, a semantic capability 3302 labeled "getPatient" is displayed as an instance of an SKL: Capability specification. The figure highlights how such capabilities are defined, visualized, and managed as first-class schema objects within the mesh architecture, enabling teams to collaboratively design, version, and orchestrate operational logic across distributed systems.

The interface includes metadata fields that describe the capability, such as the definition and its contextual scope 3304, which may reference the schema or namespace to which it belongs. These attributes provide semantic anchoring and modularity. A status badge 3306 is also shown, representing the lifecycle state of the capability—such as Draft, Live, Deprecated, or Archived—which helps users and agents interpret its readiness and usage constraints during orchestration. Structured input parameters 3308 and output parameters 3310 are formally declared, referencing linked SKL specifications (e.g., objects, enums, or mappings) to ensure typed and validated invocation semantics.

Additional interface elements on the page include usage telemetry 3312, security access permissions 3314, and contribution history 3316. These elements allow users and agents to track operational activity, access control enforcement, and authorship lineage, respectively. An execution contract viewer 3318 is also rendered, enabling users to inspect or simulate the formal execution interface—such as expected payloads or integration hooks—associated with the capability. To further contextualize its role within the broader mesh, a relationship graph 3320 is presented, illustrating how the getPatient capability connects to other specifications such as Person, Provider, Encounter, Diagnosis, and Medication. This semantic graph view enables developers and agents to reason about dependencies, impact, and data flow throughout the enterprise mesh.

Figure 34:
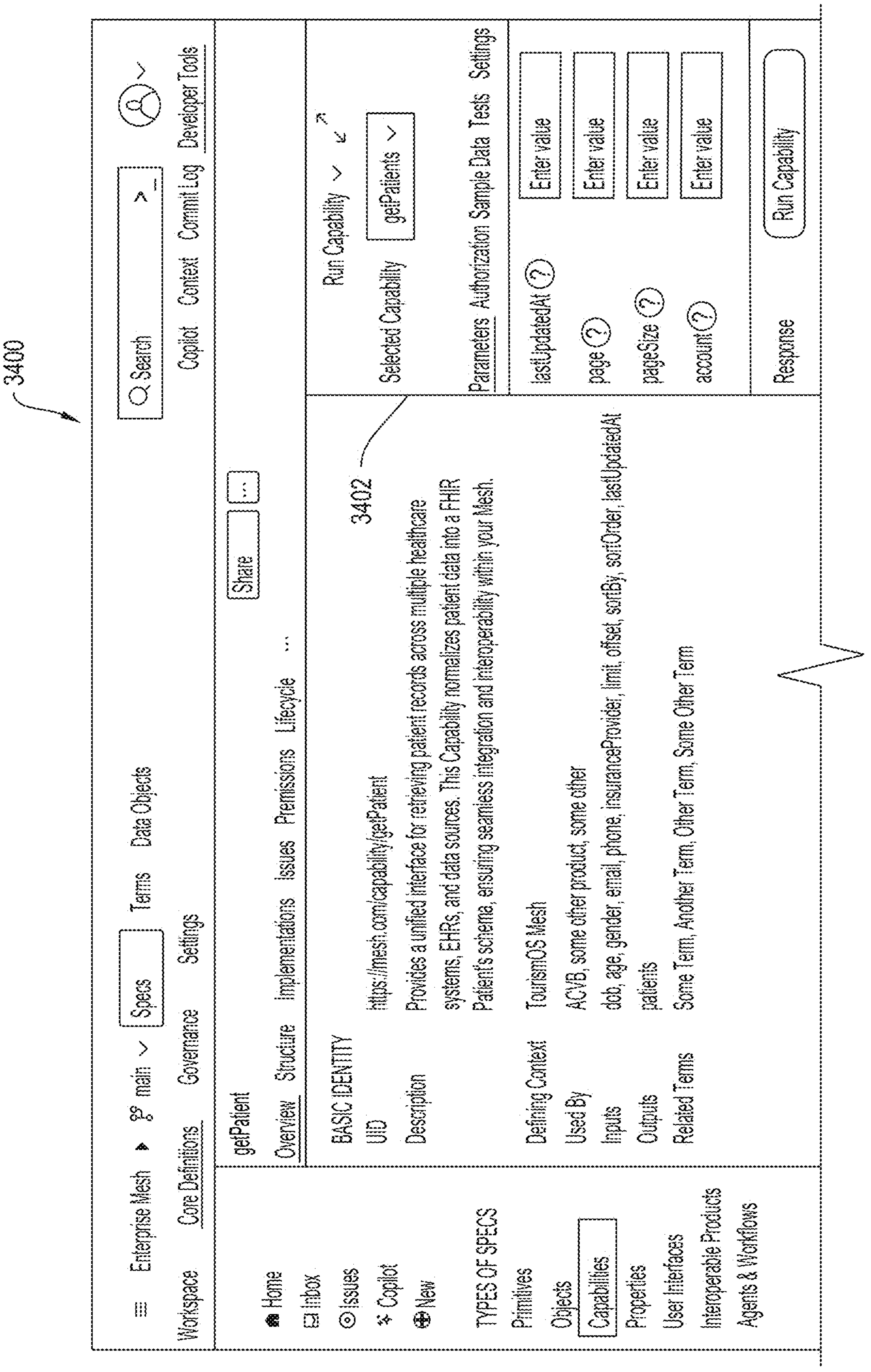
Figure 34:
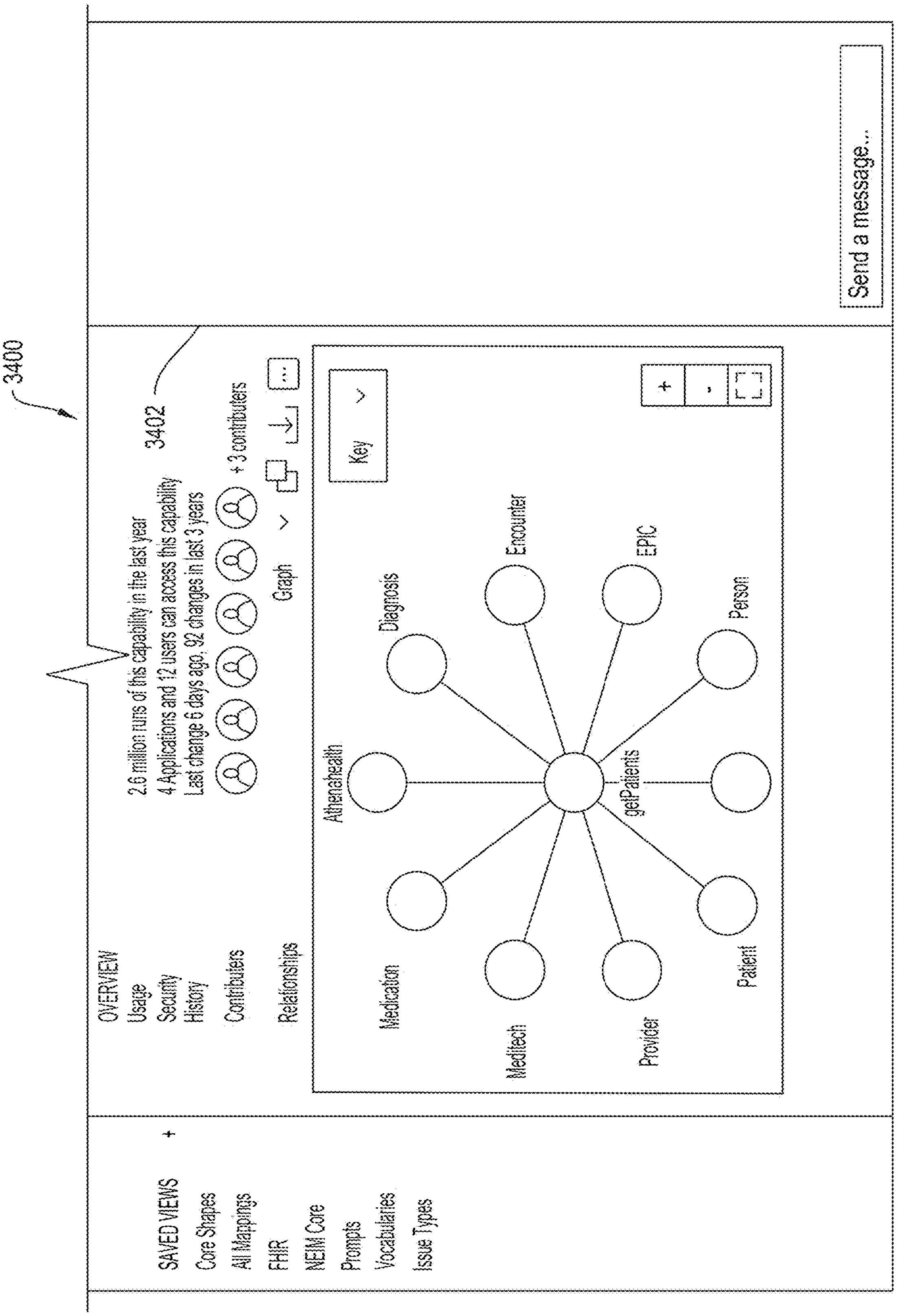

FIG. 34 illustrates a continuation of the getPatient capability spec view within an Enterprise Mesh Platform 3400, which may be substantially similar to the Enterprise Mesh Platform 3300. In this embodiment, a contextual panel 3402 is expanded to expose developer tooling. In some embodiments, this contextual panel may dynamically adapts based on the selected spec and user role, offering advanced functionality such as runtime capability testing, parameter validation, commit inspection, and intelligent assistant tools among other extensible and configurable options.

In some embodiments, the contextual panel 3402 is set to an interface for invoking semantic capabilities directly from the UI. The selected capability, getPatients, is displayed alongside a structured parameter entry form. Input fields include lastUpdatedAt, page, pageSize, and account, each corresponding to a parameter formally defined in the capability's SKL Spec. These inputs are dynamically rendered and type-validated based on their underlying semantic definitions, and the user can execute the capability by clicking the "Run Capability" button, which would initiate a live call against the capability's execution path within the mesh.

This interactive interface enables developers, analysts, or system designers to explore, test, and debug capability specifications without writing code or directly interacting with an API client. As a result, users are empowered to iterate quickly on semantic designs, confirm capability behavior under different conditions, and validate input-output mappings—all while remaining in a unified interface of the Enterprise Mesh Platform 3400.

Compared to the prior embodiment in FIG. 33, which displayed the semantic metadata and interconnectivity of the getPatient capability, FIG. 34 illustrates how the platform enables execution and live interaction with those specs. In alternative embodiments, the contextual panel 3402 may support other developer-oriented tools such as logic trace visualizations, commit/change logs, copilot suggestions, or semantic diff viewers. This modular, context-sensitive tooling illustrates that the SKL specs are not merely documentation, but executable artifacts that can be inspected, tested, reused, and evolved throughout the development lifecycle.

Figure 35:
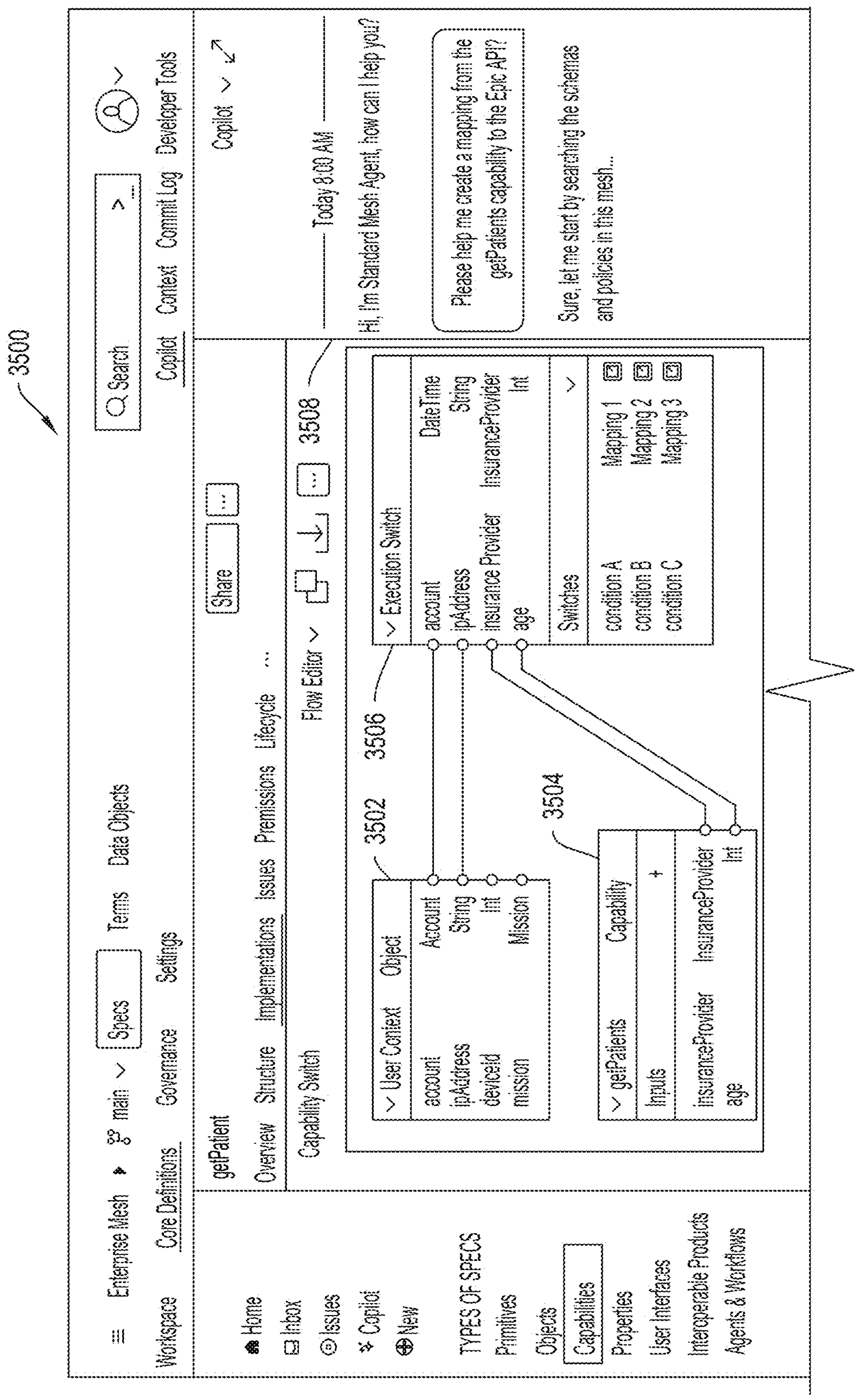
Figure 35:
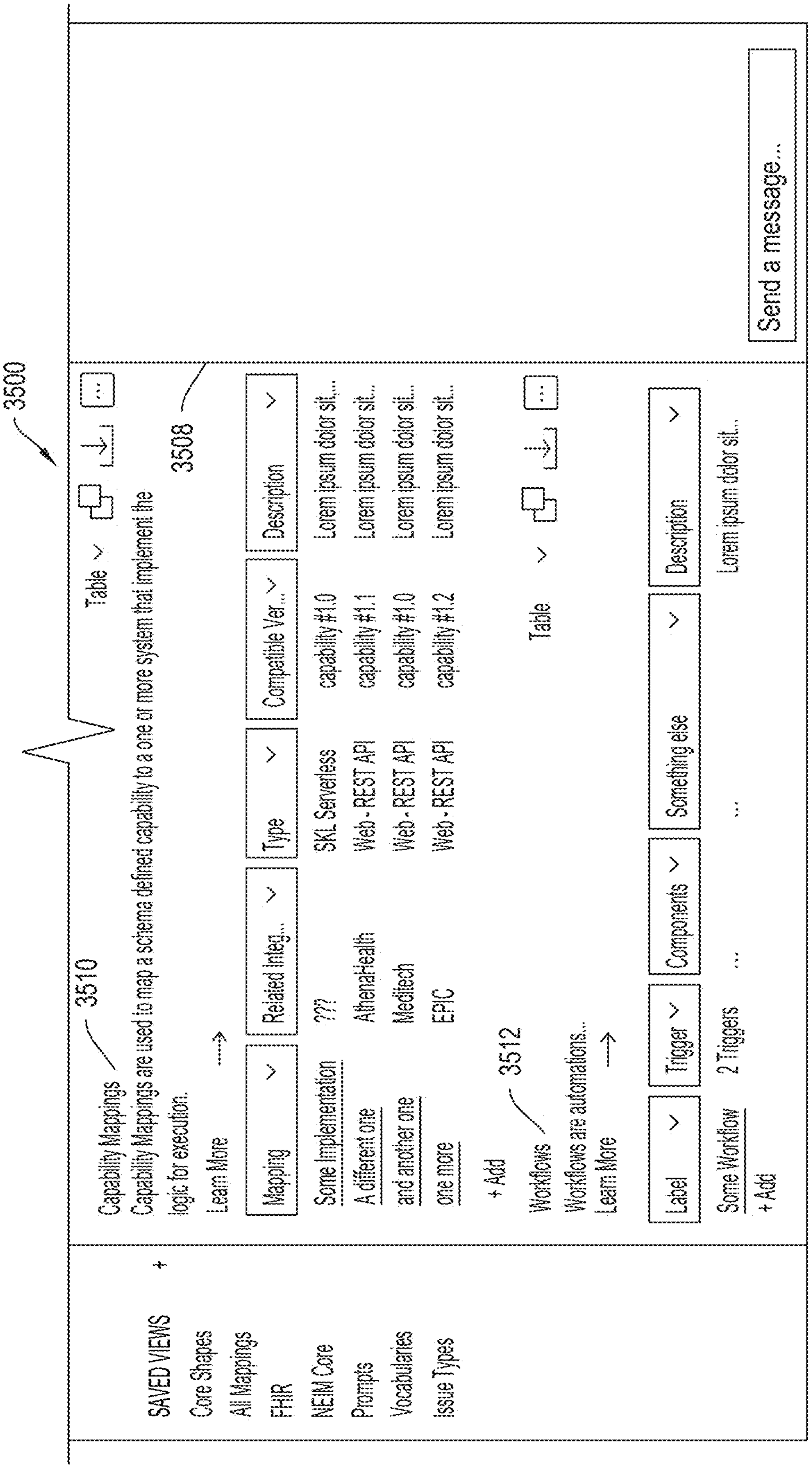

FIG. 35 depicts an implementation-centric view of a capability spec-specifically the getPatients capability—within the Enterprise Mesh Platform 3500, which may be substantially similar to the Enterprise Mesh Platform 3400. This embodiment illustrates how declaratively defined capabilities can be flexibly mapped to different runtime behaviors using constructs like execution switches, capability mappings, and conditional logic, including agentic processing. The view emphasizes how SKL Specs support modular, policy-aware orchestration through explicit mapping logic and semantic runtime resolution.

The Enterprise Mesh Platform 3500 may display a visual representation of a capability switch, which functions as a decision point that selects from multiple potential capability mappings based on contextual input data. In this example, the switch relies on an upstream User Context object 3502, which includes inputs such as account, ipAddress, and mission. These contextual values are fed into an Execution Switch 3506 alongside direct parameters from the capability 3504, such as insuranceProvider and age. Depending on the values of these inputs, the switch dynamically resolves the appropriate mapping path, invoking a downstream implementation of the capability.

Beneath this switch configuration is a list of Capability Mappings 3510, which enumerate specific runtime implementations for the getPatients capability. These mappings may point to REST APIs, SDK functions, serverless lambdas, or other system integrations. For example, some mappings may route requests to AthenaHealth®, Meditech®, or EPIC®, with each mapping versioned and semantically tied to a particular capability interface.

Also shown in this embodiment are references to SKL-defined workflows (e.g., workflow 3512) that consume or invoke the capability. These workflows act as orchestrations built from capabilities, objects, conditions, and logic blocks—providing traceable and reusable automation patterns that incorporate the spec as a runtime unit.

The Enterprise Mesh Platform 3500 may include a contextual panel 3508, revealing a copilot (e.g., an artificial intelligence) interaction interface. This conversational agent is capable of understanding and operating over the semantic mesh, enabling users to generate, refine, or navigate SKL specs using natural language. For example, a user may ask the agent to "create a mapping from getPatients to the Epic API," prompting the agent to search, propose, or draft the appropriate specification and linkage.

Figure 36:
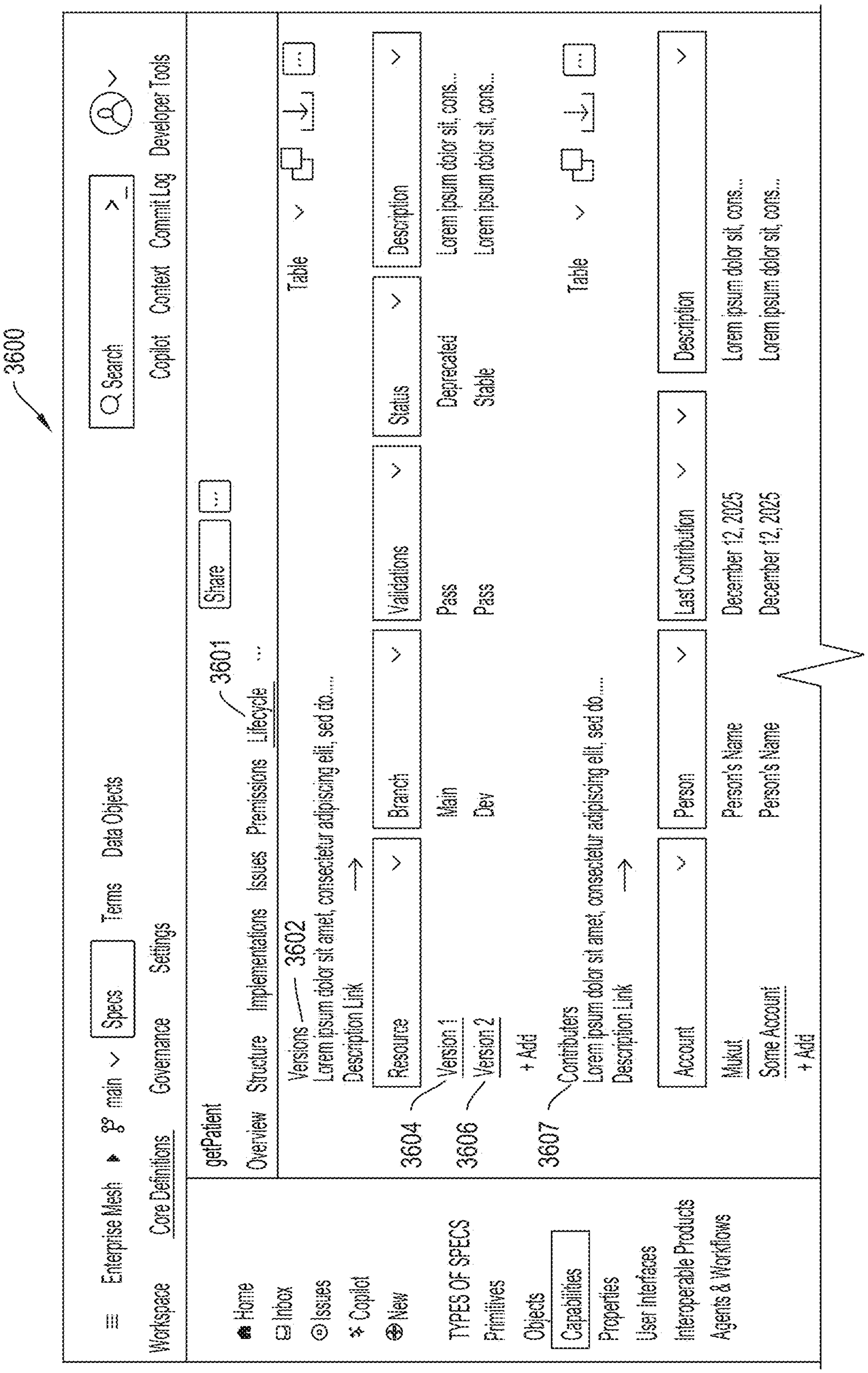
Figure 36:
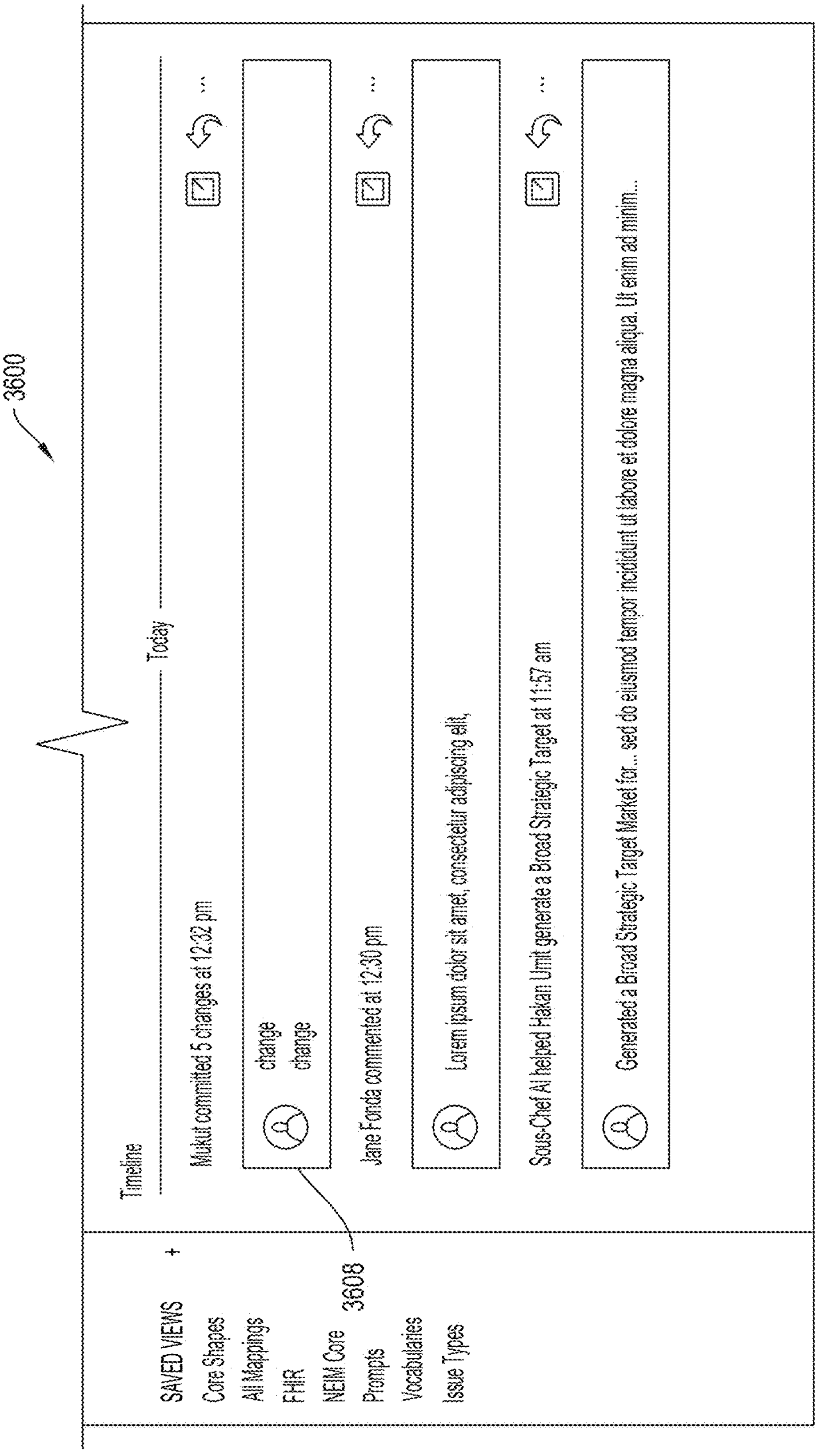

FIG. 36 illustrates a lifecycle view for a capability specification ("getPatients") within the Enterprise Mesh Platform 3600, which may be substantially similar to the Enterprise Mesh Platform 3500 of FIG. 35. FIG. 36 provides an illustration of how versioning and contribution history are formally tracked for each SKL spec, according to a non-limiting embodiment.

In response to selecting a lifecycle tab, the lifecycle tab 3601 is active, a structured version history of the specification is rendered. Under the versions heading 3602, each version of the capability is listed along with its associated metadata, such as the corresponding resource, branch, validation status, and deployment status. In this instance, Version 3604 is marked as "Deprecated" while Version 3606 is noted as "Stable." This delineation illustrates the management of multiple concurrent versions of a semantic definition, each with different lifecycle states and deployment branches, such as "Main" or "Dev."

The Enterprise Mesh Platform 3600 may include a "Contributors" section 3607, which includes a ledger of individuals or teams that have authored or contributed to various versions of the spec. This section offers granular traceability for each contributor's actions.

The Enterprise Mesh Platform 3600 may include a timeline view 3608 that shows real-time commit and change logs in a social feed-like layout. This feed supports conversational threads, inline diffs, and activity tracking, thereby creating a transparent development record. For example, a user named Mukut is shown committing five changes, followed by individual log entries from others such as Jane Fonda and Sous-Chef AI. These timeline entries can encapsulate updates to the spec, annotations, or AI-generated suggestions (as described in FIG. 35).

Figure 37:
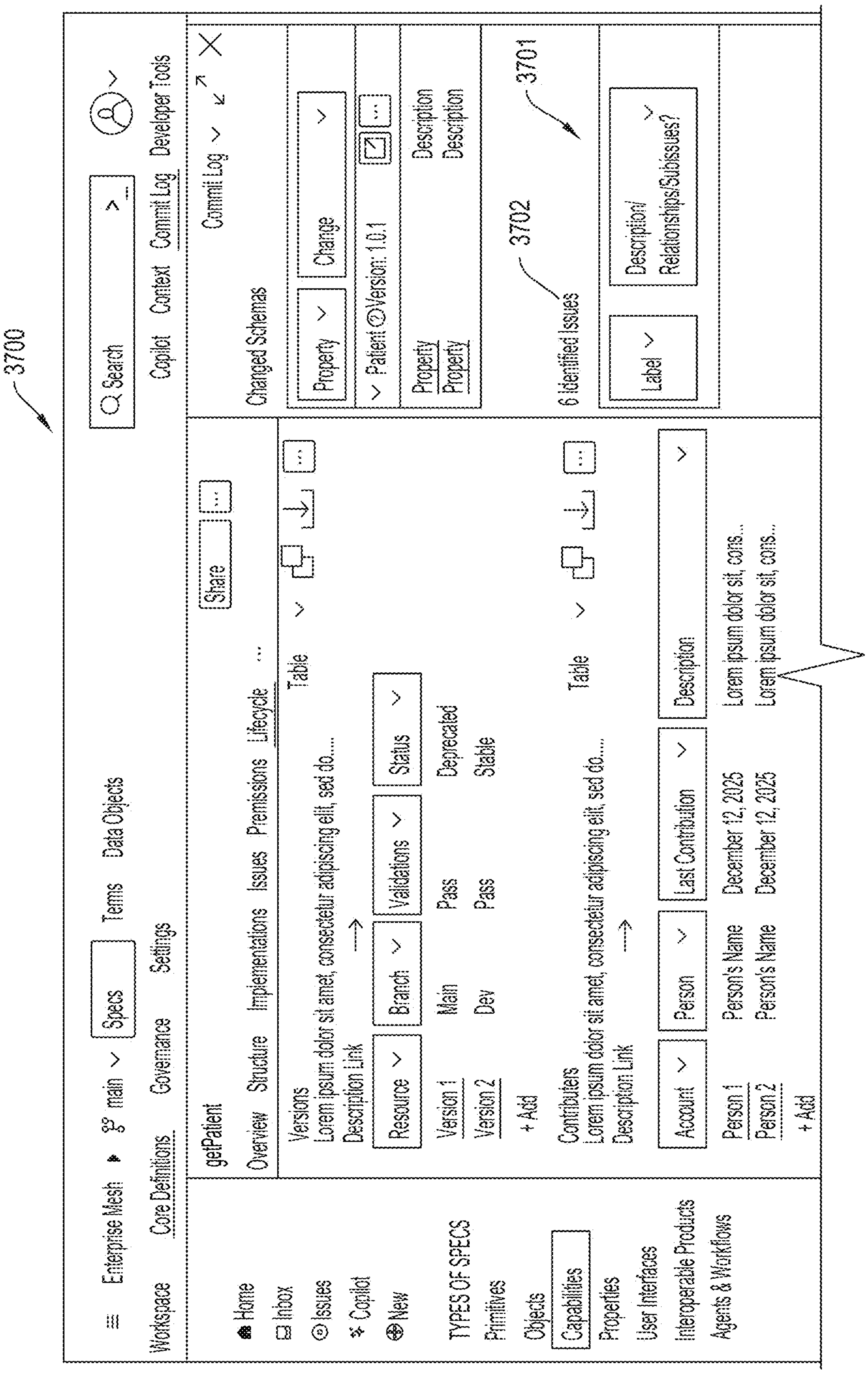
Figure 37:
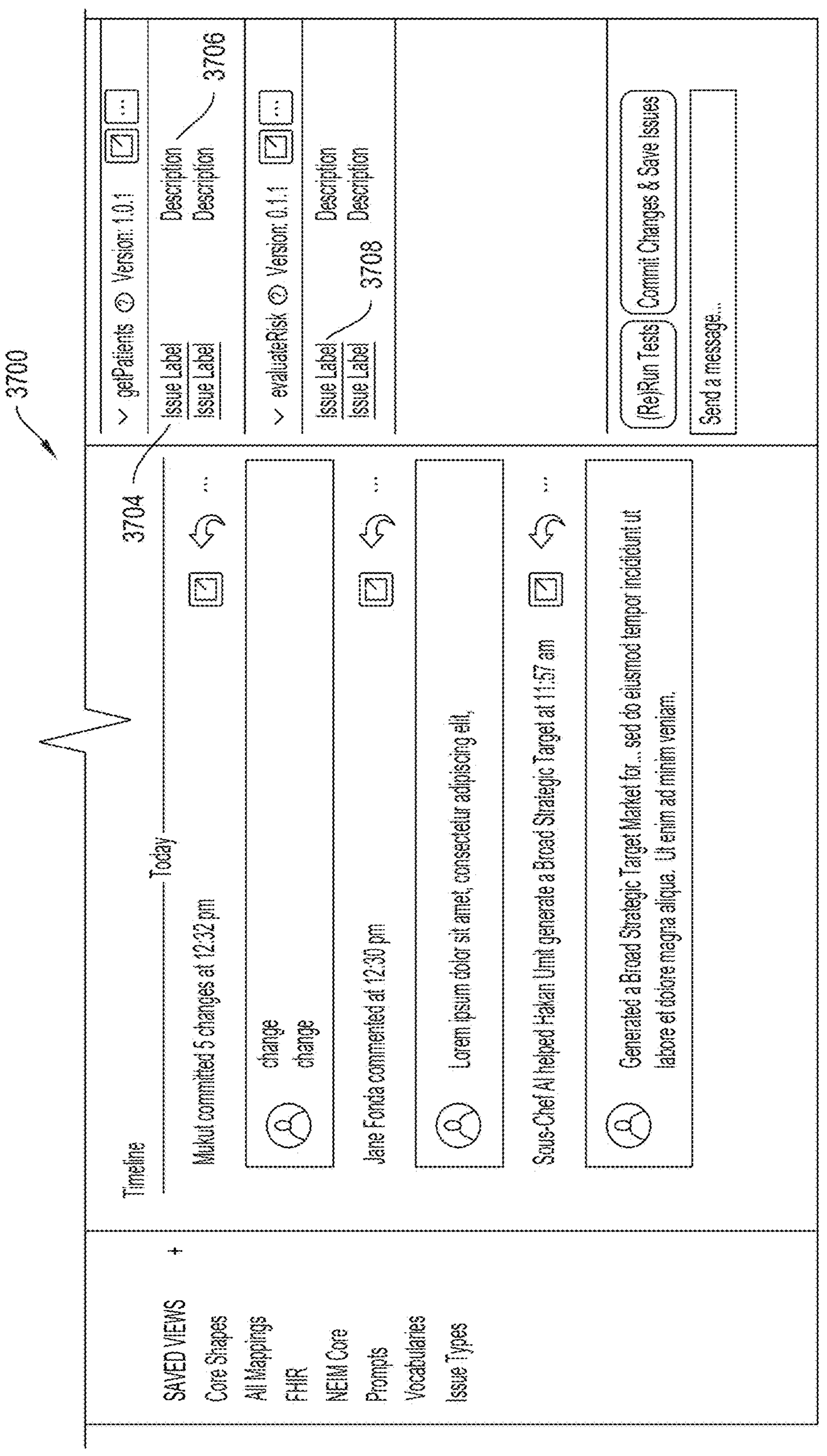

FIG. 37 illustrates the change management and schema tracking functionality of an Enterprise Mesh Platform 3700, which may be substantially similar to the Enterprise Mesh Platform 3600 of FIG. 36. In this embodiment, the platform is configured to visually and semantically track modifications made to specifications (e.g., schema updates to a capability such as getPatients) and automatically identify associated downstream or upstream impacts for resolution.

A change summary pane 3701 is rendered to display the modified specification and the specific property values that have changed. For example, it may show that the version property has been incremented to 1.0.1 or that the data binding for a capability input has been reassigned. These deltas are programmatically logged, and audit-friendly snapshots are maintained to support version control, traceability, and potential rollback.

According to a non-limiting embodiment, once a change has been added to a commit log, the analytics server detects and surfaces issues via the platform GUI in section 3702. One such identified issue is shown as issue 3704, related to potential conflicts between the getPatients capability and dependent specifications such as evaluateRisk. A description 3706 of the issue 3704 is provided to describe relevant data related to the issue 3704. The Enterprise Mesh Platform 3700 generates and displays structured issue cards such as issue 3708, including issue title, severity level, impacted specs, and suggested resolution actions. These issue cards provide developers and stakeholders with immediate insight into compatibility gaps, semantic inconsistencies, or governance nonconformance introduced by the change. By leveraging both platform-inferred impact analysis and user-defined validation rules, this approach enables dynamic and transparent schema evolution while maintaining mesh-wide coherence and operational safety.

In some embodiments, the analytics server may further classify and/or provide recommended fixes and/or changes to effectively address the issues identified. This may be achieved with AI-powered systems and/or agents that help remediate problems, improve specs or implementations, etc.

Figure 38:
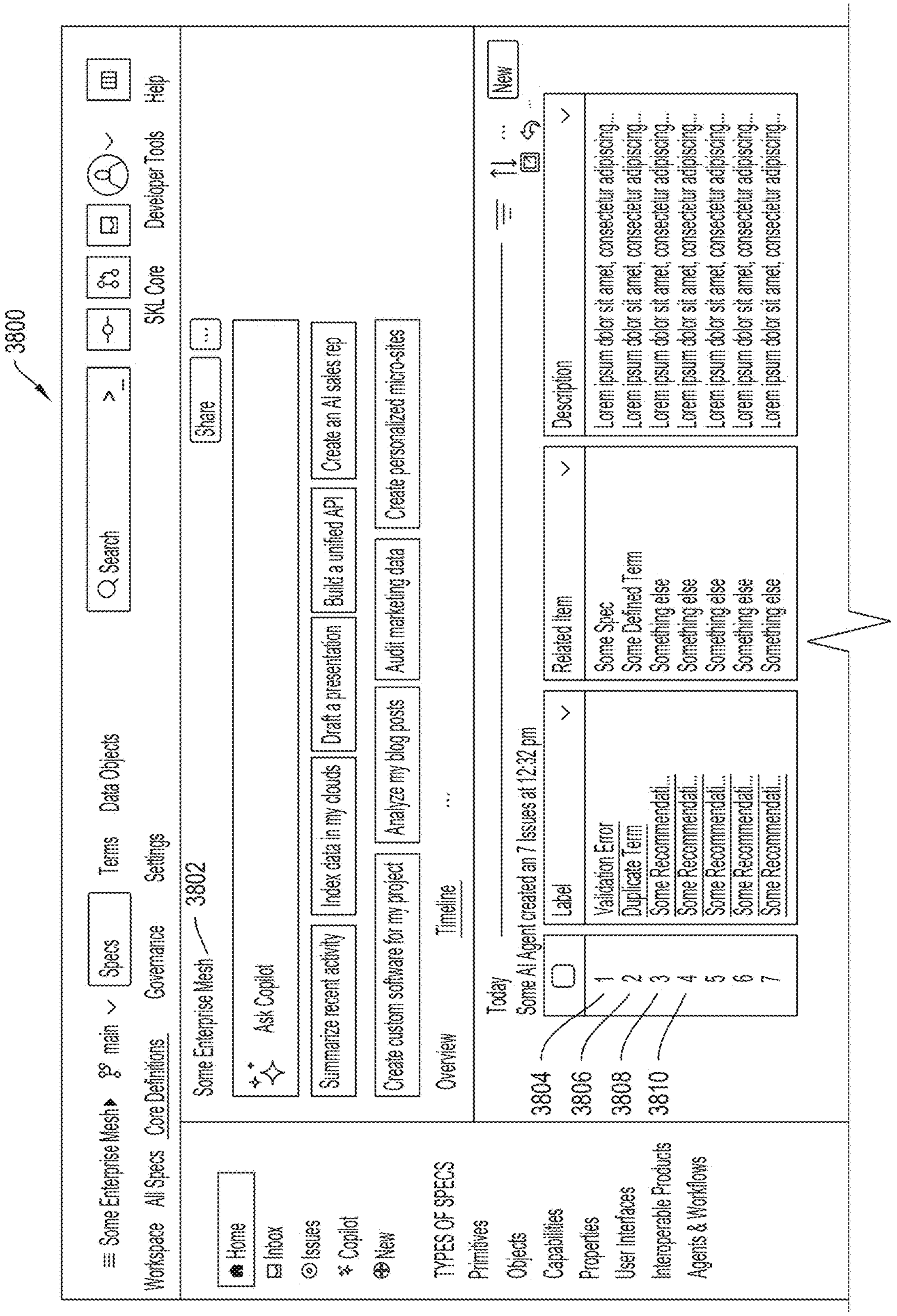
FIGS. 38-41 illustrate recursive architecture concepts, including self-describing specifications and schema-based introspection, in accordance with an embodiment.
Figure 38:
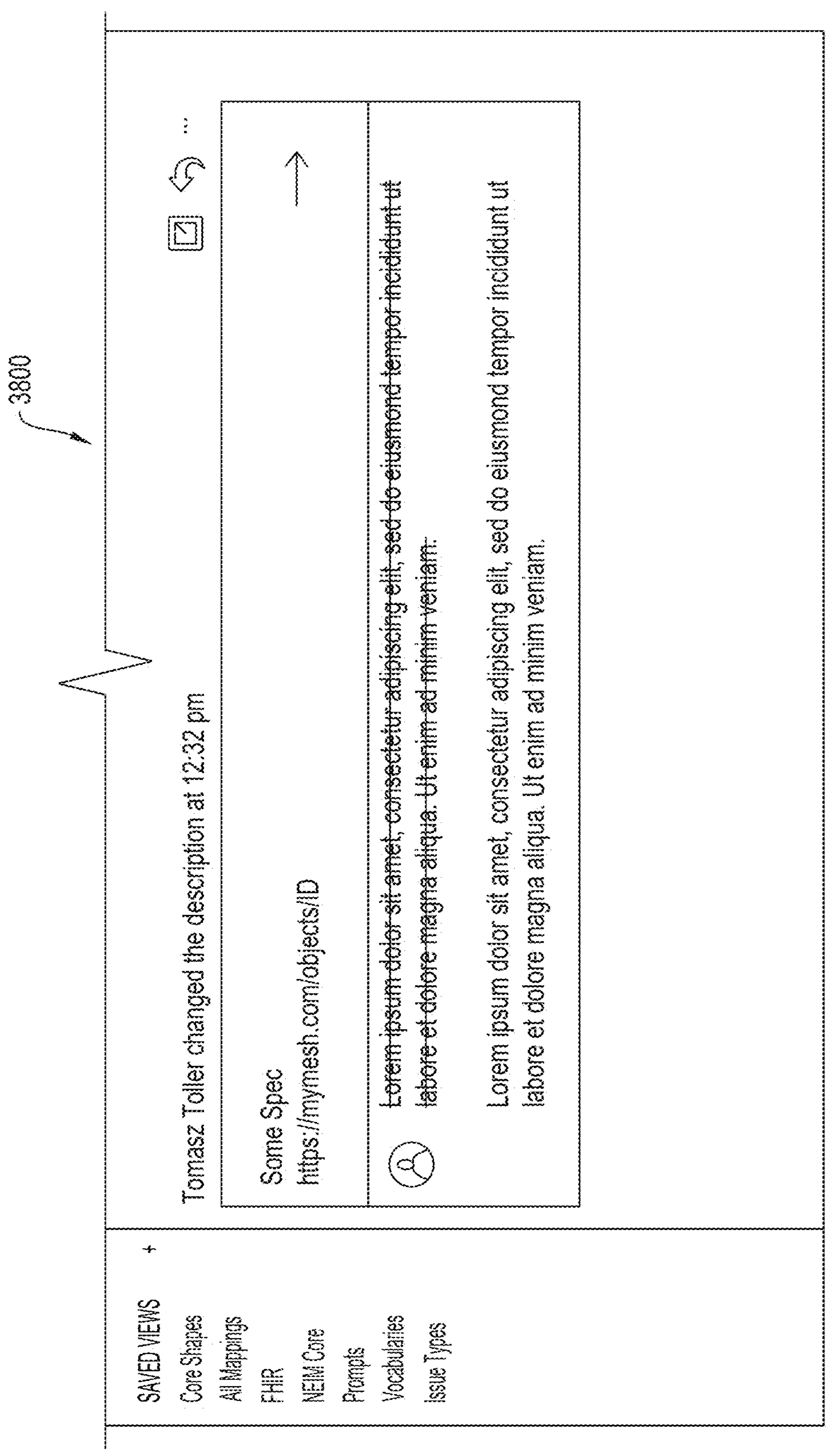

FIG. 38 illustrates a generalized homepage interface for an Enterprise Mesh 3802 within an instance of an Enterprise Mesh Platform 3800, which may be substantially similar to the Enterprise Mesh Platform 3700 of FIG. 37. FIG. 38 illustrates the Enterprise Mesh Platform 3800 rendering a GUI for management of general-purpose specifications across a mesh—not limited to governance or compliance domains.

According to this non-limiting embodiment, the timeline view is shown in FIG. 38 and serves as a working dashboard where users can interact with spec-centric activity streams, including AI-generated insights, contribution tracking, and schema-level governance events. Intelligent copilot suggestions, which can surface automated alerts, recommendations, and/or issues, are shown. For instance, an AI agent may create or flag several specification issues such as a “Validation Error” 3804, a “Duplicate Term” 3806, and/or other various issues 3808, 3810. In another embodiment, the The interface supports real-time collaboration on mesh definitions/specifications, enabling users to view ongoing changes (e.g., a user updating a spec description), audit contributions across time, and resolve surfaced issues with contextual detail.

Figure 39:
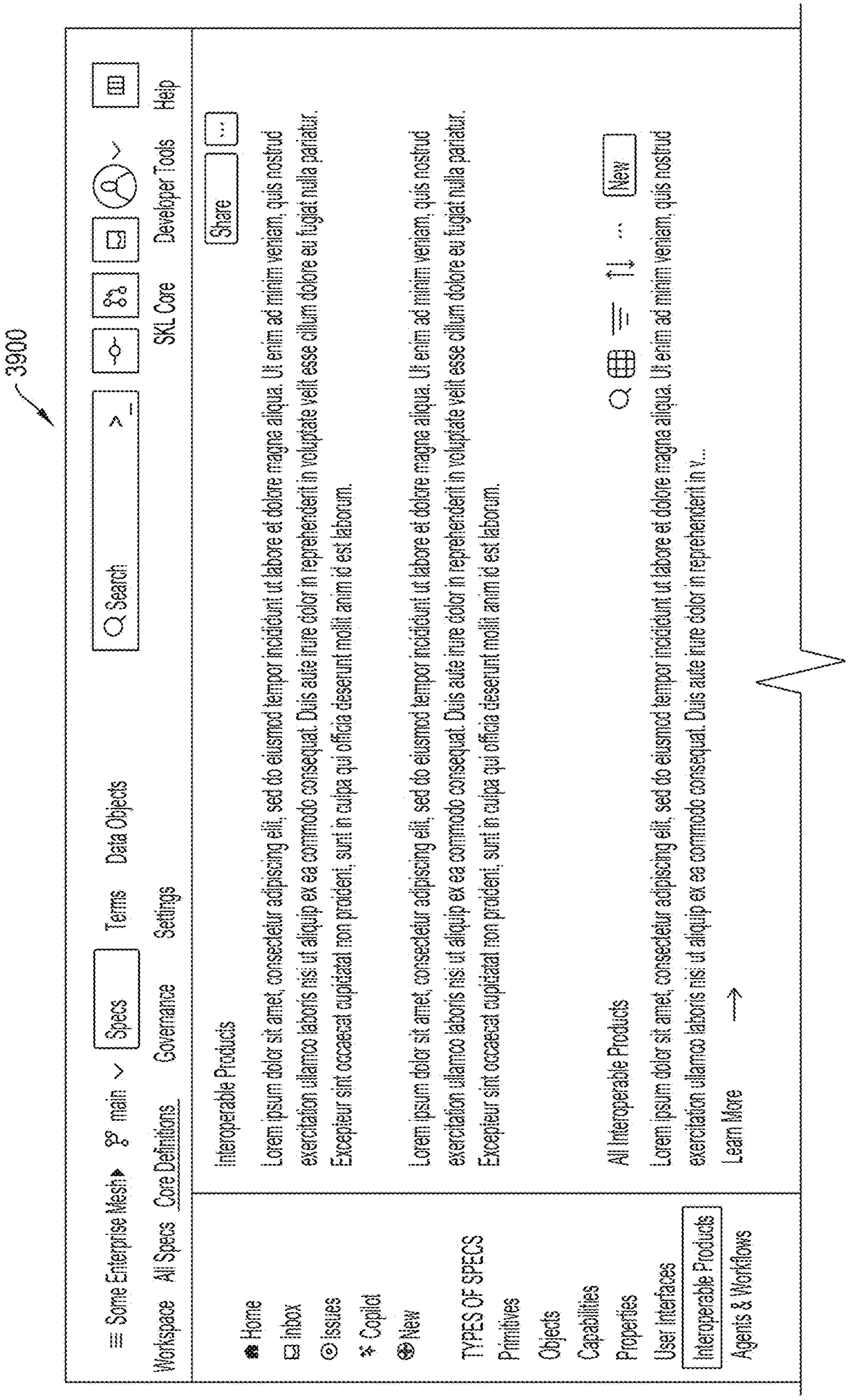
Figure 39:
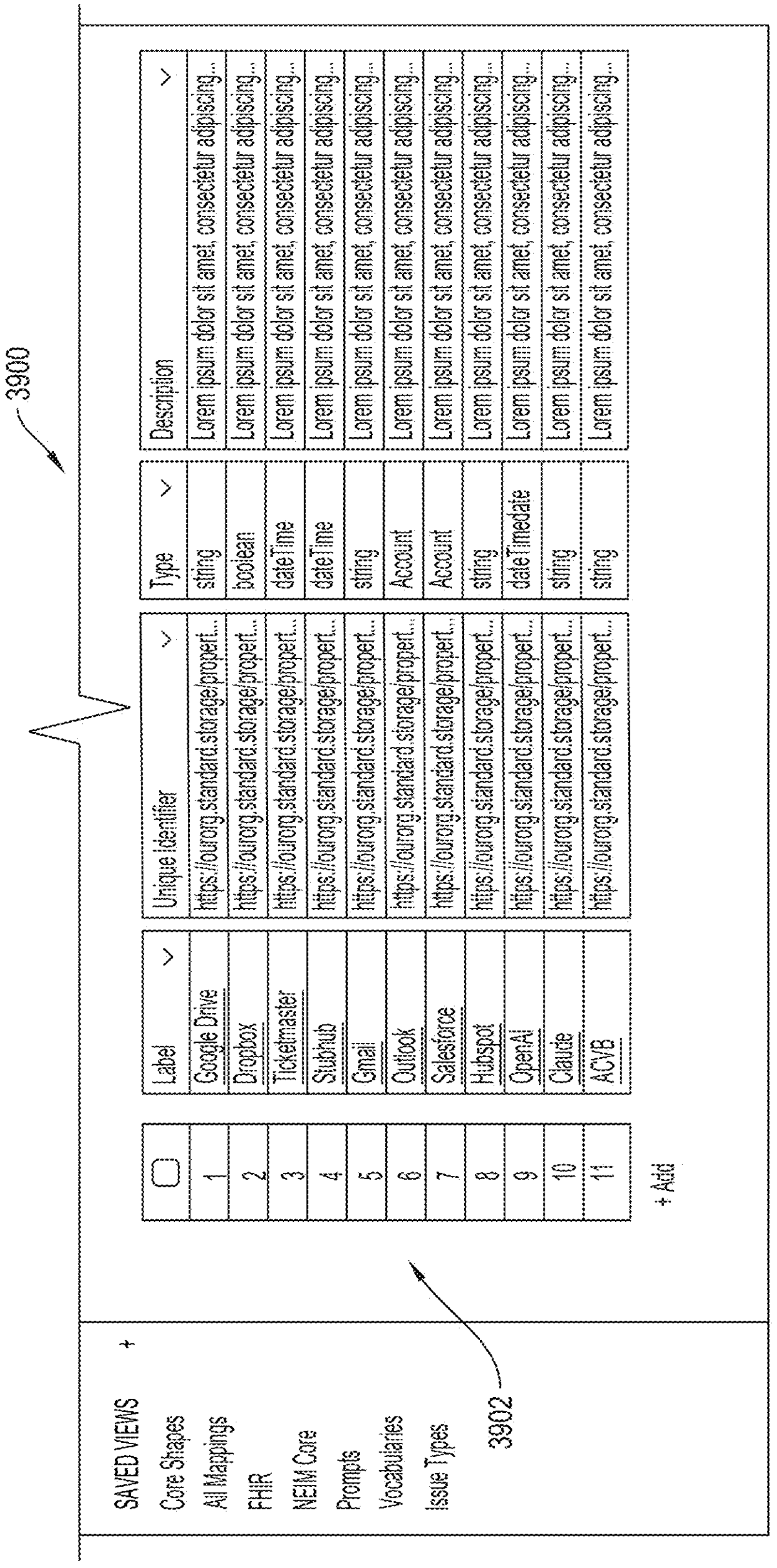

FIG. 39 illustrates another view of an Enterprise Mesh Platform 3900, which may be substantially similar to the Enterprise Mesh Platform 3800 of FIG. 38, by illustrating a navigable listing of all interoperable products that exist within a particular mesh instance. The view presented by the Enterprise Mesh Platform 3900 corresponds to the “Interoperable Products” section of the Core Definitions, and provides a structured, user-facing representation of the various semantic products available for interaction, each defined and governed as a skl:Product spec within the mesh itself.

In this embodiment, the user interface component 3902 displays a tabular list of skl:Products (also referred to herein as skl:InteroperableProduct, skl:IntegratedProduct, or skl:Integration)—such as Google Drive®, Dropbox®, Gmail®, Salesforce®, OpenAI®, and others—each associated with a unique semantic identifier (URI), a type (e.g., Account, DateTime, or String), and a corresponding description. These are not merely documentation entries but live, versioned semantic entities modeled and maintained using the same specification system as any other component of the mesh. Each product instantiates core attributes and policy definitions defined by the skl:Product spec, and can further include associated capabilities, objects, integrations, and access control configurations, according to a non-limiting embodiment.

The recursive nature of the platform is revealed through this framing: not only does the Enterprise Mesh Platform 3900 allow users to define semantic specifications for third-party systems, but those product definitions themselves are part of the semantic mesh, meaning they can be linked, versioned, mapped, validated, and executed like any other spec. For example, the Google Drive product may expose one or more semantic skl:Capabilities, which can be discovered, invoked, and remapped using the same infrastructure described in previous figures.

This represents a particularly powerful manifestation of recursive architecture. In essence each skl:Product in an Enterprise Mesh can be understood as a “mini-mesh”. In other words, each skl:Product functions as a self-contained Enterprise Mesh through its ability to define its own components, governance, and semantic relationships in a federated way, while simultaneously participating in one or more broader Enterprise Meshes.

This recursive pattern enables a consistent, schema-driven abstraction over heterogeneous systems at different scopes and scales, all managed within a shared SKL-based semantic governance layer. The recursive pattern enables federated development of products across operational contexts, from a small team to an industry-wide implementation, while still fundamentally enabling the core interoperable value propositions. In other words, these product mini-meshes enable federated governance models where each product boundary corresponds to a distinct accountability domain (e.g., potentially aligned with organizational structures such as teams, departments, or even separate enterprises). Each domain can maintain autonomous control over its internal specifications while participating in cross-domain orchestration through formally defined semantic contracts. For instance, an insurance claims processing product and a customer service product might be governed by different teams, but they can interact through their exposed capabilities using semantically defined contracts that both domains understand and enforce.

This federated model supports bi-directional inheritance, where products can inherit governance policies and structural patterns from parent meshes while simultaneously contributing specialized capabilities, objects, or patterns back to the broader ecosystem.

At runtime, the Enterprise Mesh Platform can traverse these product boundaries, resolving capabilities, validating access rights, and orchestrating workflows that span multiple mini-meshes. When a capability in one product invokes a capability in another product, the platform validates not only syntactic compatibility but also semantic alignment, policy compliance, and version compatibility—ensuring safe execution across governance domains. When specifications are versioned within a product mini-mesh, the Enterprise Mesh Platform can detect potential impacts on other products that depend on those specifications. This cross-boundary impact analysis enables coordinated evolution while maintaining semantic integrity across the distributed environment.

In these cases, each product may encapsulate (or reference/inherit) not just functionality but also ownership, lifecycles, policies, and contractual obligations. This governance-driven recursion enables organizations to model complex systems that mirror their actual structure while maintaining technical coherence across the enterprise.

The interoperability enabled by products as mini enables the safe bottom-up adoption of mesh architectures without having to re-platform or try to coordinate large scale top-down implementations. By representing every "product" in the mesh as an operational entity—interoperable, inspectable, and extensible—supporting both declarative integration (via metadata and mappings) and executable behavior (via associated capabilities and workflows), enterprise mesh unlocks domain flexibility while maintaining enterprise-wide interoperability and governance.

Figure 40:
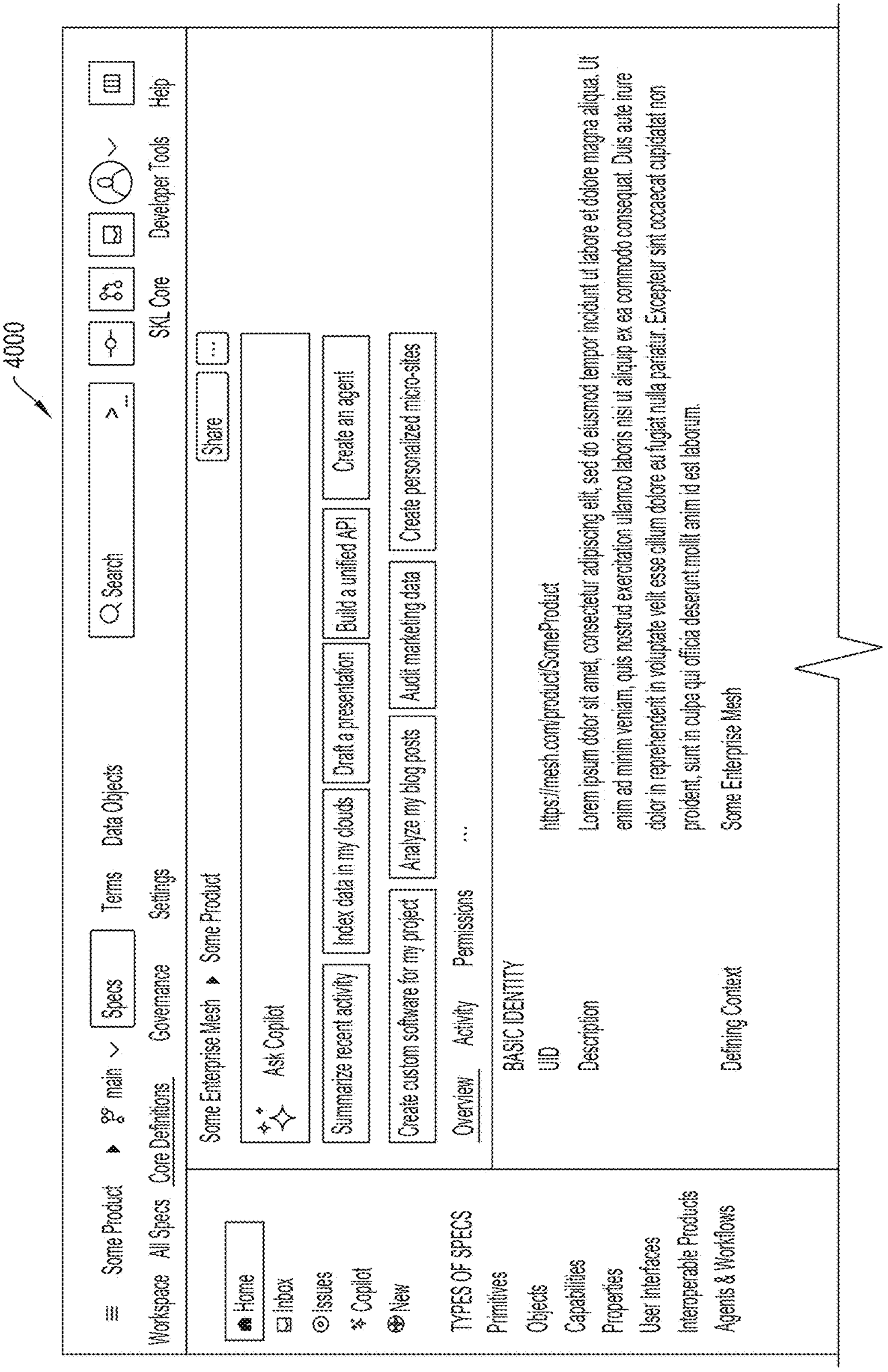
Figure 40:
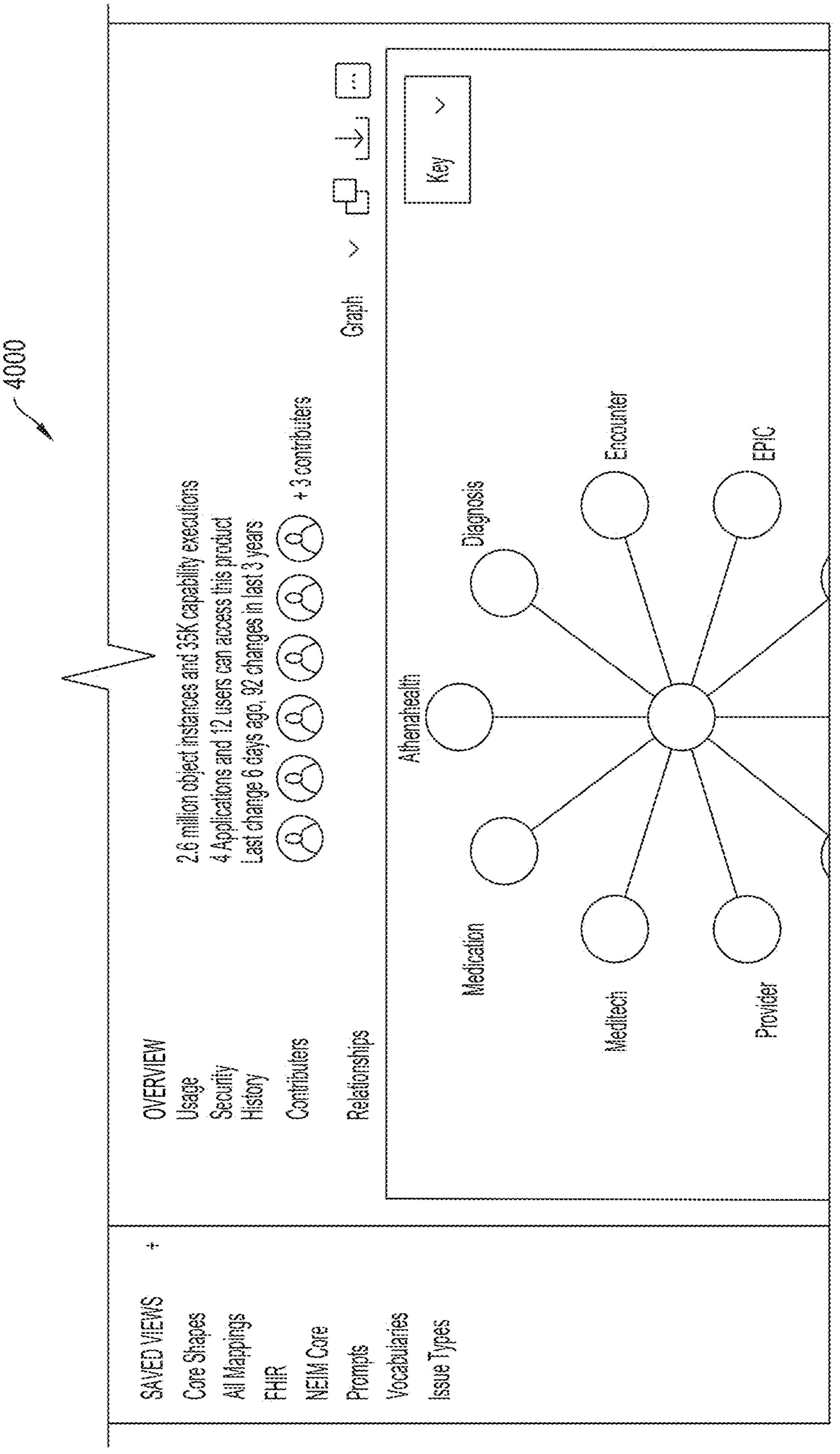

FIG. 40 illustrates an Enterprise Mesh Platform 4000, which may be substantially similar to the Enterprise Mesh Platform 3900 of FIG. 39. FIG. 40 depicts, according to a non-limiting embodiment, what happens when a user opens a specific product-here titled "Some Product." As shown, opening a product is effectively the same as opening a self-contained mini mesh. The user interface and functionality mirror the broader mesh environment, confirming that a product is not merely a static entry or label but a fully qualified semantic unit composed of its own SKL-defined specifications.

This product view includes its own overview metadata (such as UID, description, usage stats, security visibility, version history, and contributors), reinforcing that each product is treated as a composable and governable digital asset within the mesh. The defining context for the product is shown as "Some Enterprise Mesh," signifying that this product is a semantic component of the parent mesh and inherits relevant policies, capabilities, and integration patterns from that context.

In practice, a skl:Product spec aggregates a curated set of other specs (e.g., from one or more Products which may exist in a central database or across a distributed set of systems)—including data objects, capabilities, mappings, and governance policies—that together constitute the digital definition of an interoperable system integration or software offering. When viewed through the Enterprise Mesh Platform, this aggregation is rendered as a fully navigable interface. Users can drill into the specific objects, capabilities, policies, and interfaces that define the product's behavior and contract surface-mirroring the architecture of the overall mesh at a more localized scope.

Figure 41:
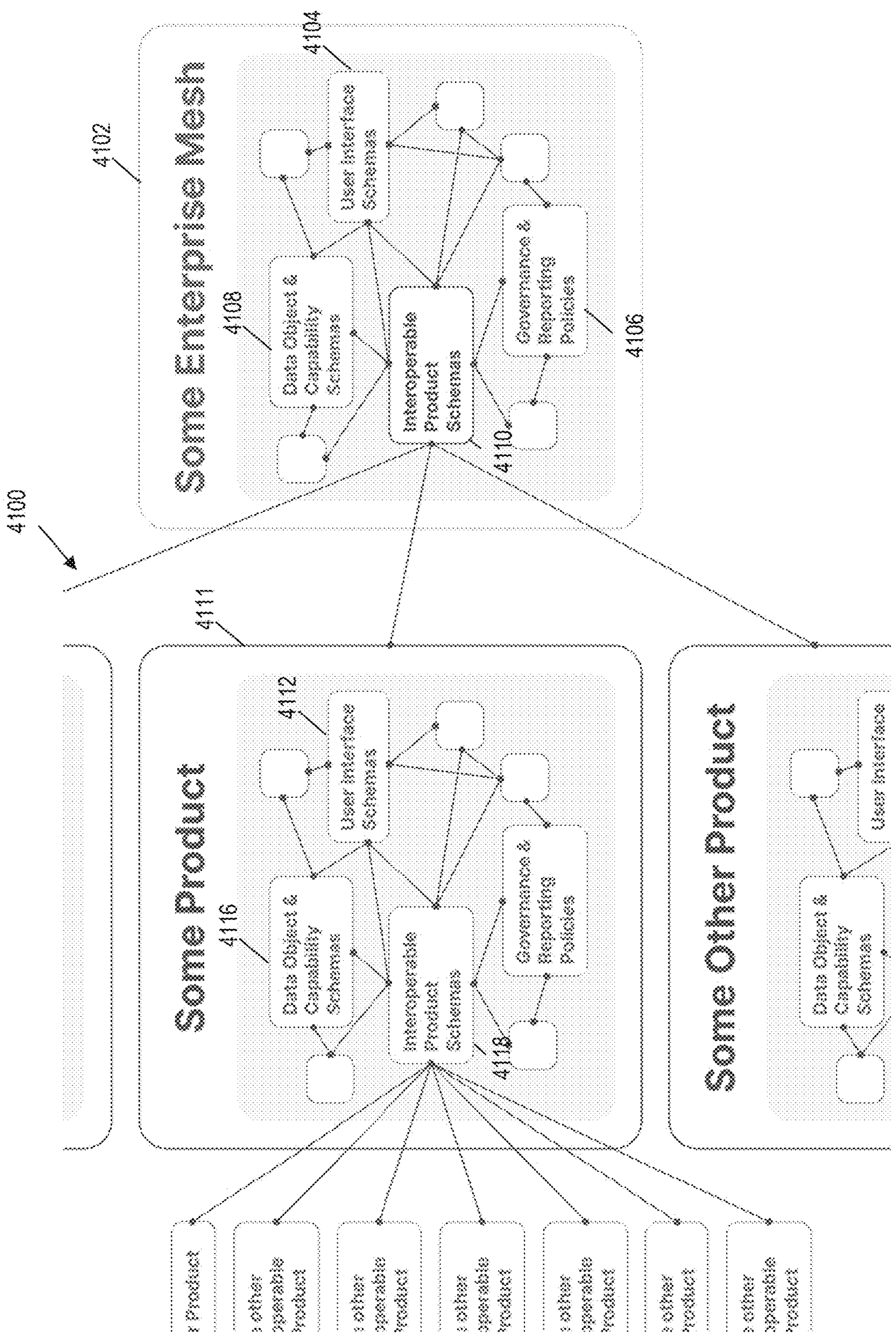

FIG. 41 provides a conceptual visualization of the recursive or "fractal" architecture that supports the data and concepts processed an Enterprise Mesh Platform 4100, which may be substantially similar to the Enterprise Mesh Platform 4000 of FIG. 40. This diagram illustrates how the Enterprise Mesh Platform 4100 is itself composed of various interrelated meshes (e.g., Enterprise Mesh 4102)—which relates several semantic classes such as Data Object & Capability Schemas 4108, User Interface Schemas 4104, and Governance & Reporting Policies 4106. The Enterprise Mesh 4102 may also specify that it includes certain Interoperable Product Schemas (e.g., skl:Product specs) 4110. Inspecting a referenced Interoperable Product (e.g., Some Product) 4111 reveals that the structure of a skl:Product is inherently the same as the structure of an enterprise mesh—including User Interface Schemas 4112, Data Object & Capability Schemas 4116, and Governance & Reporting Policies 4114—which in turn may reference its own (e.g., a different set of) Interoperable Product Schemas 4118.

This self-similar structure enables composability, reuse, and encapsulation across every level of the platform. A product within a mesh is effectively a mesh of its own. This allows teams to define, govern, and evolve products independently while still preserving linkages and inheritance from the broader enterprise mesh. Products can even contain references to other products-enabling arbitrarily deep composition, just like nested graphs or module systems.

Referring back to FIG. 39 to facilitate the illustration of an embodiment where relationships between "meshes" don't have to follow strict hierarchical patterns. For instance, a mesh may reference a product (e.g., Google Drive). In this case, Google Drive may be represented as its own skl:Product mesh, but may not exist wholly within the Enterprise Mesh. In this way, enterprise mesh networks can behave like networks of networks or meshes referencing other meshes without requiring hierarchical centralization (e.g., similar to how the semantic web works). For the avoidance of doubt however, hierarchical patterns (e.g., for the inheritance of enterprise governance baselines) can coexist with network patterns, enabling organizations to implement appropriate governance structures while maintaining flexible, adaptable connections between domains.

According to a non-limiting embodiment, interoperable products functioning as mini-meshes within a broader enterprise mesh may be distributed across multiple systems, servers, or networks. In such distributed environments, the enterprise mesh architecture supports federated semantic interaction—a method whereby semantic operations across independently governed domains can be dynamically routed, executed, and mediated by a network of analytics servers, with potentially one analytics server per product or domain.

In federated deployments, each product or domain may maintain its own analytics server that interprets and executes SKL specifications within its governance boundary. These distributed analytics servers coordinate with each other through standardized protocols to enable cross-domain semantic interactions while preserving local governance autonomy.

To illustrate this federated method, consider a concrete scenario where an application needs to invoke a capability for retrieving patient records. The application may only possess the unique identifier (UID) of this capability without knowing which product or domain hosts the capability's implementation. The application submits a request to its local or primary analytics server with this capability UID and any required parameters.

Upon receiving this request, the local analytics server must first determine which domain analytics server is responsible for the specified capability. According to an embodiment, this capability resolution may be accomplished through several mechanisms: (1) a distributed registry system where analytics servers exchange and cache references to capabilities across the federated environment; (2) a hierarchical routing protocol where requests are forwarded between domain analytics servers based on namespace patterns within the capability UID; (3) a capability resolution service maintained by each analytics server that maps capability UIDs to responsible domain analytics servers; or (4) a discovery protocol where the local analytics server queries peer analytics servers to identify which one hosts the requested capability.

Once the responsible domain analytics server is identified, the local analytics server forwards the request to that domain analytics server, which then interprets the capability definition within its local specification repository, determines the appropriate mapping using its local capability switch, and executes the request. If the capability execution itself requires access to data or sub-capabilities hosted in other domains, the domain analytics server may initiate further cross-domain requests to the appropriate peer analytics servers, with each domain boundary potentially requiring independent authentication and authorization verification against local policies According to a non-limiting embodiment, once the federated semantic interaction is initiated, the following generalized process flow may occur, regardless of the specific distribution of specifications and analytics servers. The system may begin by resolving the semantic intent of the request, identifying the specifications needed to fulfill it. This resolution may occur: (a) at the initial receiving analytics server, (b) distributed across multiple analytics servers, (c) through a federated discovery process spanning multiple specification repositories, and/or (d) via a combination of local and remote resolution mechanisms.

The system locates the relevant specifications (e.g., capabilities, objects, mappings, policies) across the distributed mesh. This discovery is not limited to a specific architecture and involves one of: a) queries to multiple specification repositories or b) resolution services that map identifiers to locations.

The system determines the execution approach for the semantic interaction. This determination may involve explicit planning when the interaction path requires runtime decisions. In some embodiments, the determination may simply follow predetermined paths defined within the semantic specifications themselves or leverage capability switches to select between alternative execution paths based on context. In some embodiments, the determination may combine predetermined and dynamically determined steps based on the specifications involved. The system enforces authorization, including one or more of valuation of access control specifications or policy evaluation and enforcement at domain boundaries and/or interaction stages.

Throughout the interaction, the system may mediate between different semantic contexts as needed, potentially including transformation of data between domain-specific schemas, resolution of terminological differences using Defined Terms, adaptation between different messaging interfaces, and/or preservation of security and classification across domain boundaries. The system ultimately prepares the final result, potentially compiling distributed execution components.

It should be understood that the steps described above may be executed in any order without departing from the scope of the description herein. Likewise, the method may include more, less, or alternative steps than those provided above.

This federated semantic interaction method enables operation across independently governed domains while allowing for diverse architectural patterns and implementation approaches. The method preserves the semantic integrity of the interaction regardless of how specifications, capabilities, and analytics servers are distributed throughout the enterprise mesh.

Figure 42:
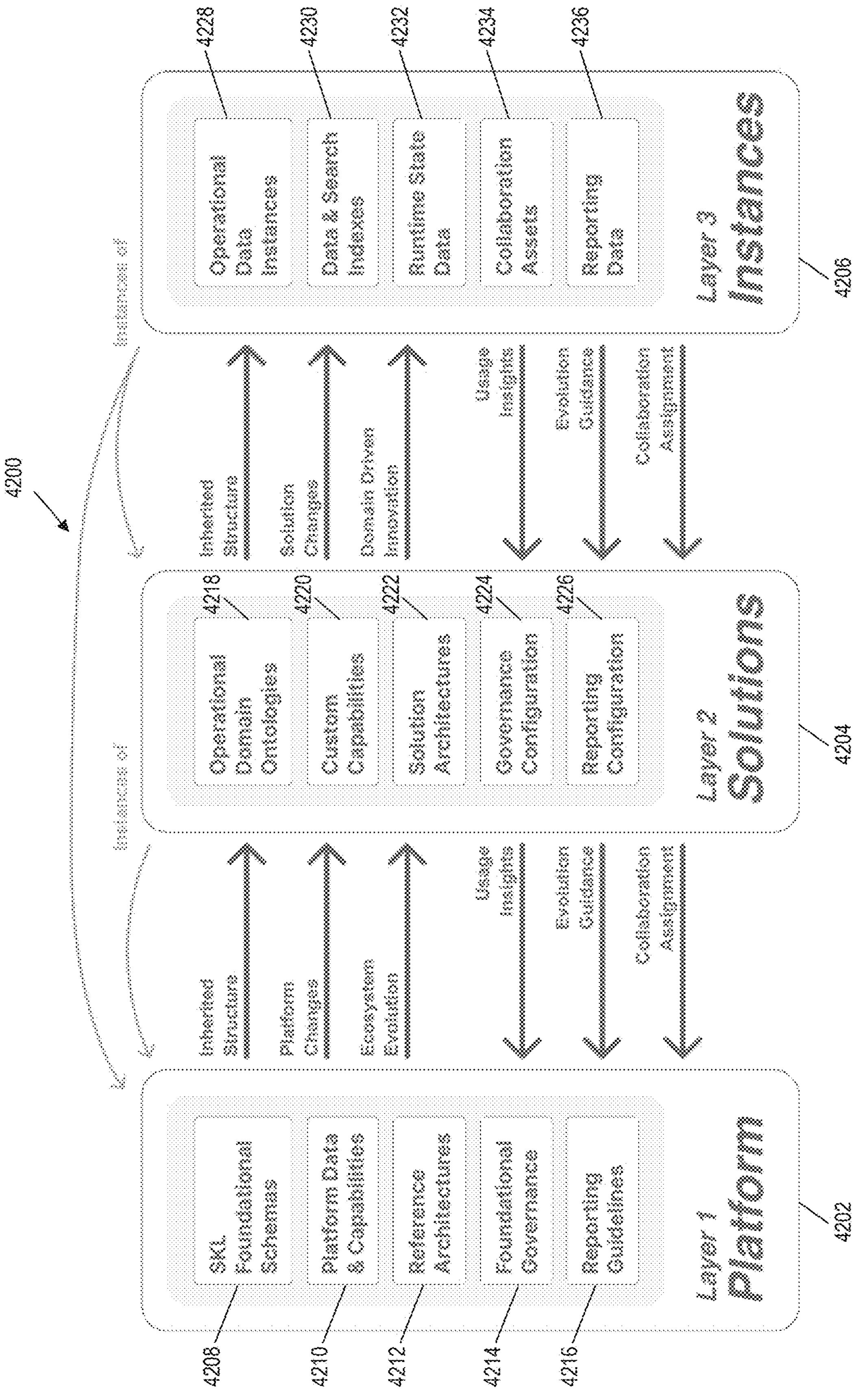
FIGS. 42-43 illustrate a multi-level inheritance framework, including platform, solution, and instance layers, in accordance with an embodiment.

FIG. 42 presents a layered architectural view of how schema-driven enterprise meshes enable recursive inheritance and domain-specific extension across platform-level infrastructure, solution-level configuration, and runtime-level instantiation. The diagram is divided into three primary layers-Platform 4202, Solutions 4204, and Instances 4206—each of which builds upon and references the layers above it.

SKL Foundational Schemas 4208 represent the core semantic primitives and structures that enable all other specifications to interoperate. These schemas define universal types such as skl:Person, skl:Organization, skl:Event, and skl:Capability, each of which provides a common grammar for more domain-specific extensions. For example, skl:Event might include subclasses like skl:UserLoginEvent or skl:SystemFailureEvent, enabling downstream analytics systems to reason over heterogeneous events in a consistent way. These foundational schemas are versioned, extensible, and serve as the ontological spine of the mesh.

Platform Data & Capabilities 4210 include shared services and utility capabilities that are pre-declared and reusable across the mesh. For instance, these might include skl:sendEmailNotification, skl:calculateRiskScore, or skl:lookupPersonIdentity. These platform capabilities can be invoked by solution-specific logic without needing to reimplement common behaviors. Similarly, shared data types—such as skl:Address or skl:ContactInfo—may be instantiated across products, ensuring structural consistency and enabling standardized data interchange.

Reference Architectures 4212 (or even Reference Designs or reusable Solution Architecture templates) may provide reusable patterns for interoperability and composition, such as workflows for "identity federation across domains" or "event-driven escalation of policy violations." For example, a reference architecture might define how a skl:Capability for incident reporting interoperates with skl:DataObject definitions for medical records, ensuring HIPAA-compliant escalation and audit logging. These architectural blueprints help accelerate development, standardize interfaces, and guide conformance to mesh-wide patterns.

Foundational Governance 4214 codifies cross-domain rules, entitlements, and enforcement policies that apply regardless of the consuming product. Examples include mesh-wide access control models, such as role-based access to skl:PatientRecord, or universal privacy filters that mask PH when data flows into non-authoritative systems. These governance controls may also define allowed compositions—e.g., preventing skl:FinancialTransaction data from being linked with marketing telemetry unless a specific policy is satisfied.

Reporting Guidelines 4216 provide mesh-level telemetry and observability standards. These may include required audit fields (e.g., skl:timestamp, skl:actor, skl:action), telemetry schemas for ingest into analytics pipelines, or templates for producing FISMA, SOC 2, or GDPR compliance artifacts. For example, any skl:Capability executed in a regulated context may be required to emit a structured skl:AuditRecord event for downstream storage in a compliance lake.

Layer 2: Solutions 4204 represents domain- or product-specific (e.g., skl:Product) configurations that are built on top of the platform. These include Operational Domain Ontologies 4218 for modeling specific verticals (e.g., healthcare, finance); Custom Capabilities 4220 and Solution Architectures 4222 that leverage or override platform references; Governance Configuration 4224 tailored to domain-specific rules; and Reporting Configuration 4226 for localized telemetry and metrics. Each solution inherits from the platform layer, but may introduce its own schema extensions, domain innovations, or implementation variations.

Interoperable Product Schemas 4118 define specialized semantic structures that model the concepts, entities, and relationships specific to a given vertical or operational context. For example, a healthcare solution might define fhir:Patient, fhir:AllergyIntolerance, or fhir:MedicationRequest as part of its operational ontology, building upon the more abstract skl:Person or skl:Event. In a financial services context, this might instead include fin:AccountHolder, fin:Transaction, or fin:RiskProfile, allowing downstream systems to reason about that domain in a structured and reusable way.

Custom Capabilities 4220 are solution-specific implementations of action verbs or SKL Capabilities that either extend or override the Platform Capabilities from Layer 1. For instance, while the platform might define a generic skl:generateDocument, a specific solution could define insurance:generatePolicyPDF with domain-specific input and output parameters. These capabilities are expressed as machine-interpretable specifications and support semantic versioning, policy enforcement, and integration binding. In some embodiments, Operational Domain Ontologies 4218 are provided in the Solutions 4204.

Solution Architectures 4222 refer to the particular way a solution composes SKL elements—capabilities, data objects, workflows, governance rules—into a coherent, domain-specific service offering. These architectures may define how multiple capabilities interact (e.g., submitClaim, evaluateFraud, approvePayment) and bind those flows to front-end interfaces or backend orchestration. In effect, Solution Architectures model how a vertical solution operationalizes its use cases, using the primitives and patterns defined in the platform.

Governance Configuration 4224 captures policies and entitlements that are tailored to the specific needs of a given solution. For example, while the Platform layer may define a general privacy model, a financial solution might extend it to require multi-factor verification for any access to fin:TransactionHistory, or apply rate-limiting policies for capabilities like submitWireTransfer. Governance Configuration ensures that rules and controls are not just inherited from the platform but can also be specialized to meet sector-specific compliance needs such as HIPAA, PCI-DSS, or internal SLAs.

Reporting Configuration 4226 governs how telemetry, metrics, and compliance data are emitted and structured within a given solution. This might include configuration of domain-specific logging levels (e.g., diagnostic traces in dev, audit-only in prod), business-specific KPIs (e.g., "claims processed per hour"), or analytics feeds (e.g., anonymized outcome metrics streamed to a regulatory dashboard). It ensures that metrics and observability are tuned to the semantics and priorities of that particular solution.

Layer 3: Instances 4206 consists of runtime expressions and concrete instantiations of the schemas defined above. These include Operational Data Instances 4228 (such as FHIR Patient objects or workflow executions); Data & Search Indexes 4230; Runtime State Data 4232; Collaboration Assets 4234; and Reporting Data 4236. These artifacts adhere to the shapes and structures defined by the solution and platform layers, providing conformance at runtime and enabling graph-wide reasoning, impact analysis, and governance enforcement.

The architecture is designed to be bi-directional and insight-rich. Data flows from Platform to Solutions to Instances via inheritance and innovation, while insight flows in the opposite direction through Usage Insights, Evolution Guidance, and Collaboration Assignment. These feedback loops enable dynamic evolution and governance, while preserving semantic consistency across all levels of the mesh.

Operational Data Instances 4228 refer to the actual, live data objects or event traces that instantiate the shapes defined by SKL-based ontologies and capabilities. These can include FHIR Patient or Encounter records in a healthcare mesh, or real-time telemetry objects such as sensorReading, incidentReport, or orderFulfillmentStatus in other domains. These instances are where schemas meet live usage—each one conforming to the type definitions, constraints, and relationships established in the upper layers. For example, if the solution layer defines a health:VaccinationEvent, then the actual record of "Jane Doe receiving a COVID-19 booster at Clinic A on March 3rd" is an Operational Data Instance under this class.

Runtime State Data 4232 captures ephemeral or transitional information generated during process execution or live system use. This might include workflow execution state (e.g., "Step 3 of 6 completed"), temporary input buffers, cached decisions, or dynamic context such as the authenticated session's entitlements. These states are tightly coupled to SKL-defined lifecycle models or capability flows and enable real-time monitoring, rollback, and adaptive branching. In a claims processing solution, for instance, this could be a claimProcessingContext object holding intermediate eligibility and fraud scores awaiting final resolution.

Collaboration Assets 4234 include human-generated or human-reviewed materials tied to specific runtime events or data objects. These might consist of annotations on a shared dashboard, audit trails from human review of automated decisions, chat transcripts embedded into workflow instances, or approvals attached to mission-critical change proposals. Because they reference SKL-defined objects (e.g., claim:ReviewNote on a claim:ReimbursementRequest), they remain semantically grounded and traceable. These assets facilitate governance, multi-stakeholder participation, and human-in-the-loop auditing.

Reporting Data 4236 refers to structured output-logs, metrics, summaries, or compliance artifacts—that is generated as part of execution and used to satisfy governance, performance, or business intelligence requirements. Examples include metrics like "number of completed workflows by region per week," or compliance traceability logs linking input/output pairs for key capabilities like submitRegulatoryFiling. This reporting layer can be configured via the SKL-defined Reporting Configuration in Layer 2 and is often subject to the Reporting Guidelines from Layer 1.

Together, these runtime artifacts form the execution fabric of the Enterprise Mesh 4200. Unlike static metadata, these Layer 3 Instances evolve continuously as applications and users interact with mesh-defined logic. Each instance is not only structured by SKL schemas, but also feeds back into the system via telemetry and feedback loops.

As described, this architecture supports bi-directional flow: schema and structure flow downward—from Platform to Solutions to Instances—while insight and governance flow upward through three primary mechanisms:

Usage Insights: Data about which capabilities are being called, how often, by whom, and with what performance metrics.

Evolution Guidance: Feedback loops that surface patterns or anomalies to inform schema evolution or capability redesign.

Collaboration Assignment: Workflows or ownership suggestions that assign governance or design tasks to responsible stakeholders based on observed runtime behavior.

Figure 43:
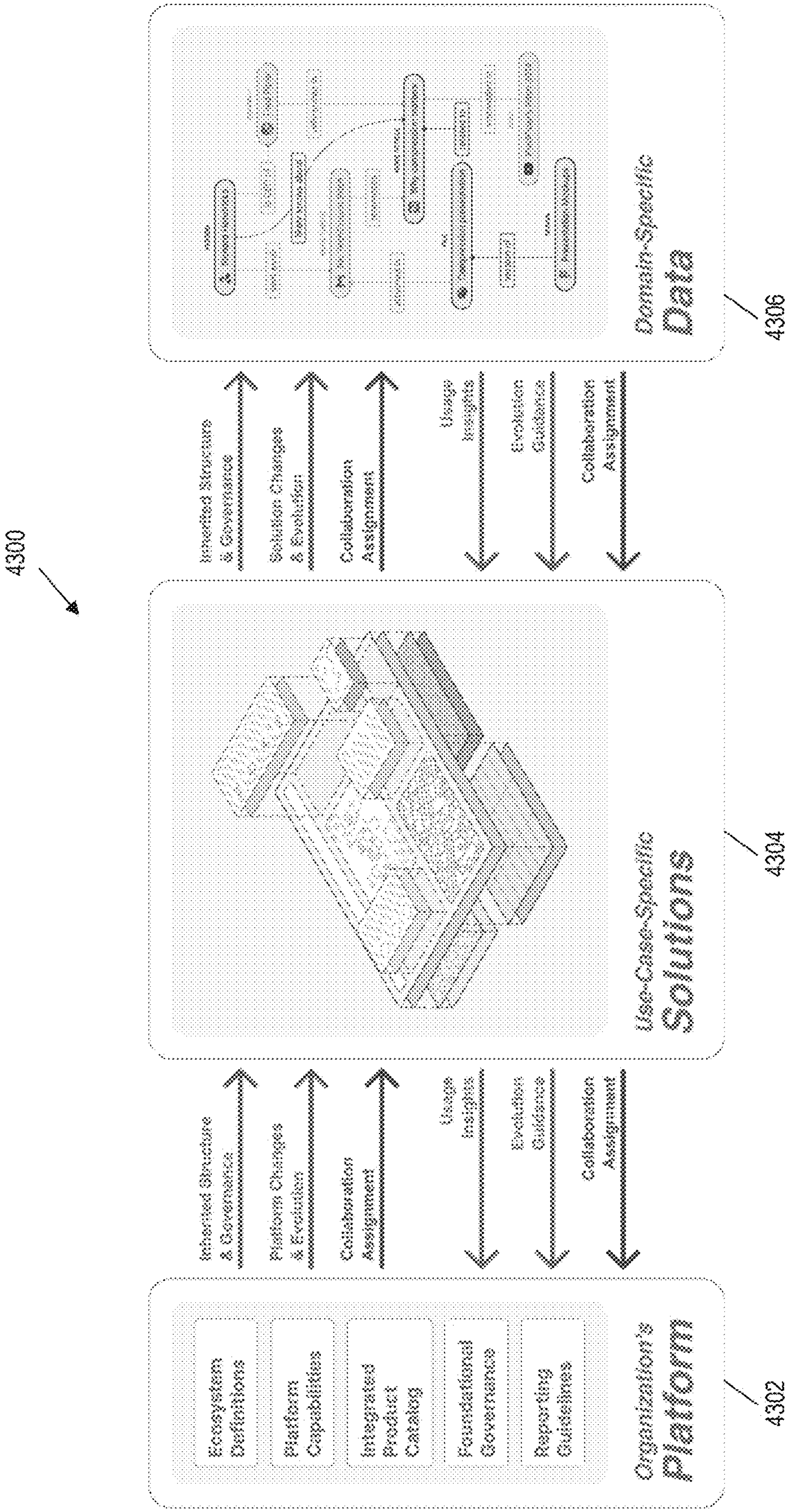

FIG. 43 illustrates a system 4300 with a high-level abstraction of the recursive architecture of the Enterprise Mesh framework as shown in FIG. 42, illustrating how graph-based schemas scale across three distinct layers: Platform Layer 4302, Solution Layer 4304, and Data Layer 4306, according to an embodiment.

A Platform Layer 4302 establishes foundational definitions and reusable components shared across the enterprise mesh. These include high-level Ecosystem Definitions, Platform Capabilities, an Integrated Product Catalog, Foundational Governance, and Reporting Guidelines. This layer provides structural inheritance and semantic integrity for all downstream use cases. Directional arrows illustrate how this layer propagates structure, governance, and evolution mandates down to solution domains, while simultaneously receiving feedback via usage analytics, evolution signals, and collaboration assignments.

Ecosystem Definitions in this context represent the high-level modeling constructs that govern how an organization conceptualizes its operational and semantic universe. These may include global vocabularies, core ontologies, cross-domain object types, and foundational capability patterns. For example, an ecosystem definition might include universal object types such as Person, Location, Organization, or Event, as well as relationship templates like isEmployedBy, locatedAt, or causes. These definitions act as semantic anchors, ensuring that disparate solutions across the mesh remain interoperable and align with a common conceptual framework.

Platform Capabilities include reusable, composable action models (e.g., skl:Capabilities) that serve as standard verbs across the organization. These may include fundamental operations like submitRequest, evaluateEligibility, syncData, or issueNotification. These capabilities are abstracted from implementation details and governed by SKL contracts, meaning they can be reused across departments, regions, or products while maintaining consistent behavior. For instance, both HR and Procurement systems may leverage a common approveWorkflowStep capability, each contextualized by its own schema, but sharing platform-level semantics and governance.

Integrated Product Catalog provides a canonical registry of interoperable products and services that are defined, managed, and composed using SKL-based schemas. Each product—whether internal or external—can be treated as a bounded context within the mesh and exposed through its own SKL interface. Examples may include a “CRM Product,” “Clinical Data Lake,” or “Claims Processing Platform,” each registered with standardized metadata, governance bindings, and contract definitions. The catalog provides a discoverable, structured interface to organizational functionality, accelerating reuse and minimizing redundant development.

Foundational Governance includes rules, constraints, and policy frameworks that define how SKL specs may be created, modified, and applied across the organization. These may include data residency requirements, role-based edit privileges, naming conventions, capability certification pipelines, and usage restriction matrices. Governance specifications enforce integrity at design time (e.g., which attributes must be present in a Person object) and runtime (e.g., restricting who may invoke a particular capability under certain contexts).

Reporting Guidelines establish the telemetry structure for mesh-wide observability and compliance. These include specifications for event logging (e.g., capabilityExecuted, schemaVersionChanged, dataAnomalyDetected), metric aggregation (e.g., throughput, latency, error rates), and compliance tracing (e.g., audit trails, lineage views). The guidelines provide a standardized way to surface feedback from live system activity to both the platform architects and the governance authorities. For example, if a product is consistently overriding a foundational capability, that insight can trigger a proposal to evolve the capability definition or create a domain-specific fork.

Directional arrows in FIG. 43 illustrate the dual flow of information and structure across the mesh. Structurally, the Platform Layer 4302 propagates reusable semantics, governance, and reference models downstream to the Solution Layer 4304. At the same time, it receives feedback signals from solutions and runtime systems via: usage analytics (e.g., most invoked capabilities, underutilized schemas); evolution signals (e.g., frequent schema extensions or capability forks), and/or collaboration assignments (e.g., ownership escalations, conflict resolutions, or co-design activities).

This bidirectional architecture allows the Platform layer to serve not only as the semantic backbone of the mesh but also as a responsive substrate that evolves in concert with organizational needs. Through declarative configuration and layered inheritance, the platform ensures mesh-wide consistency while empowering domain-specific innovation.

Solution Layer 4304 depicts tailored compositions that extend or customize the base platform for specific operational or business domains. The layered cube illustration emphasizes that a solution comprises multiple interlinked schema layers—objects, capabilities, integrations, workflows, governance constructs—forming a localized mesh. This middle tier acts as both an inheritor of upstream schemas and a progenitor of customized downstream instances. It facilitates Solution Changes & Evolution, as well as collaborative configuration through domain-specific schema variations, policies, and runtime mappings.

Domain-specific data (such as in the Data Layer 4306) represents live, operational knowledge graphs formed by actual instances conforming to the schemas defined above. This includes concrete data about people, companies, messages, files, and interactions structured and reasoned over based on their types, relationships, and metadata. The network diagram shown here reflects the expressive graph-like interconnection among these instances and their schema-defined roles. This layer feeds rich Usage Insights and Evolution Guidance back to the solution and platform levels, enabling continuous alignment and improvement of the schema definitions.

Figure 44:
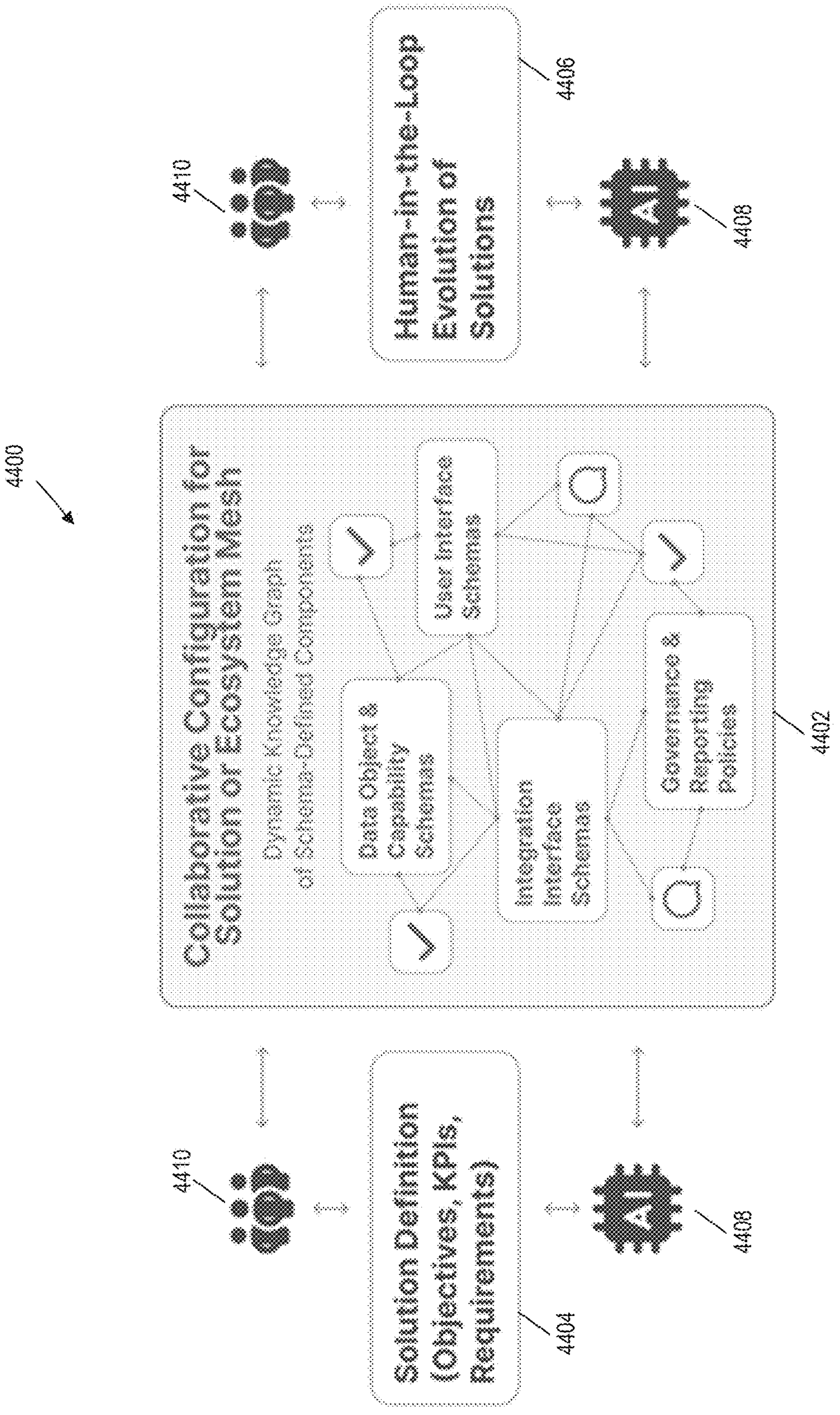
FIGS. 44-48 illustrate collaborative configuration models, human-in-the-loop workflows, and evolution guidance systems for federated environments, in accordance with an embodiment.

FIG. 44 illustrates a system 4400 (e.g., an Enterprise Mesh Platform) for collaborative configuration and lifecycle evolution of solutions/products within an Enterprise Mesh architecture, according to an embodiment. The system 4400 introduces a dynamic declarative configuration layer that is represented as an Enterprise Mesh 4402 (e.g., a dynamic knowledge graph) that enables human stakeholders and artificial intelligence systems to co-create, interpret, and govern semantically defined specs. This configuration layer is composed of interconnected specs that define structural, operational, and policy expectations, thereby enabling both real-time configuration and longitudinal evolution of capabilities and integrations across a mesh of systems. This semantic substrate forms the basis for intelligent coordination across applications, domains, and roles within the organization.

The system 4400 includes an Enterprise Mesh 4402 designated for Collaborative Configuration of Solutions or Ecosystem Meshes. The Enterprise Mesh 4402 operates as an execution-neutral semantic graph composed of reusable schema types—such as Data Object & Capability Schemas, User Interface Schemas, Integration Interface Schemas, and Governance & Reporting Policies. These components collectively define the behavioral contract for how systems are composed, governed, and interfaced. For example, the Data Object & Capability Schemas may define a domain-specific construct such as a "TaskAssignment" or "PatientRecord," while the Integration Interface Schemas describe how such constructs are transmitted or invoked across external systems, including OpenAPI definitions, message contracts, or cloud-native endpoints. The Governance & Reporting Policies may encode runtime guardrails, audit conditions, and policy inheritance that govern which entities can execute which actions under what conditions, such as data residency compliance or version-aware routing of semantic verbs.

The design and development process may begin with a high-level Solution Definition 4404, which articulates the goals, KPIs, constraints, and priorities of a solution. These may include objectives (e.g., reduce triage time by 30%), measurable thresholds (e.g., resolution within 2 hours), or domain-specific constraints (e.g., HIPAA, FedRAMP).

The high-level Solution Definitions 4404 may be collaboratively developed through inputs (e.g., conversations, meeting notes, transcripts, contracts, mission statements, user stories, performance metrics, etc.) from users 4410 (e.g., architects, product owners, compliance officers) and AI agents 4408 (e.g., language model copilots, knowledge extractors, etc.). These actors may co-author or synthesize semantic specs that get added to the Enterprise Mesh 4402. This step is analogous to the Reference Architecture and Design phases shown in FIG. 13. Through their collaboration, the analytics server may add high-level Solution Definition 4404 to the dynamic mesh of skl:Specs (e.g., the Enterprise Mesh 4402).

Once defined, these specs are subject to iterative refinement and continuous validation as they continuously fleshed out, refined, and/or developed into a comprehensive solution by collaboration between actors, which may include one or more agents autonomously or semi-autonomously generating, evaluating, and/or optimizing specs and components. At certain points, the agents may trigger alerts, such as an skl:Issue, routed to the Human-in-the-Loop 4406 triage, evaluation, and/or decision making. As solution usage unfolds, changes in usage patterns, upstream dependent systems' configuration, updated AI models, emerging compliance requirements, or runtime events may prompt the system to proactively suggest schema adjustments. For instance, if a new regulation requires tracking consent metadata on all patient interactions, the Governance Policy schema may be augmented with an AI-suggested addition to a capability's data contract. In another example, a FAR/DFARS regulations may change triggering remediation issues to be generated around all potentially impacted specs or contracts. Users 4410 can then review and approve these alerts (e.g., Issues with proposed changes). This enables continuous, practical evolution of complex ecosystems with nontrivial dependencies on external systems, policies, etc. Similarly, runtime telemetry or collaboration signals may highlight underutilized inputs or mismatched interfaces, prompting a co-evolution of User Interface Schemas or Integration Interfaces. This closed-loop refinement model ensures that solutions remain relevant, compliant, and well-integrated as the broader mesh continues to evolve.

The collaborative configuration illustrated in FIG. 44 exemplifies how users 4410 and AI agent 4408 participate in co-creating semantic specifications. These AI agents may function within a broader agent-to-agent communication framework, where each agent possesses specialized capabilities defined and discovered through SKL specifications. For example, a Requirements Analysis Agent might extract semantic concepts from business documentation, while a Specification Generator Agent transforms these concepts into formal SKL specifications. These agents communicate through semantically-defined messages that conform to shared object specifications, enabling traceable, governed, and semantically interoperable collaboration.

Figure 45:
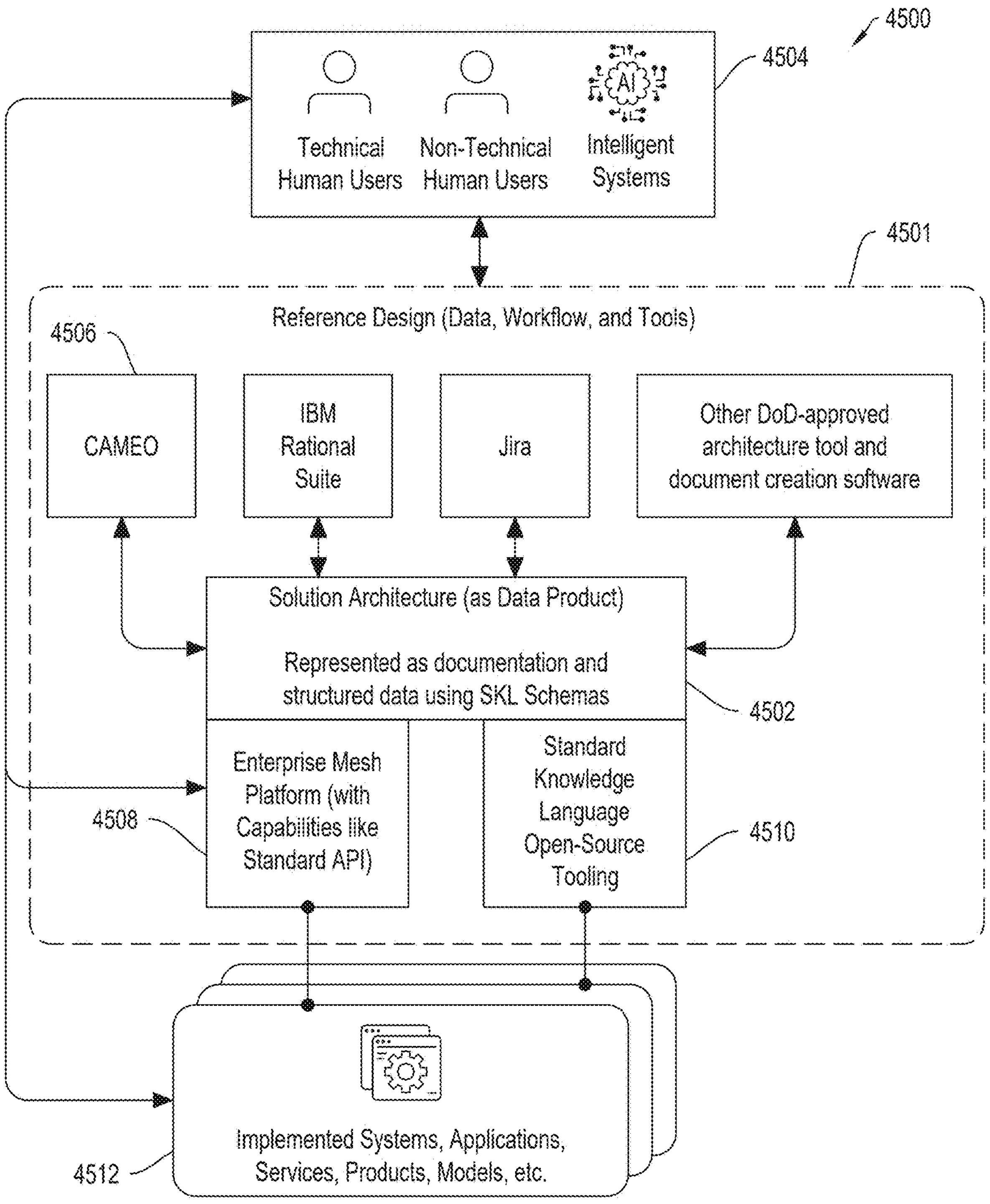
Figure 45:
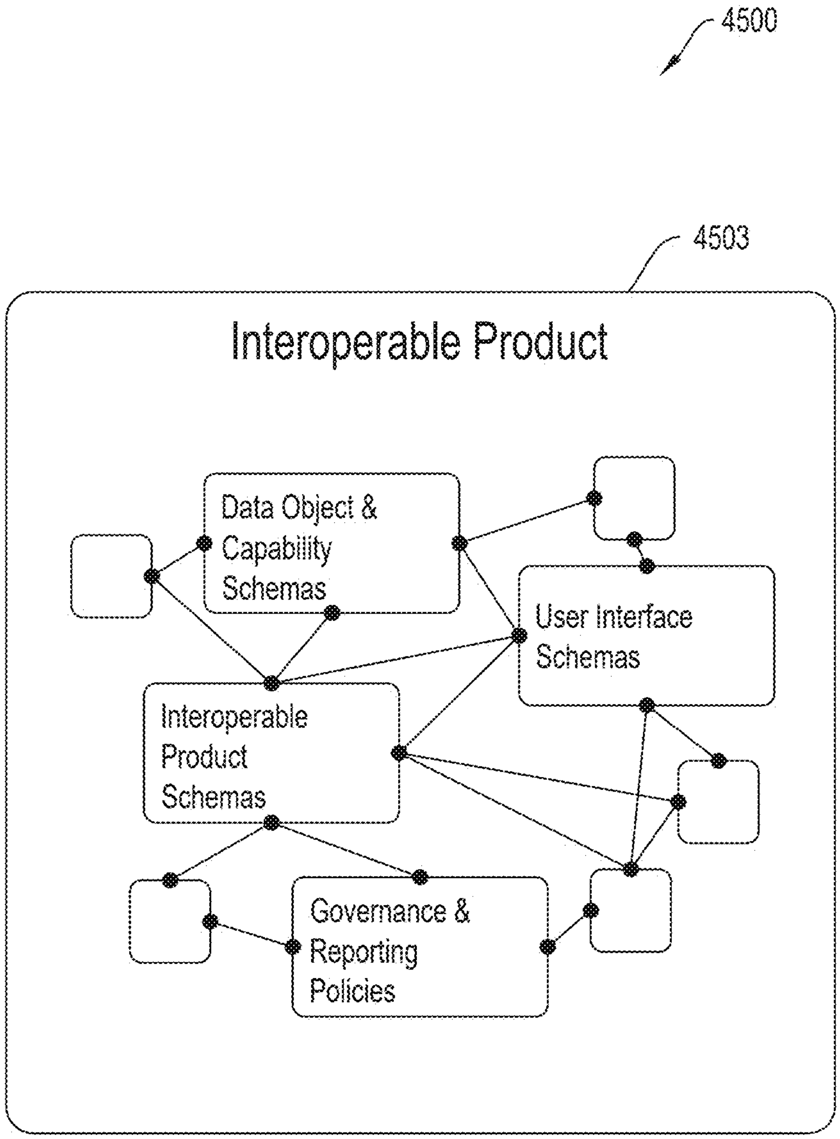

FIG. 45 illustrates a system 4500 that enable the ingestion, normalization and integration of heterogenous data into specifications within an Enterprise Mesh (e.g., that are related to a skl:Product). This system supports the transformation of reference architectures, requirements diagrams, conversations, meeting notes, project management projects, legacy documents, domain-specific models, and more into structured SKL representations.

A system 4500 includes an environment for developing reference designs 4501, showing how inputs from multiple types of users 4504—technical users, non-technical users, and intelligent systems—are incorporated. These actors work within or alongside tools commonly used in enterprise architecture or systems engineering environments 4506, such as CAMEO®, IBM Rational Suite®, Jira®, and other architecture tools that house design artifacts such as workflows, API specs, compliance rules, or system diagrams. These tools are used by the actors 4504 to develop a reference design 4501 into a Solution Architecture 4502. Importantly, these heterogeneous sources can be integrated and/or ingested into an Enterprise Mesh via pipelines that map them into SKL Schemas and create a Solution Architecture 4502 using SKL specs and instances that are related grouped or related via Product 4503.

In other words, these specifications are assembled into a Solution Architecture as Data Product 4502—a self-contained, versionable unit of interoperable design—that is accessible and manageable as schemas that work with open SKL tooling 4510, as well as can be more easily accessed, edited, and validated via an Enterprise Mesh Platform 4508. Once ingested, the schemas become part of the mesh, allowing products, services, and workflows 4512 to interoperate declaratively.

The result is a fully normalized, semantically linked specification graph—termed an Interoperable Product—that unifies previously siloed assets across tools, domains, and contributors into a composable and governed configuration layer. Moreover, this semantically rich representation enables advanced AI systems to reason over, validate, and generate specifications and implementation artifacts with precise alignment to enterprise semantics, governance requirements, and architectural patterns.

Figure 46:
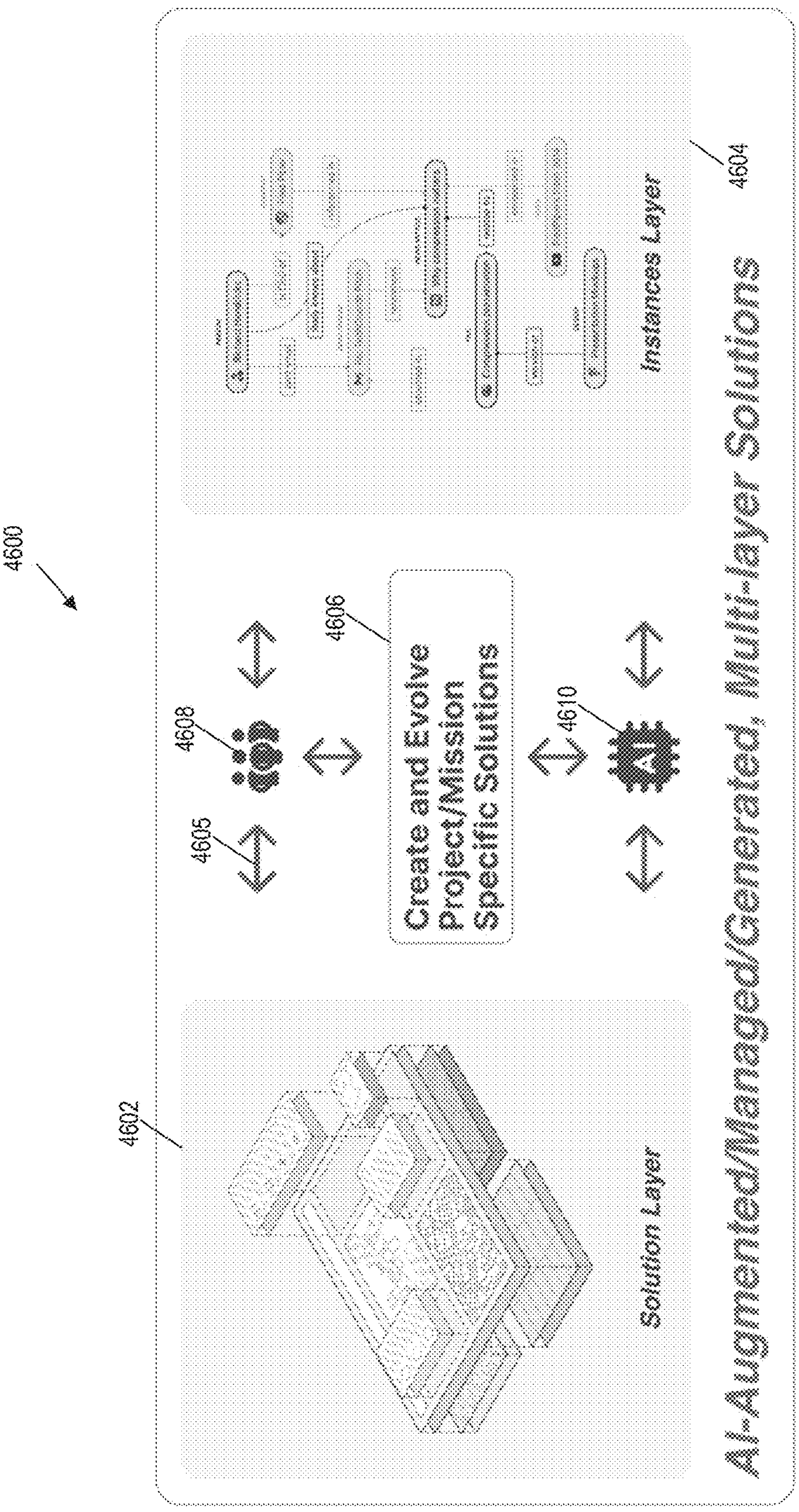

FIG. 46 illustrates a conceptual system 4600 for collaborative interplay between AI systems and human stakeholders around structured schemas (SKL:Specs) and data/instances in the lifecycle management of mission- or project-specific solutions. The system includes two primary planes of interaction: a Solution Layer 4602 composed of structured SKL specifications, and an Instances Layer 4604 composed of live data and artifacts that conform to those specifications.

The Solution Layer 4602 corresponds to the layered, modular structure of specs used to define a solution's architecture, such as skl:Object, skl:Capability, skl:Policy, and skl:IntegrationInterface. These schemas may include specifications for objects, capabilities, governance models, interfaces, and integrations, all layered to support flexibility and reuse. Tasks, issues, or evolution actions can be triggered by AI or human agents in response to changes or signals within these schema-defined configurations.

The Instances Layer 4604, is illustrated as a semantic knowledge graph of actual operational data and artifacts conforming to the specifications. These may include files, emails, dashboards, systems, and relationships-anything that conforms to the SKL-defined shapes. The instance graph provides contextual evidence and feedback to the specification layer, enabling issue detection, usage insight, and policy evaluation.

A collaborative function 4606 shared between AI agents 4610 and human contributors 4608 coordinates schema refinement and system evolution, as well as dataset management. AI agents may monitor instance-layer telemetry to detect anomalies, violations, or underutilized components. They may generate proposed schema updates (e.g., new skl:Properties, revised capability contracts) or trigger the creation of skl:Issue or skl:Workflow items. These proposals are surfaced to users through collaborative interfaces for approval, enrichment, or rejection, ensuring a human-in-the-loop governance model.

The arrows (e.g., arrow 4605) surrounding the central solution evolution function indicate bi-directional interaction between the AI and humans (vertical axis) as well as between the specification and instance layers (horizontal axis). The system enables AI reasoning across both "design-time" specs and real-time operational data, with alignment ensured via schema conformance and task telemetry. This architecture enables responsive, governed solution evolution—where live context continuously shapes design, and semantic specs actively govern operations.

The bidirectional interaction shown in FIG. 46 demonstrates how AI agents 4610 and human contributors 4608 collaborate in evolving mesh (e.g., solution) specifications. This collaboration extends beyond simple assistance to include sophisticated specification development workflows, where AI agents may propose specification refinements, validate semantic consistency, or generate implementation artifacts based on specifications. These agents operate within a semantic context defined by the enterprise mesh, ensuring that all generated content—whether specifications, code, or governance artifacts—remains aligned with enterprise policies and architectural standards.

Figure 47:
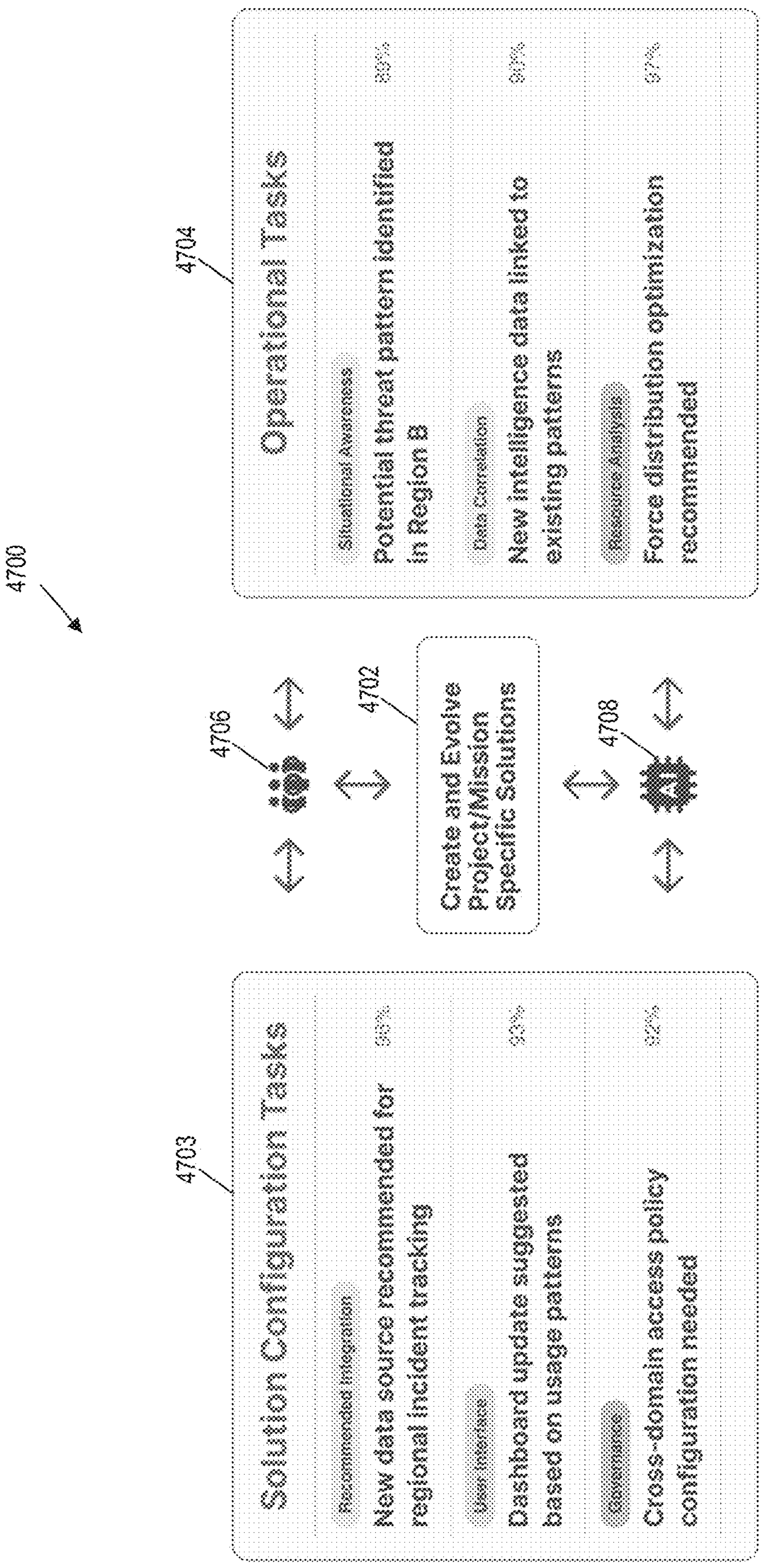

FIG. 47 illustrates a conceptual system 4700 (which may be substantially similar to the conceptual system 4600) that supports intelligent task (e.g., skl:Issue) generation within a schema-driven solution framework as a way to manage AI-driven, human-in-the loop collaboration, according to a non-limiting embodiment. The system is configured to process data in two distinct domains (e.g., potentially according to different skl:Policies or skl:Workflows), and create separate lists of tasks for human review: (1) solution configuration tasks derived from reasoning over specifications, and (2) operational tasks inferred from live data patterns. Together, these issues guide the co-evolution of a holistic project- or mission-specific solution through better collaboration between human stakeholders and AI agents.

Block 4702 represents the central function of solution creation and evolution, where users 4706 and AI agents 4708 act as co-evolutionary collaborators. These actors participate across the entire solution lifecycle, contributing to both upstream design and downstream refinement based on real-time signals and historical patterns.

Block 4703 illustrates "Solution Configuration Tasks," which represents recommendations generated by reasoning over SKL:Specs themselves (e.g., instances of skl:Object, skl:Capability, and skl:Policy). These are suggestions for changes at the schema level, such as:

A Recommended Integration may be surfaced based on unused interfaces or overlapping data domains (e.g., "Connect to Source X to improve incident tracking," with 96% confidence).

A UI Update might be proposed due to underutilized schema fields or interaction patterns (93% confidence).

A Governance Adjustment may be prompted by inconsistencies in access control or policy inheritance logic (92% confidence).

These tasks are instantiated as skl:Issue specs and routed through mesh-governed review processes. The tasks are tied to schema-defined artifacts to facilitate their retrieval when contextually relevant. In some embodiments, an agent may generate an skl:Workflow or other spec to as a recommended implementation or remediation associated with the Issue.

Block 4704 illustrates "Operational Tasks," which shows how AI systems can also reason over live data and operational state-instances that conform to previously defined specs. These may include the following examples:

Situational Awareness alerts based on anomaly detection (e.g., threat patterns in Region B with 89% confidence).

Data Correlation Tasks connecting new instance data to known semantic clusters. (90% confidence).

Resource Optimization Recommendations derived from capacity or utilization trends. (97% confidence).

As with the spec-focused tasks, each instance-related task links back to the associated entity and can trigger issue reports, workflow suggestions, or remediation steps.

The combination of blocks 4703 and 4704 reflects a full-spectrum intelligent orchestration model, where AI agents can reason over both design-time specs and real-time operational data. Human stakeholders are able to interact with the same data and remain in the loop to validate, enrich, or override AI-generated tasks, as well as to configure the AI agents themselves, ensuring governance and traceability.

More broadly, the AI-generated tasks illustrated in FIG. 47 represent one application of a broader specification-driven artifact generation framework. Beyond task generation, AI agents can interpret SKL specifications to produce various artifacts including comments, messages, documents, source code, user interfaces, documentation, and test suites. This generation process leverages the semantic richness of specifications, ensuring that generated artifacts correctly implement the behavioral contracts, data structures, and governance constraints defined in the specifications. The confidence scores shown in FIG. 47 (96%, 93%, 92%) exemplify the validation metrics that might accompany generated artifacts, providing transparency and traceability.

In some embodiments, the AI agents illustrated in FIG. 47 may function within a structured multi-agent architecture for specification-driven artifact generation. These specialized agents leverage formal SKL specifications to generate implementation code, validate functional correctness against specification-defined contracts, and optimize performance while maintaining semantic compliance. Unlike traditional approaches, this system uses specifications as both machine-interpretable blueprints guiding generation and as authoritative criteria for automated validation, creating a feedback loop where implementation artifacts are continuously verified against their governing specifications.

Figure 48:
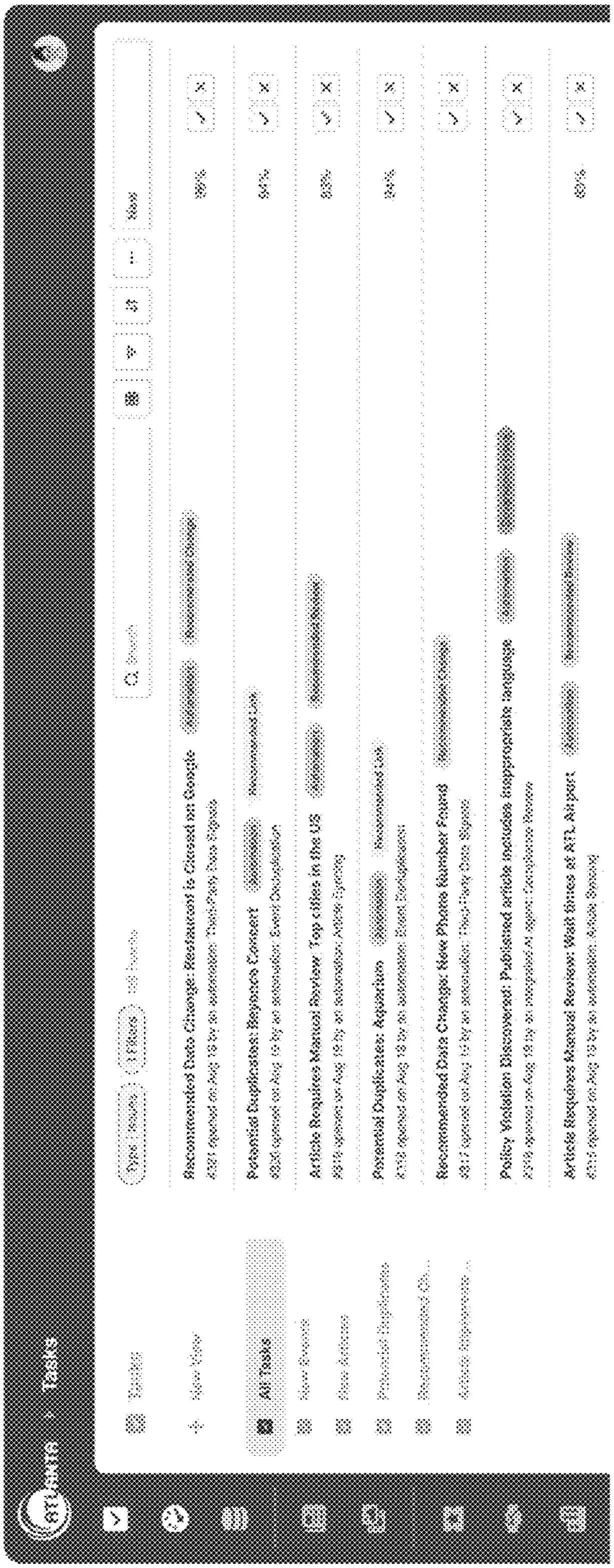

FIG. 48 illustrates an example GUI 4800. The GUI 4800 includes an interface-level illustration of how tasks can be created and managed over instance data within the Enterprise Mesh framework. The GUI 4800 may include an operational dashboard branded as "ATLANTA Tasks," which presents a task-centric workflow engine capable of surfacing issues, changes, and recommendations over data instances.

This interface exemplifies how workflows—configured declaratively at the schema level—can result in automatic, semi-automatic, or manual tasks that assist with system governance, maintenance, and refinement. Each row in the interface corresponds to an individual task, such as:

"Recommended Data Change: Restaurant is Closed on Google", flagged by automation based on third-party data signals, and tagged as both "Automation" and "Recommended Change."

"Potential Duplicates: Beyonce Concert", generated via event deduplication logic, and tagged as "Recommended Link."

"Policy Violation Discovered", surfaced by an integrated AI compliance engine, flagged as both an automation and a governance issue.

Each task is accompanied by a confidence score (e.g., 96%, 94%, etc.), and icons for validation, rejection, or further review, reflecting a system that supports human-in-the-loop workflows. This affirms that task resolution within the mesh can be managed collaboratively, and decisions can be tailored based on confidence levels and schema-based workflows.

Figure 50:
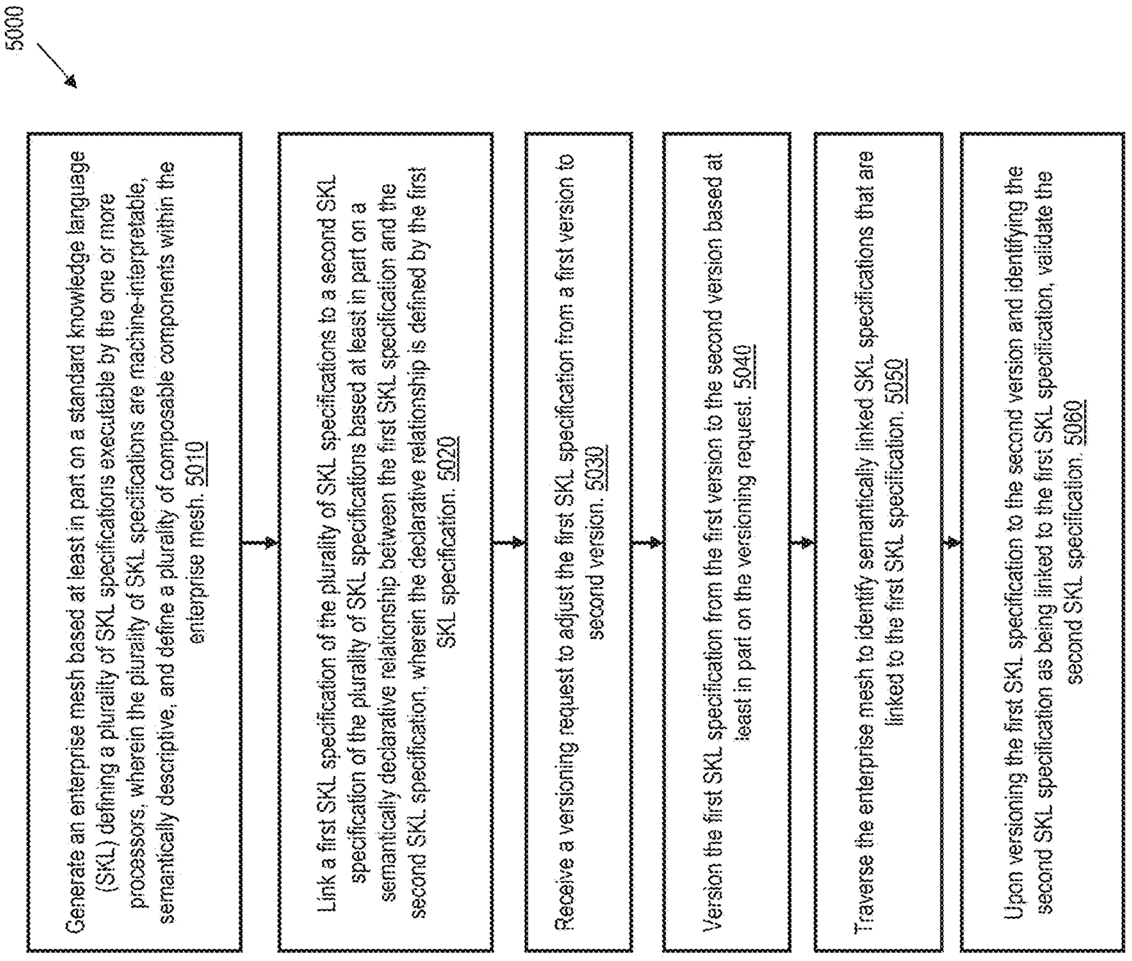
FIG. 50 illustrates a computer-implemented method flow for maintaining semantic linkages, performing version management, and executing validation processes across a distributed semantic mesh, in accordance with an embodiment.

FIG. 50 illustrates an example computer-implemented method 5000 for enabling decentralized interoperability across a distributed computing environment through the application of semantically defined schema specifications. The method may be performed by one or more processors configured to generate and manage an enterprise mesh based on a plurality of SKL specifications. The described operations may be executed by distributed computing nodes, may occur locally or remotely, and may be performed in any suitable order unless a particular sequence is explicitly required. Additionally, one or more steps may be omitted, repeated, or performed concurrently, and the method may be implemented in hardware, software, or a combination thereof. In some embodiments, subsets of the operations may be executed iteratively or recursively across layers of nested semantic relationships, allowing the enterprise mesh to support dynamic evolution while maintaining interoperability and semantic integrity.

At step 5010, the method includes generating, by one or more processors, an enterprise mesh based at least in part on a Standard Knowledge Language that defines a plurality of SKL specifications executable by the one or more processors. In some embodiments, this generation includes initializing a semantic registry or metadata catalog that is configured to receive and index a set of SKL specifications. Each SKL specification may include one or more declarative definitions that describe a component's structural type (e.g., skl:Object, skl:Capability, skl:Interface), associated attributes, semantic roles, and composability parameters. The processors may ingest SKL specifications from a data source, such as a repository, data lake, user device configuration file, or API feed, and parse each specification to extract semantic descriptors and schema inheritance logic.

In certain embodiments, generating the enterprise mesh includes organizing the extracted specifications into at least one knowledge graph (also referred to herein as nodal data structure and dynamic knowledge graph) wherein nodes correspond to individual SKL specifications and edges correspond to declared relationships such as extends, dependsOn, uses, mapsTo, or implements. Relationships can be implied through properties as well as explicit relationships. For example, John, an SKL:Person hasFriend: Jane (another SKL:Person). The knowledge graph may be a local file system, a relational database, a blockchain, etc. During this process, the processors may resolve namespace dependencies and apply normalization or schema validation routines to ensure that each specification complies with platform-level governance rules or structural constraints. The resulting enterprise mesh may include composable components such as data models, capability definitions, interface schemas, API contracts, workflow instructions, and governance policies—each defined as an instance of a machine-interpretable SKL Spec.

The processors may further compute metadata properties for each SKL specification, such as a unique identifier (UID), version information, authorship lineage, semantic tags, and compliance annotations. In some embodiments, the processors may use rule-based engines or AI models to infer implicit relationships between specifications or to detect redundancies and recommend merging or refactoring. Once instantiated, the enterprise mesh forms a dynamic, executable foundation for downstream semantic resolution, capability invocation, governance enforcement, and recursive schema propagation across a distributed computing environment.

The one or more processors may execute a series of operations that collectively instantiate the enterprise mesh as a structured and semantically linked environment of interoperable components. Upon invocation, the processors first retrieve one or more SKL specifications from a designated source—such as a local file system, remote repository, or API endpoint—and parse each specification to extract declarative metadata and structural descriptors. This parsing may include deserializing JSON-LD, RDF, or other structured formats into internal data representations usable by the runtime.

Next, the processors identify the type of each SKL specification (e.g., skl:Object, skl:Capability, skl:Interface, skl:Policy) and evaluate any included inheritance directives, composability tags, or relationship annotations. Based on this evaluation, the processors generate a node in an in-memory semantic graph corresponding to each specification and create edges between nodes based on declared relationships such as extends, uses, implements, or mapsTo.

In the context of the Enterprise Mesh and SKL-based architecture, edges may additionally or alternatively refer to the declared semantic relationships that connect two or more SKL Specifications within the underlying knowledge graph. These edges are not merely abstract links but are explicitly defined using declarative predicates—such as uses, extends, dependsOn, composesWith, or mapsTo—which encode the nature of the relationship between a source specification and a target specification. The edge carries semantic meaning that informs how one component depends on, inherits from, references, or transforms another within the mesh.

For example, if a Capability specification references an Object specification via an input parameter, this relationship would be represented as a semantic edge from the Capability node to the Object node, annotated with a predicate like hasInput or uses. These edges form the structural and logical fabric of the enterprise mesh, allowing reasoning engines and execution platforms to traverse relationships, infer dependencies, propagate changes, and enforce governance policies dynamically.

Once the initial semantic graph is established, the processors traverse the graph to resolve interdependencies, validate conformance to platform schemas, and apply any system-defined governance rules or schema normalization policies. For example, if a given skl:Capability specifies input or output parameters that reference skl:Object types, the processors verify that those referenced objects exist, match expected structural patterns, and are version-aligned.

In series or parallel, the processors may assign computed metadata to each node, such as a system-generated unique identifier, version group identifier, namespace designation, execution context, version label, and compliance status. In some configurations, processors invoke auxiliary reasoning engines or plug-in modules to enrich the graph with inferred relationships, semantic tags, or optimization recommendations (e.g., detecting duplicate definitions or resolving ambiguous mappings).

Finally, the processors serialize and store the resulting enterprise mesh—now composed of SKL-defined components arranged as an executable semantic graph—into a persistent store, cache layer, or message bus for further use. In some embodiments, the specs may be stored on different systems, databases, folders, etc. This mesh can now support runtime evaluation, distributed invocation, semantic traversal, and policy enforcement. Throughout the process, the processors perform the work autonomously, driven entirely by declarative SKL specifications and without reliance on hardcoded integration logic.

At step 5020, the method includes linking, by one or more processors, a first SKL specification of the plurality of SKL specifications to a second SKL specification of the plurality of SKL specifications based at least in part on a semantically declarative relationship between the first SKL specification and the second SKL specification, wherein the declarative relationship is defined by the first SKL specification. In some embodiments, this step involves interpreting one or more semantic relationship predicates encoded in the first SKL specification (e.g., uses, extends, dependsOn, composesWith) that reference a second specification via a resolvable identifier such as a uniform resource identifier (URI), canonical label, or namespace-qualified path.

As a non-limiting example, a first SKL specification defines a property specification labeled "firstName," and declares its type as a string. A second SKL specification, "Person," may reference this property by declaring a relationship via a SHACL-compliant skl:Property declaration that links to "firstName." The relationship between "Person" and "firstName" is semantically declarative and encoded within the structure of the "Person" specification itself—e.g., using a predicate such as uses or hasProperty. The processors recognize and materialize this relationship through identifier resolution and relationship inference.

In another illustrative example, a property specification labeled "hasFriend" may declare its expected value type to be "Person." Here again, a semantic relationship is established between "hasFriend" and "Person." Further downstream, a capability specification titled "findFriends" may define its input as a "Person" object while also embedding internal mappings or logic that reference the "hasFriend" property. In this context, the relationship chain spans multiple SKL specifications—linking a capability to an object spec, and that object spec to a property spec—all through embedded semantic declarations.

Accordingly, if the "hasFriend" property specification were subsequently modified (e.g., its type changed or removed), the embedded semantic assumptions within the "findFriends" capability could become invalid. A semantic reasoner operating within the Enterprise Mesh should be capable of tracing this chain of declarative relationships and identifying that the update to "hasFriend" potentially violates the expected semantics of the "findFriends" capability. Such breakage can be flagged for remediation or versioning intervention. This example illustrates how declarative relationships defined by the first SKL specification, when interpreted by one or more processors, enable dynamic linkage and semantic governance across distributed SKL-defined components.

The one or more processors may first resolve the reference by matching the identifier to a corresponding entry in the previously instantiated enterprise mesh graph. Upon successful resolution, the processors establish a graph edge between the first and second SKL specifications, annotated with the semantic relationship type and any qualifiers (e.g., version scope, optionality, override conditions). In some configurations, the processors validate that the declared relationship is type-compatible according to schema-level constraints. For example, a skl:Capability that declares a dependency on a skl:Object must reference a valid and conformant object definition; a skl:Interface that extends another interface must conform to the expected structural inheritance rules.

The one or more processors may also traverse declarative relationship chains and create transitive edges within the enterprise mesh to optimize downstream traversal and dependency resolution. For instance, if Specification A uses Specification B, and Specification B mapsTo Specification C, the processors may optionally record a derived uses relationship from A to C for semantic inference purposes. In more advanced configurations, the processors apply rule-based inference logic or ontology reasoners to classify the resulting relationship as direct, inferred, conditional, or policy-bound.

While in some embodiments a skl:Spec may be modeled as a combination of semantic web constructs (e.g., OWL classes and SHACL node shapes), in other embodiments (as described in detail herein) it may also be represented using JSON schemas, XML schemas, Bill of Materials (BOMs) files, compiled formats like Protocol Buffers, and/or other structured definition formats. Moreover, each skl:Spec may incorporate existing definition formats (e.g., OpenAPI specifications, XACML for policy expressions, etc.) through properties such as "skl:declarativeApiDefinition" (for API specifications), "skl:policyExpression" (for policy languages), or similar extension points. This property-based approach enables skl:Specs to embrace and extend existing standards rather than replacing them.

During the linking process, the one or more processors may tag the relationship with metadata, such as context-specific application domain, confidence score, lineage information, or dynamic resolution strategy. This metadata enables runtime systems to distinguish between hard-coded structural dependencies and soft, runtime-evaluated contextual bindings. In embodiments where declarative SKL specifications contain embedded execution rules (e.g., conditional inclusion, scope restriction, or composability gating), the processors evaluate these rules before establishing the semantic link in the mesh.

At step 5030, the method includes receiving, by one or more processors, a versioning request to adjust the first SKL specification from a first version to a second version. In some embodiments, the versioning request may originate from a human user, an AI agent, or an automated system trigger—such as a policy change, schema update, or downstream dependency event. The versioning request may be received via an API endpoint, configuration management interface, semantic editing tool, or declarative transaction log.

In some embodiments, the processors query a semantic registry or knowledge graph index to locate the currently active (e.g., stable) version of the SKL specification. The processors may then retrieve the complete specification document, including its type declarations, structural metadata, relationship annotations, semantic tags, and schema content. In response to the versioning request, the processors prepare a provisional copy of the specification that incorporates any declared changes—such as modified fields, updated relationship bindings, policy reassignments, or documentation updates.

To maintain semantic traceability, the processors may embed lineage metadata in the second version, indicating that it is a revision of the first version. This may include a version history field, timestamp, user ID or agent ID of the requestor, approval chain, and cryptographic signature or hash chain. In configurations involving collaborative governance, the processors may flag the provisional version for review or approval before it is committed to the mesh.

In certain embodiments, the processors apply pre-commit validation routines to the second version. These routines may verify structural integrity, ensure compatibility with downstream components, check for policy violations, or trigger synthetic testing scenarios. The processors may also run a diff analysis between the first and second versions to enumerate semantic differences—e.g., newly added input parameters, renamed fields, changed output types, or revised usage conditions.

Once validated, the processors may prepare the second version for activation by assigning it a new unique identifier, updating mesh-wide relationship references, and optionally deactivating the first version (or marking it as deprecated). In some configurations, the processors may retain both versions simultaneously in the enterprise mesh, allowing multiple consumers to specify version pinning or fallback strategies as part of their declarative references.

In certain embodiments entities have a "stableId" or "versionGroupId" property to facilitate stable or consistent referencing across multiple versions because each version that is created may receive its own unique id. In these cases, referencing an entity by its stableId may always give you the latest or the stable version associated with that stableId value.

At step 5040, the method includes versioning, by one or more processors, the first SKL specification from the first version to the second version based at least in part on the versioning request. Upon confirming the validity and intent of the received versioning request (as described in step 5030), the processors initiate a controlled versioning operation to instantiate a new version of the SKL specification while preserving semantic continuity and mesh-wide linkage integrity.

In one embodiment, the processors begin the versioning process by cloning the first SKL specification and assigning the clone a new version identifier, such as a sequential tag (e.g., "v1.3.0") or a semantic hash (e.g., SHA-256 of the updated schema content). This clone may retain metadata from the first version—such as UID, authorship lineage, and prior dependency references—while incrementally updating specific fields, declarations, or semantic annotations as described in the versioning request.

Next, the processors perform schema reconciliation logic, which may include updating field definitions, adjusting input/output types, inserting or modifying semantic tags, or changing linked object references. For example, if the updated version introduces a new property to a skl:Object type or modifies the output signature of a skl:Capability, the processors recompile the affected declaration block while preserving conformance to platform-level constraints or schema inheritance rules.

In some implementations, the processors generate a change summary or semantic diff that catalogs the differences between the first and second versions. This summary may include additions, deletions, renamings, constraint relaxations, or semantic reclassifications. These diffs may be attached as metadata to the second version and used in downstream impact analysis and governance workflows.

The processors may then validate the newly versioned specification using a series of rules-based or AI-augmented validators to ensure internal consistency and mesh-wide interoperability. This may include resolving namespace changes, verifying dependency integrity, checking structural constraints (e.g., cardinality, type compatibility), and confirming policy compliance as defined in the platform governance layer.

Upon successful validation, the processors commit the second version to the enterprise mesh's semantic registry or distributed schema repository. This commit operation may involve persisting the new version to a graph database, publishing a versioned API endpoint, or updating an active runtime mesh instance with the newly declared specification.

In some embodiments, the processors also propagate metadata changes associated with the second version, such as version history entries, lifecycle state (e.g., "stable," "beta," "deprecated"), and transition rules (e.g., "allow fallback to v1.2.0," "force migration from v1.0.0"). These updates may be logged to a version tracking subsystem or exposed to human reviewers via a semantic UI.

By executing these steps, the processors create a semantically rich, machine-interpretable second version of the SKL specification that is integrated into the broader enterprise mesh, allowing future graph traversal, validation, execution, and reasoning to take this versioned state into account.

In some embodiments, the one or more processors may support multiple status types for versioned specifications within a single branch, such as "draft," "staging," "production," "deprecated," and "archived." Each status may carry different governance implications and visibility constraints within the enterprise mesh. For instance, specifications with "draft" status may be visible only to authorized development stakeholders, while "production" status specifications are available to all authorized consumers in the mesh. This fine-grained status management enables complex workflow governance throughout the specification lifecycle.

In some embodiments, the versioning process may support a branching mechanism, wherein the one or more processors maintain multiple distinct lineages of a given SKL specification simultaneously. For example, a production branch may maintain stable versions currently in use across the enterprise mesh, while one or more feature branches support parallel development of new capabilities without disrupting production operations.

At step 5050, the method includes traversing, by one or more processors, the enterprise mesh to identify semantically linked SKL specifications that are linked to the first SKL specification. This traversal is triggered in response to a versioning event (e.g., as described in step 5040), and enables the system to detect and analyze all downstream or related specifications that may be affected by the version change.

In some embodiments, the processors begin by locating the node in the enterprise mesh graph corresponding to the first SKL specification (e.g., via its unique identifier or semantic URI). Once located, the processors execute a graph traversal algorithm (e.g., breadth-first search, depth-limited search, or semantic query evaluation) to follow all outbound and inbound edges representing declarative relationships, such as dependsOn, uses, extends, implements, mapsTo, linkedVia, or other platform-defined linkage types.

Additional or alternative methods for may include, for example, parallel query distribution may simultaneously dispatch resolution requests across multiple registries or repositories across domains, enabling low-latency discovery in distributed environments, wherein the one or more processors simultaneously dispatch discovery requests to multiple repositories across domains. Identifier-based routing may use the structure of the SKL Specification ID itself—for instance, a namespace or domain prefix embedded in the ID—to direct the request to the appropriate domain or server, wherein the structure of the specification's identifier contains embedded domain information that directs the resolution process. Federated registry consultation allows the system to query a mesh-wide index or directory of specification locations and their current metadata, wherein the one or more processors query distributed specification indexes that map identifiers to their locations across domains. Semantic relationship traversal leverages known SKL relationships (e.g., dependencies, inheritance, mappings) to locate related specs even when direct references are unavailable, wherein the one or more processors follow the declared relationships between specifications to discover related components across domain boundaries.

Each edge in the graph corresponds to a semantic dependency or composability relationship between SKL specifications. For example, if the first SKL specification is a skl:Capability that depends on certain skl:Object types for its input or output definitions, or if it is referenced within a solution-level workflow or policy, the processors identify and catalog all such linked specifications.

In some implementations, the traversal includes recursive or chained dependency resolution, such that specifications indirectly linked to the first SKL specification (e.g., transitive dependencies) are also surfaced. The processors may construct a dependency tree, lineage map, or semantic impact graph that captures all affected nodes, their relationship types, and relative depth from the root (e.g., the first specification).

The processors may also expand the traversal results with metadata indicating the nature and criticality of each linkage. For instance, certain relationships may be marked as "strong bindings" (e.g., hard references that require synchronized version updates), while others may be "soft references" (e.g., optional configurations or runtime overrides). This classification enables differentiated handling in downstream validation, alerting, or update workflows.

In some embodiments, the processors may apply semantic filters to limit traversal to specific relationship types, SKL categories (e.g., only traverse skl:Object and skl:Interface types), or version bounds (e.g., exclude deprecated or obsolete nodes). These traversal parameters may be defined declaratively within the mesh governance policies or inferred from the context of the triggering version change.

In some embodiments, the one or more processors implement a multi-layered semantic break detection algorithm that extends beyond simple field presence validation. This algorithm may analyze specifications at multiple semantic levels, including structural compatibility (field presence/absence), type compatibility (data format alignment), semantic intent compatibility (purpose and meaning alignment), and behavioral compatibility (runtime expectation alignment).

In some embodiments, the dependency traversal mechanism employs a weighted graph analysis approach when validating linked specifications. This approach may assign different significance levels to various types of semantic relationships (e.g., "extends" relationships may carry higher semantic weight than "references" relationships), enabling prioritized impact assessment across complex dependency chains. The traversal engine may construct a complete impact graph that captures both direct and transitive dependencies, with metadata indicating relationship criticality and potential remediation complexity.

In some embodiments, the semantic analysis engine incorporates ontological reasoning capabilities that interpret relationships within and between SKL specifications. This reasoning engine may leverage defined term sets, semantic annotations, and contextual metadata to determine semantic equivalence, subsumption relationships, or transformation pathways between concepts across specifications. For example, when a property is renamed, the semantic analyzer may detect that despite structural difference, the semantic intent remains equivalent based on defined term references or contextual usage patterns across the enterprise mesh.

Upon completion of the traversal, the processors may store the identified set of linked SKL specifications in a semantic change set, which serves as input for subsequent validation (step 5060), notification, or update propagation procedures. The processors may also log the traversal operation, annotate affected nodes with impact metadata, or surface the dependency graph in a visualization interface for human review or AI co-pilot augmentation.

At step 5060, the method includes, upon versioning the first SKL specification to the second version and identifying the second SKL specification as being linked to the first SKL specification, validating, by one or more processors, the second SKL specification. This validation process ensures semantic coherence, structural integrity, and behavioral compatibility across the affected portions of the enterprise mesh in response to the versioning event.

In some embodiments, the one or more processors begin by retrieving the updated version of the first SKL specification (as generated in step 5040) and loading its semantic contract, including any updated attributes, schema structures, or execution behaviors. The processors then access the set of semantically linked SKL specifications identified during the traversal operation in step 5050 and initiate a validation loop for each of those linked specifications.

For each linked SKL specification (e.g., the second SKL specification), the processors parse its declarative definition to extract dependency references, version alignment constraints, expected interface shapes, and structural relationships—such as required data bindings, role mappings, or inheritance declarations. These extracted values are then compared against the updated definition of the first SKL specification to detect any compatibility violations, mismatches, or deprecated feature usage.

For example, if the second SKL specification declares an input parameter that is structurally bound to a now-modified object type in the first SKL specification, the processors evaluate whether the new structure remains compatible (e.g., via shape matching, cardinality verification, or schema coercion). If the second SKL specification extends or implements a capability or policy from the first, the processors verify that the inherited contract remains fulfillable under the new version.

In some implementations, the validation process includes type-checking, schema alignment testing, and rule-based governance enforcement. The processors may invoke predefined conformance rules—such as "all implemented interfaces must support the updated parameter types" or "version X deprecates attribute Y, flag if still in use"—to automatically evaluate the second SKL specification's compliance. These rules may be part of the platform's embedded validation engine or dynamically loaded from governance policy specifications.

In cases where validation fails, the processors may generate a structured issue report (e.g., via skl:Issue) or change log entry indicating the nature of the validation failure, the impacted nodes, and potential resolution actions (e.g., refactor, remap, override), among other associated remediation metadata. This issue may be stored in a semantic issue tracker, sent to an AI reasoning module for remediation suggestions, or flagged for human-in-the-loop intervention.

In some embodiments, the processors may automatically revalidate dependent specifications recursively if the second SKL specification itself has downstream dependencies. This ensures end-to-end propagation of validation across the mesh and supports continuous integrity checking as specifications evolve.

Additionally, successful validations may be recorded in a version-aware compliance ledger or metadata catalog, allowing for auditability and longitudinal tracking of specification conformance. The processors may also emit status signals or lifecycle events to notify downstream systems or mesh participants that the second SKL specification has passed validation in the context of the first specification's version change.

When the second SKL specification cannot be validated due to a broken link caused by the versioning of the first SKL specification, the one or more processors initiate a structured error-handling and impact resolution workflow to preserve semantic integrity within the enterprise mesh while alerting relevant systems and to the inconsistency.

Upon detecting that a declarative relationship from the second SKL specification points to an invalid, missing, or incompatible version of the first SKL specification, the processors classify the failure as a link resolution error (e.g., a skl:Issue). This may occur, for example, when the updated version of the first SKL specification has removed or renamed a field, modified a capability contract, or deprecated an expected object type or API shape that the second SKL specification still references.

The processors may first attempt automated mitigation, such as (1) checking for alternate versions of the first SKL specification that satisfy the second specification's declared constraints (e.g., version fallback, compatible minor versions); (2) evaluating if a structural shim or backward-compatible mapping (e.g., a skl:Mapping spec) is available to bridge the discrepancy between the old and new versions; and/or (3) suggesting inferred changes to the second SKL specification, such as updating references to the new field or adjusting structural expectations using default values or relaxed constraints If automated reconciliation is not possible, the processors log the failure as a semantic validation exception and mark the second SKL specification as being in a degraded or pending state. This state may include tags (e.g., Defined Terms) such as invalidBinding, requiresReview, or pendingMigration, and the affected node may be excluded from runtime orchestration or dependency resolution until the issue is resolved.

The system then generates a structured issue report detailing one or more of (1) the identity of the second SKL specification (e.g., URI, version, schema type); (2) the specific broken link (e.g., uses->getPatient@v1.2.0 now points to getPatient@v1.3.0 where the contract has changed), (3) the nature of the incompatibility (e.g., missing output field, changed return type, invalid inheritance chain), and/or (4) recommended resolution actions (e.g., update reference, modify interface, create transitional mapping).

This report may be routed to one or more AI co-pilot and or AI Agents for intelligent remediation suggestions or autonomous remediation or assigned to a designated human stakeholder or team based on mesh governance policies. For example, a domain steward or schema author may receive a task in the mesh UI or collaboration system to review and resolve the issue.

In some configurations, the mesh may support soft links or runtime fallbacks that allow partial execution or non-breaking failure modes. For example, the second SKL specification may be allowed to operate with reduced functionality, log a runtime warning, or revert to a previously pinned version of the first SKL specification-if such behavior is permitted by policy.

Additionally, the processors may update the semantic registry or dependency graph with annotations indicating the breakage, enabling other mesh participants (e.g., other specs, products, or runtime agents) to be aware of the unstable linkage and prevent cascading errors.

Upon determining that the second SKL specification cannot be validated due to a broken semantic link caused by the versioning of the first SKL specification, the method may further include remediating, by the one or more processors, the broken link by executing one or more automated or policy-driven remediation operations.

In some embodiments, the processors may first analyze the version delta between the first version and the second version of the SKL specification to identify structural or semantic changes responsible for the validation failure. This may include detecting removed or renamed properties, modified capability contracts, or reclassified relationships. Based on this analysis, the processors may generate a provisional revision of the second SKL specification. This provisional revision may incorporate updated references, adjusted structure, or substituted semantic bindings to reestablish compatibility with the second version of the first SKL specification. The provisional revision may be flagged for human-in-the-loop review, programmatic testing, or policy-driven auto-approval workflows.

Alternatively or additionally, the processors may attempt to select a compatible alternative version of the first SKL specification, such as a previously published backward-compatible version that satisfies the semantic constraints declared in the second SKL specification. If found, the second SKL specification may be linked to the selected version, allowing continued operation without structural modification.

In scenarios where schema-level reconciliation is not feasible, the processors may apply a fallback mapping—such as an instance of a skl:Mapping—to transform, translate, or otherwise adapt the interface of the second SKL specification to remain interoperable with the updated first SKL specification. These mappings may be predefined by domain architects, synthesized by AI agents, or inferred from past semantic alignments. Once applied, the mapping ensures runtime compatibility while preserving semantic intent and system integrity.

Regardless of whether immediate remediation is successful, the processors may also create a structured issue record documenting the broken link, the affected SKL specifications, the context of the versioning operation, and any remediation steps taken or recommended. This issue may be stored as a mesh-native object (e.g., an instance of skl:Issue, skl:Task, or skl:ChangeRequest) and tagged with metadata such as authoring domain, severity, impacted policies, and suggested resolution paths. This issue may be surfaced to designated roles, such as domain stewards or system integrators, through the Enterprise Mesh Platform's governance interface or AI-assisted semantic editors.

In some embodiments, the one or more processors may generate multiple alternative remediation proposals based on semantic analysis of the broken link and its context. For example, when a version change introduces incompatibility by removing or changing a capability parameter, the system may propose: (1) an automated specification update that modifies the dependent specification to conform to the new interface; (2) a semantically-defined adapter component that translates between the old and new interface structures; or (3) a policy-driven configuration fallback that maintains functionality through alternate pathways.

In some embodiments, the one or more processors may autonomously generate adapter components that mediate between incompatible versions of linked specifications. These adapters may be defined as SKL specifications themselves that explicitly describe transformation logic to maintain compatibility despite interface changes. In some implementations, these adapter specifications may be used to generate implementation code that performs the necessary translations at runtime.

In some embodiments, the one or more processors may evaluate policy specifications associated with affected components to identify defined fallback behaviors or degradation rules that can be automatically activated to remediate compatibility issues while awaiting permanent resolution. This policy-driven approach enables service continuity even when semantic breaks occur.

In some embodiments, automated remediation proposals are subject to a human review workflow before implementation. The one or more processors may generate structured review tasks that include the proposed remediation specifications, contextual explanations of the semantic issues, and optional implementation suggestions. These review tasks may be routed to appropriate stakeholders based on specification ownership metadata or governance policies defined in the enterprise mesh.

In some embodiments, the human review workflow enables stakeholders to approve, reject, or modify automated remediation proposals through a semantically structured interface. Stakeholders may refine automatically generated specifications or implementation suggestions while maintaining traceability to the original compatibility issue. All decisions and modifications made during this review process may be tracked as versioned artifacts within the enterprise mesh, providing comprehensive governance auditability.

In some embodiments, upon approval of a remediation proposal, the one or more processors perform semantic validation to confirm that the approved remedy resolves the identified compatibility issue while maintaining overall mesh integrity. This validation step may generate a formal resolution record linked to both the original issue and the implemented remedy, establishing a complete audit trail of the remediation process.

Figure 51:
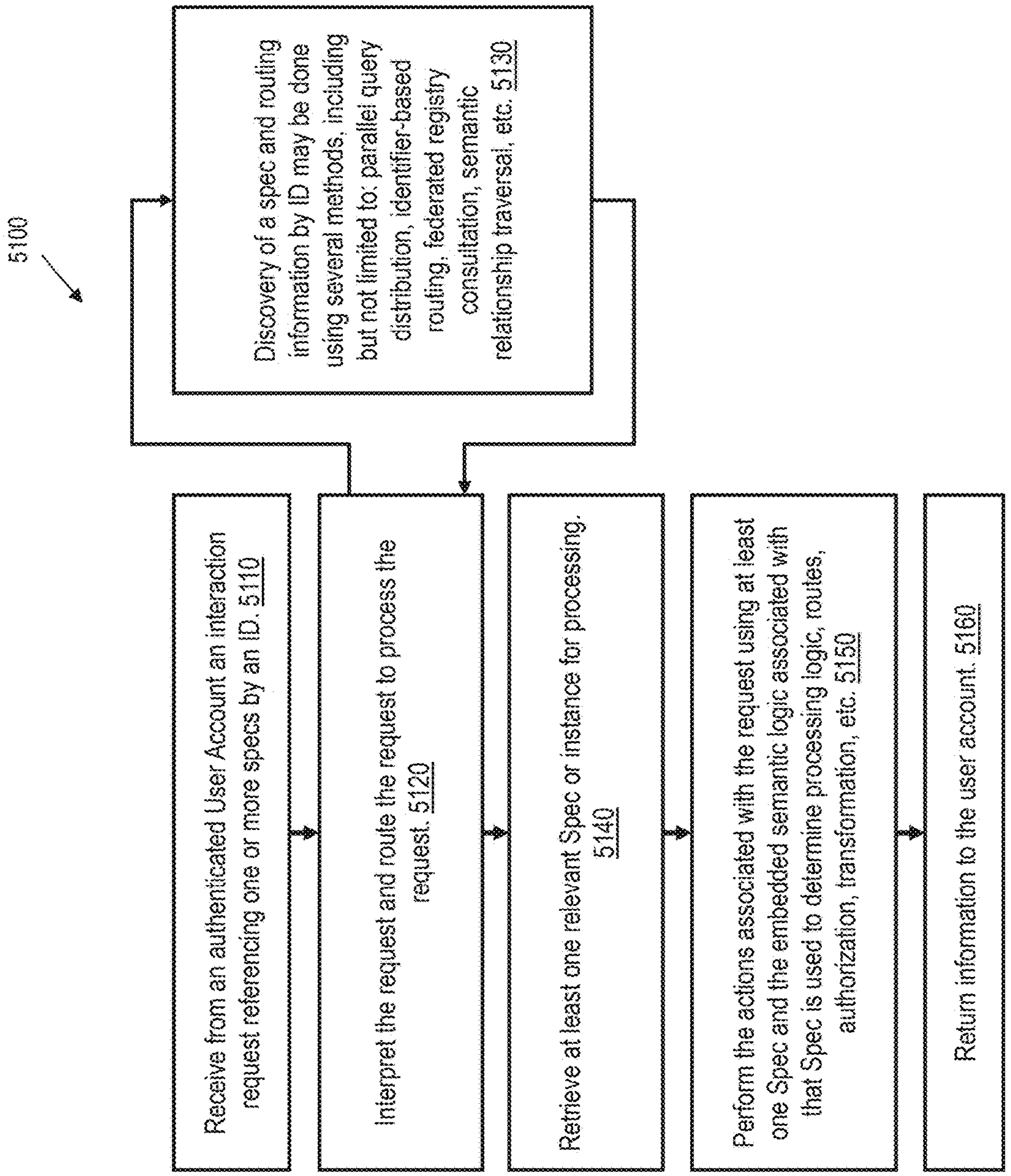
FIG. 51 illustrates a computer-implemented method for federated semantic interaction across distributed computing environments utilizing SKL Specifications.

FIG. 51 illustrates a computer-implemented method 5100 for federated semantic interaction across distributed computing environments utilizing SKL Specifications. The figure depicts an exemplary flow diagram showing how requests are processed, routed, and executed within an Enterprise Mesh architecture, with federation emerging naturally from the system's fundamental design rather than requiring specialized handling.

At the first step 5110, an authenticated User Account initiates an interaction request that references one or more SKL Specifications via an identifier (ID). This request may originate from a human user, application, or AI agent, and contains sufficient addressing information to begin resolution within the distributed environment. The request may explicitly reference one or more capabilities, objects, workflows, or other specification types by their respective identifiers. The request is received by one or more processors (e.g., one or more processors of the analytics server).

At step 5120, the one or more processors semantically interpret the request and route it to the appropriate server that will process the request. In some embodiments, the analytics server processes the request. In other embodiments, a separate server communicably coupled to the analytics server processes the request. This routing determination occurs by analyzing the specification identifiers referenced in the request and applying resolution logic to determine the responsible processing server. As described herein, the one or more processors and the ultimate processing server/processors may be the same physical entity or different entities distributed across the mesh, enabling federation without requiring centralized coordination.

Step 5130 represents the discovery phase of a federated semantic interaction method within an Enterprise Mesh architecture. Step 5130 may be executed serially, in parallel, or in the placed of step 5120. In step 5130, the one or more processors initiate discovery and routing procedures to locate the SKL Specification(s) referenced by the request identifier. This discovery may be performed using several mechanisms in parallel or selectively based on contextual factors.

For example, parallel query distribution may simultaneously dispatch resolution requests across multiple registries or repositories across domains, enabling low-latency discovery in distributed environments, wherein the one or more processors simultaneously dispatch discovery requests to multiple repositories across domains. Identifier-based routing may use the structure of the SKL Specification ID itself—for instance, a namespace or domain prefix embedded in the ID—to direct the request to the appropriate domain or server, wherein the structure of the specification's identifier contains embedded domain information that directs the resolution process. Federated registry consultation allows the system to query a mesh-wide index or directory of specification locations and their current metadata, wherein the one or more processors query distributed specification indexes that map identifiers to their locations across domains. Semantic relationship traversal leverages known SKL relationships (e.g., dependencies, inheritance, mappings) to locate related specs even when direct references are unavailable, wherein the one or more processors follow the declared relationships between specifications to discover related components across domain boundaries.

The third step 5140 involves the one or more processors using the request's information to retrieve at least one relevant SKL Specification or instance required for processing. This retrieval process leverages the addressing mechanisms built into the SKL architecture.

During this retrieval process, the server performs any authorization verification required according to the policies associated with the specifications being accessed. This authorization may occur at multiple points in the federation process and is governed by the policy specifications linked to the resources being accessed.

In the fourth step 5150, the server performs at least one action associated with the request using at least one retrieved specification and its embedded or related semantic logic. Critically, this embedded/related logic-contained or referenced by the specification itself determines the processing behavior, including routing decisions, further authorization requirements, data transformations, and capability invocations. This self-contained, specification-driven approach enables consistent behavior regardless of which server processes the request, facilitating federation across heterogeneous environments without requiring homogeneous implementation patterns.

The embedded/related semantic logic may include capability switching conditions that select different execution pathways based on request context, conditional transformation mappings that mediate between domain-specific data formats, or workflow orchestration patterns that coordinate multi-step operations across domain boundaries. These logical components are all defined within the specifications themselves, enabling autonomous interpretation by any compliant server within the distributed environment. In some embodiments, a capability switch may in turn route sub processing to other systems or domains depending on the determined semantic logic.

Finally, in the fifth step 5160, the server may return information to the requesting User Account (e.g., as it receives orchestrated information from its potentially federated sub-processing). This response may include transformed data, execution results, or status information, formatted according to the output specifications defined in the relevant SKL Specifications. In federated scenarios, this response may incorporate data or processing results from multiple domains, aggregated and transformed according to the semantic mappings defined in the specifications.

This method improves traditional integration approaches by enabling federation through the inherent properties of the specifications themselves rather than through centralized orchestration or custom integration code. The self-describing, addressable, and composable nature of SKL Specifications creates a distributed knowledge graph where semantic relationships transcend organizational and technical boundaries, enabling true decentralized interoperability.

By encoding processing logic, routing decisions, and transformation rules within the specifications, the system ensures consistent behavior across distributed environments without requiring centralized control. Each specification functions as a self-contained, portable unit that can be interpreted and executed by any compliant server, regardless of its location or implementation details. This architecture enables seamless federation across domain boundaries while preserving local governance autonomy and implementation flexibility.

In some embodiments, the enterprise mesh includes at least one SKL product that operates as a sub-enterprise mesh. This SKL product may be defined by a second plurality of SKL specifications that are governed, composed, and executed in accordance with the schema-driven principles of the overarching enterprise mesh. A sub-enterprise mesh, while logically encapsulated within the SKL product, maintains active connections to the broader mesh through bi-directional inherencies—allowing semantic relationships to flow in both directions across architectural boundaries.

Each SKL product may represent a modular unit of enterprise functionality, such as a microservice, application, AI agent, or connector, and internally may comprise objects, capabilities, workflows, policies, and mappings specific to the domain or functional purpose of that sub-enterprise mesh. These components do not exist in isolation: they participate in bi-directional inherencies with the specifications of the broader enterprise mesh. For instance, an SKL product may expose a submitReport capability that reuses a shared IncidentReport object spec defined outside the sub-enterprise mesh, while simultaneously contributing a domain-specific AuditPolicy spec that is inherited by governance specs elsewhere in the enterprise mesh.

The bi-directional inherencies maintained between the sub-enterprise mesh and the top-level mesh enable reusable architectural patterns, recursive semantic layering, and consistent governance. The SKL product can extend or override specifications defined globally, while also publishing reusable specs that become available for use across other domains. These bi-directional inherencies may be structurally encoded as inheritance relationships, usage links, mapping references, or policy bindings resolved by the Enterprise Mesh Platform (EMP).

Instantiating or interpreting an SKL product may include dynamically loading its constituent specifications, registering it as a sub-enterprise mesh, and resolving bi-directional inherencies with specifications already present in the parent mesh. This enables the EMP to treat the SKL product both as a self-contained execution unit and as a semantically porous participant in the larger mesh fabric.

Through this architecture, each SKL product may scale independently while remaining interoperable with the broader system via its sub-enterprise mesh representation and the bi-directional inherencies it maintains with global SKL specifications.

In some embodiments, the method further includes receiving, by the one or more processors, an indication of a broken semantic link between the first SKL specification and the second SKL specification, wherein the indication is based at least in part on the versioning of the first SKL specification. This indication may arise during the validation phase following a version update, wherein the second SKL specification fails to conform to or interoperate with the updated structure, semantics, or declared interfaces of the newly versioned first SKL specification.

The processors may detect this broken link automatically through a combination of graph traversal, semantic dependency checking, and schema-level validation. For example, a second SKL specification that references a removed capability, renamed property, or deprecated interface in the updated version of the first SKL specification may fail to resolve its declared relationships. The processors may determine that the semantic binding no longer satisfies the structural or governance constraints defined by the SKL schema or mesh policies.

Upon receiving or internally generating this indication, the processors are configured to generate an issue alert that documents the broken link and includes metadata describing the cause of the breakage. The issue alert may include, without limitation, identifiers of the affected SKL specifications, the type of semantic relationship that failed, the nature of the change that introduced the incompatibility (e.g., missing output type, altered signature, removed relationship), and any associated policies or workflows that may be impacted.

In some embodiments, the issue alert is formatted as a structured SKL Specification instance, such as a skl:Issue, skl:Notification, or skl:Task, which may be published into the enterprise mesh knowledge graph, surfaced in a governance interface, or transmitted to designated stakeholders or roles. The alert may also include links to remediation recommendations, changelogs, or automated patching workflows, enabling fast diagnosis and resolution.

In some embodiments, the method further includes generating, by the one or more processors, executable code for executing the second SKL specification in response to validating the second SKL specification, wherein the executable code is generated based at least in part on the second version of the first SKL specification. Following a successful validation procedure—such as ensuring that the second SKL specification remains structurally and semantically compatible with the updated version of the first SKL specification—the processors may initiate a code generation process tailored to the mesh environment.

This execution code may correspond to runtime logic, orchestration instructions, or transformation routines that implement the behavior described by the second SKL specification. In one embodiment, the code generation process translates the declarative structure of the second SKL specification into executable components such as API calls, workflow nodes, policy enforcement hooks, or semantic transformation layers. The generated code may reference schemas, mappings, and relationships defined in the updated first SKL specification, ensuring that the execution logic remains fully aligned with the current versioned semantic model.

In some cases, the generated code may include conditionals or routing logic derived from the policies or constraints defined in either the first or second SKL specification. For example, if the second SKL specification describes a capability that invokes a method on an object defined in the newly versioned first SKL specification, the generated code may include calls to the associated interface definitions, data transformations, and postcondition checks—dynamically composed from the SKL graph at runtime.

The code generation process may be performed entirely by the one or more processors operating within the Enterprise Mesh Platform (EMP), or it may be augmented with contributions from AI agents or user-defined code templates. The resulting execution code may be deployed to a runtime environment, cached for repeated invocation, or persisted within the mesh as a compiled asset associated with the second SKL specification.

In some embodiments, the method further includes managing version states of the first SKL specification in relation to the validation of the second SKL specification. Specifically, the first SKL specification may be designated by the one or more processors as a draft version prior to the completion of validation procedures involving semantically linked specifications, such as the second SKL specification. This draft designation indicates that the first SKL specification is in a provisional, non-finalized state within the enterprise mesh, and that its downstream dependencies—including SKL specifications that reference or inherit from it—must undergo semantic validation before the new version is promoted for general execution.

During this draft state, the processors may restrict the use of the first SKL specification to staging environments, speculative composition, or isolated test scenarios. Any mesh workflows, policies, or products that reference the draft version may be flagged for compatibility review or deferred activation until all semantically linked SKL specifications have been validated against the proposed changes.

Upon successful validation of the second SKL specification—such as confirming that it structurally and semantically aligns with the second version of the first SKL specification—the processors may update the version state of the first SKL specification from draft to live. This transition indicates that the first SKL specification is now available for active use in runtime mesh execution, discovery, and orchestration.

The live version status may be recorded in the metadata of the first SKL specification, along with a changelog, lineage information, and any relevant validation outcomes. In some configurations, the promotion to live status may also trigger downstream publication events, policy re-evaluation, or code regeneration steps for other dependent SKL specifications.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be a computer-implemented method in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a computer-readable non-transitory storage medium or processor-readable storage medium. The steps of a method or algorithm disclosed herein may be embodied in a processor-executable software module, which may reside on a computer-readable or processor-readable storage medium. A computer-readable non-transitory storage medium or processor-readable media includes both computer storage media and tangible storage media that facilitate transfer of a computer program from one place to another. A computer-readable non-transitory storage medium may be any available media that may be accessed by a computer and include a set of instructions that when executed cause one or more processors to execute one or more of the methods and systems described herein. By way of example, and not limitation, such computer-readable non-transitory storage medium may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a computer-readable non-transitory storage medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

The foregoing description of embodiments has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to best explain the principles of the invention and its practical application to thereby enable others skilled in the art to best utilize the invention in various embodiments and with various modifications as are suited to the particular use contemplated.

Any section headings used herein are for organizational purposes only and are not to be construed as limiting the subject matter described.

It should be appreciated that any reference to a computer, server, processor, memory, platform, interface, module, or engine herein is intended to refer to one or more physical or virtual computing devices capable of executing programmatic instructions to carry out the functions described. The invention may be embodied as a system, apparatus, or computer-implemented method, and it may be implemented in software, hardware, firmware, or any combination thereof.

Where methods are described, unless explicitly stated otherwise, the order of the steps of the method may be altered, repeated, combined, omitted, or performed concurrently without departing from the scope of the invention. In some embodiments, a computer-implemented method may be stored in the form of executable instructions on a computer-readable non-transitory storage medium and executed by one or more processors. The described techniques and systems may include distributed architectures or cloud-based deployments that perform the steps of the computer-implemented method across multiple computing environments.

It should be further understood that while several embodiments are described in the context of a computer-implemented method operating within an enterprise mesh architecture, the principles herein are equally applicable to any computer-implemented method designed to manage, execute, validate, or govern semantic specifications across a distributed computing environment.

All such variations and modifications are intended to fall within the scope of the appended claims. While various aspects and embodiments have been disclosed, other aspects and embodiments are contemplated. The various aspects and embodiments disclosed are for purposes of illustration and are not intended to be limiting, with the true scope and spirit being indicated by the following claims.

Various descriptions are provided below that may be used to supplement the description of various components described herein.

Enterprise Mesh is a composable, schema-driven, and AI-ready architecture for decentralized innovation and secure, scalable integration. It is a holistic approach to enterprise architecture that extends the data mesh architectural approach using concepts that are aligned with Gartner's Composable Enterprise. The Enterprise Mesh is a declarative, schema-based architecture that provides an unambiguous way to define and describe the various components, relationships, dependencies, lineages, versions, and more within a mesh ecosystem through open definitions. By representing the mesh architecture itself as data and providing tools that can dynamically integrate the data-based definitions with software systems and applications in various languages, the Enterprise Mesh establishes a cross-language type system that behaves similar to a "living architecture", continuously and intelligently evolving in a governed way. This declarative, cross-language type system uniformly integrates inputs and interactions from both technical and non-technical users, as well as legacy and intelligent, AI-driven systems. Data is the language that everyone can "speak" within the Enterprise Mesh.

The Enterprise Mesh does not need to translate data into code, as it provides tooling that can make various aspects of a solution architecture immediately accessible as working software. It simplifies solutions development by systemically removing various steps and facilitating the transition from reference designs to implementation. It minimizes errors, miscommunications, and security or compliance concerns by creating a standardized data/schema-driven interface for better alignment between various human and AI stakeholders for planning, usage, and governance. EM's schemas can leverage protocol buffers at the expense of runtime dynamism in scenarios where high-performance is paramount.

If an Enterprise Mesh is a registry of schemas, an Enterprise Mesh Platform is the tool to help you manage the registry. It provides a no-code/low-code environment where users can leverage AI-powered tooling, collaboration features, and version control to continuously evolve a library of SKL Schemas/components (e.g., into an organization- or a project/mission/domain/product-specific "Languages"). It stores architectural definitions of software, including capabilities, data, and other components agnostic to programming language, framework, or vendor as SKL schemas. SKL is to the EMP as Git is to GitHub. Its technical and non-technical users can easily collaborate, discover software and data components, read documentation that duplicates as the operational API (won't be outdated), understand how components are interrelated, and see usage, compliance and security information related to any given node. The synergy between SKL and the EMP not only simplifies the process of building and managing bespoke, AI-powered software but also improves how organizations approach software development and integration, leading to enhanced operational efficiency, streamlined decision-making processes, and improved mission outcomes. It is a both human and machine-readable catalog and documentation set for any system's (or platform's) technology and data stack, drastically simplifying the understanding of any given system and facilitating autonomous integration. EMP stores instances of SKL schemas (e.g., a system's data, capabilities, policies, interfaces, mappings/transformations) as data in one or more dynamic knowledge graphs that are continuously evolving. EMP can be used to (1) govern and monitor access to and usage of an entire data tech stack; (2) understand dependencies across processes and systems in an organization; (3) orchestrate AI-processes and to create a centrally governable interface for AI-powered systems to access data and/or other subsystems. SKL, EM, and EMP are unique in their ability to be applied at different scales.

As described in these embodiments, SKL is the implementation-agnostic language and framework used to define everything in an Enterprise Mesh—schemas, capabilities, terms, and their relationships—as machine-interpretable, semantically descriptive specifications that enable interoperability across distributed systems. SKL establishes a configurable and extensible machine-interpretable, multi-level, and structured way to describe data structures, behaviors, constraints, and semantics of any component in an ecosystem. While some embodiments may leverage semantic web technologies, SKL can be represented in various formats including but not limited to JSON, JSON-LD, XML, Protocol Buffers, TypeScript interfaces, or other structured serialization formats depending on performance, compatibility, or runtime requirements. The SKL is able to formalize semantic knowledge in executable specifications, not in any particular serialization format.

SKL defines the base/common "schema vocabulary" to structure existing definitions (e.g., OpenAPI, XACML, etc.) as interoperable components that all tools and agents understand, thereby enabling the schema-driven development vision. It provides baseline patterns that support the entire lifecycle of definitions (creation, validation, versioning) and ensures that knowledge is captured in a reusable, technology-agnostic form rather than hard-coded. By using SKL, organizations achieve decentralized interoperability (everyone agrees on the specs, not on specific technologies) and can harness AI. Because SKL specs are formal, AI agents can reason about them to generate code or verify compliance. In summary, SKL is the backbone that structures various standards to facilitate interoperable definitions for how things are described across individuals, organizations, and ecosystems.

SKL is semantic technology that simplifies complex software architectures and ecosystems by breaking them down into manageable, modular, and composable components. It provides a standardized way for developers to abstract and interact with various software elements, such as data objects, code functions, and interface components, across different programming languages. It is built using open semantic-web technologies and is designed to interface with alternate technologies, e.g. protocol buffers, for high-performance use cases.

SKL supports a layered approach to semantic integration, allowing data to be structured according to each source's schema to be easily mapped to a standardized ontology. It extends existing semantic integration methods by enabling continuous schema evolution with version control and supporting sophisticated mappings between components SKL provides a foundational ontology of classes (e.g., Spec, Object, Capability, Property, Mapping, InteroperableProduct) and "MixIns" (e.g., IsManageable, IsAuditable, IsDeduplicable, IsAccessControllable) for meta-modeling integrations through schemas (e.g., in JSON-LD) that are open-source and fully extensible. More than documentation, schemas that are instances of the SKL "meta-model" ontology become a functional part of an executable environment. This is similar to model-driven development, but without requiring code generation, as the schemas directly drive the runtime. These schemas can be used to represent the interfaces of any system using common standards (e.g., OpenAPI, WSDL, AsyncAPI, GraphQL SDL, IDL, etc.) as well as the transformations between schemas of different systems (e.g., using RML or our extension which supports custom code). The collection of a system or organization's schemas ultimately defines its solution architecture, and behaves like a domain specific ontology that can be compared to and related to other schemas in other domains or systems, offering unprecedented agility through a composable, unified, governable, and independently-controlled software ecosystems.

In other embodiments, the base definition of SKL could be written in plain JSON or some other declarative way.

By way of example, a team might use SKL to define a "MissionPlan" spec that includes properties (objectives, timeline, resources) and capabilities (e.g., scheduleDeployment). In some embodiments, this SKL Specification is stored in a knowledge graph. When a planning software and a logistics AI agent both read the "MissionPlan" spec, they share the exact understanding of what a "Mission Plan" entails. The agent could automatically generate a draft plan, and the software can validate it, because both reference the same SKL definition.

As used herein, an SKL Specification or "skl:Spec" is a machine-interpretable declaration that defines the semantic structure, behavior, and governance of a component within a computing environment (e.g., a distributed computing environment). An skl:Spec may serve one or more roles simultaneously: as documentation, as an interface contract, as executable code or a code substitute (and/or as a code-generation model), and as a governance definition.

An SKL Specification is in some embodiments a foundational element of schema-driven development: the skl:Spec acts as a living blueprint or contract for a particular component or concept, able to express semantic contracts that can be validated, executed, and governed at runtime, regardless of its underlying representation technology or expression language.

While in some embodiments a skl:Spec may be modeled as a combination of semantic web constructs (e.g., OWL classes and SHACL node shapes), in other embodiments it may be represented using JSON schemas, XML schemas, Bill of Materials (BOMs) files, compiled formats like Protocol Buffers, and/or other structured definition formats. Moreover, each skl:Spec may incorporate existing definition formats (e.g., OpenAPI specifications, XACML for policy expressions, etc.) through properties such as "skl:declarativeApiDefinition" (for API specifications), "skl:policyExpression" (for policy languages), or similar extension points.

This property-based approach enables skl:Specs to embrace and extend existing standards rather than replacing them.

For example, according to a non-limiting embodiment, a RESTfulApiInterface specification (a type of skl:IntegrationInterface) might include an OpenAPI definition via its skl:declarativeApiDefinition property, while a GraphQLInterface (a different type of skl:IntegrationInterface) would reference a GraphQL SDL through the its own use of that same property type. This flexibility allows organizations to leverage existing investments in specification formats while gaining the semantic governance, versioning, and interoperability benefits of the Enterprise Mesh.

SKL specifications can be used to define "classes"/"shapes"/"structures" of properties, defined terms, software components, service APIs, data models, workflows, even contracts, policies, and/or access controls. Specs can be used to represent multiple relevant aspects of an entity depending on the type of Spec. In some embodiments, a Spec must define its structure (e.g., data fields and relationships, akin to a schema), its documentation (e.g., description, motivation, purpose, etc.), its architectural patterns (e.g., validation rules, version control, security patterns, etc.), and its semantic context (linkages to Defined Terms for unambiguous meaning). In some embodiments, specific types of specs such as Capabilities must define their inputs/outputs, performance expectations, etc. and are related together into a product via relationships. In other embodiments, an skl:Product (e.g., a service) might encapsulate all these components into one encompassing skl:Spec.

In some embodiments, skl:Specs may be designed and prepackaged with certain patterns for collaboration, lifecycle management, auditing, and evaluation capabilities. In other embodiments, these features may be defined as one or more federated patterns (e.g., multiple lifecycle patterns using different versioning schemes and logic) that can coexist and may be inherited or used by different products, components, or specifications according to specific domain needs.

Skl:Specs are executable knowledge in other words, they can operational parts of software environments (different vs. model-driven development that is usually used to generate code). In some embodiments, they can also drive normal model-driven development workflows and be translated into code.

SKL:Specs are designed to be consumed by machines and AI. This means they can drive automation: an AI agent can read an SKL Specification and generate code or configuration, or validate that an implemented system conforms to the Spec (or the validation mechanisms of the Spec itself, such as potentially embedded SHACL definitions, may inherently do this). SKL Specs thus enable agentic automation, decentralized evolution (multiple versions and extensions), and a marketplace of interoperable components all defined in a common (or at least interoperable) continuously evolvable language. In some embodiments, SKL Specs can be used to represent real world objects (e.g., a physical file in a cabinet in a secure location, a fish on a boat, etc.) as digital twins and be used to model the systems. In these cases, the systems may not be directly interactable via an executable spec but rather a human or some other system could interact with a spec (e.g., a capability, an API endpoint, etc.) as the API to trigger some "off-mesh" process.

SKL Specs may be inherently composable, meaning a spec can reference other specs to define composite behaviors, dependencies, or types. This enables recursive modeling and modular software composition.

One example is a "Person" SKL Spec. This spec would define the data structure for a person (name, contact info, roles, etc.), validation constraints (e.g., a Person must have one name—not zero, not two), which are really related skl:Properties. Specs can also include meta-level information, including documentation and structured, configurable properties like purpose, motivation, rationale, etc. For example, skl:Purpose may define the goal or job the Spec is designed to solve (e.g., "This Person spec standardizes contact information across CRM, HR, and analytics systems"); skl:motivation may document the background problem or use case (e.g., "Inconsistent person records across systems resulted in duplicate notifications and compliance risks"); and skl:rationale may capture reasoning behind specific design decisions and trade-offs (e.g., "Phone number is modeled as a string rather than numeric type to preserve international formatting conventions"). These structured meta-properties enable both humans and AI agents to understand not just what the specification defines, but why specific design choices were made, facilitating more effective reuse and evolution of specifications across domains.

Specs can be related to other specs, Capabilities associated with a person (e.g. sendMessage or updateAddress actions), and externally defined constraints (e.g. an AccessControlAssignment that state only authorized roles can update a Person name). Specs can also reference Defined Terms like "Social Security Number" or "Phone Number" from a standard term set/taxonomy to ensure everyone interprets the meaning of properties the same way (e.g., two skl:Properties for product1:ssn, product2:socialSecurityNumber exist. One defines the value as a string and the other as an int. Both are two different implementations of the same concept which is represented as a "Social Security Number" Defined Term in a defined term set of canonical definitions). Once this spec is published, any application in the mesh with correct access—a CRM system, an HR app, an AI assistant—can use it. For instance, an AI bot could generate a form UI for updating Person instances automatically from the spec, and a data sync service could ensure multiple databases stay consistent by referencing the Person spec's unique ID rules and field definitions. In some embodiments, other meshes and/or domains outside the defining mesh, may also reference and use the Person spec, so long as the Person spec has an ID that is unique.

The multi-level ontology of the Enterprise Mesh is the architectural foundation of SKL that organizes its concepts into a layered metamodel (often aligning with the OMG Meta-Object Facility four-layer model). To manage the complexity and ensure rigor, the EM employs a multi-level ontology architecture. Explaining SKL through by comparison to the four-layer metamodeling approach, you can think of it as follows:

M3 (Meta-metamodel Layer): The foundational layer defining the basic constructs for creating modeling languages. This layer defines the standards and components which are used to define metamodels. In this architecture, skl:Spec itself occupies the meta-metamodel layer, serving as the fundamental construct that defines how all other elements in the system are specified—including itself. This self-definition is accomplished through the use of MixIns (which exist at the M2 layer as instances of skl:Spec) and a special "compilesShape" property which facilitates circular inheritance by compiling patterns defined by MixIns into a new version of the core definition of Spec that is then inherited by the MixIns themselves (as demonstrated in FIG. 16).

Unlike traditional approaches that depend on external meta-metamodeling technologies at the M3 layer, the Enterprise Mesh places skl:Spec as the foundational element, with all other components (including skl:Object, skl:Capability, etc.) residing at the M2 layer as instances of skl:Spec. This recursive, self-describing architecture maintains its semantic integrity regardless of which specific technologies (e.g., JSON, XML, Protocol Buffers) are used to implement it in a particular deployment.

This four-layer metamodeling analogy, while helpful in its ability to describe SKL the multi-layer concepts, is flexible in its interpretation for how to classify certain types of specs and should not be considered limiting through its fixed implementation with how certain types of components are classified at different levels. For instance, in some embodiments, the M3 layer may be used to define the constructs for creating metalanguages using various technologies like OWL, RDFS, OpenAPI, etc.

M2 (Metamodel Layer): This layer defines the core concepts and structure of the Enterprise Mesh framework itself. It specifies the building blocks for domain ontologies and SKL Specs, such as defining what constitutes an SKL Specification and the base types of Specs such as a Defined Term, an skl:MixIn, an skl:Object, an skl:Capability, an skl:Property, an skl:Product, an skl:UserInterface, an skl:AccessControlAssignment, etc. Elements at this layer are instances of M3 constructs but also define the classes that are instantiated at the layer below. These elements are similar to “clabjects” in some metamodels due to their dual nature as both classes and objects.

M1 (Domain Ontology/Model Layer): This layer contains the specific instances of enterprise domain models and ontologies that define concrete business concepts (e.g., instances of Objects—Customer, Product, LoanApplication, SensorReading—that are still “objects” because they while they are instances of skl:Object and skl:Spec, they are still classes that will have instances (e.g., IntegrationInterfaces, Properties, Capabilities, UserInterfaceTypes, etc.). These models are instances of M2 metamodel elements. In some embodiments, instances of Defined Terms, Policies, etc. can be thought of to be M1 level instances, and in other embodiments those can be M0 level instances. Similarly, in some embodiments, instances of MixIns and other special specs may be modeled as M2 level specs (e.g., IsVersionable is a subclass of MixIn, rather than an instance of).

M0 (Instance/Data Layer): This layer represents the actual runtime data instances conforming to the M1 object models (e.g., specific customer records, individual loan applications, sensor data points). While Enterprise Mesh primarily governs interactions at the M1/M2 level via SKL Specs, validation rules within specs might impose constraints referencing M0 data characteristics. Similarly, certain patterns (e.g., versioning, auditing, etc.) may be inherited by M0 instances if M1-level specs define those patterns in a way that is applied to its instances (e.g., if an M1 spec specifies that the schema it is defining is directly a subclass of skl:IsVersionable).

This multi-level structure provides a formal, hierarchical foundation for defining and managing semantic knowledge across the enterprise, enabling abstraction, consistency, and automated reasoning. It allows for the separation of concerns between the fundamental modeling language (M3), the EM framework definition (M2), specific domain knowledge (M1), and operational data (M0).

In various embodiments, SKL Specifications can function analogously to, generate, or incorporate Bill of Materials (BOM) structures at multiple levels of the mesh architecture. Unlike traditional BOMs that typically apply only to product-level entities, the Enterprise Mesh enables BOM-like consolidation around any specification type based on stakeholder needs or governance requirements.

For example, while an skl:Product may generate a traditional BOM listing all its constituent specifications (e.g., objects, capabilities, interfaces), similar consolidation patterns can emerge around other focal points. An skl:Capability might serve as the center of a capability-focused BOM that enumerates all objects it operates on, mappings it utilizes, policies that govern it, and integration interfaces through which it can be invoked. Similarly, an skl:Property could anchor a property-focused BOM identifying all objects that reference it, defined terms that provide its semantic meaning, validation rules that constrain it, and access policies that govern it.

This flexible, multi-focal BOM pattern represents an advancement over conventional approaches that limit BOMs to product or component boundaries. By enabling BOM-like views (or value propositions) around any specification type, the Enterprise Mesh supports diverse stakeholder perspectives—from security specialists focused on policy-centered BOMs to data stewards requiring property-centered BOMs—while maintaining semantic consistency across all views.

SKL Specifications can further extend the traditional BOM concept through their executable nature. While conventional BOMs function primarily as documentation artifacts, SKL-derived and SKL-defined BOMs can be actively executed, validated, and governed at runtime. For instance, a capability-centered BOM might not only document dependencies but also validate the runtime availability of required components, enforce version compatibility, or generate alerts when linked specifications change in potentially incompatible ways. In some embodiments, a skl:Product may generate, function as, or incorporate traditional Bill of Materials (BOM) artifacts (e.g., CycloneDX or SPDX BOM) to satisfy compliance requirements, dependency tracking, or documentation needs, while simultaneously providing active semantic governance capabilities that traditional BOMs lack) such as serving as an active entity that enforces access controls, validates component compatibility, and orchestrates interactions based on declarative policies.

An skl:Product is a specialized type of SKL Specification that establishes a governance boundary around a logically cohesive set of capabilities, objects, interfaces, and policies. Unlike other skl:Specs which tend to be defined primarily by functionality (e.g., a “send” capability), a skl:Product tends to be (though need not be) characterized by its governance boundary. This boundary delineates clear ownership, accountability, and lifecycle management responsibilities. For example, while a financial analytics platform as a skl:Product may include multiple capabilities (e.g., “generateFinancialReport,” “calculateRiskExposure”), its definition as a product emerges from the “grouping” of components together (typically in a way that reflects the governance team responsible) rather than merely the functions it provides. This governance-centric definition enables consistent management of specifications across organizational and technical boundaries.

In some embodiments, an skl:Product is not merely a static collection of specifications (e.g., as documentation) but rather can actively participate in runtime operations (e.g., through an Enterprise Mesh Platform). When invoked, a product can provide semantic resolution of capabilities, route queries to the correct underlying systems or storage mechanisms, enforce access controls, validate inputs against schema requirements, and orchestrate execution across its internal components—all based on its declarative specifications rather than hardcoded logic.

In some embodiments, skl:Products can span organizational boundaries, enabling federated governance models where multiple teams or even separate enterprises collaborate on shared products while maintaining clearly defined ownership boundaries for specific capabilities or data objects. This federation is enabled by the formal semantic contracts established through SKL specifications, which ensure consistent interpretation across diverse environments.

For example, a "Claims Processing Platform" modeled as an skl:Product might include skl:Object specifications for "Claim," "ClaimEvidence," and "Adjudication"; skl:Capability specifications for "submitClaim," "validateEvidence," and "issuePayment"; skl:Policy specifications governing data retention and privacy; and skl:IntegrationInterface specifications defining how external systems can invoke these capabilities. While multiple teams might contribute to different aspects of this product, the skl:Product specification provides a unified governance framework that ensures semantic consistency and policy compliance across all components. In many embodiments, skl:Products will likely also reference skl:Specs that are defined externally to that product (e.g., an skl:Object, is a spec that is likely to be referenced by many Products, even though those products may not have authored or have ultimate authority over the skl:Object spec. In some embodiments, such may create a copy or a fork of the original skl:Object spec such that it would be defined, rather than referenced, by the Product).

In this way, an skl:Product can function as a self-contained "mini-mesh" with its own internal governance structure, policies, and semantics, while still participating in one or more larger Enterprise Meshes. This recursive nature enables complex systems to be encapsulated as products that can themselves contain or reference other products, creating a hierarchical decomposition that aligns with organizational structures while maintaining semantic coherence across boundaries.

The Enterprise Mesh architecture incorporates several key patterns that operate independently yet cohesively. The recursive product structure, the meta-model layers, and the platform/solutions/instances organization each address different architectural concerns while working together to create a comprehensive governance and execution framework. These patterns should not be conflated—each serves a distinct purpose in enabling the mesh's flexibility, coherence, and scalability across organizational and technical boundaries.

Within this architectural framework, the Enterprise Mesh embodies two design principles that facilitate its flexibility and coherence:

1. Scale-invariant operations: The same execution principles, governance mechanisms, lifecycle management processes, and other patterns may be consistently applied across all levels of the mesh. For example, as illustrated in FIG. 50, capability switching logic operates identically whether routing a request within a product or across multiple products in different domains. When a capability is invoked, the same semantic resolution process occurs regardless of whether the capability exists in the local product or in a remote product across domain boundaries. Similarly, as illustrated in FIG. 24, lifecycle and versioning patterns may be applied at different levels of the architecture. This consistent way to define and apply behavioral pattern ensures that policies, validation, versioning, and execution flow work predictably across all scales of the mesh architecture.
2. Recursive structures: recursive architecture in the Enterprise Mesh represents a fundamental design principle where the same patterns, structures, and behaviors apply consistently across different scales and abstraction levels. This enables seamless composition, self-reference, and consistent governance throughout the system. Recursion in the Enterprise Mesh manifests in the following ways:

Structural recursion: SKL Specifications can be composed of other specifications in nested hierarchical structures. For example, a "Product" spec may include a collection of "Products" specs, each Product being a fully defined SKL specification that references or encompasses its own properties, capabilities, and governance rules. This compositional pattern can extend to arbitrary depths, enabling complex systems to be modeled through consistent building blocks.

Self-descriptive recursion: The Enterprise Mesh uses SKL to describe itself the very specifications that define the mesh's components are themselves defined as SKL specifications. This self-description enables introspection, where the system can reason about and operate on its own structure using the same mechanisms it uses to process any other specification.

Self-descriptive recursion manifests in several concrete ways within the Enterprise Mesh. For example, the skl:Spec itself may in some ways be defined as an skl:Spec (e.g., by using skl:compilesShape to compile all the patterns that in essence define a Spec), enabling the system to validate and process specification definitions using the same mechanisms it uses for any other specification. Similarly, capability resolution processes within the Enterprise Mesh Platform are themselves defined as capabilities, allowing the system to use its own semantic resolution mechanisms to determine how resolution should occur.

These recursive principles are most clearly demonstrated in the concept of Products as "mini-meshes." As illustrated in FIGS. 39-41, one or more skl:Product function as a self-contained Enterprise Mesh with its own internal specifications, relationships, and governance. This product-level mesh follows the exact same structural patterns, definitional approaches, and operational mechanisms as the broader enterprise mesh, creating a fractal architecture that maintains consistency across organizational and technical boundaries. This recursive pattern enables federated governance while preserving semantic coherence throughout the distributed environment.

While the Enterprise Mesh employs recursive patterns in its Product structure, it is distinguished from other architectural patterns in the system. For example, the MixIn compilation mechanism illustrated in FIG. 16 represents a separate pattern that addresses inheritance and composition at the specification level rather than structural containment. Similarly, the multi-level meta-model and the platform/solutions/instances organization each serve different architectural purposes while coexisting within the Enterprise Mesh framework.

Each Product functions not only as a conceptual mini-mesh but can also operate as an independently deployed entity on its own infrastructure. Products can be hosted on separate servers (and with specs hosted on different databases/systems), managed by different teams, and potentially implemented using different underlying technologies, while maintaining semantic interoperability through SKL specifications. This infrastructure independence enables true federation where each Product owner has autonomy over implementation details while preserving semantic coherence across organizational boundaries. The Enterprise Mesh Platform can coordinate interactions between these distributed Products through consistent semantic resolution of capabilities and objects, regardless of where they are physically hosted.

One example of recursion in the Enterprise Mesh is an Integrated Logistics Platform (ILP) implemented as a Product specification. This ILP Product contains multiple sub-Products such as a Warehouse Management Service, Transportation Booking Service, and Realtime Tracking Service. Each of these internal Products has its own capabilities, objects, and governance policies defined through SKL specifications. When an external system invokes a "requestShipment" capability on the ILP Product, the capability switch mechanism (structural recursion) routes this request to the appropriate internal Product, which processes it using the same semantic resolution mechanisms (operational recursion) as the broader mesh. Each internal Product could potentially contain further nested Products, creating multiple recursive layers while maintaining consistent behavior and governance throughout the system.

The Enterprise Mesh architecture includes a layered organization pattern (illustrated in FIGS. 42-43) that facilitates governance, reuse, and evolution across the enterprise. This pattern operates distinctly from, yet complementary to, recursive product structures and MOF-style multi-level modeling described elsewhere herein.

As illustrated in FIGS. 42-43, the Platform Layer represents enterprise-wide foundational capabilities, objects, and policies. This is the enterprise-wide foundation which can be manifested as an Enterprise Mesh Platform, which itself can be modeled as a Product within the mesh (e.g., following the same specification patterns as any other Product). This platform-as-product approach enables the platform team to provide base components (shared objects, common capabilities, enterprise-wide policies) that accelerate innovation by domain teams. In alternate embodiments, the platform team may create multiple products that create the core enterprise platform or offering that is usable by others.

The Solution Layer contains domain-specific Products developed by different teams using components from the Platform Layer while adding their own specialized capabilities and objects. This separation enables domain autonomy while maintaining enterprise-wide semantic consistency.

The Instances Layer consists of actual runtime data conforming to the specifications—not specifications themselves. This clear separation between specifications (in Platform and Solution layers) and instances (in the Instances Layer) maintains architectural clarity.

This layered approach supports natural evolution: when domain-level innovations demonstrate value, they may be elevated to the platform level to benefit the entire enterprise. Conversely, domain teams retain the freedom to extend or customize platform components to meet specific needs without disrupting the broader architecture.

Unlike the meta-model MOF analogy described elsewhere, which addresses specification structure at a conceptual level, this three-layer pattern addresses practical deployment, governance, and evolution concerns across organizational boundaries.

As enabled by the Enterprise Mesh, "Living Architecture" describes the state where an enterprise's architecture is not a static blueprint or descriptive model, but rather a dynamic, adaptive, and actively executing system. This characteristic arises from the continuous interpretation and execution of distributed skl:Specs (representing knowledge, capabilities, policies) by the Enterprise Mesh Platform (EMP) across the interconnected mesh of skl:Objects. It implies an architecture capable of sensing changes or stimuli within its environment (internal or external) and responding through the execution of relevant skl:Specs, potentially leading to self-organization, automated adjustments, and evolution over time. The "living" quality stems directly from the combination of executable knowledge (skl:Specs), an active execution environment (the EMP), and the interconnectedness of the mesh components (skl:Objects). Events or interactions trigger the execution of skl:Specs, which can alter states, create new instances, or modify relationships, leading to cascading effects and adaptations throughout the mesh. This dynamic, responsive behavior contrasts sharply with the static nature of traditional architectural representations.

Certain types of SKL specifications (e.g., skl:Specs, SKL specs, specifications, etc.) form the foundational building blocks of the Enterprise Mesh. These foundational types allow an enterprise to express what the system can do, how it is governed, how components interoperate, and the shared vocabulary that unites them. These specification types are semantically rich, executable, and can be versioned, composed, and interpreted dynamically by the Enterprise Mesh Platform (EMP).

The skl:Object type provides a schema-driven mechanism to define data structures and domain-specific classes such as "Patient," "Person," or "Place." Objects specs, as with other specs, may provide features to ensure conformance of instances to these data structures defined in object specs (e.g., using SHACL). These object specs are designed to be lightweight, reusable, and easily managed by specific domain teams. Existing ontologies, schemas, and/or data structures libraries (such as FHIR, Schema.org, or NIEM) may be fully modeled as skl:Objects, much in the same way as they may be represented as owl:Classes, while remaining extensible for meta-level governance and evolution through meta-level skl:Properties (e.g., properties on the skl:Object specs rather than the properties on the instances of such objects) and patterns that support lifecycle tracking, governance, and integration alignment. An skl:Object is a specialized type of skl:Spec that enables modular knowledge representation across an enterprise.

The skl:Capability spec defines what a system or data object can do. It represents an executable unit of functionality such as "submitRequest," "evaluateRisk," or "shareDocument." These capabilities are defined with inputs, outputs, preconditions, and/or postconditions (e.g., validation requirements), and can include links to skl:Mapping specs that describe transformations and/or execution logic for the capability, or relationships to skl:Policy specs (e.g., via skl:AccessControlAssignment specs) that apply governance conditions. Capabilities are self-describing, discoverable, and dynamically composable, making them ideal for intelligent orchestration and agentic execution. For example, a "shareDocument" capability may specify that it takes a Document and a User as inputs and returns a ShareLink. This capability may be implemented using various systems (e.g., Google Drive, SharePoint) but is uniformly understood across the mesh through its specification.

The skl:Relationship spec enables semantic modeling of how two specs or their instances relate to one another. These relationships are first-class specifications that may themselves include properties or constraints. Examples include relationships like "depends on," "is associated with," "is duplicate of," "is derived from," or other types of relationships that enable rich modeling of system and/or data dependencies and associations.

The skl:Mapping spec defines how to transform or relate data between different specs and/or nodes. These mappings may be used to mediate between schemas, convert values, or adapt logic across heterogeneous systems. Unlike static conversion code, mappings are declared semantically and executed dynamically, facilitating runtime interoperability.

A skl:Product, as defined above, is a type of spec that is often used to establishes a governance or system boundary around a logically cohesive set of capabilities, objects, interfaces, and policies.

The skl:IntegrationInterface specification defines how external systems or components interface with the Enterprise Mesh or with products within the mesh. Through extensible properties such as "skl:declarativeApi Definition," an skl:IntegrationInterface can incorporate diverse API definition formats including OpenAPI specifications, GraphQL schemas, AsyncAPI definitions, gRPC service definitions, or custom interface descriptions. For example, a RESTfulApiInterface (a type of skl:IntegrationInterface) might reference an OpenAPI specification, while a GraphQLInterface would reference a GraphQL SDL definition through the same property mechanism. This approach enables the Enterprise Mesh to semantically govern and version these interfaces without requiring translation into a proprietary format, preserving compatibility with existing tooling and development workflows. Multiple integration interfaces may be associated with a single product, and a single interface may be used across multiple products, enabling flexible decomposition and reuse of integration patterns.

The skl:Workflow spec enables declarative modeling of logical sequences of actions, events, or conditions. These workflows may be composed of multiple nodes that reference specs (e.g., skl:Capability, skl:IntegrationInterface, etc.), instances of specs/objects (e.g., a given AI prompt, which is an instance of the skl:StructuredPrompt spec), and/or other logical nodes, and are used to coordinate processes across distributed systems. In some embodiments, skl:Workflow may also be used to express capability mappings or business logic.

The skl:Policy spec defines executable governance conditions—such as data access constraints, invocation rules, or security requirements. Policies are enforceable at runtime by the EMP and may control access to resources, regulate composition of specs, and ensure conformance to governance requirements. In some embodiments, skl:Policy specs can be modeled as either a type or a subclass of skl:Workflow, wherein the workflow nodes can be used to describe logical expressions written in various languages (e.g., XACML, OPA). Unlike external rules engines or static ACLs, these policies are integrated directly into the semantic fabric of the mesh and are dynamically enforced.

The skl:AccessControlAssignment spec defines the authorization rules for who can perform which actions on which resources. This includes support for role-based access control (RBAC), attribute-based access control (ABAC), and traditional access control lists (ACLs). These assignments enable fine-grained, policy-driven access management that aligns with the semantic model of the mesh.

Other examples include the mesh supports skl:DefinedTerm and skl:DefinedTermSet specs, which define formal vocabularies and taxonomies. These specifications ensure semantic consistency across the mesh by anchoring shared concepts in a machine-interpretable format. For example, a term set such as "OperationalStatus" may include terms like "Active," "Inactive," and "Flagged," which can be reused consistently across schemas, capabilities, and policies.

Agentic Interaction refers to the ways in which autonomous or semi-autonomous agents (software agents or AI) participate in the Enterprise Mesh, using SKL Specs and Defined Terms as the common language for decision-making, communication, and action. In an Enterprise Mesh environment, agents (for example, AI assistants, bots, or intelligent services) are first-class actors that can interpret the same specs that humans or traditional software do. They leverage those specs to understand the context (semantics of data and capabilities) and to ensure their actions are valid and interoperable. For instance, an agent can read a spec to determine out how to invoke a capability on a service, or to check what data it's allowed to access. Agentic interactions can include negotiation between agents (e.g., a contracting agent and a compliance agent exchanging messages defined by an SKL spec), automated orchestration (an AI coordinating multiple services per a workflow spec), and dynamic adaptation (agents adjusting behavior if specs/policies change). If everything is semantically grounded, agents can go beyond simple API call—they "understand" terms like Customer or Classified Data via Defined Terms, so they can reason or explain decisions. This concept may be used to achieve AI-augmented automation in the mesh: for example, it goes beyond just APIs talking, but intelligences cooperating under a shared ontology. It also ties into security and governance—e.g., agents can enforce policies encoded in specs (an access-control agent can read the spec's rules and permit or deny actions accordingly).

For example, a multi-agent scenario in a smart procurement system. One of the agents is tasked with assembling a contract (ContractDraftingAgent), another with verifying compliance (ComplianceAgent), and another represents the supplier's system (SupplierAgent). The contract to be produced is defined by a spec (with sections, clauses, terms defined via SKL). The ContractDraftingAgent uses that spec to generate a draft contract asdocument (because it knows the required structure and terms from the spec). It then sends the draft to the ComplianceAgent by creating an instance of a "ContractReviewRequest" object defined in SKL which includes fields such as contractID and a status. Both agents understand this object because it's based on a Defined Term Set for contract statuses. The ComplianceAgent, upon receiving it, checks the contract content against compliance rules that are embedded in the contract spec (perhaps certain clauses are mandated by policy). If something is missing, it uses a capability "requestClarification" defined in the spec to ask the drafting agent for more info. The SupplierAgent later receives the final contract and, since it also adheres to the spec, it can auto-fill certain sections (like company info) by matching terms (it knows what "SupplierAddress" means thanks to the same ontology). Throughout this, the agents interacted by exchanging structured data and triggers that were all specified in the SKL definitions-making the process smooth and automated. No human needed to intervene to translate terms or formats; the agents had a shared understanding.

According to a non-limiting embodiment for a specific implementation for Navy procurement document management, the Enterprise Mesh transforms traditional acquisition documents into machine-executable specifications. This process begins by ingesting heterogeneous requirement data—potentially including legacy Naval procurement documents, FAR/DFARS regulations, mission-specific requirements, meeting notes and transcripts, etc.—and normalizing them into formal instances of objects such as skl:Requirement specs (or other kinds of specs like constraints, assumptions, etc.) within the enterprise mesh. This normalization process, which can be performed by either specialized services or AI agents, converts unstructured content into semantically tagged specifications with explicit relationships to applicable governance controls.

The Enterprise Mesh Platform then invokes an AI-Powered Contract Generation Capability that consumes these normalized Requirements specs (and potentially other normalized objects or data) to programmatically generate structured Procurement Document Specs (or other types of structured documents/specs). These specifications may include machine-interpretable representations of critical procurement components, including: (i) Statement-of-Work sections with deliverables and acceptance criteria defined as executable validation rules; (ii) pricing tables with semantic bindings to budgetary constraints and payment schedules; and (iii) evaluation criteria expressed as executable scoring algorithms for automated proposal assessment. Each component maintains semantically declarative relationships with both originating requirements and applicable FAR/DFARS regulations, enabling automatic detection when changes to one component would break dependencies with others.

These Procurement Document Specs are published to a skl:Product in the Enterprise Mesh, which maintains a version-controlled repository of specifications available for discovery and consumption. External vendor systems with proper authentication can programmatically retrieve these specifications, enabling them to understand Navy requirements in machine-interpretable form rather than relying solely on human interpretation of text documents. This capability implements a governance-as-code approach where FAR/DFARS requirements and Navy-specific policies are encoded directly into the knowledge graph as interconnected components that actively govern document creation and modification.

When vendor proposals are received, the Enterprise Mesh Platform executes a Conformance Engine capability that mechanically compares proposal content against the semantic requirements, constraints, etc. defined in the Procurement Document Spec. This engine validates both structural conformance and semantic compliance, producing a quantitative compliance score that objectively measures how well each proposal meets the specified requirements. The architecture of the Enterprise Mesh—comprising a specification graph and an instance graph-enables this validation by comparing the runtime instances of vendor proposals against the governing specification model.

In some embodiments, this may be further extended by facilitating not just documentation comparisons, but also the "integration" of different solutions against procurement and/or expected solution specs as detailed in the description of FIG. 13.

Governance in the EM/SKL context refers to the set of policies, rules, and processes that ensure the whole ecosystem runs in a compliant, secure, and coherent manner—and importantly, many of these rules are themselves encoded in the SKL specifications (making them computable). This concept covers governance of data (ensuring proper access controls, classifications, lineage), of schemas (who can create or modify an SKL Spec, how versions are approved), and of interactions (enforcing SLAs, auditing agent decisions).

The Enterprise Mesh, by design, supports federated ecosystem governance: each domain or team can have autonomy over their specs and data, but within enterprise-wide guardrails and common standards, expressed through semantically linked specifications. For example, an enterprise policy might require that all skl:Properties containing personally identifiable information must reference a "PersonallyIdentifiableInformation" DefinedTerm that has associated security policies—any specification that violates this can be automatically flagged during validation.

Governance also encompasses continuous monitoring and compliance verification: because specifications and term sets are semantically explicit, enforcement points can dynamically check at runtime (and/or at other times) whether interactions conform (or historically conformed) to declared policies. The EM approach to governance is adaptive-policies can evolve by updating the relevant specifications (e.g., strengthen an access control policy, and enforcement points across the mesh immediately enforce the new requirements). This enables continuous evolution without disruption, maintaining trust and alignment with regulations through a living architecture where governance rules are first-class semantic assets.

The collaborative configuration, solution evolution, and AI-assisted task generation illustrated in FIGS. 44-48 represent specific applications of broader semantic orchestration and AI integration capabilities within the Enterprise Mesh. These capabilities extend beyond user interfaces and task generation to encompass comprehensive frameworks for agent-to-agent communication, specification development, artifact generation, and cross-domain orchestration.

The following sections elaborate on the semantic orchestration and AI integration capabilities of the Enterprise Mesh, expanding on the concepts illustrated in FIGS. 44-48 to describe comprehensive frameworks for agent-to-agent communication, specification development, artifact generation, and cross-domain orchestration.

Agent-to-Agent Communication

In various embodiments, the Enterprise Mesh architecture includes a structured agent-to-agent communication framework where intelligent agents interact through semantically defined contracts based on SKL specifications. This framework transforms traditional service-oriented or API-driven architectures into a dynamic ecosystem where autonomous agents provide, consume, and mediate capabilities through a shared semantic understanding.

The agent-to-agent framework comprises several architectural components that collectively enable intelligent, policy-governed collaboration between autonomous systems. At its foundation is the Agent Capability Registry, which maintains a dynamic inventory of capabilities exposed by each agent in the mesh. Unlike traditional service registries that store endpoint information, this registry captures the semantic intent, governance constraints, and contextual applicability of each capability using SKL specifications.

Agents communicate through semantically typed messages that conform to SKL-defined specifications. These messages include not only payload data but also contextual metadata, security assertions, provenance information, and semantic annotations that enable intelligent routing and processing. For example, when an analytical agent (e.g., of the analytics server) requests data from a data provider agent, the request message may include unambiguous defined term IDs/classifications, purpose declarations, and capability expectations (priority, performance, format, granularity).

The Enterprise Mesh enables these communications through its federated semantic routing capabilities, where capability resolution, policy enforcement, and intelligent routing occur based on the semantic definitions within SKL specifications. Unlike traditional centralized message brokers limited to syntactic patterns, this distributed approach allows a server anywhere in the mesh to interpret the semantic content of messages to match capabilities with requests, enforce access controls, apply transformations, and maintain governance boundaries. The system may employ spec discovery methods and/or capability switching to dynamically select the optimal implementation to fulfill a capability request based on context, load, policies, or other factors (as described elsewhere herein).

In advanced implementations, as with humans-in-the-loop, Enterprise Mesh supports negotiation protocols where agents can engage in multi-step exchanges to refine requests using similar collaboration assets as human-machine and/or human-human collaboration, including messages, tasks, comments, and more. For example, a planning agent may negotiate via messages and/or using other artifacts with one or more resource provider agents to optimize a task assignment based on availability, capabilities, and constraints—all expressed through SKL specifications and data instances that both parties can interpret.

One or more agent interactions may remain governed by the policies, access controls, and semantic contracts defined within the Enterprise Mesh and that can be used to govern all User Accounts. Message exchanges, capability invocation, and negotiation sequence may be subject to validation, logging, and policy enforcement, so that even emergent behaviors remain within governance boundaries, depending on specific policy configurations.

The AI agents 4708 shown in FIG. 47 and the collaborative functions illustrated in FIG. 46 demonstrate aspects of this agent-to-agent framework, enabling the coordinated generation and management of tasks within a governed semantic environment.

AI-Assisted Specification Development Framework

In certain embodiments, the Enterprise Mesh incorporates a multi-agent AI framework for the generation, refinement, and evolution of SKL specifications. This framework facilitates the acceleration of the development of their semantic architecture while maintaining governance and quality standards.

This automated or semi-automated specification development may be done by one or more AI agents that analyze various inputs—such as business requirements, legacy documentation, existing code repositories, regulatory frameworks, and operational telemetry—to generate or refine SKL specifications. Unlike traditional code generation systems limited to producing implementation artifacts, this approach generates the semantic contracts themselves as machine-interpretable SKL specifications that subsequently guide system behavior, governance, and integration. It is understood that the analytics server may execute one or more AI agents to execute one or more of the methods and steps described herein.

In a non-limiting example, a Requirements Analysis Agent interprets natural language descriptions, regulatory documents, or existing technical specifications to extract key entities, capabilities, constraints, and policies. This agent may employ natural language processing and domain-specific reasoning to identify candidate objects, capabilities, and their relationships. The output of this analysis process forms a semantic network of concepts, Requirements, Defined Terms, etc. in a domain or product that may serves as input for subsequent cleanup and/or specification generation.

A Data Preparation Agent may then clean up the semantic network of terms and artifacts to identify potential issues or areas where confidence is low. This agent may then pass through terms and artifacts without issues to a Spec Generation Agent, which then creates formalized SKL specifications around the Defined Terms and begins to relate them to other artifacts like requirements, constraints, etc. It may use domain-specific templates, architectural patterns, and governance constraints to produce structurally valid and semantically rich specifications. For instance, when generating a capability specification, the agent would define appropriate input and output schemas, identify potential policies to assign, and establish semantic links to related specifications within the enterprise mesh.

A Specification Validation Agent performs comprehensive semantic validation on generated specifications, verifying alignment with governance standards, architectural patterns, and domain constraints. This validation extends beyond syntactic correctness to include semantic consistency, compliance with polies, alignment with enterprise taxonomies, etc. If validation failures occur, the agent generates structured an alert or feedback (e.g., in the form of an Issue) that informs the refinement process, creating a closed-loop system for iterative improvement.

In more sophisticated implementations, these agents operate within a collaborative framework where Specification Evolution Agents continuously monitor the Enterprise Mesh for optimization opportunities. These agents analyze usage patterns, performance metrics, governance violations, and emerging requirements to suggest refinements to existing specifications or identify gaps requiring new specifications. For example, if a capability consistently fails to meet performance criteria in certain contexts, the evolution agent might suggest capability splitting, parameter optimization, improving underlying queries, or alternate implementation pathways.

This AI-driven specification development operates within the governance boundaries established by the enterprise mesh. All generated or modified specifications are subject to version control, policy enforcement, and semantic validation as described elsewhere in this disclosure. This ensures that even AI-generated specifications maintain semantic integrity within the broader architecture.

The collaboration between users 4410 and AI agents 4408 illustrated in FIG. 44 demonstrates this specification development framework in action, where AI systems assist in drafting, refining, and validating specifications while humans provide domain expertise and strategic direction.

Specification-Driven Artifact Generation

In certain embodiments, the Enterprise Mesh implements a specification-driven artifact generation framework that transforms SKL specifications into executable artifacts such as source code, user interfaces, documentation, and test suites.

According to a non-limiting embodiment, the artifact generation process begins with specification ingestion, wherein relevant SKL specifications are retrieved from the Enterprise Mesh. For code generation, this often includes at least one capability specification that defines the semantic contract (inputs, outputs, preconditions, postconditions), related object specifications that define data structures, and policy specifications that define governance constraints.

A Code Generation Agent interprets these specifications to produce implementation code in target programming languages. This agent may employ large language models, program synthesis techniques, or template-based generation, all guided by the formal structure and semantic content of the SKL specifications. The generated code implements the interfaces, data structures, and behavior defined in the specifications, including policy enforcement, error handling, and integration logic.

In some embodiments, the agents may simply implement a specific capability or workflow or policy node behind the semantic contract rather than attempt to develop an entire solution. In other embodiments, the system traverses the enterprise mesh to identify all specifications relevant to the generation task, following semantic relationships to ensure comprehensive context and then generate each of those components one at a time.

Moreover, when generating source code, the agent may incorporate context from related specifications when generating its output. For example, if a capability specification references the defined term "FinancialTransactionProcessing," the generation agent would automatically know to incorporate policies and patterns assigned to that Defined Term, such as transaction atomicity guarantees, comprehensive audit logging, and standardized error recovery mechanisms aligned with financial compliance requirements. Similarly, if input parameters reference object specifications with sensitive data classifications, the agent would know to generate appropriate validation, masking, or protection mechanisms.

A Specification Conformance Validator then ensures that each generated artifacts properly implements and conforms to the specifications from which they were derived. For code artifacts, this may include compilation or interpretation, verification of interface compliance, and assessment of behavioral alignment with the specification. The validator may automatically generate test suites from constraints embedded in the specifications, such as transforming SHACL constraints in object specifications into data validation tests or deriving input-output test cases from capability preconditions and postconditions.

Upon successful validation, generated artifacts are stored with explicit references to/from the versions of specifications from which they were derived. These references enable traceability, impact analysis, and regeneration when specifications evolve. When a specification changes, the system can identify all dependent artifacts and trigger appropriate regeneration or validation processes to maintain semantic alignment.

Beyond code generation, the framework supports production of complementary artifacts such as documentation, deployment configurations, etc. For example, a Documentation Agent might synthesize human-readable documentation in specific formats from the specifications' structural definitions and semantic annotations (purpose, motivation, examples).

This comprehensive approach to artifact generation ensures that all implementation artifacts-regardless of type or target platform-remain aligned with the semantically defined specifications in the Enterprise Mesh. As specifications evolve through governance processes, the generated artifacts evolve correspondingly, maintaining semantic consistency throughout the system lifecycle.

The tasks generated by AI agents 4708 in FIG. 47 represent one application of this specification-driven artifact generation framework, where specifications drive the production of actionable items with associated confidence scores and contextual metadata.

Cross-Domain Semantic Orchestration

In some implementations, the Enterprise Mesh provides cross-domain semantic orchestration capabilities that facilitate AI-driven coordination across traditionally disparate domains such as software development, legal/contractual frameworks, financial systems, and operational environments. This orchestration layer unifies these domains through SKL specifications that serve as a common semantic foundation interpretable by both human stakeholders and intelligent agents.

The semantic orchestration architecture employs specialized AI agents that understand domain-specific semantics while interpreting cross-domain relationships defined in the enterprise mesh. A Contract Management Agent may interpret legal requirements expressed as SKL policy specifications to automatically generate access control assignments, data handling procedures, or reporting workflows that ensure contractual compliance within software implementations. Similarly, a Financial Orchestration Agent might analyze cost specifications, usage telemetry, and capability invocation patterns to implement dynamic pricing, billing workflows, or budget enforcement mechanisms.

These cross-domain agents leverage the semantic precision of SKL specifications to perform accurate and consistent translation between domain contexts. For example, a regulatory requirement expressed in legal terminology can be accurately translated into specific software validation rules, access policies, and audit procedures because all domains reference the same underlying semantic structures defined in SKL. This decreases or eliminates traditional communication barriers between business, legal, and technical teams by providing a single source of truth interpretable from multiple perspectives.

The orchestration layer supports complex, multi-domain workflows such as regulatory-driven feature deployment, where the release of a new capability is coordinated across development, testing, legal review, financial approval, and operational deployment stages. Each domain maintains its own processes and tools while sharing a unified understanding of the capability's semantic definition, governing policies, deployment status, and operational characteristics.

In contract-driven implementations, SKL specifications simultaneously serve as technical requirements and contractual obligations. When a vendor implements a capability defined by a SKL specification, the Enterprise Mesh can automatically validate the implementation against both technical requirements (e.g., inputs, outputs, performance) and contractual obligations (security controls, compliance features, quality attributes). This validation can trigger downstream processes such as acceptance workflows, payment authorizations, or warranty activations.

Through this cross-domain orchestration, the Enterprise Mesh enables organizations to align or coordinate semantic definitions across all operational domains, ensuring that technical implementations, legal agreements, financial mechanisms, and operational processes maintain consistent semantic interpretation despite their diverse domain-specific expressions.

In certain embodiments, the Enterprise Mesh incorporates advanced artificial intelligence capabilities—including embedding models, large language models, graph neural networks, and joint embedding predictive architectures (JEPA)—to enhance semantic reasoning, adaptive generation, and governance across specifications and their implementations. These models operate over the mesh's knowledge graph to infer relationships, predict change impacts, and detect inconsistencies, supporting bi-directional evolution between specifications, code, policies, and project workflows. This unified intelligence framework allows AI agents to collaborate across lifecycle stages—planning, authoring, validating, deploying—while maintaining semantic alignment and traceability, resulting in a self-optimizing, continuously adaptive architecture.

I claim:

1. A computer-implemented method for decentralized interoperability across a distributed computing environment, comprising:

generating, by one or more processors, an enterprise mesh based at least in part on a standard knowledge language (SKL) defining a plurality of SKL specifications executable by the one or more processors, wherein the plurality of SKL specifications are machine-interpretable, semantically descriptive, and define a plurality of composable components within the enterprise mesh;

linking, by the one or more processors, a first SKL specification of the plurality of SKL specifications to a second SKL specification of the plurality of SKL specifications based at least in part on a semantically declarative relationship between the first SKL specification and the second SKL specification, wherein the semantically declarative relationship is embedded within a semantic definition of the first SKL specification and stored within a data structure of the first SKL specification, the semantically declarative relationship identifying the second SKL specification by a unique identifier;

receiving, by the one or more processors, a versioning request to adjust the first SKL specification from a first version to second version;

versioning, by the one or more processors, the first SKL specification from the first version to the second version based at least in part on the versioning request;

traversing, by the one or more processors, the enterprise mesh to identify semantically linked SKL specifications that are linked to the first SKL specification;

upon versioning the first SKL specification to the second version and identifying the second SKL specification as being linked to the first SKL specification, validating, by the one or more processors, the second SKL specification; and executing, by the one or more processors, the second SKL specification by dynamically interpreting a data structure of the second SKL specification at runtime to modify an operation of the enterprise mesh, wherein the operation is interpreted based on validating the second SKL specification, and wherein the semantically declarative relationship directs at least part of an execution flow of the operation.

2. The computer-implemented method of claim 1, further comprising:

receiving, by the one or more processors, an indication of a broken link between the first SKL specification and the second SKL specification based in part on versioning of the first SKL specification; and generating, by the one or more processors, an alert indicating the broken link and a cause of the broken link.

3. The computer-implemented method of claim 2, further comprising:

remediating, by the one or more processors, the broken link by performing one or more of (1) generating a provisional revision of the second SKL specification, (2) selecting a compatible alternative version of the first SKL specification, (3) applying a fallback mapping to maintain compatibility between the first SKL specification and the second SKL specification, or (4) creating a structured issue identifying the broken link and associated remediation metadata.

4. The computer-implemented method of claim 1, wherein the enterprise mesh includes at least one SKL product, wherein the at least one SKL product is a sub-enterprise mesh that comprises a second plurality of SKL specifications with bi-directional inherencies with the plurality of SKL specifications of the enterprise mesh.

5. The computer-implemented method of claim 1, further comprising:

in response at least in part to validating the second SKL specification, generating, by the one or more processors, execution code for executing the second SKL specification based at least in part on the second version of the first SKL specification.

6. The computer-implemented method of claim 1, wherein the first SKL specification is one of an object, a capability, a mapping, a policy, a workflow, and a product.

7. The computer-implemented method of claim 1, wherein the enterprise mesh further comprises a Zero Trust Architecture (ZTA) for accessing protected data.

8. The computer-implemented method of claim 1, further comprising:

determining that the second SKL specification does not satisfy a validation rule; and withholding promotion of the second SKL specification to a runtime-executable state based on determining that the second SKL specification does not satisfy the validation rule.

9. A system comprising:

one or more processors; and a computer-readable non-transitory storage medium containing instructions that when executed by the one or more processors, cause the one or more processors to perform a method comprising:

generating an enterprise mesh based at least in part on a standard knowledge language (SKL) defining a plurality of SKL specifications executable by the one or more processors, wherein the plurality of SKL specifications are machine-interpretable, semantically descriptive, and define a plurality of composable components within the enterprise mesh;

linking a first SKL specification of the plurality of SKL specifications to a second SKL specification of the plurality of SKL specifications based at least in part on a semantically declarative relationship between the first SKL specification and the second SKL specification, wherein the semantically declarative relationship is embedded within a semantic definition of the first SKL specification and stored within a data structure of the first SKL specification, the semantically declarative relationship identifying the second SKL specification by a unique identifier;

receiving a versioning request to adjust the first SKL specification from a first version to second version;

versioning the first SKL specification from the first version to the second version based at least in part on the versioning request;

traversing the enterprise mesh to identify semantically linked SKL specifications that are linked to the first SKL specification;

upon versioning the first SKL specification to the second version and identifying the second SKL specification as being linked to the first SKL specification, validating the second SKL specification; and executing the second SKL specification by dynamically interpreting a data structure of the second SKL specification at runtime to modify an operation of the enterprise mesh, wherein the operation is interpreted based on validating the second SKL specification, and wherein the semantically declarative relationship directs at least part of an execution flow of the operation.

10. The system of claim 9, the method further comprising:

receiving an indication of a broken link between the first SKL specification and the second SKL specification based in part on versioning of the first SKL specification; and generating an alert indicating the broken link and a cause of the broken link.

11. The system of claim 10, the method further comprising:

remediating the broken link by performing one or more of (1) generating a provisional revision of the second SKL specification, (2) selecting a compatible alternative version of the first SKL specification, (3) applying a fallback mapping to maintain compatibility between the first SKL specification and the second SKL specification, or (4) creating a structured issue identifying the broken link and associated remediation metadata.

12. The system of claim 9, wherein the enterprise mesh includes at least one SKL product, wherein the at least one SKL product is a sub-enterprise mesh that comprises a second plurality of SKL specifications with bi-directional inherencies with the plurality of SKL specifications of the enterprise mesh.

13. The system of claim 9, the method further comprising:

in response at least in part to validating the second SKL specification, generating execution code for executing the second SKL specification based at least in part on the second version of the first SKL specification.

14. The system of claim 9, wherein the first SKL specification is one of an object, a capability, a mapping, a policy, a workflow, and a product.

15. The system of claim 9, wherein the enterprise mesh further comprises a Zero Trust Architecture (ZTA) for accessing protected data.

16. The system of claim 9, wherein the enterprise mesh further comprises a knowledge graph of instances of objects adhering to SKL.

17. A computer-readable non-transitory storage medium containing instructions that, when executed by one or more processors, cause the one or more processors to perform a method comprising:

generating an enterprise mesh based at least in part on a standard knowledge language (SKL) defining a plurality of SKL specifications executable by the one or more processors, wherein the plurality of SKL specifications are machine-interpretable, semantically descriptive, and define a plurality of composable components within the enterprise mesh;

linking a first SKL specification of the plurality of SKL specifications to a second SKL specification of the plurality of SKL specifications based at least in part on a semantically declarative relationship between the first SKL specification and the second SKL specification, wherein the semantically declarative relationship is embedded within a semantic definition of the first SKL specification and stored within a data structure of the first SKL specification, the semantically declarative relationship identifying the second SKL specification by a unique identifier;

receiving a versioning request to adjust the first SKL specification from a first version to second version;

versioning the first SKL specification from the first version to the second version based at least in part on the versioning request;

traversing the enterprise mesh to identify semantically linked SKL specifications that are linked to the first SKL specification;

upon versioning the first SKL specification to the second version and identifying the second SKL specification as being linked to the first SKL specification, validating the second SKL specification; and executing the second SKL specification by dynamically interpreting a data structure of the second SKL specification at runtime to modify an operation of the enterprise mesh, wherein the operation is interpreted based on validating the second SKL specification, and wherein the semantically declarative relationship directs at least part of an execution flow of the operation.

18. The computer-readable non-transitory storage medium of claim 17, the method further comprising:

receiving an indication of a broken link between the first SKL specification and the second SKL specification based in part on versioning of the first SKL specification; and generating an alert indicating the broken link and a cause of the broken link.

19. The computer-readable non-transitory storage medium of claim 18, the method further comprising:

remediating the broken link by performing one or more of (1) generating a provisional revision of the second SKL specification, (2) selecting a compatible alternative version of the first SKL specification, (3) applying a fallback mapping to maintain compatibility between the first SKL specification and the second SKL specification, or (4) creating a structured issue identifying the broken link and associated remediation metadata.

20. The computer-readable non-transitory storage medium of claim 17, wherein the enterprise mesh includes at least one SKL product, wherein the at least one SKL product is a sub-enterprise mesh that comprises a second plurality of SKL specifications with bi-directional inherencies with the plurality of SKL specifications of the enterprise mesh.

* * * * *